(12) United States Patent
Kudurshian et al.

(10) Patent No.: US 12,175,977 B2
(45) Date of Patent: Dec. 24, 2024

(54) INTELLIGENT DIGITAL ASSISTANT IN A MULTI-TASKING ENVIRONMENT

(71) Applicant: Apple Inc., Cupertino, CA (US)

(72) Inventors: Aram D. Kudurshian, San Francisco, CA (US); Bronwyn Jones, San Francisco, CA (US); Elizabeth Caroline Furches Cranfill, San Francisco, CA (US); Harry J. Saddler, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/136,710

(22) Filed: Apr. 19, 2023

(65) Prior Publication Data

US 2023/0352016 A1 Nov. 2, 2023

Related U.S. Application Data

(63) Continuation of application No. 17/231,713, filed on Apr. 15, 2021, now Pat. No. 11,657,820, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 16/685* (2019.01);
(Continued)

(58) Field of Classification Search
CPC .................. G10L 2015/223; G10L 15/22; G10L 15/1815
See application file for complete search history.

(56) References Cited

U.S. PATENT DOCUMENTS 6,233,559 B1   5/2001   Balakrishnan
6,697,777 B1   2/2004   Ho et al.
(Continued)

FOREIGN PATENT DOCUMENTS

AU   2014100581 B4   9/2014
AU   2015203483 A1   7/2015
(Continued)

OTHER PUBLICATIONS

Advisory Action received for U.S. Appl. No. 16/024,447, mailed on Jan. 28, 2020, 7 pages.
(Continued)

*Primary Examiner* — Ibrahim Siddo
(74) *Attorney, Agent, or Firm* — DLA Piper LLP (US)

(57) ABSTRACT

Systems and processes for operating a digital assistant are provided. In one example, a method includes receiving a first speech input from a user. The method further includes identifying context information and determining a user intent based on the first speech input and the context information. The method further includes determining whether the user intent is to perform a task using a searching process or an object managing process. The searching process is configured to search data, and the object managing process is configured to manage objects. The method further includes, in accordance with a determination the user intent is to perform the task using the searching process, performing the task using the searching process; and in accordance with the determination that the user intent is to perform the task using the object managing process, performing the task using the object managing process.

51 Claims, 82 Drawing Sheets

Related U.S. Application Data continuation of application No. 16/717,790, filed on Dec. 17, 2019, now Pat. No. 11,037,565, which is a continuation of application No. 15/271,766, filed on Sep. 21, 2016, now Pat. No. 10,586,535.

(60) Provisional application No. 62/348,728, filed on Jun. 10, 2016.

(51) Int. Cl.
| | |
|---|---|
| *G06F 16/683* | (2019.01) |
| *G06F 16/9032* | (2019.01) |
| *G06F 16/951* | (2019.01) |
| *G10L 13/02* | (2013.01) |
| *G10L 15/18* | (2013.01) |
| *G10L 15/30* | (2013.01) |

(52) U.S. Cl.
CPC ........ *G06F 16/9032* (2019.01); *G06F 16/951* (2019.01); *G10L 13/02* (2013.01); *G10L 15/1815* (2013.01); *G10L 15/30* (2013.01); *G10L 2015/223* (2013.01); *G10L 2015/228* (2013.01)

(56) References Cited

U.S. PATENT DOCUMENTS

| | | | |
|---|---|---|---|
| 8,345,665 | B2 | 1/2013 | Vieri et al. |
| 8,346,563 | B1 | 1/2013 | Hjelm et al. |
| 8,346,757 | B1 | 1/2013 | Lamping et al. |
| 8,352,183 | B2 | 1/2013 | Thota et al. |
| 8,352,268 | B2 | 1/2013 | Naik et al. |
| 8,352,272 | B2 | 1/2013 | Rogers et al. |
| 8,355,919 | B2 | 1/2013 | Silverman et al. |
| 8,359,234 | B2 | 1/2013 | Vieri |
| 8,370,145 | B2 | 2/2013 | Endo et al. |
| 8,370,158 | B2 | 2/2013 | Gazdzinski |
| 8,371,503 | B2 | 2/2013 | Gazdzinski |
| 8,374,871 | B2 | 2/2013 | Ehsani et al. |
| 8,375,320 | B2 | 2/2013 | Kotler et al. |
| 8,380,504 | B1 | 2/2013 | Peden et al. |
| 8,380,507 | B2 | 2/2013 | Herman et al. |
| 8,381,107 | B2 | 2/2013 | Rottler et al. |
| 8,381,135 | B2 | 2/2013 | Hotelling et al. |
| 8,386,079 | B1 | 2/2013 | Kohler et al. |
| 8,386,485 | B2 | 2/2013 | Kerschberg et al. |
| 8,386,926 | B1 | 2/2013 | Matsuoka et al. |
| 8,391,844 | B2 | 3/2013 | Novick et al. |
| 8,392,717 | B2 | 3/2013 | Chai et al. |
| 8,396,295 | B2 | 3/2013 | Gao et al. |
| 8,396,714 | B2 | 3/2013 | Rogers et al. |
| 8,396,715 | B2 | 3/2013 | Odell et al. |
| 8,401,163 | B1 | 3/2013 | Kirchhoff et al. |
| 8,406,745 | B1 | 3/2013 | Upadhyay et al. |
| 8,407,239 | B2 | 3/2013 | Dean et al. |
| 8,418,086 | B2 | 4/2013 | Weber et al. |
| 8,423,288 | B2 | 4/2013 | Stahl et al. |
| 8,428,758 | B2 | 4/2013 | Naik et al. |
| 8,433,572 | B2 | 4/2013 | Caskey et al. |
| 8,433,778 | B1 | 4/2013 | Shreesha et al. |
| 8,434,133 | B2 | 4/2013 | Kulkarni et al. |
| 8,442,821 | B1 | 5/2013 | Vanhoucke |
| 8,447,612 | B2 | 5/2013 | Gazdzinski |
| 8,452,597 | B2 | 5/2013 | Bringert et al. |
| 8,452,602 | B1 | 5/2013 | Bringert et al. |
| 8,453,058 | B1 | 5/2013 | Coccaro et al. |
| 8,457,959 | B2 | 6/2013 | Kaiser |
| 8,458,115 | B2 | 6/2013 | Cai et al. |
| 8,458,278 | B2 | 6/2013 | Christie et al. |
| 8,463,592 | B2 | 6/2013 | Lu et al. |
| 8,464,150 | B2 | 6/2013 | Davidson et al. |
| 8,468,502 | B2 | 6/2013 | Lui et al. |
| 8,473,289 | B2 | 6/2013 | Jitkoff et al. |
| 8,473,485 | B2 | 6/2013 | Wong et al. |
| 8,477,323 | B2 | 7/2013 | Low et al. |
| 8,478,816 | B2 | 7/2013 | Parks et al. |
| 8,479,122 | B2 | 7/2013 | Hotelling et al. |
| 8,484,027 | B1 | 7/2013 | Murphy |
| 8,489,599 | B2 | 7/2013 | Bellotti |
| 8,498,670 | B2 | 7/2013 | Cha et al. |
| 8,498,857 | B2 | 7/2013 | Kopparapu et al. |
| 8,514,197 | B2 | 8/2013 | Shahraray et al. |
| 8,515,736 | B1 | 8/2013 | Duta |
| 8,515,750 | B1 | 8/2013 | Lei et al. |
| 8,521,513 | B2 | 8/2013 | Millett et al. |
| 8,521,526 | B1 | 8/2013 | Lloyd et al. |
| 8,521,531 | B1 | 8/2013 | Kim |
| 8,521,533 | B1 | 8/2013 | Ostermann et al. |
| 8,527,276 | B1 | 9/2013 | Senior et al. |
| 8,533,266 | B2 | 9/2013 | Koulomzin et al. |
| 8,537,033 | B2 | 9/2013 | Gueziec |
| 8,539,342 | B1 | 9/2013 | Lewis |
| 8,543,375 | B2 | 9/2013 | Hong |
| 8,543,397 | B1 | 9/2013 | Nguyen |
| 8,543,398 | B1 | 9/2013 | Strope et al. |
| 8,560,229 | B1 | 10/2013 | Park et al. |
| 8,560,366 | B2 | 10/2013 | Mikurak |
| 8,571,528 | B1 | 10/2013 | Channakeshava |
| 8,571,851 | B1 | 10/2013 | Tickner et al. |
| 8,577,683 | B2 | 11/2013 | Dewitt |
| 8,583,416 | B2 | 11/2013 | Huang et al. |
| 8,583,511 | B2 | 11/2013 | Hendrickson |
| 8,583,638 | B2 | 11/2013 | Donelli |
| 8,589,156 | B2 | 11/2013 | Burke et al. |
| 8,589,161 | B2 | 11/2013 | Kennewick et al. |
| 8,589,374 | B2 | 11/2013 | Chaudhari |
| 8,589,869 | B2 | 11/2013 | Wolfram |
| 8,589,911 | B1 | 11/2013 | Sharkey et al. |
| 8,595,004 | B2 | 11/2013 | Koshinaka |
| 8,595,642 | B1 | 11/2013 | Lagassey |
| 8,600,743 | B2 | 12/2013 | Lindahl et al. |
| 8,600,746 | B1 | 12/2013 | Lei et al. |
| 8,600,930 | B2 | 12/2013 | Sata et al. |
| 8,606,090 | B2 | 12/2013 | Eyer |
| 8,606,568 | B1 | 12/2013 | Tickner et al. |
| 8,606,576 | B1 | 12/2013 | Barr et al. |
| 8,606,577 | B1 | 12/2013 | Stewart et al. |
| 8,615,221 | B1 | 12/2013 | Cosenza et al. |
| 8,620,659 | B2 | 12/2013 | Di Cristo et al. |
| 8,620,662 | B2 | 12/2013 | Bellegarda |
| 8,626,681 | B1 | 1/2014 | Jurca et al. |
| 8,630,841 | B2 | 1/2014 | Van Caldwell et al. |
| 8,635,073 | B2 | 1/2014 | Chang |
| 8,638,363 | B2 | 1/2014 | King et al. |
| 8,639,516 | B2 | 1/2014 | Lindahl et al. |
| 8,645,128 | B1 | 2/2014 | Agiomyrgiannakis |
| 8,645,137 | B2 | 2/2014 | Bellegarda et al. |
| 8,645,138 | B1 | 2/2014 | Weinstein et al. |
| 8,654,936 | B1 | 2/2014 | Eslambolchi et al. |
| 8,655,646 | B2 | 2/2014 | Lee et al. |
| 8,655,901 | B1 | 2/2014 | Li et al. |
| 8,660,843 | B2 | 2/2014 | Falcon et al. |
| 8,660,849 | B2 | 2/2014 | Gruber et al. |
| 8,660,924 | B2 | 2/2014 | Hoch et al. |
| 8,660,970 | B1 | 2/2014 | Fiedorowicz |
| 8,661,112 | B2 | 2/2014 | Creamer et al. |
| 8,661,340 | B2 | 2/2014 | Goldsmith et al. |
| 8,670,979 | B2 | 3/2014 | Gruber et al. |
| 8,675,084 | B2 | 3/2014 | Bolton et al. |
| 8,676,273 | B1 | 3/2014 | Fujisaki |
| 8,676,583 | B2 | 3/2014 | Gupta et al. |
| 8,676,904 | B2 | 3/2014 | Lindahl |
| 8,677,377 | B2 | 3/2014 | Cheyer et al. |
| 8,681,950 | B2 | 3/2014 | Mack et al. |
| 8,682,667 | B2 | 3/2014 | Haughay |
| 8,687,777 | B1 | 4/2014 | Lavian et al. |
| 8,688,446 | B2 | 4/2014 | Yanagihara |
| 8,688,453 | B1 | 4/2014 | Joshi et al. |
| 8,689,135 | B2 | 4/2014 | Portele et al. |
| 8,694,322 | B2 | 4/2014 | Snitkovskiy et al. |
| 8,695,074 | B2 | 4/2014 | Saraf et al. |
| 8,696,364 | B2 | 4/2014 | Cohen |
| 8,706,472 | B2 | 4/2014 | Ramerth et al. |

(56) References Cited

U.S. PATENT DOCUMENTS

| | | |
|---|---|---|
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,825,474 B1 | 9/2014 | Zhai et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,843,369 B1 | 9/2014 | Sharifi |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,954,440 B1 | 2/2015 | Gattani et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,550 B2 | 3/2015 | Ko et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,013,992 B2 | 4/2015 | Perkins |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-Jefri et al. |
| 9,043,208 B2 | 5/2015 | Koch et al. |
| 9,043,211 B2 | 5/2015 | Haiut et al. |
| 9,043,319 B1 | 5/2015 | Burns et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,092,433 B2 | 7/2015 | Rodriguez |
| 9,092,789 B2 | 7/2015 | Anshul |
| 9,094,576 B1 | 7/2015 | Karakotsios |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,196,245 B2 | 11/2015 | Larcheveque et al. |
| 9,197,848 B2 | 11/2015 | Felkai et al. |
| 9,201,955 B1 | 12/2015 | Quintao et al. |
| 9,202,520 B1 | 12/2015 | Tang |
| 9,208,153 B1 | 12/2015 | Zaveri et al. |
| 9,213,754 B1 | 12/2015 | Zhan et al. |
| 9,214,137 B2 | 12/2015 | Bala et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,529 B1 | 12/2015 | Khafizova |

(56) References Cited

U.S. PATENT DOCUMENTS

| | | |
|---|---|---|
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,245,388 B2 | 1/2016 | Poulos et al. |
| 9,246,984 B2 | 1/2016 | Zises |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B2 | 2/2016 | Alvarez Guevara et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,298,358 B1 | 3/2016 | Wilden et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,865 B2 | 6/2016 | Berenson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,400,779 B2 | 7/2016 | Convertino et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,121 B2 | 10/2016 | Yang et al. |
| 9,466,294 B1 | 10/2016 | Tunstall-Pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,803 B2 | 12/2016 | Chen et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,571,995 B1 | 2/2017 | Scheer et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,584,946 B1 | 2/2017 | Lyren et al. |
| 9,586,318 B2 | 3/2017 | Djugash et al. |
| 9,602,946 B2 | 3/2017 | Karkkainen et al. |
| 9,607,612 B2 | 3/2017 | Deleeuw |
| 9,612,999 B2 | 4/2017 | Prakah-Asante et al. |
| 9,619,200 B2 | 4/2017 | Chakladar et al. |
| 9,619,459 B2 | 4/2017 | Hebert et al. |
| 9,620,113 B2 | 4/2017 | Kennewick et al. |
| 9,620,126 B2 | 4/2017 | Chiba |
| 9,626,695 B2 | 4/2017 | Balasubramanian et al. |
| 9,626,799 B2 | 4/2017 | McArdle et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,678,664 B2 | 6/2017 | Zhai et al. |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,691,384 B1 | 6/2017 | Wang et al. |
| 9,696,963 B2 | 7/2017 | Son et al. |
| 9,697,016 B2 | 7/2017 | Jacob |
| 9,697,822 B1 | 7/2017 | Naik et al. |
| 9,697,827 B1 | 7/2017 | Lilly et al. |
| 9,697,828 B1 | 7/2017 | Prasad et al. |
| 9,698,999 B2 | 7/2017 | Mutagi |
| 9,711,148 B1 | 7/2017 | Sharifi et al. |

(56) References Cited

U.S. PATENT DOCUMENTS

| | | |
|---|---|---|
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,754,591 B1 | 9/2017 | Kumar et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,891,811 B2 | 2/2018 | Federighi et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,940,616 B1 | 4/2018 | Morgan et al. |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,972,304 B2 | 5/2018 | Paulik et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,990,926 B1 | 6/2018 | Pearce |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,026,401 B1 | 7/2018 | Mutagi et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,048,748 B2 | 8/2018 | Sridharan et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,068,570 B2 | 9/2018 | Dai et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,688 B2 | 9/2018 | Piernot et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,127,926 B2 | 11/2018 | James |
| 10,134,425 B1 | 11/2018 | Johnson, Jr. |
| 10,135,965 B2 | 11/2018 | Woolsey et al. |
| 10,142,222 B1 | 11/2018 | Zhang |
| 10,146,923 B2 | 12/2018 | Pitkänen et al. |
| 10,147,421 B2 | 12/2018 | Liddell et al. |
| 10,147,441 B1 | 12/2018 | Pogue et al. |
| 10,149,156 B1 | 12/2018 | Tiku et al. |
| 10,162,512 B2 | 12/2018 | Seo et al. |
| 10,162,817 B2 | 12/2018 | Schlesinger et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,229,680 B1 | 3/2019 | Gillespie et al. |
| 10,237,711 B2 | 3/2019 | Linn et al. |
| 10,241,644 B2 | 3/2019 | Gruber et al. |
| 10,242,501 B1 | 3/2019 | Pusch et al. |
| 10,248,308 B2 | 4/2019 | Karunamuni et al. |
| 10,248,771 B1 | 4/2019 | Ziraknejad et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,282,737 B2 | 5/2019 | Clark et al. |
| 10,289,205 B1 | 5/2019 | Sumter et al. |
| 10,291,066 B1 | 5/2019 | Leabman et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |

(56) References Cited

U.S. PATENT DOCUMENTS

| | | |
|---|---|---|
| 10,311,871 B2 | 6/2019 | Newendorp et al. |
| 10,325,598 B2 | 6/2019 | Basye et al. |
| 10,331,312 B2 | 6/2019 | Napolitano et al. |
| 10,332,509 B2 | 6/2019 | Catanzaro et al. |
| 10,332,513 B1 | 6/2019 | D'souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,339,721 B1 | 7/2019 | Dascola et al. |
| 10,339,925 B1 | 7/2019 | Rastrow et al. |
| 10,346,540 B2 | 7/2019 | Karov et al. |
| 10,346,541 B1 | 7/2019 | Phillips et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,305 B2 | 7/2019 | Larcheveque et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,373,381 B2 | 8/2019 | Nuernberger et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,416,760 B2 | 9/2019 | Burns et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,431,210 B1 | 10/2019 | Huang et al. |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,497,366 B2 | 12/2019 | Sapugay et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,515,623 B1 | 12/2019 | Grizzel |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,559,225 B1 | 2/2020 | Tao et al. |
| 10,559,299 B1 | 2/2020 | Arel et al. |
| 10,566,007 B2 | 2/2020 | Fawaz et al. |
| 10,568,032 B2 | 2/2020 | Freeman et al. |
| 10,572,885 B1 | 2/2020 | Guo et al. |
| 10,579,401 B2 | 3/2020 | Dawes |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,628,483 B2 | 4/2020 | Rao et al. |
| 10,629,186 B1 | 4/2020 | Slifka |
| 10,630,795 B2 | 4/2020 | Aoki et al. |
| 10,642,934 B2 | 5/2020 | Heck et al. |
| 10,649,652 B2 | 5/2020 | Sun |
| 10,659,851 B2 | 5/2020 | Lister et al. |
| 10,671,428 B2 | 6/2020 | Zeitlin |
| 10,679,007 B2 | 6/2020 | Jia et al. |
| 10,679,608 B2 | 6/2020 | Mixter et al. |
| 10,684,099 B2 | 6/2020 | Zaetterqvist |
| 10,684,703 B2 | 6/2020 | Hindi et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,776,933 B2 | 9/2020 | Faulkner |
| 10,778,839 B1 | 9/2020 | Newstadt et al. |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,831,494 B2 | 11/2020 | Grocutt et al. |
| 10,832,031 B2 | 11/2020 | Kienzle et al. |
| 10,842,968 B1 | 11/2020 | Kahn et al. |
| 10,846,618 B2 | 11/2020 | Ravi et al. |
| 10,847,142 B2 | 11/2020 | Newendorp et al. |
| 10,860,629 B1 | 12/2020 | Gangadharaiah et al. |
| 10,861,483 B2 | 12/2020 | Feinauer et al. |
| 10,877,637 B1 | 12/2020 | Antos et al. |
| 10,880,668 B1 | 12/2020 | Robinson et al. |
| 10,885,277 B2 | 1/2021 | Ravi et al. |
| 10,892,996 B2 | 1/2021 | Piersol |
| 10,909,459 B2 | 2/2021 | Tsatsin et al. |
| 10,937,263 B1 | 3/2021 | Tout et al. |
| 10,937,410 B1 | 3/2021 | Rule |
| 10,942,702 B2 | 3/2021 | Piersol et al. |
| 10,942,703 B2 | 3/2021 | Martel et al. |
| 10,944,859 B2 | 3/2021 | Weinstein et al. |
| 10,957,310 B1 | 3/2021 | Mohajer et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,017,766 B2 | 5/2021 | Chao et al. |
| 11,037,565 B2 | 6/2021 | Kudurshian et al. |
| 11,038,934 B1 | 6/2021 | Hansen et al. |
| 11,043,220 B1 | 6/2021 | Hansen et al. |
| 11,048,473 B2 | 6/2021 | Carson et al. |
| 11,061,543 B1 | 7/2021 | Blatz et al. |
| 11,072,344 B2 | 7/2021 | Provost et al. |
| 11,076,039 B2 | 7/2021 | Weinstein et al. |
| 11,080,336 B2 | 8/2021 | Van Dusen |
| 11,086,858 B1 | 8/2021 | Koukoumidis et al. |
| 11,094,311 B2 | 8/2021 | Candelore et al. |
| 11,113,598 B2 | 9/2021 | Socher et al. |
| 11,126,331 B2 | 9/2021 | Lo et al. |
| 11,132,172 B1 | 9/2021 | Naik et al. |
| 11,133,008 B2 | 9/2021 | Piernot et al. |
| 11,151,899 B2 | 10/2021 | Pitschel et al. |
| 11,169,660 B2 | 11/2021 | Gupta et al. |
| 11,181,988 B1 | 11/2021 | Bellegarda et al. |
| 11,183,193 B1 | 11/2021 | Hansen et al. |
| 11,183,205 B1 | 11/2021 | Ebenezer et al. |
| 11,200,027 B2 | 12/2021 | Aggarwal et al. |
| 11,204,787 B2 | 12/2021 | Radebaugh et al. |
| 11,205,192 B1 | 12/2021 | Rivera et al. |
| 11,210,477 B2 | 12/2021 | Srinivasan et al. |
| 11,217,255 B2 | 1/2022 | Kim et al. |
| 11,235,248 B1 | 2/2022 | Orrino et al. |
| 11,269,426 B2 | 3/2022 | Jorasch et al. |
| 11,269,678 B2 | 3/2022 | Gruber et al. |

(56) References Cited

U.S. PATENT DOCUMENTS

| | | |
|---|---|---|
| 11,283,631 B2 | 3/2022 | Yan et al. |
| 11,289,082 B1 | 3/2022 | Lacy et al. |
| 11,418,461 B1 | 8/2022 | Elfardy et al. |
| 11,487,932 B2 | 11/2022 | Kramer |
| 11,507,183 B2 | 11/2022 | Manjunath et al. |
| 2003/0115067 A1 | 6/2003 | Ibaraki et al. |
| 2003/0167155 A1 | 9/2003 | Reghetti |
| 2005/0177359 A1 | 8/2005 | Lu et al. |
| 2006/0075429 A1 | 4/2006 | Istvan et al. |
| 2007/0150289 A1 | 6/2007 | Sakuramoto et al. |
| 2007/0174350 A1 | 7/2007 | Pell et al. |
| 2008/0189110 A1 | 8/2008 | Freeman et al. |
| 2008/0255852 A1 | 10/2008 | Hu |
| 2009/0054046 A1 | 2/2009 | Whittington et al. |
| 2009/0225041 A1 | 9/2009 | Kida et al. |
| 2009/0306989 A1 | 12/2009 | Kaji |
| 2009/0320126 A1 | 12/2009 | Harada |
| 2010/0031150 A1 | 2/2010 | Andrew |
| 2011/0075818 A1 | 3/2011 | Vance et al. |
| 2011/0282686 A1 | 11/2011 | Venon et al. |
| 2011/0295590 A1 | 12/2011 | Lloyd et al. |
| 2012/0035931 A1 | 2/2012 | LeBeau et al. |
| 2012/0041759 A1 | 2/2012 | Barker et al. |
| 2012/0084089 A1 | 4/2012 | Lloyd et al. |
| 2012/0233553 A1 | 9/2012 | Barrus |
| 2012/0265528 A1 | 10/2012 | Gruber et al. |
| 2012/0310642 A1 | 12/2012 | Cao et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0006957 A1 | 1/2013 | Huang et al. |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0022189 A1 | 1/2013 | Ganong et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038437 A1 | 2/2013 | Talati et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041685 A1 | 2/2013 | Yegnanarayanan |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0055402 A1 | 2/2013 | Amit et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0064104 A1 | 3/2013 | Bekiares et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0077772 A1 | 3/2013 | Lichorowic et al. |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0080890 A1 | 3/2013 | Krishnamurthi |
| 2013/0080972 A1 | 3/2013 | Moshrefi et al. |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085757 A1 | 4/2013 | Nakamura et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103383 A1 | 4/2013 | Du et al. |
| 2013/0103391 A1 | 4/2013 | Millmore et al. |
| 2013/0103405 A1 | 4/2013 | Namba et al. |
| 2013/0103698 A1 | 4/2013 | Schlipf |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124187 A1 | 5/2013 | Qin |
| 2013/0124189 A1 | 5/2013 | Baldwin |
| 2013/0124672 A1 | 5/2013 | Pan |
| 2013/0125168 A1 | 5/2013 | Agnihotri et al. |
| 2013/0130669 A1 | 5/2013 | Xiao et al. |

(56) References Cited

U.S. PATENT DOCUMENTS

| | | |
|---|---|---|
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132094 A1 | 5/2013 | Lim |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0177296 A1 | 7/2013 | Geisner et al. |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-Hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226580 A1 | 8/2013 | Witt-Ehsani |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0246920 A1 | 9/2013 | Fields et al. |
| 2013/0247055 A1 | 9/2013 | Berner et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0298139 A1 | 11/2013 | Resnick et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |

(56) References Cited

U.S. PATENT DOCUMENTS

| | | |
|---|---|---|
| 2013/0325448 A1 | 12/2013 | Levien et al. |
| 2013/0325460 A1 | 12/2013 | Kim et al. |
| 2013/0325473 A1 | 12/2013 | Larcher et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0332886 A1 | 12/2013 | Cranfill et al. |
| 2013/0337771 A1 | 12/2013 | Klein et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342487 A1 | 12/2013 | Jeon |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346016 A1 | 12/2013 | Suzuki et al. |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012575 A1 | 1/2014 | Ganong et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0019873 A1 | 1/2014 | Gupta et al. |
| 2014/0026037 A1 | 1/2014 | Garb et al. |
| 2014/0028029 A1 | 1/2014 | Jochman |
| 2014/0028477 A1 | 1/2014 | Michalske |
| 2014/0028603 A1 | 1/2014 | Xie et al. |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040228 A1 | 2/2014 | Kritt et al. |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040905 A1 | 2/2014 | Tsunoda et al. |
| 2014/0040918 A1 | 2/2014 | Li |
| 2014/0040961 A1 | 2/2014 | Green et al. |
| 2014/0046922 A1 | 2/2014 | Crook et al. |
| 2014/0046934 A1 | 2/2014 | Zhou et al. |
| 2014/0047001 A1 | 2/2014 | Phillips et al. |
| 2014/0051399 A1 | 2/2014 | Walker |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0058732 A1 | 2/2014 | Labsky et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |
| 2014/0071069 A1 | 3/2014 | Anderson et al. |
| 2014/0071241 A1 | 3/2014 | Yang et al. |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |

(56) References Cited

U.S. PATENT DOCUMENTS

| | | |
|---|---|---|
| 2014/0108357 A1 | 4/2014 | Procops et al. |
| 2014/0108391 A1 | 4/2014 | Volkert |
| 2014/0108792 A1 | 4/2014 | Borzycki et al. |
| 2014/0112556 A1 | 4/2014 | Kalinli-Akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122057 A1 | 5/2014 | Chelba et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0122589 A1 | 5/2014 | Fyke et al. |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142934 A1 | 5/2014 | Kim |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0148209 A1 | 5/2014 | Weng et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0165006 A1 | 6/2014 | Chaudhri et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181123 A1 | 6/2014 | Tuffet Blaise et al. |
| 2014/0181703 A1 | 6/2014 | Sullivan et al. |
| 2014/0181715 A1 | 6/2014 | Axelrod et al. |
| 2014/0181741 A1 | 6/2014 | Apacible et al. |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0200891 A1 | 7/2014 | Larcheveque et al. |
| 2014/0201655 A1 | 7/2014 | Mahaffey et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0253455 A1 | 9/2014 | Mauro et al. |
| 2014/0257809 A1 | 9/2014 | Goel et al. |
| 2014/0257815 A1 | 9/2014 | Zhao et al. |
| 2014/0257902 A1 | 9/2014 | Moore et al. |

(56) References Cited

U.S. PATENT DOCUMENTS

| | | |
|---|---|---|
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0341217 A1 | 11/2014 | Eisner et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358521 A1 | 12/2014 | Mikutel et al. |
| 2014/0358523 A1 | 12/2014 | Sheth et al. |
| 2014/0358549 A1 | 12/2014 | O'connor et al. |
| 2014/0359456 A1 | 12/2014 | Thiele et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |
| 2014/0380214 A1 | 12/2014 | Huang et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006147 A1 | 1/2015 | Schmidt |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |

(56) References Cited

U.S. PATENT DOCUMENTS

| | | |
|---|---|---|
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033130 A1 | 1/2015 | Scheessele |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0042640 A1 | 2/2015 | Algreatly |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046375 A1 | 2/2015 | Mandel et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0049884 A1 | 2/2015 | Ye |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0051901 A1 | 2/2015 | Stonehouse et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066473 A1 | 3/2015 | Jeong et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095159 A1 | 4/2015 | Kennewick et al. |
| 2015/0095268 A1 | 4/2015 | Greenzeiger et al. |
| 2015/0095278 A1 | 4/2015 | Flinn et al. |
| 2015/0095310 A1 | 4/2015 | Beaurepaire |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0112684 A1 | 4/2015 | Scheffer et al. |
| 2015/0113407 A1 | 4/2015 | Hoffert et al. |
| 2015/0113435 A1 | 4/2015 | Phillips |
| 2015/0113454 A1 | 4/2015 | Mclaughlin |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0121227 A1 | 4/2015 | Peng |
| 2015/0123898 A1 | 5/2015 | Kim et al. |
| 2015/0127336 A1 | 5/2015 | Lei et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0130716 A1 | 5/2015 | Sridharan et al. |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149146 A1 | 5/2015 | Abramovitz et al. |
| 2015/0149177 A1 | 5/2015 | Kalns et al. |
| 2015/0149182 A1 | 5/2015 | Kalns et al. |
| 2015/0149354 A1 | 5/2015 | McCoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160635 A1 | 6/2015 | Schofield et al. |
| 2015/0160855 A1 | 6/2015 | Bi |
| 2015/0161108 A1 | 6/2015 | Back |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0161997 A1 | 6/2015 | Wetsel et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169195 A1 | 6/2015 | Choi |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0177945 A1 | 6/2015 | Sengupta et al. |
| 2015/0178388 A1 | 6/2015 | Winnemoeller et al. |
| 2015/0178785 A1 | 6/2015 | Salonen |
| 2015/0179168 A1 | 6/2015 | Hakkani-Tur et al. |
| 2015/0179176 A1 | 6/2015 | Ryu et al. |
| 2015/0181285 A1 | 6/2015 | Zhang et al. |
| 2015/0185718 A1 | 7/2015 | Tappan et al. |

(56) References Cited

U.S. PATENT DOCUMENTS

| | | |
|---|---|---|
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0200879 A1 | 7/2015 | Wu et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228282 A1 | 8/2015 | Evrard |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Ehlen et al. |
| 2015/0235434 A1 | 8/2015 | Miller et al. |
| 2015/0235540 A1 | 8/2015 | Verna et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248494 A1 | 9/2015 | Mital |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255068 A1 | 9/2015 | Kim et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0261944 A1 | 9/2015 | Hosom et al. |
| 2015/0262443 A1 | 9/2015 | Chong |
| 2015/0262573 A1 | 9/2015 | Brooks et al. |
| 2015/0262583 A1 | 9/2015 | Kanda et al. |
| 2015/0269139 A1 | 9/2015 | McAteer et al. |
| 2015/0269420 A1 | 9/2015 | Kim et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279354 A1 | 10/2015 | Gruenstein et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0293602 A1 | 10/2015 | Kay et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310852 A1 | 10/2015 | Spizzo et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |

(56) References Cited

U.S. PATENT DOCUMENTS

| | | |
|---|---|---|
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350147 A1 | 12/2015 | Shepherd et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370455 A1 | 12/2015 | Van Os et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0373428 A1 | 12/2015 | Trollope et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1* | 12/2015 | Van Os ............ H04N 21/2541 725/38 |
| 2015/0382079 A1 | 12/2015 | Lister et al. |
| 2015/0382147 A1 | 12/2015 | Clark et al. |
| 2015/0382322 A1 | 12/2015 | Migicovsky et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018899 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0019896 A1 | 1/2016 | Alvarez Guevara et al. |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034447 A1* | 2/2016 | Shin ............... G06Q 10/107 704/3 |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0057203 A1 | 2/2016 | Gärdenfors et al. |
| 2016/0057475 A1* | 2/2016 | Liu ............... G11B 27/031 725/87 |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0066360 A1 | 3/2016 | Vinegrad et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071520 A1 | 3/2016 | Hayakawa |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092074 A1 | 3/2016 | Raux et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0105308 A1 | 4/2016 | Dutt |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0116980 A1 | 4/2016 | George-Svahn et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0139720 A1 | 5/2016 | Kritt et al. |

(56) References Cited

U.S. PATENT DOCUMENTS

| | | |
|---|---|---|
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0147739 A1 | 5/2016 | Lim et al. |
| 2016/0148610 A1 | 5/2016 | Kennewick, Jr. et al. |
| 2016/0148612 A1 | 5/2016 | Guo et al. |
| 2016/0148613 A1 | 5/2016 | Kwon et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154792 A1 | 6/2016 | Sarikaya et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0156990 A1 | 6/2016 | Miccoy et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0169267 A1 | 6/2016 | Pool |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173929 A1 | 6/2016 | Klappert |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0202957 A1 | 7/2016 | Siddall et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0226956 A1 | 8/2016 | Hong et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0234206 A1 | 8/2016 | Tunnell et al. |
| 2016/0239480 A1 | 8/2016 | Larcheveque et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0242148 A1 | 8/2016 | Reed |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283055 A1 | 9/2016 | Haghighat et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0291831 A1 | 10/2016 | Baek |
| 2016/0292603 A1 | 10/2016 | Prajapati et al. |
| 2016/0293157 A1 | 10/2016 | Chen et al. |
| 2016/0293167 A1 | 10/2016 | Chen et al. |
| 2016/0293168 A1 | 10/2016 | Chen |
| 2016/0294755 A1 | 10/2016 | Prabhu |
| 2016/0294813 A1 | 10/2016 | Zou |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0316349 A1 | 10/2016 | Lee et al. |
| 2016/0317924 A1 | 11/2016 | Tanaka et al. |
| 2016/0320838 A1 | 11/2016 | Teller et al. |
| 2016/0321239 A1 | 11/2016 | Iso-Sipilä et al. |
| 2016/0321243 A1 | 11/2016 | Walia et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0322055 A1 | 11/2016 | Sainath et al. |
| 2016/0328134 A1 | 11/2016 | Xu |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0342803 A1 | 11/2016 | Goodridge et al. |
| 2016/0350070 A1 | 12/2016 | Sung et al. |
| 2016/0350650 A1 | 12/2016 | Leeman-Munk et al. |
| 2016/0350812 A1 | 12/2016 | Priness et al. |
| 2016/0351190 A1 | 12/2016 | Piernot et al. |
| 2016/0352567 A1 | 12/2016 | Robbins et al. |

(56) References Cited

U.S. PATENT DOCUMENTS

| | | |
|---|---|---|
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358603 A1 | 12/2016 | Azam et al. |
| 2016/0358609 A1 | 12/2016 | Connell et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0364382 A1 | 12/2016 | Sarikaya |
| 2016/0365101 A1 | 12/2016 | Foy et al. |
| 2016/0371054 A1 | 12/2016 | Beaumont et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379105 A1 | 12/2016 | Moore, Jr. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004209 A1 | 1/2017 | Johl et al. |
| 2017/0004409 A1 | 1/2017 | Chu et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0027522 A1 | 2/2017 | Van Hasselt et al. |
| 2017/0031576 A1 | 2/2017 | Saoji et al. |
| 2017/0031711 A1 | 2/2017 | Wu et al. |
| 2017/0032440 A1 | 2/2017 | Paton |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0034087 A1 | 2/2017 | Borenstein et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0046025 A1 | 2/2017 | Dascola et al. |
| 2017/0046330 A1 | 2/2017 | Si et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0069321 A1 | 3/2017 | Toiyama |
| 2017/0069327 A1 | 3/2017 | Heigold et al. |
| 2017/0075653 A1 | 3/2017 | Dawidowsky et al. |
| 2017/0076518 A1 | 3/2017 | Patterson et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0083506 A1 | 3/2017 | Liu et al. |
| 2017/0084277 A1 | 3/2017 | Sharifi |
| 2017/0085547 A1 | 3/2017 | De Aguiar et al. |
| 2017/0085696 A1 | 3/2017 | Abkairov |
| 2017/0090428 A1 | 3/2017 | Oohara |
| 2017/0090569 A1 | 3/2017 | Levesque |
| 2017/0090864 A1 | 3/2017 | Jorgovanovic |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0108236 A1 | 4/2017 | Guan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0133009 A1 | 5/2017 | Cho et al. |
| 2017/0134807 A1 | 5/2017 | Shaw et al. |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0148307 A1 | 5/2017 | Yeom et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161439 A1 | 6/2017 | Raduchel et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0171139 A1 | 6/2017 | Marra et al. |
| 2017/0171387 A1 | 6/2017 | Vendrow |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |

(56) References Cited

U.S. PATENT DOCUMENTS

| | | |
|---|---|---|
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Boja et al. |
| 2017/0186429 A1 | 6/2017 | Giuli et al. |
| 2017/0186446 A1 | 6/2017 | Wosk et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0195856 A1 | 7/2017 | Snyder et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0201846 A1 | 7/2017 | Katayama et al. |
| 2017/0206002 A1 | 7/2017 | Badger et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0222961 A1 | 8/2017 | Beach et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0236517 A1 | 8/2017 | Yu et al. |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249291 A1 | 8/2017 | Patel |
| 2017/0249309 A1 | 8/2017 | Sarikaya |
| 2017/0256256 A1 | 9/2017 | Wang et al. |
| 2017/0257723 A1 | 9/2017 | Morishita et al. |
| 2017/0262051 A1 | 9/2017 | Tall et al. |
| 2017/0262432 A1 | 9/2017 | Sarikaya et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270092 A1 | 9/2017 | He et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0273044 A1 | 9/2017 | Alsina |
| 2017/0277691 A1 | 9/2017 | Agarwal |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0286407 A1 | 10/2017 | Chochowski et al. |
| 2017/0287218 A1 | 10/2017 | Nuernberger et al. |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308589 A1 | 10/2017 | Liu et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316779 A1 | 11/2017 | Mohapatra et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0337540 A1 | 11/2017 | Buckman et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0347180 A1 | 11/2017 | Petrank |
| 2017/0347222 A1 | 11/2017 | Kanter |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371865 A1 | 12/2017 | Eck et al. |
| 2017/0371866 A1 | 12/2017 | Eck |
| 2017/0371885 A1 | 12/2017 | Aggarwal et al. |
| 2017/0372703 A1 | 12/2017 | Sung et al. |
| 2017/0372719 A1 | 12/2017 | Li et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007210 A1 | 1/2018 | Todasco |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0018959 A1 | 1/2018 | Des Jardins et al. |
| 2018/0018973 A1 | 1/2018 | Moreno et al. |
| 2018/0020093 A1 | 1/2018 | Bentitou et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0039239 A1 | 2/2018 | Burchard |
| 2018/0041571 A1 | 2/2018 | Rogers et al. |
| 2018/0045963 A1 | 2/2018 | Hoover et al. |
| 2018/0046340 A1 | 2/2018 | Mall |
| 2018/0046851 A1 | 2/2018 | Kienzle et al. |
| 2018/0047201 A1 | 2/2018 | Filev et al. |
| 2018/0047288 A1 | 2/2018 | Cordell et al. |

(56) References Cited

U.S. PATENT DOCUMENTS

| | | |
|---|---|---|
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063276 A1 | 3/2018 | Foged |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0067929 A1 | 3/2018 | Ahn |
| 2018/0068074 A1 | 3/2018 | Shen |
| 2018/0068194 A1 | 3/2018 | Matsuda |
| 2018/0069743 A1 | 3/2018 | Bakken et al. |
| 2018/0075659 A1 | 3/2018 | Browy et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0077648 A1 | 3/2018 | Nguyen |
| 2018/0081739 A1 | 3/2018 | Gravenites et al. |
| 2018/0082692 A1 | 3/2018 | Khoury et al. |
| 2018/0083898 A1 | 3/2018 | Pham |
| 2018/0088788 A1 | 3/2018 | Cheung et al. |
| 2018/0088902 A1 | 3/2018 | Mese et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091732 A1 | 3/2018 | Wilson et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0097812 A1 | 4/2018 | Gillett et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0109920 A1 | 4/2018 | Aggarwal et al. |
| 2018/0113673 A1 | 4/2018 | Sheynblat |
| 2018/0114591 A1 | 4/2018 | Pribanic et al. |
| 2018/0121430 A1 | 5/2018 | Kagoshima et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137097 A1 | 5/2018 | Lim et al. |
| 2018/0137404 A1 | 5/2018 | Fauceglia et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0152558 A1 | 5/2018 | Chan et al. |
| 2018/0152803 A1 | 5/2018 | Seefeldt et al. |
| 2018/0157372 A1 | 6/2018 | Kurabayashi |
| 2018/0157398 A1 | 6/2018 | Kaehler et al. |
| 2018/0157408 A1 | 6/2018 | Yu et al. |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165278 A1 | 6/2018 | He et al. |
| 2018/0165801 A1 | 6/2018 | Kim et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0181370 A1 | 6/2018 | Parkinson |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0214061 A1 | 8/2018 | Knoth et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232608 A1 | 8/2018 | Pradeep et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0267952 A1 | 9/2018 | Osborne et al. |
| 2018/0268023 A1 | 9/2018 | Korpusik et al. |
| 2018/0268106 A1 | 9/2018 | Velaga |
| 2018/0268337 A1 | 9/2018 | Miller et al. |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293086 A1 | 10/2018 | Laird-Mcconnell et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0300952 A1 | 10/2018 | Evans et al. |
| 2018/0307216 A1 | 10/2018 | Ypma et al. |
| 2018/0307603 A1 | 10/2018 | Che |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0308491 A1 | 10/2018 | Oktem et al. |
| 2018/0314362 A1 | 11/2018 | Kim et al. |
| 2018/0314552 A1 | 11/2018 | Kim et al. |
| 2018/0314689 A1 | 11/2018 | Wang et al. |
| 2018/0314981 A1 | 11/2018 | Chen |

(56) References Cited

U.S. PATENT DOCUMENTS

| | | |
|---|---|---|
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329512 A1 | 11/2018 | Liao et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336006 A1 | 11/2018 | Chakraborty et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336893 A1 | 11/2018 | Robinson et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0342243 A1 | 11/2018 | Vanblon et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0366110 A1 | 12/2018 | Hashem et al. |
| 2018/0366116 A1 | 12/2018 | Nicholson et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0019508 A1 | 1/2019 | Rochford et al. |
| 2019/0020482 A1 | 1/2019 | Gupta et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0079724 A1 | 3/2019 | Feuz et al. |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087205 A1 | 3/2019 | Guday |
| 2019/0087412 A1 | 3/2019 | Seyed Ibrahim et al. |
| 2019/0087455 A1 | 3/2019 | He et al. |
| 2019/0090812 A1 | 3/2019 | Martin et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0096134 A1 | 3/2019 | Amacker et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0108834 A1 | 4/2019 | Nelson et al. |
| 2019/0114320 A1 | 4/2019 | Patwardhan et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139058 A1 | 5/2019 | Clark et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |
| 2019/0164546 A1 | 5/2019 | Piernot et al. |
| 2019/0172243 A1 | 6/2019 | Mishra et al. |
| 2019/0172458 A1 | 6/2019 | Mishra et al. |
| 2019/0172465 A1 | 6/2019 | Lee et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180749 A1 | 6/2019 | Carey et al. |
| 2019/0180750 A1 | 6/2019 | Renard et al. |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |

(56) References Cited

U.S. PATENT DOCUMENTS

| | | |
|---|---|---|
| 2019/0189125 A1 | 6/2019 | Van Os et al. |
| 2019/0190898 A1 | 6/2019 | Cui |
| 2019/0197053 A1 | 6/2019 | Graham et al. |
| 2019/0197119 A1 | 6/2019 | Zhang et al. |
| 2019/0213498 A1 | 7/2019 | Adjaoute |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0228581 A1 | 7/2019 | Dascola et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0237061 A1 | 8/2019 | Rusak et al. |
| 2019/0243902 A1 | 8/2019 | Saeki et al. |
| 2019/0244618 A1 | 8/2019 | Newendorp et al. |
| 2019/0251167 A1 | 8/2019 | Krishnapura Subbaraya et al. |
| 2019/0251339 A1 | 8/2019 | Hawker |
| 2019/0251960 A1 | 8/2019 | Maker et al. |
| 2019/0258852 A1 | 8/2019 | Shimauchi et al. |
| 2019/0259386 A1 | 8/2019 | Kudurshian et al. |
| 2019/0265886 A1 | 8/2019 | Moon et al. |
| 2019/0266246 A1 | 8/2019 | Wang et al. |
| 2019/0272318 A1 | 9/2019 | Suzuki et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0279622 A1 | 9/2019 | Liu et al. |
| 2019/0281387 A1 | 9/2019 | Woo et al. |
| 2019/0287012 A1 | 9/2019 | Asli et al. |
| 2019/0287522 A1 | 9/2019 | Lambourne et al. |
| 2019/0294769 A1 | 9/2019 | Lesso |
| 2019/0294962 A1 | 9/2019 | Vezer et al. |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0303504 A1 | 10/2019 | Pasumarthy |
| 2019/0304438 A1 | 10/2019 | Qian et al. |
| 2019/0310765 A1 | 10/2019 | Napolitano et al. |
| 2019/0311031 A1 | 10/2019 | Powell et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0324780 A1 | 10/2019 | Zhu et al. |
| 2019/0324925 A1 | 10/2019 | Toyoda et al. |
| 2019/0325081 A1 | 10/2019 | Liu et al. |
| 2019/0325866 A1 | 10/2019 | Bromand et al. |
| 2019/0333523 A1 | 10/2019 | Kim et al. |
| 2019/0335567 A1 | 10/2019 | Boudreau et al. |
| 2019/0339784 A1 | 11/2019 | Lemay et al. |
| 2019/0340252 A1 | 11/2019 | Huyghe |
| 2019/0341027 A1 | 11/2019 | Vescovi et al. |
| 2019/0341056 A1 | 11/2019 | Paulik et al. |
| 2019/0342748 A1 | 11/2019 | Kwatra et al. |
| 2019/0347063 A1 | 11/2019 | Liu et al. |
| 2019/0347525 A1 | 11/2019 | Liem et al. |
| 2019/0348022 A1 | 11/2019 | Park et al. |
| 2019/0349333 A1 | 11/2019 | Pickover et al. |
| 2019/0349622 A1 | 11/2019 | Kim et al. |
| 2019/0354256 A1 | 11/2019 | Karunamuni et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0361978 A1 | 11/2019 | Ray et al. |
| 2019/0362252 A1 | 11/2019 | Miller et al. |
| 2019/0362557 A1 | 11/2019 | Lacey et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0370443 A1 | 12/2019 | Lesso |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0377955 A1 | 12/2019 | Swaminathan et al. |
| 2019/0385043 A1 | 12/2019 | Choudhary et al. |
| 2019/0385418 A1 | 12/2019 | Mixter et al. |
| 2019/0387352 A1 | 12/2019 | Jot et al. |
| 2019/0391726 A1 | 12/2019 | Iskandar et al. |
| 2020/0012718 A1 | 1/2020 | Kung et al. |
| 2020/0019609 A1 | 1/2020 | Yu et al. |
| 2020/0020326 A1 | 1/2020 | Srinivasan et al. |
| 2020/0034421 A1 | 1/2020 | Ferrucci et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Lisa |
| 2020/0043489 A1 | 2/2020 | Bradley et al. |
| 2020/0044485 A1 | 2/2020 | Smith et al. |
| 2020/0045164 A1 | 2/2020 | Kwatra et al. |
| 2020/0051554 A1 | 2/2020 | Kim et al. |
| 2020/0051565 A1 | 2/2020 | Singh |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0066236 A1 | 2/2020 | Giusti et al. |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0082807 A1 | 3/2020 | Kim et al. |
| 2020/0084572 A1 | 3/2020 | Jadav et al. |
| 2020/0090393 A1 | 3/2020 | Shin et al. |
| 2020/0090658 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piernot et al. |
| 2020/0098368 A1 | 3/2020 | Lemay et al. |
| 2020/0103963 A1 | 4/2020 | Kelly et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0112454 A1 | 4/2020 | Brown et al. |
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0135213 A1 | 4/2020 | Kim et al. |
| 2020/0135226 A1 | 4/2020 | Mittal et al. |
| 2020/0137230 A1 | 4/2020 | Spohrer |
| 2020/0142505 A1 | 5/2020 | Choi et al. |
| 2020/0142554 A1 | 5/2020 | Lin et al. |
| 2020/0143812 A1 | 5/2020 | Walker, II et al. |

(56) References Cited

U.S. PATENT DOCUMENTS

| | | |
|---|---|---|
| 2020/0143819 A1 | 5/2020 | Delcroix et al. |
| 2020/0152186 A1 | 5/2020 | Koh et al. |
| 2020/0159579 A1 | 5/2020 | Shear et al. |
| 2020/0159651 A1 | 5/2020 | Myers |
| 2020/0159801 A1 | 5/2020 | Sekine |
| 2020/0160179 A1 | 5/2020 | Chien et al. |
| 2020/0160838 A1 | 5/2020 | Lee |
| 2020/0168120 A1 | 5/2020 | Rodriguez Bravo |
| 2020/0169637 A1 | 5/2020 | Sanghavi et al. |
| 2020/0175566 A1 | 6/2020 | Bender et al. |
| 2020/0176004 A1 | 6/2020 | Kleijn et al. |
| 2020/0176018 A1 | 6/2020 | Feinauer et al. |
| 2020/0184057 A1 | 6/2020 | Mukund |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0211566 A1 | 7/2020 | Kang et al. |
| 2020/0218074 A1 | 7/2020 | Hoover et al. |
| 2020/0218780 A1 | 7/2020 | Jun et al. |
| 2020/0218805 A1 | 7/2020 | Liu et al. |
| 2020/0219517 A1 | 7/2020 | Wang et al. |
| 2020/0220914 A1 | 7/2020 | Carrigan et al. |
| 2020/0221155 A1 | 7/2020 | Hansen et al. |
| 2020/0226481 A1 | 7/2020 | Sim et al. |
| 2020/0226823 A1 | 7/2020 | Stachniak et al. |
| 2020/0227034 A1 | 7/2020 | Summa et al. |
| 2020/0227044 A1 | 7/2020 | Lindahl |
| 2020/0228774 A1 | 7/2020 | Kar et al. |
| 2020/0243069 A1 | 7/2020 | Amores et al. |
| 2020/0243094 A1 | 7/2020 | Thomson et al. |
| 2020/0249985 A1 | 8/2020 | Zeitlin |
| 2020/0251111 A1 | 8/2020 | Temkin et al. |
| 2020/0252508 A1 | 8/2020 | Gray |
| 2020/0258508 A1 | 8/2020 | Aggarwal et al. |
| 2020/0258512 A1 | 8/2020 | Smith et al. |
| 2020/0258513 A1 | 8/2020 | Smith et al. |
| 2020/0267222 A1 | 8/2020 | Phipps et al. |
| 2020/0267503 A1 | 8/2020 | Watkins et al. |
| 2020/0272485 A1 | 8/2020 | Karashchuk et al. |
| 2020/0275216 A1 | 8/2020 | Mckinney et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294487 A1 | 9/2020 | Donohoe et al. |
| 2020/0294494 A1 | 9/2020 | Suyama et al. |
| 2020/0294508 A1 | 9/2020 | Kwasiborski et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0320988 A1 | 10/2020 | Rastogi et al. |
| 2020/0322571 A1 | 10/2020 | Awai |
| 2020/0327895 A1 | 10/2020 | Gruber et al. |
| 2020/0333875 A1 | 10/2020 | Bansal et al. |
| 2020/0334068 A1 | 10/2020 | Krishnamurthy et al. |
| 2020/0334492 A1 | 10/2020 | Zheng et al. |
| 2020/0335121 A1 | 10/2020 | Mosseri et al. |
| 2020/0342082 A1 | 10/2020 | Sapozhnykov et al. |
| 2020/0342182 A1 | 10/2020 | Johnson Premkumar et al. |
| 2020/0342849 A1 | 10/2020 | Yu et al. |
| 2020/0342863 A1 | 10/2020 | Aggarwal et al. |
| 2020/0348813 A1 | 11/2020 | Sharifi et al. |
| 2020/0356243 A1 | 11/2020 | Meyer et al. |
| 2020/0356589 A1 | 11/2020 | Rekik et al. |
| 2020/0356610 A1 | 11/2020 | Coimbra et al. |
| 2020/0356634 A1 | 11/2020 | Srinivasan et al. |
| 2020/0357387 A1 | 11/2020 | Prabhavalkar et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0364858 A1 | 11/2020 | Kaethner et al. |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372719 A1 | 11/2020 | Andjelic et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380984 A1 | 12/2020 | Venkatraman et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2020/0411002 A1 | 12/2020 | Lee et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0035567 A1 | 2/2021 | Newendorp et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0073254 A1 | 3/2021 | Ghafourifar et al. |
| 2021/0073293 A1 | 3/2021 | Fenton et al. |
| 2021/0074264 A1 | 3/2021 | Liang et al. |
| 2021/0074295 A1 | 3/2021 | Moreno et al. |
| 2021/0082400 A1 | 3/2021 | Vishnoi et al. |
| 2021/0082420 A1 | 3/2021 | Kraljic et al. |
| 2021/0089124 A1 | 3/2021 | Manjunath et al. |
| 2021/0090314 A1 | 3/2021 | Hussen et al. |
| 2021/0092128 A1 | 3/2021 | Leblang |
| 2021/0097998 A1 | 4/2021 | Kim et al. |
| 2021/0099317 A1 | 4/2021 | Hilleli et al. |
| 2021/0103366 A1 | 4/2021 | Behzadi et al. |
| 2021/0104232 A1 | 4/2021 | Lee et al. |
| 2021/0104236 A1 | 4/2021 | Doggett et al. |
| 2021/0105528 A1 | 4/2021 | Van Os et al. |
| 2021/0110106 A1 | 4/2021 | Vescovi et al. |
| 2021/0110115 A1 | 4/2021 | Moritz et al. |
| 2021/0110254 A1 | 4/2021 | Duy et al. |
| 2021/0117214 A1 | 4/2021 | Presant et al. |
| 2021/0124597 A1 | 4/2021 | Ramakrishnan et al. |
| 2021/0127031 A1 | 4/2021 | Kanemoto |
| 2021/0127220 A1 | 4/2021 | Mathieu et al. |
| 2021/0134318 A1 | 5/2021 | Harvey et al. |
| 2021/0141839 A1 | 5/2021 | Tang et al. |
| 2021/0143987 A1 | 5/2021 | Xu et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151053 A1 | 5/2021 | Takahashi et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |

(56) References Cited

U.S. PATENT DOCUMENTS

| | | |
|---|---|---|
| 2021/0173555 A1 | 6/2021 | Kandur Raja et al. |
| 2021/0174020 A1 | 6/2021 | Sohn et al. |
| 2021/0174022 A1 | 6/2021 | Ishikawa et al. |
| 2021/0174403 A1 | 6/2021 | Bellini et al. |
| 2021/0176521 A1 | 6/2021 | Matthews |
| 2021/0182716 A1 | 6/2021 | Muramoto et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0210089 A1 | 7/2021 | Ma et al. |
| 2021/0216134 A1 | 7/2021 | Fukunaga et al. |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0247959 A1 | 8/2021 | Agarwal et al. |
| 2021/0248804 A1 | 8/2021 | Hussen Abdelaziz et al. |
| 2021/0249009 A1 | 8/2021 | Manjunath et al. |
| 2021/0256980 A1 | 8/2021 | George-Svahn et al. |
| 2021/0258554 A1 | 8/2021 | Bruls et al. |
| 2021/0258881 A1 | 8/2021 | Freeman et al. |
| 2021/0264913 A1 | 8/2021 | Schramm et al. |
| 2021/0264916 A1 | 8/2021 | Kim et al. |
| 2021/0271333 A1 | 9/2021 | Hindi et al. |
| 2021/0273894 A1 | 9/2021 | Tian et al. |
| 2021/0278956 A1 | 9/2021 | Dolbakian et al. |
| 2021/0279548 A1 | 9/2021 | Adan et al. |
| 2021/0280180 A1 | 9/2021 | Skobeltsyn et al. |
| 2021/0281965 A1 | 9/2021 | Malik et al. |
| 2021/0287080 A1 | 9/2021 | Moloney |
| 2021/0294569 A1 | 9/2021 | Piersol et al. |
| 2021/0294571 A1 | 9/2021 | Carson et al. |
| 2021/0295602 A1 | 9/2021 | Scapel et al. |
| 2021/0303116 A1 | 9/2021 | Barlow |
| 2021/0303342 A1 | 9/2021 | Dunn et al. |
| 2021/0304075 A1 | 9/2021 | Duong et al. |
| 2021/0306812 A1 | 9/2021 | Gross et al. |
| 2021/0312917 A1 | 10/2021 | Weksler et al. |
| 2021/0312930 A1 | 10/2021 | Sugaya |
| 2021/0312931 A1 | 10/2021 | Paulik et al. |
| 2021/0313019 A1 | 10/2021 | Pribanic et al. |
| 2021/0314440 A1 | 10/2021 | Matias et al. |
| 2021/0318901 A1 | 10/2021 | Gruber et al. |
| 2021/0319178 A1 | 10/2021 | Zhang |
| 2021/0327409 A1 | 10/2021 | Naik |
| 2021/0327410 A1 | 10/2021 | Beaufays et al. |
| 2021/0334528 A1 | 10/2021 | Bray et al. |
| 2021/0335342 A1 | 10/2021 | Yuan et al. |
| 2021/0342050 A1 | 11/2021 | Wang |
| 2021/0342212 A1 | 11/2021 | Neumann |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |
| 2021/0358294 A1 | 11/2021 | Parashar et al. |
| 2021/0365161 A1 | 11/2021 | Ellis et al. |
| 2021/0365174 A1 | 11/2021 | Ellis et al. |
| 2021/0365641 A1 | 11/2021 | Zhang et al. |
| 2021/0365863 A1 | 11/2021 | Friske et al. |
| 2021/0366473 A1 | 11/2021 | Maeng |
| 2021/0366475 A1 | 11/2021 | Wilkosz et al. |
| 2021/0366480 A1 | 11/2021 | Lemay et al. |
| 2021/0373851 A1 | 12/2021 | Stasior et al. |
| 2021/0375275 A1 | 12/2021 | Yoon et al. |
| 2021/0375290 A1 | 12/2021 | Hu et al. |
| 2021/0377381 A1 | 12/2021 | Aggarwal et al. |
| 2021/0390259 A1 | 12/2021 | Hildick-Smith et al. |
| 2021/0390955 A1 | 12/2021 | Piernot et al. |
| 2021/0393168 A1 | 12/2021 | Santarelli et al. |
| 2021/0398187 A1 | 12/2021 | Narayanan et al. |
| 2021/0402306 A1 | 12/2021 | Huang |
| 2021/0406260 A1 | 12/2021 | Sharifi et al. |
| 2021/0407318 A1 | 12/2021 | Pitschel et al. |
| 2021/0407502 A1 | 12/2021 | Vescovi et al. |
| 2022/0004825 A1 | 1/2022 | Xie et al. |
| 2022/0013106 A1 | 1/2022 | Deng et al. |
| 2022/0019292 A1 | 1/2022 | Lemay et al. |
| 2022/0020367 A1 | 1/2022 | Orkin et al. |
| 2022/0021631 A1 | 1/2022 | Jina et al. |
| 2022/0021978 A1 | 1/2022 | Gui et al. |
| 2022/0028379 A1 | 1/2022 | Carbune et al. |
| 2022/0028387 A1 | 1/2022 | Walker et al. |
| 2022/0030345 A1 | 1/2022 | Gong et al. |
| 2022/0035999 A1 | 2/2022 | Pawelec |
| 2022/0043986 A1 | 2/2022 | Nell et al. |
| 2022/0050661 A1 | 2/2022 | Lange et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0092262 A1 | 3/2022 | Ni et al. |
| 2022/0093088 A1 | 3/2022 | Sridhar et al. |
| 2022/0093095 A1 | 3/2022 | Dighe et al. |
| 2022/0093098 A1 | 3/2022 | Samal et al. |
| 2022/0093101 A1 | 3/2022 | Krishnan et al. |
| 2022/0093109 A1 | 3/2022 | Orr et al. |
| 2022/0093110 A1 | 3/2022 | Kim et al. |
| 2022/0094765 A1 | 3/2022 | Niewczas |
| 2022/0100789 A1 | 3/2022 | Kumar et al. |
| 2022/0103491 A1 | 3/2022 | Yang et al. |
| 2022/0107780 A1 | 4/2022 | Gruber et al. |
| 2022/0114327 A1 | 4/2022 | Faaborg et al. |
| 2022/0115016 A1 | 4/2022 | Whalin |
| 2022/0122615 A1 | 4/2022 | Chen et al. |
| 2022/0130126 A1 | 4/2022 | Delgado et al. |
| 2022/0139396 A1 | 5/2022 | Gada et al. |
| 2022/0148587 A1 | 5/2022 | Drummie et al. |
| 2022/0155857 A1 | 5/2022 | Lee et al. |
| 2022/0156041 A1 | 5/2022 | Newendorp et al. |
| 2022/0157310 A1 | 5/2022 | Newendorp et al. |
| 2022/0157315 A1 | 5/2022 | Raux et al. |
| 2022/0180868 A1 | 6/2022 | Sharifi et al. |
| 2022/0197491 A1 | 6/2022 | Meyer et al. |
| 2022/0198025 A1 | 6/2022 | Gupta et al. |
| 2022/0206298 A1 | 6/2022 | Goodman |
| 2022/0214775 A1 | 7/2022 | Shah et al. |
| 2022/0215159 A1 | 7/2022 | Qian et al. |
| 2022/0222437 A1 | 7/2022 | Lauber |
| 2022/0229985 A1 | 7/2022 | Bellegarda et al. |
| 2022/0230653 A1 | 7/2022 | Binder et al. |
| 2022/0253969 A1 | 8/2022 | Kamenetskaya et al. |
| 2022/0254338 A1 | 8/2022 | Gruber et al. |
| 2022/0254339 A1 | 8/2022 | Acero et al. |
| 2022/0254347 A1 | 8/2022 | Lindahl |
| 2022/0261468 A1 | 8/2022 | Lin et al. |
| 2022/0262354 A1 | 8/2022 | Greborio et al. |
| 2022/0264262 A1 | 8/2022 | Gruber et al. |
| 2022/0284901 A1 | 9/2022 | Novitchenko et al. |
| 2022/0291816 A1 | 9/2022 | Fan et al. |
| 2022/0292128 A1 | 9/2022 | Sharifi et al. |
| 2022/0293124 A1 | 9/2022 | Weinberg et al. |
| 2022/0293125 A1 | 9/2022 | Maddika et al. |
| 2022/0295170 A1 | 9/2022 | Ito et al. |
| 2022/0300094 A1 | 9/2022 | Hindi et al. |
| 2022/0301549 A1 | 9/2022 | Lee et al. |
| 2022/0301566 A1 | 9/2022 | Van Os et al. |
| 2022/0308718 A1 | 9/2022 | Klein et al. |
| 2022/0329691 A1 | 10/2022 | Chinthakunta et al. |
| 2022/0343066 A1 | 10/2022 | Kwong et al. |
| 2022/0366889 A1 | 11/2022 | Yerroju et al. |
| 2022/0374109 A1 | 11/2022 | Kramer et al. |
| 2022/0374110 A1 | 11/2022 | Ramaswamy et al. |
| 2022/0374597 A1 | 11/2022 | Bellegarda et al. |
| 2022/0374727 A1 | 11/2022 | Hansen et al. |
| 2022/0375466 A1 | 11/2022 | Hergenrader et al. |
| 2022/0375553 A1 | 11/2022 | Lasko et al. |
| 2022/0382843 A1 | 12/2022 | Gong et al. |
| 2022/0382994 A1 | 12/2022 | Cox et al. |
| 2022/0383044 A1 | 12/2022 | Bellegarda |
| 2022/0383864 A1 | 12/2022 | Gruber et al. |

(56) References Cited

U.S. PATENT DOCUMENTS

| | | | |
|---|---|---|---|
| 2022/0383872 | A1 | 12/2022 | Li et al. |
| 2022/0391585 | A1 | 12/2022 | Bellegarda et al. |
| 2022/0392446 | A1 | 12/2022 | Webber et al. |
| 2022/0405117 | A1 | 12/2022 | Gruber et al. |
| 2022/0406301 | A1 | 12/2022 | Barros et al. |
| 2022/0406309 | A1 | 12/2022 | Piernot et al. |
| 2022/0408173 | A1 | 12/2022 | Gong et al. |
| 2023/0013615 | A1 | 1/2023 | Sanghavi et al. |
| 2023/0017115 | A1 | 1/2023 | Sanghavi et al. |
| 2023/0018457 | A1 | 1/2023 | Zeitlin |
| 2023/0026764 | A1 | 1/2023 | Karashchuk et al. |
| 2023/0029028 | A1 | 1/2023 | Aitken et al. |
| 2023/0035643 | A1 | 2/2023 | Binder et al. |
| 2023/0035941 | A1 | 2/2023 | Herman et al. |
| 2023/0036059 | A1 | 2/2023 | Blatz et al. |
| 2023/0036798 | A1 | 2/2023 | Newendorp et al. |
| 2023/0040703 | A1 | 2/2023 | Lemay et al. |
| 2023/0042224 | A1 | 2/2023 | Patel et al. |
| 2023/0048256 | A1 | 2/2023 | Gui et al. |
| 2023/0050767 | A1 | 2/2023 | Mozayeni |
| 2023/0051062 | A1 | 2/2023 | Hu et al. |
| 2023/0057442 | A1 | 2/2023 | Stasior et al. |
| 2023/0058929 | A1 | 2/2023 | Lasko et al. |
| 2023/0066552 | A1 | 3/2023 | Van Os et al. |
| 2023/0072481 | A1 | 3/2023 | Acero et al. |
| 2023/0081605 | A1 | 3/2023 | O'Mara et al. |
| 2023/0087244 | A1 | 3/2023 | Akmal et al. |
| 2023/0098174 | A1 | 3/2023 | Simes et al. |
| 2023/0111509 | A1 | 4/2023 | Kim et al. |
| 2023/0112859 | A1 | 4/2023 | Vilhauer et al. |
| 2023/0134970 | A1 | 5/2023 | Rasipuram et al. |

FOREIGN PATENT DOCUMENTS

| | | |
|---|---|---|
| AU | 2015101171 A4 | 10/2015 |
| AU | 2017203668 A1 | 1/2018 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 1641563 A | 7/2005 |
| CN | 101709977 A | 5/2010 |
| CN | 101872156 A | 10/2010 |
| CN | 102057374 A | 5/2011 |
| CN | 102243692 A | 11/2011 |
| CN | 102647628 A | 8/2012 |
| CN | 202385210 U | 8/2012 |
| CN | 102693047 A | 9/2012 |
| CN | 102792320 A | 11/2012 |
| CN | 102857808 A | 1/2013 |
| CN | 102859480 A | 1/2013 |
| CN | 102866828 A | 1/2013 |
| CN | 102870065 A | 1/2013 |
| CN | 102882752 A | 1/2013 |
| CN | 102890936 A | 1/2013 |
| CN | 102893327 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102939515 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103078995 A | 5/2013 |
| CN | 103093334 A | 5/2013 |
| CN | 103093755 A | 5/2013 |
| CN | 103105995 A | 5/2013 |
| CN | 103109249 A | 5/2013 |
| CN | 103135916 A | 6/2013 |
| CN | 103187053 A | 7/2013 |
| CN | 103197963 A | 7/2013 |
| CN | 103198831 A | 7/2013 |
| CN | 103209369 A | 7/2013 |
| CN | 103217892 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103277974 A | 9/2013 |
| CN | 103280218 A | 9/2013 |
| CN | 103282957 A | 9/2013 |
| CN | 103292437 A | 9/2013 |
| CN | 103324100 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456303 A | 12/2013 |
| CN | 103456304 A | 12/2013 |
| CN | 103456306 A | 12/2013 |
| CN | 103457837 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103546453 A | 1/2014 |
| CN | 103562863 A | 2/2014 |
| CN | 103582896 A | 2/2014 |
| CN | 103593054 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103686723 A | 3/2014 |
| CN | 103714816 A | 4/2014 |
| CN | 103716454 A | 4/2014 |
| CN | 103727948 A | 4/2014 |
| CN | 103730120 A | 4/2014 |
| CN | 103744761 A | 4/2014 |
| CN | 103748531 A | 4/2014 |
| CN | 103760984 A | 4/2014 |
| CN | 103761104 A | 4/2014 |
| CN | 103765385 A | 4/2014 |
| CN | 103778527 A | 5/2014 |
| CN | 103780758 A | 5/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 102693729 B | 9/2014 |
| CN | 104036774 A | 9/2014 |
| CN | 104038621 A | 9/2014 |
| CN | 104050153 A | 9/2014 |
| CN | 104090652 A | 10/2014 |
| CN | 104092829 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104185868 A | 12/2014 |
| CN | 104219785 A | 12/2014 |
| CN | 104240701 A | 12/2014 |
| CN | 104243699 A | 12/2014 |
| CN | 104281259 A | 1/2015 |

(56) References Cited

FOREIGN PATENT DOCUMENTS

| | | |
|---|---|---|
| CN | 104281390 A | 1/2015 |
| CN | 104284257 A | 1/2015 |
| CN | 104284486 A | 1/2015 |
| CN | 104335205 A | 2/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104378723 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104520849 A | 4/2015 |
| CN | 104573472 A | 4/2015 |
| CN | 104575493 A | 4/2015 |
| CN | 104575501 A | 4/2015 |
| CN | 104575504 A | 4/2015 |
| CN | 104584010 A | 4/2015 |
| CN | 104584096 A | 4/2015 |
| CN | 104584601 A | 4/2015 |
| CN | 104604274 A | 5/2015 |
| CN | 104679472 A | 6/2015 |
| CN | 104685898 A | 6/2015 |
| CN | 104699746 A | 6/2015 |
| CN | 104731441 A | 6/2015 |
| CN | 104769584 A | 7/2015 |
| CN | 104769670 A | 7/2015 |
| CN | 104798012 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105144136 A | 12/2015 |
| CN | 105164678 A | 12/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105264903 A | 1/2016 |
| CN | 105265005 A | 1/2016 |
| CN | 105278681 A | 1/2016 |
| CN | 105320251 A | 2/2016 |
| CN | 105320726 A | 2/2016 |
| CN | 105338425 A | 2/2016 |
| CN | 105379234 A | 3/2016 |
| CN | 105427122 A | 3/2016 |
| CN | 105430186 A | 3/2016 |
| CN | 105468137 A | 4/2016 |
| CN | 105471705 A | 4/2016 |
| CN | 105472587 A | 4/2016 |
| CN | 105516441 A | 4/2016 |
| CN | 105554217 A | 5/2016 |
| CN | 105556592 A | 5/2016 |
| CN | 105677765 A | 6/2016 |
| CN | 105791920 A | 7/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106062790 A | 10/2016 |
| CN | 106164909 A | 11/2016 |
| CN | 106415412 A | 2/2017 |
| CN | 106462383 A | 2/2017 |
| CN | 106462617 A | 2/2017 |
| CN | 106463114 A | 2/2017 |
| CN | 106465074 A | 2/2017 |
| CN | 106471570 A | 3/2017 |
| CN | 106534469 A | 3/2017 |
| CN | 106558310 A | 4/2017 |
| CN | 106575195 A | 4/2017 |
| CN | 106575501 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107491469 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108268187 A | 7/2018 |
| CN | 108647681 A | 10/2018 |
| CN | 109447234 A | 3/2019 |
| CN | 109657629 A | 4/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 110945840 A | 3/2020 |
| CN | 111124224 A | 5/2020 |
| CN | 107123417 B | 6/2020 |
| CN | 111316203 A | 6/2020 |
| CN | 112204507 A | 1/2021 |
| DE | 202016008226 U1 | 5/2017 |
| EP | 2551784 A1 | 1/2013 |
| EP | 2555536 A1 | 2/2013 |
| EP | 2575128 A2 | 4/2013 |
| EP | 2608610 A1 | 6/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2741175 A2 | 6/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |

(56) References Cited

FOREIGN PATENT DOCUMENTS

| | | |
|---|---|---|
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2988513 A1 | 2/2016 |
| EP | 2891049 A4 | 3/2016 |
| EP | 3032532 A1 | 6/2016 |
| EP | 3035329 A1 | 6/2016 |
| EP | 3036594 A2 | 6/2016 |
| EP | 3038333 A1 | 6/2016 |
| EP | 3107101 A1 | 12/2016 |
| EP | 3115905 A1 | 1/2017 |
| EP | 3125097 A2 | 2/2017 |
| EP | 3132442 A1 | 2/2017 |
| EP | 2672231 B1 | 5/2017 |
| EP | 3161612 A1 | 5/2017 |
| EP | 3200185 A1 | 8/2017 |
| EP | 3224708 A1 | 10/2017 |
| EP | 3227771 A1 | 10/2017 |
| EP | 3246916 A1 | 11/2017 |
| EP | 3270658 A1 | 1/2018 |
| EP | 3300074 A1 | 3/2018 |
| EP | 3336805 A1 | 6/2018 |
| EP | 2973380 B1 | 8/2018 |
| EP | 2983065 B1 | 8/2018 |
| EP | 3382530 A1 | 10/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3550483 A1 | 10/2019 |
| EP | 3567584 A1 | 11/2019 |
| EP | 3588912 A1 | 1/2020 |
| EP | 3323058 B1 | 2/2020 |
| EP | 3321928 B1 | 4/2020 |
| EP | 2992490 B1 | 2/2021 |
| EP | 4131256 A1 | 2/2023 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-88535 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-231655 A | 11/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-182042 A | 9/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-10979 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-520409 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-156845 A | 9/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 6291147 B1 | 2/2018 |
| JP | 2018-64297 A | 4/2018 |
| JP | 2018-511095 A | 4/2018 |
| JP | 2018-101242 A | 6/2018 |
| JP | 2018-113035 A | 7/2018 |
| JP | 2018-525950 A | 9/2018 |
| JP | 2018-536889 A | 12/2018 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |

(56) References Cited

FOREIGN PATENT DOCUMENTS

| | | |
|---|---|---|
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0048779 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-2015-0025059 A | 3/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-1510013 B1 | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0096774 A | 8/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0122837 A | 11/2018 |
| KR | 10-2018-0133525 A | 12/2018 |
| KR | 10-2018-0135877 A | 12/2018 |
| KR | 10-1959328 B1 | 3/2019 |
| KR | 10-2020-0007926 A | 1/2020 |
| KR | 10-2020-0105519 A | 9/2020 |
| RU | 2012141604 A | 4/2014 |
| TW | 201312548 A | 3/2013 |
| TW | 201407184 A | 2/2014 |
| TW | 201610982 A | 3/2016 |
| TW | 201629750 A | 8/2016 |
| WO | 2010/002497 A1 | 1/2010 |
| WO | 2011/084156 A2 | 7/2011 |
| WO | 2011/088053 A2 | 7/2011 |
| WO | 2011/095523 A1 | 8/2011 |
| WO | 2011/116309 A1 | 9/2011 |
| WO | 2012/033312 A1 | 3/2012 |
| WO | 2012/092562 A1 | 7/2012 |
| WO | 2012/145227 A1 | 10/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/008461 A1 | 1/2014 |
| WO | 2014/018580 A1 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/040022 A2 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/073825 A1 | 5/2014 |
| WO | 2014/078965 A1 | 5/2014 |
| WO | 2014/093339 A1 | 6/2014 |
| WO | 2014/093911 A2 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/149473 A1 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197339 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/200731 A1 | 12/2014 |
| WO | 2014/203495 A1 | 12/2014 |
| WO | 2014/204659 A2 | 12/2014 |
| WO | 2014/209264 A1 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/054141 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |

(56) References Cited

FOREIGN PATENT DOCUMENTS

| | | |
|---|---|---|
| WO | 2015/099939 A1 | 7/2015 |
| WO | 2015/112625 A1 | 7/2015 |
| WO | 2015/116151 A1 | 8/2015 |
| WO | 2015/121449 A1 | 8/2015 |
| WO | 2015/127404 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183368 A1 | 12/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/004074 A1 | 1/2016 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/045192 A1 | 3/2016 |
| WO | 2016/048789 A1 | 3/2016 |
| WO | 2016/049439 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/118344 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/191737 A2 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/203484 A1 | 11/2017 |
| WO | 2017/210035 A1 | 12/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/014788 A1 | 1/2018 |
| WO | 2018/044633 A1 | 3/2018 |
| WO | 2018/057269 A1 | 3/2018 |
| WO | 2018/067528 A1 | 4/2018 |
| WO | 2018/075170 A1 | 4/2018 |
| WO | 2018/081833 A1 | 5/2018 |
| WO | 2018/090060 A1 | 5/2018 |
| WO | 2018/176053 A1 | 9/2018 |
| WO | 2018/208506 A1 | 11/2018 |
| WO | 2018/209152 A1 | 11/2018 |
| WO | 2018/213401 A1 | 11/2018 |
| WO | 2018/213415 A1 | 11/2018 |
| WO | 2018/213481 A1 | 11/2018 |
| WO | 2018/217014 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/190646 A2 | 10/2019 |
| WO | 2019/236217 A1 | 12/2019 |
| WO | 2020/010530 A1 | 1/2020 |
| WO | 2020/022572 A1 | 1/2020 |
| WO | 2020/096706 A1 | 5/2020 |
| WO | 2020/109074 A1 | 6/2020 |
| WO | 2020/208302 A1 | 10/2020 |
| WO | 2021/054565 A1 | 3/2021 |
| WO | 2021/061349 A1 | 4/2021 |
| WO | 2021/062148 A1 | 4/2021 |
| WO | 2021/188439 A1 | 9/2021 |
| WO | 2021/252230 A1 | 12/2021 |
| WO | 2022/047214 A2 | 3/2022 |

OTHER PUBLICATIONS

"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "VoiceOver for OS X", Online available at:—<http://www.apple.com/accessibility/voiceover/>, May 19, 2014, pp. 1-3.
Applicant Initiated Interview Summary received for U.S. Appl. No. 16/024,447, mailed on Oct. 2, 2019, 4 pages.
Applicant-Initiated Interview Summary received for U.S. Appl. No. 16/024,447, mailed on Jan. 17, 2020, 4 pages.
Applicant-Initiated Interview Summary received for U.S. Appl. No. 16/402,922, mailed on Apr. 28, 2020, 3 pages.
Applicant-Initiated Interview Summary received for U.S. Appl. No. 16/402,922, mailed on Jan. 17, 2020, 3 pages.
Applicant-Initiated Interview Summary received for U.S. Appl. No. 16/717,790, mailed on Dec. 15, 2020, 3 pages.
Asakura et al., "What LG thinks; How the TV should be in the Living Room", HiVi, vol. 31, No. 7, Stereo Sound Publishing, Inc., Jun. 17, 2013, pp. 68-71.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Ashingtondctech & Gaming, "SwipeStatusBar—Reveal the Status Bar in a Fullscreen App", Online Available at: <https://www.youtube.com/watch?v=wA_tT9|AreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Beointegration.com, "BeoLink Gateway—Programming Example", Online Available at: < https:/ /www.youtube.com/watch?v= TXDaJFm5UH4>, Mar. 4, 2015, 3 pages.

(56) References Cited

OTHER PUBLICATIONS

Bodapati et al., "Neural Word Decomposition Models for Abusive Language Detection", Proceedings of the Third Workshop on Abusive Language Online, Aug. 1, 2019, pp. 135-145.
Brief Communication Regarding Oral Proceedings received for European Patent Application No. 16904830.3, mailed on Feb. 3, 2021, 1 page.
Brief Communication Regarding Oral Proceedings received for European Patent Application No. 19150734.2, mailed on Nov. 17, 2020, 2 pages.
Brief Communication Regarding Oral Proceedings received for European Patent Application No. 19157463.1, mailed on Mar. 8, 2021, 2 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, And Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Corrected Notice of Allowance received for U.S. Appl. No. 15/271,766, mailed on Dec. 4, 2019, 2 pages.
Corrected Notice of Allowance received for U.S. Appl. No. 15/271,766, mailed on Jan. 28, 2020, 2 pages.
Corrected Notice of Allowance received for U.S. Appl. No. 15/271,766, mailed on Oct. 15, 2019, 2 pages.
Corrected Notice of Allowance received for U.S. Appl. No. 15/271,766, mailed on Sep. 30, 2019, 2 pages.
Corrected Notice of Allowance received for U.S. Appl. No. 16/402,922, mailed on Jul. 8, 2020, 2 pages.
Corrected Notice of Allowance received for U.S. Appl. No. 16/402,922, mailed on Oct. 27, 2020, 2 pages.
Corrected Notice of Allowance received for U.S. Appl. No. 16/402,922, mailed on Sep. 17, 2020, 2 pages.
Corrected Notice of Allowance received for U.S. Appl. No. 16/402,922, mailed on Sep. 28, 2020, 2 pages.
Corrected Notice of Allowance received for U.S. Appl. No. 16/717,790, mailed on Apr. 12, 2021, 2 pages.
Corrected Notice of Allowance received for U.S. Appl. No. 16/717,790, mailed on Apr. 28, 2021, 2 pages.
Corrected Notice of Allowance received for U.S. Appl. No. 16/717,790, mailed on Feb. 12, 2021, 2 pages.
Corrected Notice of Allowance received for U.S. Appl. No. 16/717,790, mailed on Mar. 8, 2021, 2 pages.
Corrected Notice of Allowance received for U.S. Appl. No. 16/717,790, mailed on Mar. 24, 2021, 2 pages.
Czech Lucas, "A System for Recognizing Natural Spelling of English Words", Diploma Thesis, Karlsruhe Institute of Technology, May 7, 2014, 107 pages.
Dai, et al., "Transformer-XL: Attentive Language Models Beyond a Fixed-Length Context", Online available at: arXiv:1901.02860v3, Jun. 2, 2019, 20 pages.
Decision to Grant received for Danish Patent Application No. PA201770032, mailed on May 22, 2019, 2 pages.
Decision to Grant received for Danish Patent Application No. PA201770035, mailed on Jun. 21, 2019, 2 pages.
Decision to Grant received for Danish Patent Application No. PA201770036, mailed on Oct. 8, 2018, 2 pages.
Decision to Grant received for European Patent Application No. 19150734.2, mailed on Apr. 22, 2021, 2 pages.
Decision to Grant received for European Patent Application No. 19157463.1, mailed on Jun. 30, 2022, 2 pages.
Decision to Refuse received for European Patent Application No. 16904830.3, mailed on Mar. 24, 2021, 20 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
"DIRECTV™ Voice", Now Part of the DIRECTTV Mobile App for Phones, Sep. 18, 2013, 5 pages.
Dwork et al., "The Algorithmic Foundations of Differential Privacy", Foundations and Trends in Theoretical Computer Science: vol. 9: No. 3-4, 211-407, 2014, 281 pages.
Earthling 1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Extended European Search Report received for European Patent Application No. 16904830.3, mailed on Jun. 24, 2019, 8 pages.
Extended European Search Report received for European Patent Application No. 19150734.2, mailed on Apr. 26, 2019, 8 pages.
Extended European Search Report received for European Patent Application No. 19157463.1, mailed on Jun. 6, 2019, 8 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 16/024,447, mailed on Oct. 11, 2019, 59 pages.
Final Office Action received for U.S. Appl. No. 16/402,922, mailed on Jan. 31, 2020, 22 pages.
Final Office Action Received for U.S. Appl. No. 15/271,766, mailed on Mar. 11, 2019, 17 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gatys et al., "Image Style Transfer Using Convolutional Neural Networks", Proceedings of IEEE International Conference on Acoustics, Speech and Signal Processing (ICASSP), 2016, pp. 2414-2423.

(56) References Cited

OTHER PUBLICATIONS

Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Online available at:—<https://www.youtube.com/watch?v=PS1FbB5qWEI>, Nov. 12, 2014, 1 page.
Gu et al., "BadNets: Evaluating Backdooring Attacks on Deep Neural Networks", IEEE Access, vol. 7, Mar. 21, 2019, pp. 47230-47244.
Guim, Mark, "How to Set a Person-Based Reminder with Cortana", Online available at:—<http://www.wpcentral.com/how-to-person-based-reminder-cortana>, Apr. 26, 2014, 15 pages.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
Hinton et al., "Distilling the Knowledge in a Neural Network", arXiv preprintarXiv:1503.02531, Mar. 2, 2015, 9 pages.
"How to Enable Google Assistant on Galaxy S7 and Other Android Phones (No Root)", Online available at:—<https://www.youtube.com/watch?v=HekIQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
ID3.org, "id3v2.4.0-Frames", Online available at:—<http://id3.org/id3v2.4.0-frames?action=print>, retrieved on Jan. 22, 2015, pp. 1-41.
Idasallinen, "What's The 'Like' Meter Based on?", Online Available at: <https://community.spotify.com/t5/Content-Questions/What-s-the-like-meter-based-on/td-p/1209974>, Sep. 22, 2015, 6 pages.
Ikeda, Masaru, "beGLOBAL SEOUL 2015 Startup Battle: Talkey", YouTube Publisher, Online Available at:—<https://www.youtube.com/watch?v=4Wkp7sAAldg>, May 14, 2015, 1 page.
Inews and Tech, "How to Use the QuickType Keyboard in IOS 8", Online available at:—<http://www.inewsandtech.com/how-to-use-the-quicktype-keyboard-in-ios-8/>, Sep. 17, 2014, 6 pages.
Intention to Grant received for Danish Patent Application No. PA201770032, mailed on Mar. 18, 2019, 2 pages.
Intention to Grant received for Danish Patent Application No. PA201770035, mailed on Apr. 26, 2019, 2 pages.
Intention to Grant received for Danish Patent Application No. PA201770036, mailed on May 1, 2018, 2 pages.
Intention to Grant received for European Patent Application No. 19150734.2, mailed on Dec. 1, 2020, 8 pages.
Intention to Grant received for European Patent Application No. 19157463.1, mailed on Jan. 7, 2022, 17 pages.
Intention to Grant received for European Patent Application No. 19157463.1, mailed on Mar. 1, 2022, 17 pages.
"Interactive Voice", Online available at:—<http://www.helloivee.com/company/>, retrieved on Feb. 10, 2014, 2 pages.
International Preliminary Report on Patentability received for PCT Patent Application No. PCT/US2016/059953, mailed on Dec. 20, 2018, 9 pages.
International Search Report and Written Opinion received for PCT Patent Application No. PCT/US2016/059953, mailed on Mar. 10, 2017., 13 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
Invitation to Pay Additional Fees Received for PCT Patent Application No. PCT/US2016/059953, mailed on Dec. 29, 2016, 2 pages.
"iPhone 6 Smart Guide Full Version for SoftBank", Gijutsu-Hyohron Co., Ltd., vol. 1, Dec. 1, 2014, 4 pages.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages. EFS Web 2.1.18.
Jeong, "Development Trend of N-Screen Service", Journal of Broadcasting Engineering, vol. 17, No. 1, Sep. 20212 18 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new Al bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition Via Anchor Word Representations", Interspeech 2017, Aug. 20-24, 2017, pp. 2471-2475.
Kondrat, Tomek, "Automation for Everyone with MacroDroid", Online available at: https://www.xda-developers.com/automation-for-everyone-with-macrodroid/, Nov. 17, 2013, 6 pages.
Kumatani et al., "Direct Modeling of Raw Audio with DNNS For Wake Word Detection", in 2017 IEEE Automatic Speech Recognition and Understanding Workshop (ASRU), 2017, 6 pages.
Lee, Sungjin, "Structured Discriminative Model For Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.

(56) References Cited

OTHER PUBLICATIONS

Luo et al., "Speaker-Independent Speech Separation With Deep Attractor Network", IEEE/ACM Transactions on Audio, Speech, and Language Processing, vol. 26, No. 4, Apr. 2018, pp. 787-796.
Maas et al., "Combining Acoustic Embeddings and Decoding Features for End-of-Utterance Detection in Real-Time Far-Field Speech Recognition Systems", in 2018 IEEE International Conference on Acoustics, Speech and Signal Processing (ICASSP). IEEE,, 2018, 5 pages.
Mallidi et al., "Device-Directed Utterance Detection", Proc. Interspeech, Aug. 7, 2018, 4 pages.
Marketing Land, "Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
Minutes of Oral Proceedings received for European Patent Application No. 19157463.1, mailed on Jan. 28, 2022, 9 pages.
Minutes of the Oral Proceedings received for European Patent Application No. 19157463.1, mailed on Dec. 22, 2021, 9 pages.
Mnih et al., "Human-Level Control Through Deep Reinforcement Learning", Nature, vol. 518, Feb. 26, 2015, pp. 529-533.
Modern Techies, "Braina-Artificial Personal Assistant for PC(like Cortana,Siri)!!!!", Online available at: <https://www.youtube.com/watch?v=_Coo2P8ilqQ>, Feb. 24, 2017, 3 pages.
Muller et al., "Control Theoretic Models of Pointing", ACM Transactions on Computer-Human Interaction, Aug. 2017, 36 pages.
Myers, Brad A., "Shortcutter for Palm", Available at: <http://www.cs.cmu.edu/~pebbles/v5/shortcutter/palm/index.html>, retrieved on Jun. 18, 2014, 10 pages.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 15/271,766, mailed on Oct. 1, 2018, 16 pages.
Non-Final Office Action received for U.S. Appl. No. 16/024,447, mailed on Feb. 28, 2020, 63 pages.
Non-Final Office Action received for U.S. Appl. No. 16/024,447, mailed on Jul. 3, 2019, 50 pages.
Non-Final Office Action received for U.S. Appl. No. 16/402,922, mailed on Oct. 18, 2019, 20 pages.
Non-Final Office Action received for U.S. Appl. No. 16/717,790, mailed on Sep. 28, 2020, 13 pages.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Notice of Acceptance received for Australian Patent application No. 2016409890, mailed on Jul. 6, 2018, 3 pages.
Notice of Acceptance received for Australian Patent Application No. 2018241102, mailed on May 22, 2019, 3 pages.
Notice of Acceptance received for Australian Patent Application No. 2019213416, mailed on Nov. 7, 2019, 3 pages.
Notice of Acceptance received for Australian Patent Application No. 2020201030, mailed on Apr. 23, 2021, 3 pages.
Notice of Allowance received for Chinese Patent Application No. 2016800792830, mailed on Apr. 13, 2021, 2 pages.
Notice of Allowance received for Chinese Patent Application No. 201910010561.2, mailed on Feb. 25, 2021, 2 pages.
Notice of Allowance received for Chinese Patent Application No. 201910115436.8, mailed on Aug. 16, 2022, 3 pages.
Notice of Allowance received for Japanese Patent Application No. 2019-121991, mailed on Dec. 13, 2019, 4 pages.
Notice of Allowance received for Korean Patent Application No. 10-2019-7004448, mailed on Sep. 28, 2020, 3 pages.
Notice of Allowance received for U.S. Appl. No. 15/271,766, mailed on Jul. 31, 2019, 19 pages.
Notice of Allowance received for U.S. Appl. No. 16/024,447, mailed on Apr. 22, 2020, 18 pages.
Notice of Allowance received for U.S. Appl. No. 16/402,922, mailed on Jun. 22, 2020, 10 pages.
Notice of Allowance received for U.S. Appl. No. 16/717,790, mailed on Jan. 19, 2021, 11 pages.
Notice of Allowance received for U.S. Appl. No. 17/231,713, mailed on Jan. 24, 2023, 11 pages.
Office Action received for Australian Patent Application No. 2019213416, mailed on Aug. 14, 2019, 4 pages.
Office Action received for Australian Patent Application No. 2020201030, mailed on Aug. 25, 2020, 4 pages.
Office Action received for Australian Patent Application No. 2020201030, mailed on Mar. 9, 2021, 4 pages.
Office Action received for Australian Patent Application No. 2020201030, mailed on Nov. 11, 2020, 4 pages.
Office Action received for Australian Patent Application No. 2021204695, mailed on Jun. 15, 2022, 5 pages.
Office Action received for Chinese Patent Application No. 201680079283.0, mailed on Oct. 9, 2020, 22 pages.
Office Action received for Chinese Patent Application No. 201910010561.2, mailed on Jul. 1, 2020, 19 pages.
Office Action received for Chinese Patent Application No. 201910115436.8, mailed on Mar. 14, 2022, 30 pages.
Office Action received for Chinese Patent Application No. 201910115436.8, mailed on Oct. 9, 2021, 28 pages.
Office Action received for Chinese Patent Application No. 202110689193.6, mailed on Aug. 1, 2022, 18 pages.
Office Action received for Chinese Patent Application No. 202110689193.6, mailed on Mar. 16, 2022, 7 pages.
Office Action received for Chinese Patent Application No. 202110689193.6, mailed on Nov. 11, 2022, 21 pages.
Office Action received for Danish Patent Application No. PA201770032, mailed on Apr. 16, 2018, 5 pages.
Office Action received for Danish Patent Application No. PA201770032, mailed on Apr. 18, 2017., 10 pages.
Office Action received for Danish Patent Application No. PA201770032, mailed on Feb. 18, 2019, 2 pages.
Office Action received for Danish Patent Application No. PA201770032, mailed on Oct. 19, 2017., 2 pages.
Office Action received for Danish Patent Application No. PA201770035, mailed on Jan. 8, 2019, 4 pages.
Office Action received for Danish Patent Application No. PA201770035, mailed on Mar. 20, 2018, 5 pages.
Office Action received for Danish Patent Application No. PA201770035, mailed on Mar. 23, 2017., 6 pages.
Office Action received for Danish Patent Application No. PA201770035, mailed on Oct. 17, 2017., 4 pages.
Office Action received for Danish Patent Application No. PA201770036, mailed on Feb. 21, 2018., 3 pages.
Office Action received for Danish Patent Application No. PA201770036, mailed on Jun. 20, 2017., 10 pages.
Office Action received for European Patent Application No. 16904830.3, mailed on Feb. 28, 2020, 7 pages.

(56) References Cited

OTHER PUBLICATIONS

Office Action received for European Patent Application No. 19150734.2, mailed on Feb. 21, 2020, 7 pages.
Office Action received for European Patent Application No. 19157463.1, mailed on Mar. 2, 2020, 7 pages.
Office Action received for Japanese Patent Application No. 2018-535277, mailed on Mar. 12, 2019, 7 pages.
Office Action received for Japanese Patent Application No. 2018-535277, mailed on Nov. 19, 2018, 10 pages.
Office Action received for Japanese Patent Application No. 2019-121991, mailed on Aug. 30, 2019, 4 pages.
Office Action received for Korean Patent Application No. 10-2018-7023111, mailed on Dec. 12, 2019, 6 pages.
Office Action received for Korean Patent Application No. 10-2018-7023111, mailed on Sep. 25, 2019, 6 pages.
Office Action received for Korean Patent Application No. 10-2019-7004448, mailed on May 22, 2020, 9 pages.
Office Action received for Korean Patent Application No. 10-2019-7004448, mailed on Sep. 19, 2019, 12 pages.
Office Action received for Korean Patent Application No. 10-2020-7037709, mailed on Jan. 24, 2022, 10 pages.
Office Action received for Korean Patent Application No. 10-2020-7037709, mailed on Jan. 27, 2021, 9 pages.
Office Action received for Korean Patent Application No. 10-2020-7037709, mailed on Jul. 27, 2021, 8 pages.
Office Action received for Korean Patent Application No. 10-2020-7037709, mailed on May 25, 2022, 7 pages.
Office Action received for Korean Patent Application No. 10-2020-7037709, mailed on Nov. 18, 2022, 6 pages.
Office Action received for Korean Patent Application No. 10-2018-7023111, mailed on Jan. 2, 2019, 11 pages.
OSXDaily, "Get a List of Siri Commands Directly from Siri", Online available at:—<http://osxdaily.com/2013/02/05/list-siri-commands/>, Feb. 5, 2013, 15 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC MAG, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online Available at:—<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
Pocketables.com, "AutoRemote example profile", Online available at: https://www.youtube.com/watch?v=kC_zhUnNZj8, Jun. 25, 2013, 1 page.

"Pose, Cambridge Dictionary Definition of Pose", Available online at: <https://dictionary.cambridge.org/dictionary/english/pose>, 4 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Result of Consultation received for European Patent Application No. 16904830.3, mailed on Feb. 18, 2021, 4 pages.
Result of Consultation received for European Patent Application No. 19150734.2, mailed on Nov. 16, 2020, 3 pages.
Result of Consultation received for European Patent Application No. 19157463.1 mailed on Feb. 9, 2022, 3 pages.
Result of Consultation received for European Patent Application No. 19157463.1 mailed on Jan. 18, 2022, 3 pages.
Result of Consultation received for European Patent Application No. 19157463.1, mailed on Mar. 5, 2021, 7 pages.
Result of Consultation received for European Patent Application No. 19157463.1, mailed on Nov. 5, 2021, 9 pages.
Rios Mafe, "New Bar Search for Facebook", YouTube, available at:—<https://www.youtube.com/watch?v=vwgN1WbvCas>, Jul. 19, 2013, 2 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:—<https://productforums.google.com/forum/#!topic/websearch/lp3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages.
Siou, Serge, "How to Control Apple TV 3rd Generation Using Remote app", Online available at: <https://www.youtube.com/watch?v=PhyKftZ0S9M>, May 12, 2014, 3 pages.

(56) References Cited

OTHER PUBLICATIONS

"Skilled at Playing my iPhone 5", Beijing Hope Electronic Press, Jan. 2013, 6 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
SRI, "SRI Speech: Products: Software Development Kits: EduSpeak", Online available at: <http://web.archive.org/web/20090828084033/http://www.speechatsri.com/products/eduspeak>shtml, retrieved on Jun. 20, 2013, pp. 1-2.
Summons to Attend Oral Proceedings received for European Patent Application No. 16904830.3, mailed on Dec. 5, 2022, 3 pages.
Summons to Attend Oral Proceedings received for European Patent Application No. 16904830.3, mailed on Sep. 3, 2020, 10 pages.
Summons to Attend Oral Proceedings received for European Patent Application No. 19150734.2, mailed on Aug. 5, 2020, 9 pages.
Summons to Attend Oral Proceedings received for European Patent Application No. 19157463.1, mailed on Apr. 22, 2021, 21 pages.
Summons to Attend Oral Proceedings received for European Patent Application No. 19157463.1, mailed on Sep. 14, 2020, 10 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
"Use Macrodroid skillfully to automatically clock in with Ding Talk", Online available at: https://blog.csdn.net/qq_26614295/article/details/84304541, Nov. 20, 2018, 11 pages.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
"What's on Spotify?", Music for everyone, Online Available at:—<https://web.archive.org/web/20160428115328/https://www.spotify.com/us/>, Apr. 28, 2016, 6 pages.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
Win, et al., "Myanmar Text to Speech System based on Tacotron-2", International Conference on Information and Communication Tecnology Convergence (ICTC), Oct. 21-23, 2020, pp. 578-583.
Wu et al., "Monophone-Based Background Modeling for Two-Stage on-device Wake Word Detection", in 2018 IEEE International Conference on Acoustics, Speech and Signal Processing (ICASSP), Apr. 2018, 5 pages.
X.AI, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at : <https://www.youtube.com/watch?v=zpmUeOX_xro>, Mar. 31, 2015, 4 pages.
Yates Michaelc., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., "Very Deep Convolutional Networks for End-To-End Speech Recognition", IEEE International Conference on Acoustics, Speech and Signal Processing (ICASSP), 2017, 5 pages.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhong et al., "JustSpeak: Enabling Universal Voice Control on Android", W4A'14, Proceedings of the 11th Web for All Conference, No. 36, Apr. 7-9, 2014, 8 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-Aware Neural Network Based Beamformer for Speaker Extraction in Speech Mixtures", Interspeech 2017, Aug. 20-24, 2017, pp. 2655-2659.
Office Action received for Chinese Patent Application No. 202110024848.8, mailed on Feb. 29, 2024, 16 pages (9 pages of English Translation and 7 pages of Official Copy).

(56) References Cited

OTHER PUBLICATIONS

Office Action received for Korean Patent Application No. 10-2023-7000495, mailed on Apr. 29, 2024, 7 pages (3 pages of English Translation and 4 pages of Official Copy).
Extended European Search Report received for European Patent Application No. 23191700.6, mailed on Nov. 3, 2023, 7 pages.
Communication of Board of Appeal received for European Patent Application No. 16904830.3, mailed on May 25, 2023, 8 pages.
Office Action received for Korean Patent Application No. 10-2023-7000495, mailed on Jul. 28, 2023, 13 pages (6 pages of English Translation and 7 pages of Official Copy).
Office Action received for Korean Patent Application No. 10-2023-7000495, mailed on Dec. 28, 2023, 7 pages (3 pages of English Translation and 4 pages of Official Copy).
Abdelaziz et al., "Speaker-Independent Speech-Driven Visual Speech Synthesis using Domain-Adapted Acoustic Models", May 15, 2019, 9 pages.
Accessibility on iOS, Apple Inc., Online available at: https://developer.apple.com/accessibility/ios/, Retrieved on Jul. 26, 2021, 2 pages.
Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.
Badshah, et al., "Deep Features-based Speech Emotion Recognition For Smart Affective Services", Multimedia Tools and Applications, Oct. 31, 2017, pp. 5571-5589.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
"Cake", Online Available at: <https://web.archive.org/web/20170808091948/https://emojipedia.org/search/?q=cake>, Aug. 8, 2017, 5 pages.
Castellini, Rick, "How to enable and use dictation with an iPhone or iPad", Online Available at: <https://www.youtube.com/watch?v=8w133yN6rTU>, Sep. 7, 2017, 3 pages.
"Context-Sensitive User Interface", Online available at: https://web.archive.org/web/20190407003349/https://en.wikipedia.org/wiki/Context-sensitive_user_interface, Apr. 7, 2019, 3 pages.
Creswell et al., "Generative Adversarial Networks", IEEE Signal Processing Magazine, Jan. 2018, pp. 53-65.
Fitzpatrick, Aidan, "Introducing Camo 1.5: AR modes", Available Online at : "https://reincubate.com/blog/camo-ar-modes-release/", Oct. 28, 2021, 8 pages.
Ganin et al., "Unsupervised Domain Adaptation by Backpropagation", in Proceedings of the 32nd International Conference on Machine Learning, vol. 37, Jul. 2015, 10 pages.
Geyer et al., "Differentially Private Federated Learning: A Client Level Perspective", arXiv:1712.07557v2, Mar. 2018, 7 pages.
Gomes et al., "Mining Recurring Concepts in a Dynamic Feature Space", IEEE Transactions on Neural Networks and Learning Systems, vol. 25, No. 1, Jul. 31, 2013, pp. 95-110.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Hanqing et al., "Deep Learning of Instruction Intention Understanding Using Stacked Denoising Autoencoder", Journal of Shanghai Jiaotong University, vol. 50 No. 7, Jul. 28, 2016, 6 pages (Official Copy only). {See communication under 37 CFR § 1.98(a) (3)}.
Hawkeye, "Hawkeye—A better user testing platform", Online Available at: https://www.youtube.com/watch?v=el0TW0g_760, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages (Official Copy only). {See communication under 37 CFR § 1.98(a) (3)}.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Lal et al., "User-Realistic Path Synthesis Via Multi-Task Generative Adversarial Networks for Continuous Path Keyboard Input", Apple Invention Disclosure P38856, Apr. 2018.
Li et al., "Deep neural network for short-text sentiment classification", International Conference on Database Systems for Advanced Applications, Springer, Cham, 2016, 8 pages.
"Method to Provide Remote Voice Navigation Capability on the Device", ip.com, Jul. 21, 2016, 4 pages.
Michalevsky et al., "Gyrophone: Recognizing Speech from Gyroscope Signals", Proceedings of the 23rd USENIX Security Symposium, Aug. 20-22, 2014, pp. 1053-1067.
Microsoft Soundscape—A map delivered in 3D sound, Microsoft Research, Online available at: https://www.microsoft.com/en-us/research/product/soundscape/, Retrieved on Jul. 26, 2021, 5 pages.
Müller et al., "A Taxonomy for Information Linking in Augmented Reality", AVR 2016, Part I, LNCS 9768, 2016, pp. 368-387.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.
"Nuance Dragon Naturally Speaking", Version 13 End-User Workbook, Nuance Communications Inc., Sep. 2014, 125 pages.
Products for Pals—ALS Tech, "Skyle for iPad Pro eye gaze control real world review", Online Available at: <https://www.youtube.com/watch?v=_3TxZtDJpFo>, Aug. 13, 2020, 4 pages.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (Chi Ea '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Schenk et al., "GazeEverywhere: Enabling Gaze-only User Interaction on an Unmodified Desktop PC in Everyday Scenarios", In

(56) References Cited

OTHER PUBLICATIONS

Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at : https://winaero.com/chrome-will-automatically-create-tab-groups/, Sep. 18, 2020, 5 pages.
Tkachenko, Sergey, "Enable Tab Groups Auto Create in Google Chrome", Available online at : https://winaero.com/enable-tab-groups-auto-create-in-google-chrome/, Nov. 30, 2020, 5 pages.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
"Working with the Dragon Bar", Nuance Communications, Inc, Jun. 27, 2016, 2 pages.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.
Zhang et al., "Compact Acoustic Modeling Based on Acoustic Manifold Using a Mixture of Factor Analyzers", Workshop on Automatic Speech Recognition and Understanding, 2013, 6 pages.
Zhang et al., "IEHouse: A Non-Intrusive Household Appliance State Recognition System", IEEE Smart World, Ubiquitous Intelligence & Computing, Advanced & Trusted Computed, 2017, 8 pages.
Zhang et al., "Voicemoji: Emoji Entry Using Voice for Visually Impaired People", CHI '21, May 8-13, 2021, 18 pages.
Office Action received for Chinese Patent Application No. 202110689197.4, mailed on Sep. 19, 2024, 14 pages (8 pages of English Translation and 6 pages of Official Copy).

* cited by examiner

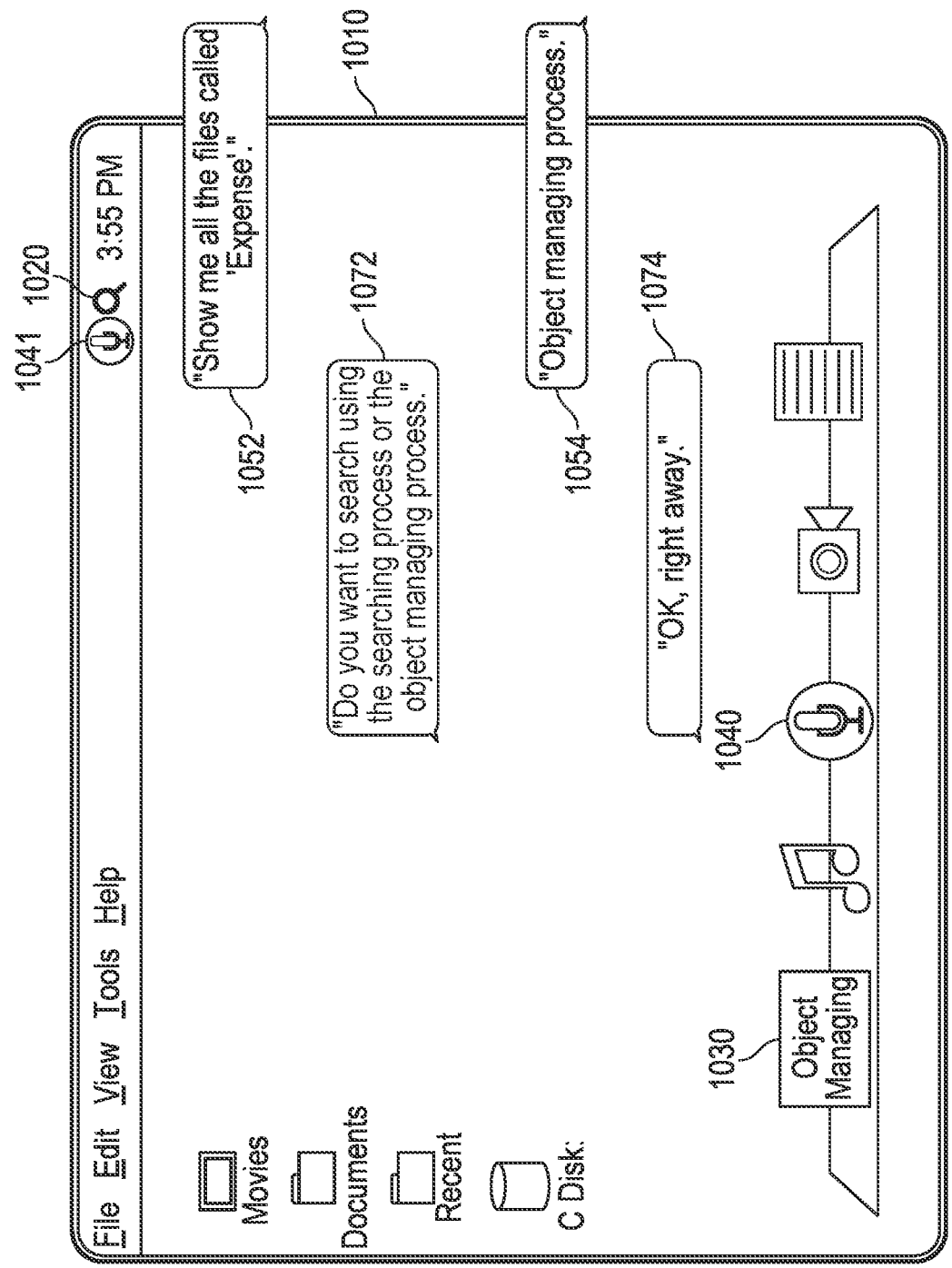

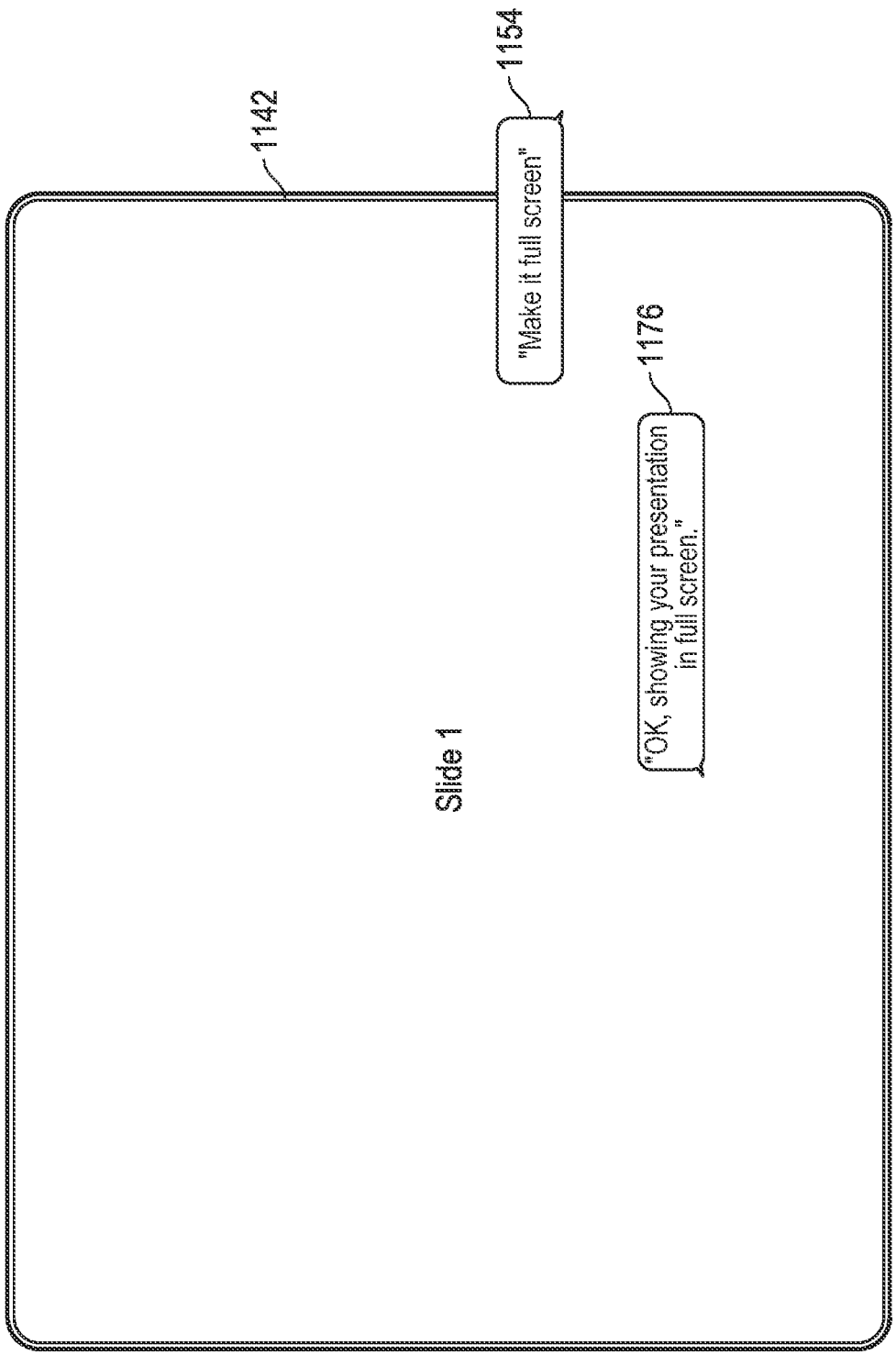

INTELLIGENT DIGITAL ASSISTANT IN A MULTI-TASKING ENVIRONMENT

CROSS-REFERENCE TO RELATED APPLICATIONS

This application is a continuation of U.S. patent application Ser. No. 17/231,713, filed Apr. 15, 2021, entitled "INTELLIGENT DIGITAL ASSISTANT IN A MULTI-TASKING ENVIRONMENT," which is a continuation of U.S. patent application Ser. No. 16/717,790, filed Dec. 17, 2019, now U.S. Pat. No. 11,037,565, entitled "INTELLIGENT DIGITAL ASSISTANT IN A MULTI-TASKING ENVIRONMENT," which is a continuation of U.S. patent application Ser. No. 15/271,766, now U.S. Pat. No. 10,586,535, filed Sep. 21, 2016, entitled "INTELLIGENT DIGITAL ASSISTANT IN A MULTI-TASKING ENVIRONMENT," which claims priority to U.S. Provisional Patent Application Ser. No. 62/348,728, entitled "INTELLIGENT DIGITAL ASSISTANT IN A MULTI-TASKING ENVIRONMENT," filed on Jun. 10, 2016. The contents of both applications are hereby incorporated by reference in their entirety for all purposes.

FIELD

The present disclosure relates generally to a digital assistant and, more specifically, to a digital assistant that interacts with a user to perform a task in a multi-tasking environment.

BACKGROUND

Digital assistants are increasing popular. In a desktop or tablet environment, a user frequently multi-tasks including searching files or information, managing files or folders, playing movies or songs, editing documents, adjusting system configurations, sending emails, etc. It is often cumbersome and inconvenient for the user to manually perform multiple tasks in parallel and to frequently switch between tasks. It is thus desirable for a digital assistant to have the ability to assist the user to perform some of the tasks in a multi-tasking environment based on a user's voice input.

BRIEF SUMMARY

Some existing techniques for assisting the user to perform a task in a multi-tasking environment may include, for example, dictation. Typically, a user may be required to manually perform many other tasks in a multi-tasking environment. As an example, a user may have been working on a presentation yesterday on his or her desktop computer and may wish to continue to work on the presentation. The user is typically required to manually locate the presentation on his or her desktop computer, open the presentation, and continue the editing of the presentation.

As another example, a user may have been booking a flight on his or her smartphone when the user is away from his desktop computer. The user may wish to continue booking the flight when the desktop computer is available. In existing technologies, the user needs to launch a web browser and start over on the flight booking process at the user's desktop computer. In other words, the prior flight booking progress that the user made at the smartphone may not be continued at the user's desktop computer.

As another example, a user may be editing a document on his or her desktop computer and wish to change a system configuration such as changing the brightness level of the screen, turning on Bluetooth connections, or the like. In existing technologies, the user may need to stop editing the document, find and launch the brightness configuration application, and manually change the settings. In a multi-tasking environment, some existing technologies are incapable of performing tasks as described in the above examples based on a user's speech input. Providing a voice-enabled digital assistant in a multi-tasking environment is thus desired and advantageous.

Systems and processes for operating a digital assistant are provided. In accordance with one or more examples, a method includes, at a user device with one or more processors and memory, receiving a first speech input from a user. The method further includes identifying context information associated with the user device and determining a user intent based on the first speech input and the context information. The method further includes determining whether the user intent is to perform a task using a searching process or an object managing process. The searching process is configured to search data stored internally or externally to the user device, and the object managing process is configured to manage objects associated with the user device. The method further includes, in accordance with a determination that the user intent is to perform the task using the searching process, performing the task using the searching process. The method further includes, in accordance with the determination that the user intent is to perform the task using the object managing process, performing the task using the object managing process.

In accordance with one or more examples, a method includes, at a user device with one or more processors and memory, receiving a speech input from a user to perform a task. The method further includes identifying context information associated with the user device and determining a user intent based on the speech input and context information associated with the user device. The method further includes, in accordance with user intent, determining whether the task is to be performed at the user device or at a first electronic device communicatively connected to the user device. The method further includes, in accordance with a determination that the task is to be performed at the user device and content for performing the task is located remotely, receiving the content for performing the task. The method further includes, in accordance with a determination that the task is to be performed at the first electronic device and the content for performing the task is located remotely to the first electronic device, providing the content for performing the task to the first electronic device.

In accordance with one or more examples, a method includes, at a user device with one or more processors and memory, receiving a speech input from a user to manage one or more system configurations of the user device. The user device is configured to concurrently provide a plurality of user interfaces. The method further includes identifying context information associated with the user device and determining a user intent based on the speech input and context information. The method further includes determining whether the user intent indicates an informational request or a request for performing a task. The method further includes, in accordance with a determination that the user intent indicates an informational request, providing a spoken response to the informational request. The method further includes, in accordance with a determination that the user intent indicates a request for performing a task, instantiating a process associated with the user device to perform the task.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 10A-10B illustrate functionalities of performing a task using an object managing process by a digital assistant according to various examples.

FIGS. 11A-11D illustrate functionalities of performing a task using a search process by a digital assistant according to various examples.

DETAILED DESCRIPTION

Figure 1:
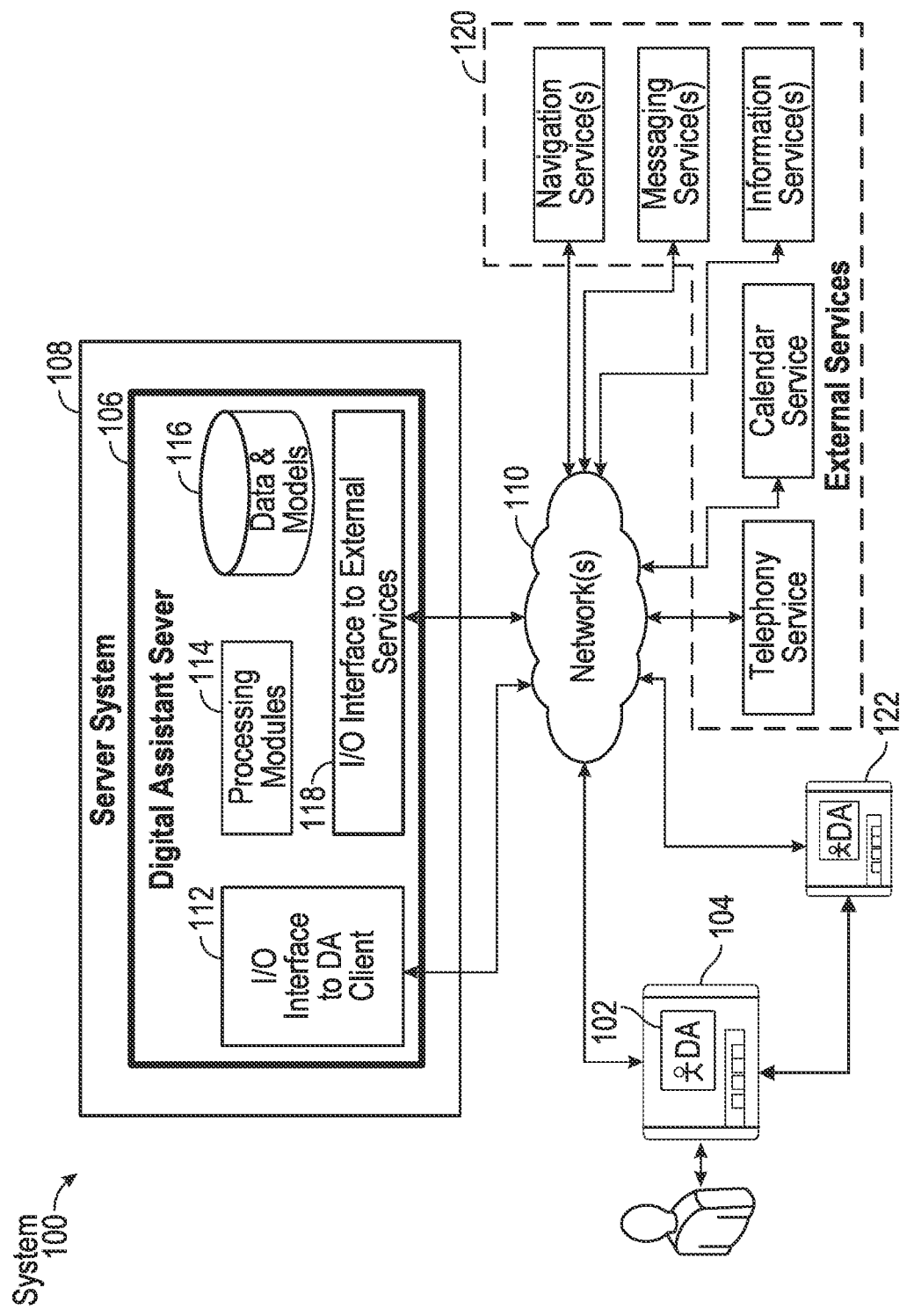
FIG. 1 is a block diagram illustrating a system and environment for implementing a digital assistant according to various examples.

In the following description of the disclosure and embodiments, reference is made to the accompanying drawings, in which it is shown by way of illustration, of specific embodiments that can be practiced. It is to be understood that other embodiments and examples can be practiced and changes can be made without departing from the scope of the disclosure.

Techniques for providing a digital assistant in a multi-tasking environment are desirable. As described herein, techniques for providing a digital assistant in a multi-tasking environment are desired for various purposes such as reducing the cumbersomeness of searching objects or information, enabling efficient object management, maintaining continuity between tasks performed at the user device and at another electronic device, and reducing the user's manual effort in adjusting system configurations. Such techniques are advantageous by allowing the user to operate a digital assistant to perform various tasks using speech inputs in a multi-tasking environment. Further, such techniques alleviate the cumbersomeness or inconvenience associated with performing various tasks in a multi-tasking environment. Furthermore, by allowing the user to perform tasks using speech, they are able to keep both hands on the keyboard or mouse while performing tasking that would require a context switch—effectively, allowing the digital assistant to perform tasks as if a "third-hand" of the user. As will be appreciated, by allowing the user to perform tasks using speech it allows the user to more efficiently complete tasks that may require multiple interactions with multiple applications. For example, searching for images and sending them to an individual in an email may require opening a search interface, entering search terms, selecting one or more results, opening am email for composition, copying or moving the resulting files to the open email, addressing the email and sending it. Such a task can be completed more efficiently by voice with a command such as "find pictures from X date and send them to my wife". Similar requests for moving files, searching for information on the internet, composing messages can all be made more efficient using voice, while simultaneously allowing the user to perform other tasks using their hands.

Although the following description uses terms "first," "second," etc. to describe various elements, these elements should not be limited by the terms. These terms are only used to distinguish one element from another. For example, a first storage could be termed a second storage, and, similarly, a second storage could be termed a first storage, without departing from the scope of the various described examples. The first storage and the second storage can both be storages and, in some cases, can be separate and different storages.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1 System and Environment

FIG. 1 illustrates a block diagram of system 100 according to various examples. In some examples, system 100 can implement a digital assistant. The terms "digital assistant," "virtual assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant can be capable of accepting a user request at least partially in the form of a natural language command, request, statement, narrative, and/or inquiry. Typically, the user request can seek either an informational answer or performance of a task by the digital assistant. A satisfactory response to the user request can be a provision of the requested informational answer, a performance of the requested task, or a combination of the two.

For example, a user can ask the digital assistant a question, such as "Where am I right now?" Based on the user's current location, the digital assistant can answer, "You are in Central Park near the west gate." The user can also request the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant can sometimes interact with the user in a continuous dialogue involving multiple exchanges of information over an extended period of time. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

As shown in FIG. 1, in some examples, a digital assistant can be implemented according to a client-server model. The digital assistant can include client-side portion 102 (hereafter "DA client 102") executed on user device 104 and server-side portion 106 (hereafter "DA server 106") executed on server system 108. DA client 102 can communicate with DA server 106 through one or more networks 110. DA client 102 can provide client-side functionalities such as user-facing input and output processing and communication with DA server 106. DA server 106 can provide server-side functionalities for any number of DA clients 102 each residing on a respective user device 104.

In some examples, DA server 106 can include client-facing I/O interface 112, one or more processing modules 114, data and models 116, and I/O interface to external services 118. The client-facing I/O interface 112 can facilitate the client-facing input and output processing for DA server 106. One or more processing modules 114 can utilize data and models 116 to process speech input and determine the user's intent based on natural language input. Further, one or more processing modules 114 perform task execution based on inferred user intent. In some examples, DA server 106 can communicate with external services 120 through network(s) 110 for task completion or information acquisition. I/O interface to external services 118 can facilitate such communications.

User device 104 can be any suitable electronic device. For example, user devices can be a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B). A portable multifunctional device can be, for example, a mobile telephone that also contains other functions, such as PDA and/or music player functions. Specific examples of portable multifunction devices can include the iPhone®, iPod Touch®, and iPad® devices from Apple Inc. of Cupertino, California. Other examples of portable multifunction devices can include, without limitation, laptop or tablet computers. Further, in some examples, user device 104 can be a non-portable multifunctional device. In particular, user device 104 can be a desktop computer, a game console, a television, or a television set-top box. In some examples, user device 104 can operate in a multi-tasking environment. A multi-tasking environment allows a user to operate device 104 to perform multiple tasks in parallel. For example, a multi-tasking environment may be a desktop or laptop environment, in which device 104 may perform one task in response to the user input received from a physical user-interface device and, in parallel, perform another task in response to the user's voice input. In some examples, user device 104 can include a touch-sensitive surface (e.g., touch screen displays and/or touchpads). Further, user device 104 can optionally include one or more other physical user-interface devices, such as a physical keyboard, a mouse, and/or a joystick. Various examples of electronic devices, such as multifunctional devices, are described below in greater detail.

Examples of communication network(s) 110 can include local area networks (LAN) and wide area networks (WAN), e.g., the Internet. Communication network(s) 110 can be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 can be implemented on one or more standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

In some examples, user device 104 can communicate with DA server 106 via second user device 122. Second user device 122 can be similar or identical to user device 104. For example, second user device 122 can be similar to devices 200, 400, or 600 described below with reference to FIGS. 2A, 4, and 6A-6B. User device 104 can be configured to communicatively couple to second user device 122 via a direct communication connection, such as Bluetooth, NFC, BTLE, or the like, or via a wired or wireless network, such as a local Wi-Fi network. In some examples, second user device 122 can be configured to act as a proxy between user device 104 and DA server 106. For example, DA client 102 of user device 104 can be configured to transmit information (e.g., a user request received at user device 104) to DA server 106 via second user device 122. DA server 106 can process the information and return relevant data (e.g., data content responsive to the user request) to user device 104 via second user device 122.

In some examples, user device 104 can be configured to communicate abbreviated requests for data to second user device 122 to reduce the amount of information transmitted from user device 104. Second user device 122 can be configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100 can include any number and type of user devices configured in this proxy configuration to communicate with DA server system 106.

Although the digital assistant shown in FIG. 1 can include both a client-side portion (e.g., DA client 102) and a server-side portion (e.g., DA server 106), in some examples, the functions of a digital assistant can be implemented as a standalone application installed on a user device. In addition, the divisions of functionalities between the client and server portions of the digital assistant can vary in different implementations. For instance, in some examples, the DA client can be a thin-client that provides only user-facing input and output processing functions, and delegates all other functionalities of the digital assistant to a backend server.

2. Electronic Devices

Figure 2A:
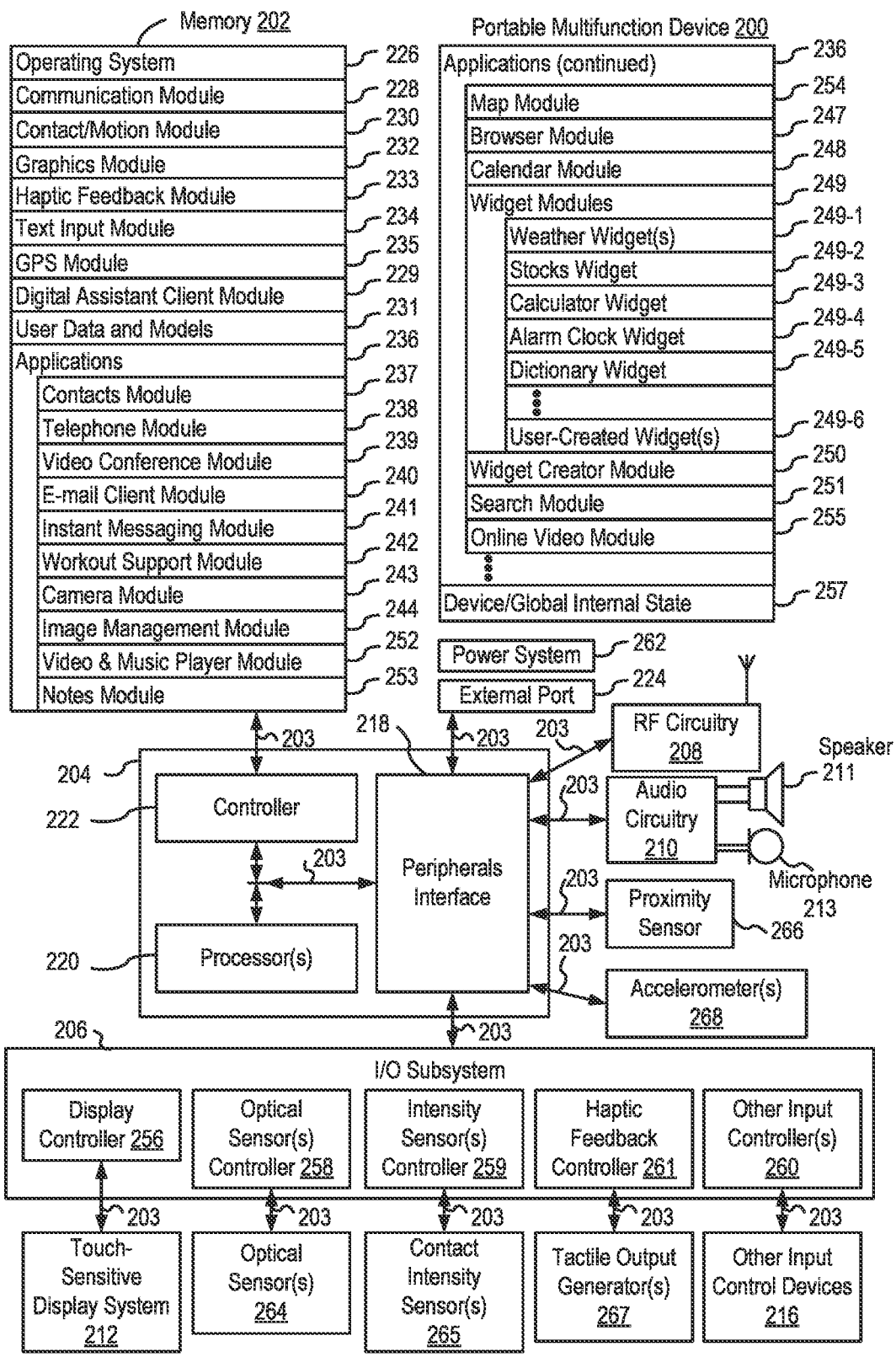
FIG. 2A is a block diagram illustrating a portable multi-function device implementing the client-side portion of a digital assistant in accordance with some embodiments.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 may include one or more computer-readable storage mediums. The computer-readable storage mediums may be tangible and non-transitory. Memory 202 may include high-speed random access memory and may also include non-volatile memory, such as one or more magnetic disk storage devices, flash memory devices, or other non-volatile solid-state memory devices. Memory controller 222 may control access to memory 202 by other components of device 200.

In some examples, a non-transitory computer-readable storage medium of memory 202 can be used to store instructions (e.g., for performing aspects of process 1200, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of process 1200, described below) can be stored on a non-transitory computer-readable storage medium (not shown) of the server system 108 or can be divided between the non-transitory computer-readable storage medium of memory 202 and the non-transitory computer-readable storage medium of server system 108. In the context of this document, a "non-transitory computer-readable storage medium" can be any medium that can contain or store the program for use by or in connection with the instruction execution system, apparatus, or device.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 may be implemented on a single chip, such as chip 204. In some other embodiments, they may be implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data may be retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button may disengage a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) may turn power to device 200 on or off. The user may be able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output may include graphics, text, icons, video, and any combination thereof (collectively termed "graphics"). In some embodiments, some or all of the visual output may correspond to user interface objects.

Touch screen 212 has a touch-sensitive surface, sensor, or set of sensors that accept input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user interface objects (e.g., one or more soft keys, icons, web pages, or images) that are displayed on touch screen 212. In an exemplary embodiment, a point of contact between touch screen 212 and the user corresponds to a finger of the user.

Touch screen 212 may use LCD (liquid crystal display) technology, LPD (light-emitting polymer display) technology, or LED (light-emitting diode) technology, although other display technologies may be used in other embodiments. Touch screen 212 and display controller 256 may detect contact and any movement or breaking thereof using any of a plurality of touch-sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 may be analogous to the multi-touch sensitive touchpads described in the following U.S. Pat. No. 6,323, 846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 may have a video resolution in excess of 100 dpi. In some embodiments, the touch screen has a video resolution of approximately 160 dpi. The user may make contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 212 or an extension of the touch-sensitive surface formed by the touch screen.

Device 200 also includes power system 262 for powering the various components. Power system 262 may include a power management system, one or more power sources (e.g., battery or alternating current (AC)), a recharging system, a power failure detection circuit, a power converter or inverter, a power status indicator (e.g., a light-emitting diode) and any other components associated with the generation, management, and distribution of power in portable devices.

Device 200 may also include one or more optical sensors 264. FIG. 2A shows an optical sensor coupled to optical sensor controller 258 in I/O subsystem 206. Optical sensor 264 may include charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 may capture still images or video. In some embodiments, an optical sensor is located on the back of device 200, opposite touch screen display 212 on the front of the device so that the touch screen display may be used as a viewfinder for still and/or video image acquisition. In some embodiments, an optical sensor is located on the front of the device, so that the user's image may be obtained for video conferencing while the user views the other video conference participants on the touch screen display. In some embodiments, the position of optical sensor 264 can be changed by the user (e.g., by rotating the lens and the sensor in the device housing) so that a single optical sensor 264 may be used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 may also include one or more proximity sensors 266. FIG. 2A shows proximity sensor 266 coupled to peripherals interface 218. Alternately, proximity sensor 266 may be coupled to input controller 260 in I/O subsystem 206. Proximity sensor 266 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 may also include one or more accelerometers 268. FIG. 2A shows accelerometer 268 coupled to peripherals interface 218. Alternately, accelerometer 268 may be coupled to an input controller 260 in I/O subsystem 206. Accelerometer 268 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
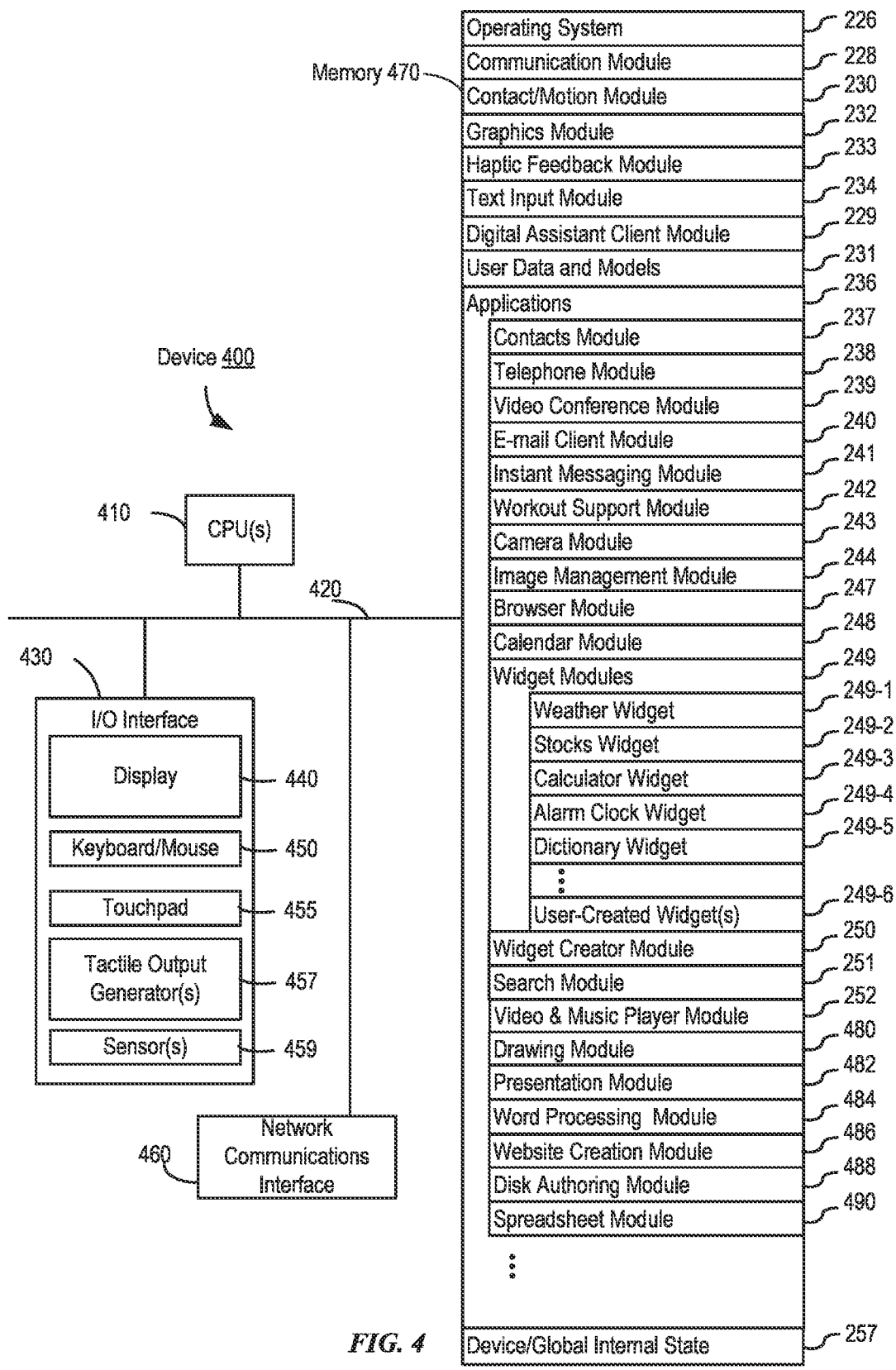
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 can store data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views, or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which may be a component of graphics module 232, provides soft keyboards for entering text in various applications (e.g., contacts module 237, e-mail client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 can include various client-side digital assistant instructions to provide the client-side functionalities of the digital assistant. For example, digital assistant client module 229 can be capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 can also be capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output can be provided as voice, sound, alerts, text messages, menus, graphics, videos, animations, vibrations, and/or combinations of two or more of the above. During operation, digital assistant client module 229 can communicate with DA server 106 using RF circuitry 208.

User data and models 231 can include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 can includes various models (e.g., speech recognition models, statistical language models, natural language processing models, ontology, task flow models, service models, etc.) for processing user input and determining user intent.

In some examples, digital assistant client module 229 can utilize the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 can provide the contextual information or a subset thereof with the user input to DA server 106 to help infer the user's intent. In some examples, the digital assistant can also use the contextual information to determine how to prepare and deliver outputs to the user. Contextual information can be referred to as context data.

In some examples, the contextual information that accompanies the user input can include sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 can be provided to DA server 106 as contextual information associated with a user input.

In some examples, the digital assistant client module 229 can selectively provide information (e.g., user data 231) stored on the portable multifunction device 200 in response to requests from DA server 106. In some examples, digital assistant client module 229 can also elicit additional input from the user via a natural language dialogue or other user interfaces upon request by DA server 106. Digital assistant client module 229 can pass the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 may include the following modules (or sets of instructions), or a subset or superset thereof:

Contacts module 237 (sometimes called an address book or contact list);
Telephone module 238;
Video conference module 239;
Email client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which may include one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that may be stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 may be used to manage an address book or contact list (e.g., stored in application internal state 292 of contacts module 237 in memory 202 or memory 470), including: adding name(s) to the address book; deleting name(s) from the address book; associating telephone number(s), email address(es), physical address(es) or other information with a name; associating an image with a name; categorizing and sorting names; providing telephone numbers or email addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 may be used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, email client module 240 includes executable instructions to create, send, receive, and manage email in response to user instructions. In conjunction with image management module 244, email client module 240 makes it very easy to create and send emails with still or video images taken with camera module 243.

In conjunction with RF circuitry 208, touch screen 212, display controller 256, contact/motion module 230, graphics module 232, and text input module 234, instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, email client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that may be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 may be used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 may be used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, email client module 240, and browser module 247, online video module 255 includes instructions that allow the user to access, browse, receive (e.g., by streaming and/or download), play back (e.g., on the touch screen or on an external, connected display via external port 224), send an email with a link to a particular online video, and otherwise manage online videos in one or more file formats, such as H.264. In some embodiments, instant messaging module 241, rather than email client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 252, FIG. 2A). In some embodiments, memory 202 may store a subset of the modules and data structures identified above. Furthermore, memory 202 may store additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 may be reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
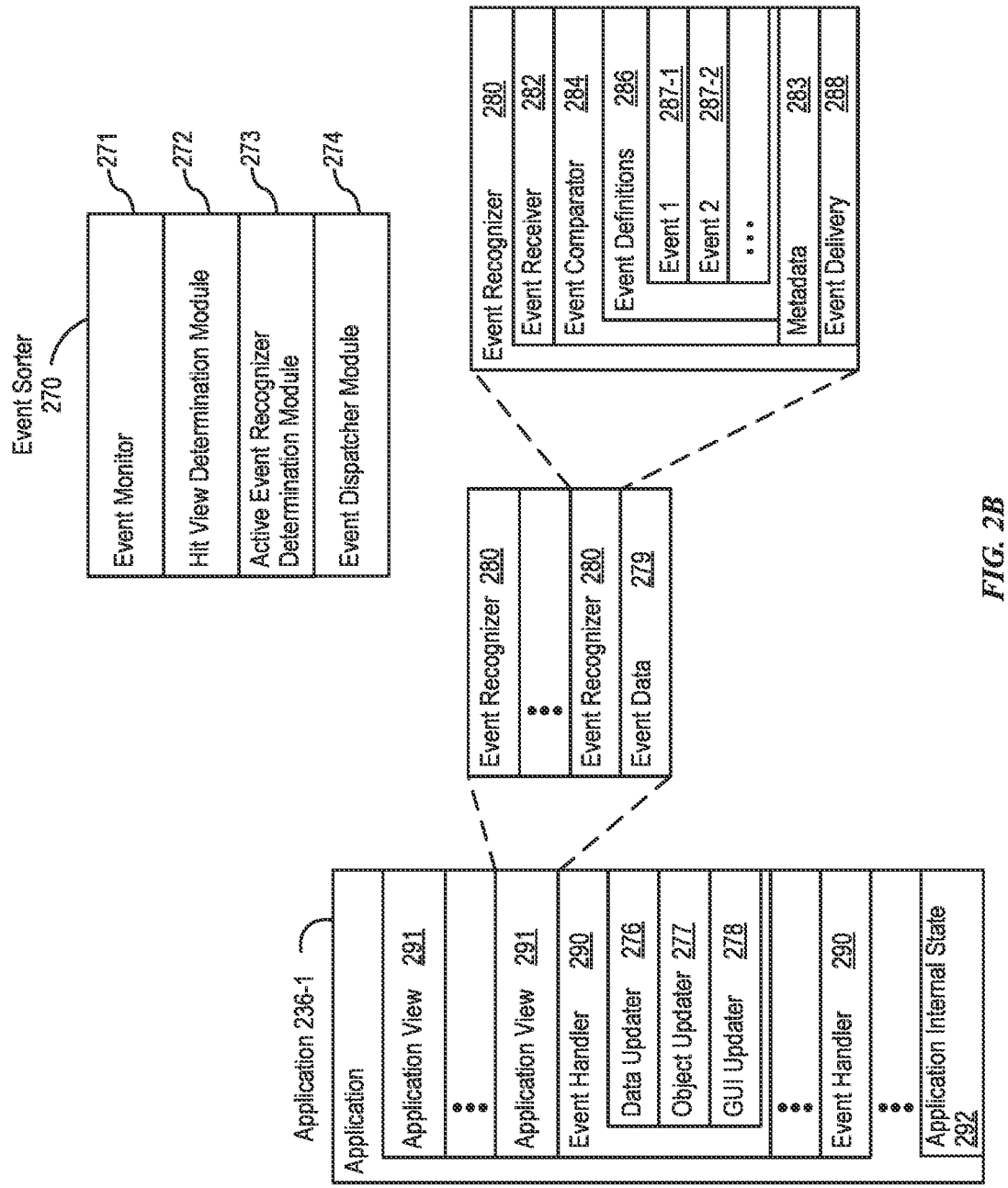
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 may utilize or call data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283 and event delivery instructions 288 (which may include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers may interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
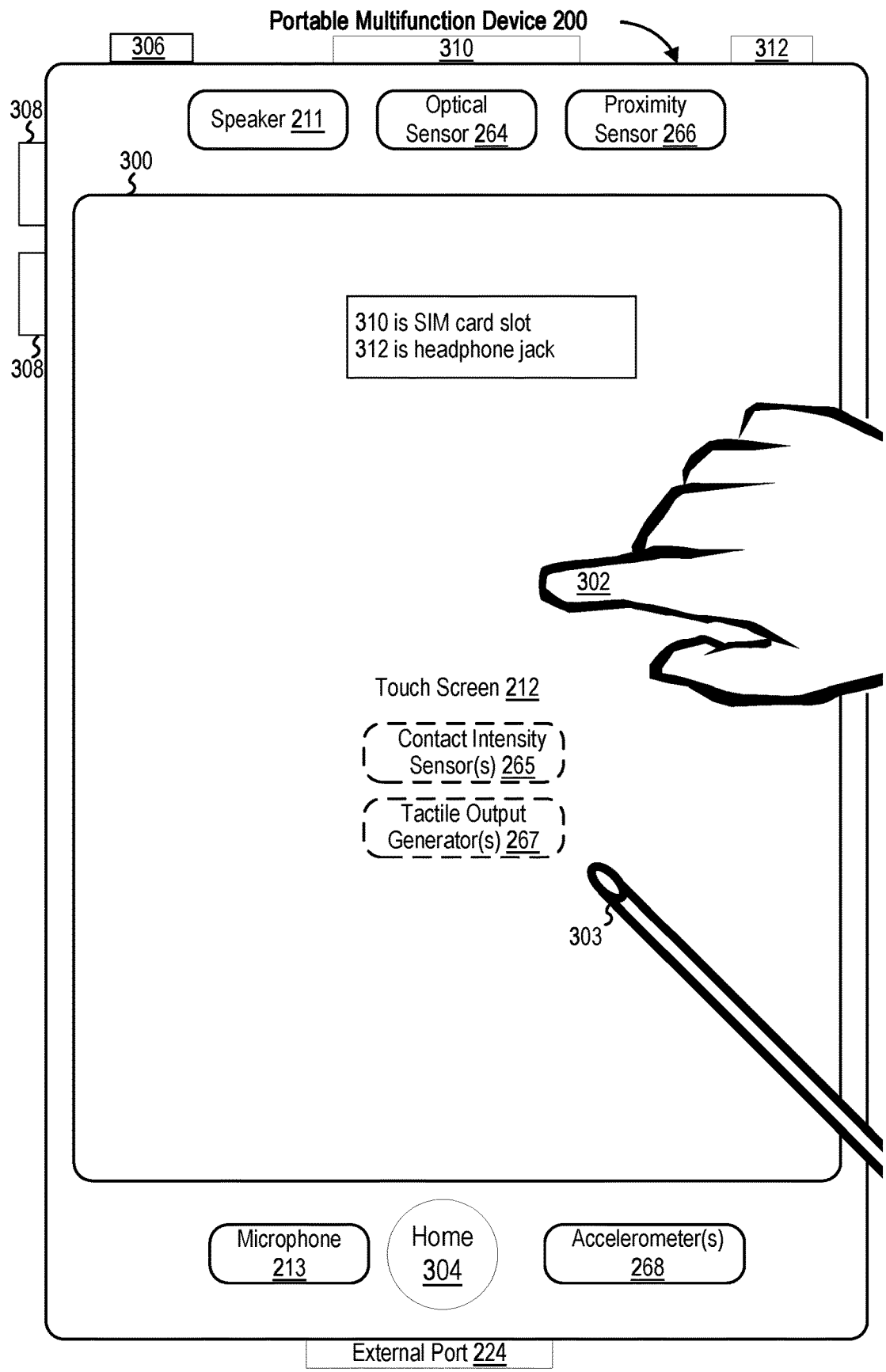
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward, and/or downward), and/or a rolling of a finger (from right to left, left to right, upward, and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 may also include one or more physical buttons, such as "home" or menu button 304. As described previously, menu button 304 may be used to navigate to any application 236 in a set of applications that may be executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 470 may store a subset of the modules and data structures identified above. Furthermore, memory 470 may store additional modules and data structures not described above.

Attention is now directed towards embodiments of user interfaces that may be implemented on, for example, portable multifunction device 200.

Figure 5A:
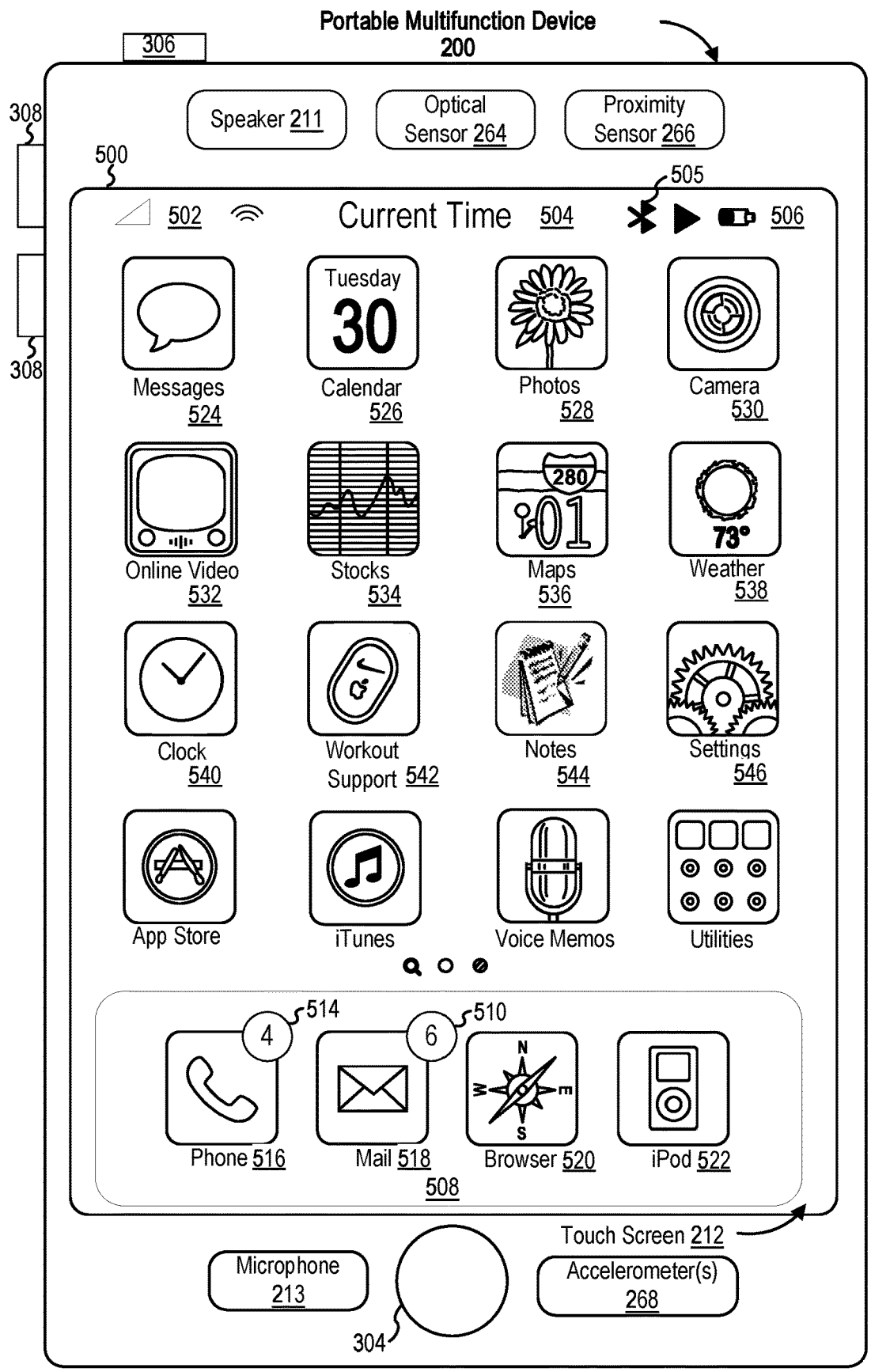
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces may be implemented on device 400. In some embodiments, user interface 500 includes the following elements, or a subset or superset thereof:

Signal strength indicator(s) 502 for wireless communication(s), such as cellular and Wi-Fi signals;
  Time 504;
  Bluetooth indicator 505;
  Battery status indicator 506;
  Tray 508 with icons for frequently used applications, such as:
    Icon 516 for telephone module 238, labeled "Phone," which optionally includes an indicator 514 of the number of missed calls or voicemail messages;
    Icon 518 for email client module 240, labeled "Mail," which optionally includes an indicator 510 of the number of unread emails;
    Icon 520 for browser module 247, labeled "Browser;" and
    Icon 522 for video and music player module 252, also referred to as iPod (trademark of Apple Inc.) module 252, labeled "iPod;" and
  Icons for other applications, such as:
    Icon 524 for IM module 241, labeled "Messages;"
    Icon 526 for calendar module 248, labeled "Calendar;"
    Icon 528 for image management module 244, labeled "Photos;"
    Icon 530 for camera module 243, labeled "Camera;"
    Icon 532 for online video module 255, labeled "Online Video;"
    Icon 534 for stocks widget 249-2, labeled "Stocks;"
    Icon 536 for map module 254, labeled "Maps;"
    Icon 538 for weather widget 249-1, labeled "Weather;"
    Icon 540 for alarm clock widget 249-4, labeled "Clock;"
    Icon 542 for workout support module 242, labeled "Workout Support;"
    Icon 544 for notes module 253, labeled "Notes;" and
    Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
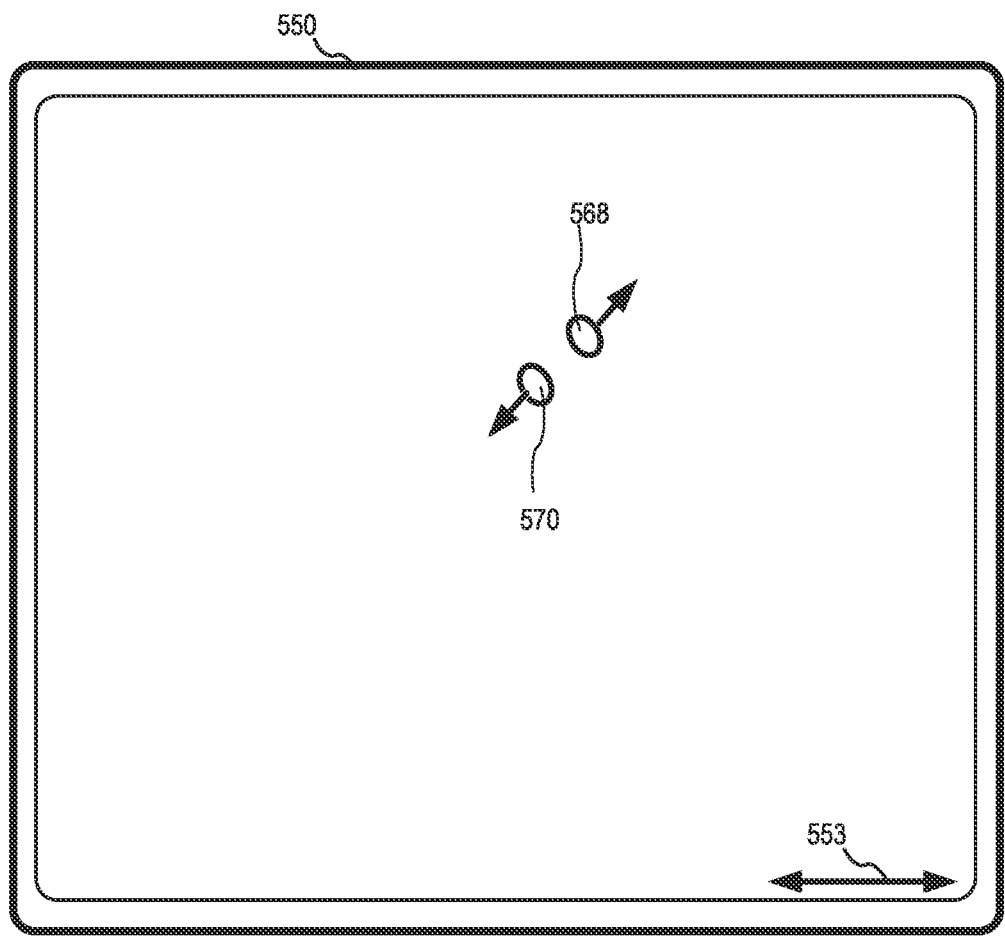
FIG. 5B illustrates an exemplary user interface for a multifunction device with a touch-sensitive surface that is separate from the display according to various examples.
Figure 5B:
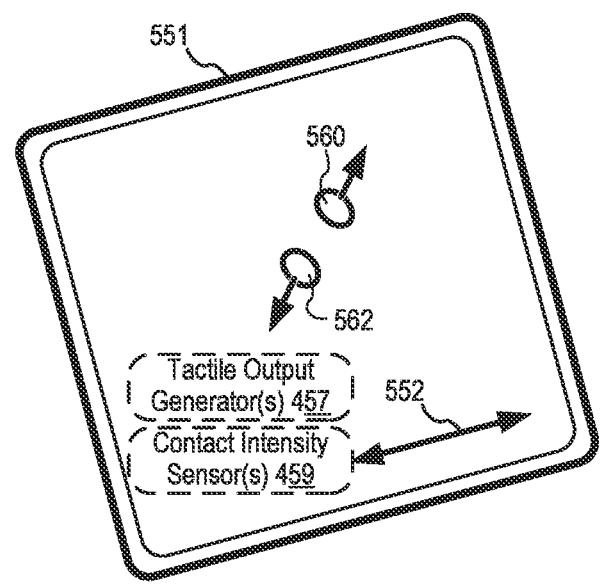

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, and/or finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
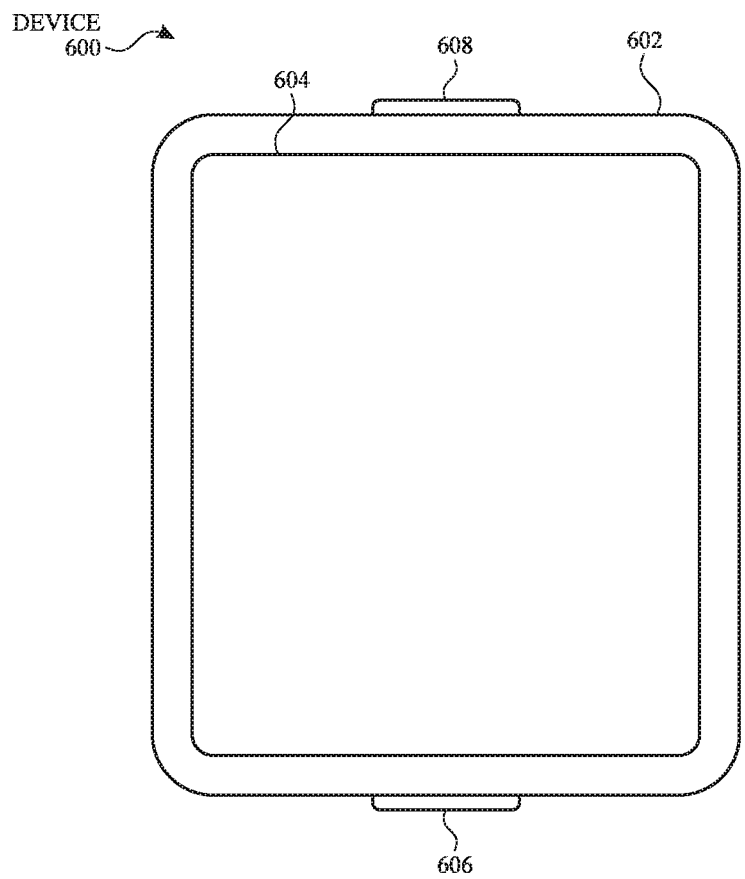
FIG. 6A illustrates a personal electronic device according to various examples.

FIG. 6A illustrates exemplary personal electronic device 600. Device 600 includes body 602. In some embodiments, device 600 can include some or all of the features described with respect to devices 200 and 400 (e.g., FIGS. 2A and 4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) may have one or more intensity sensors for detecting intensity of contacts (e.g., touches) being applied. The one or more intensity sensors of touch screen 604 (or the touch-sensitive surface) can provide output data that represents the intensity of touches. The user interface of device 600 can respond to touches based on their intensity, meaning that touches of different intensities can invoke different user interface operations on device 600.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, can be physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms may permit device 600 to be worn by a user.

Figure 6B:
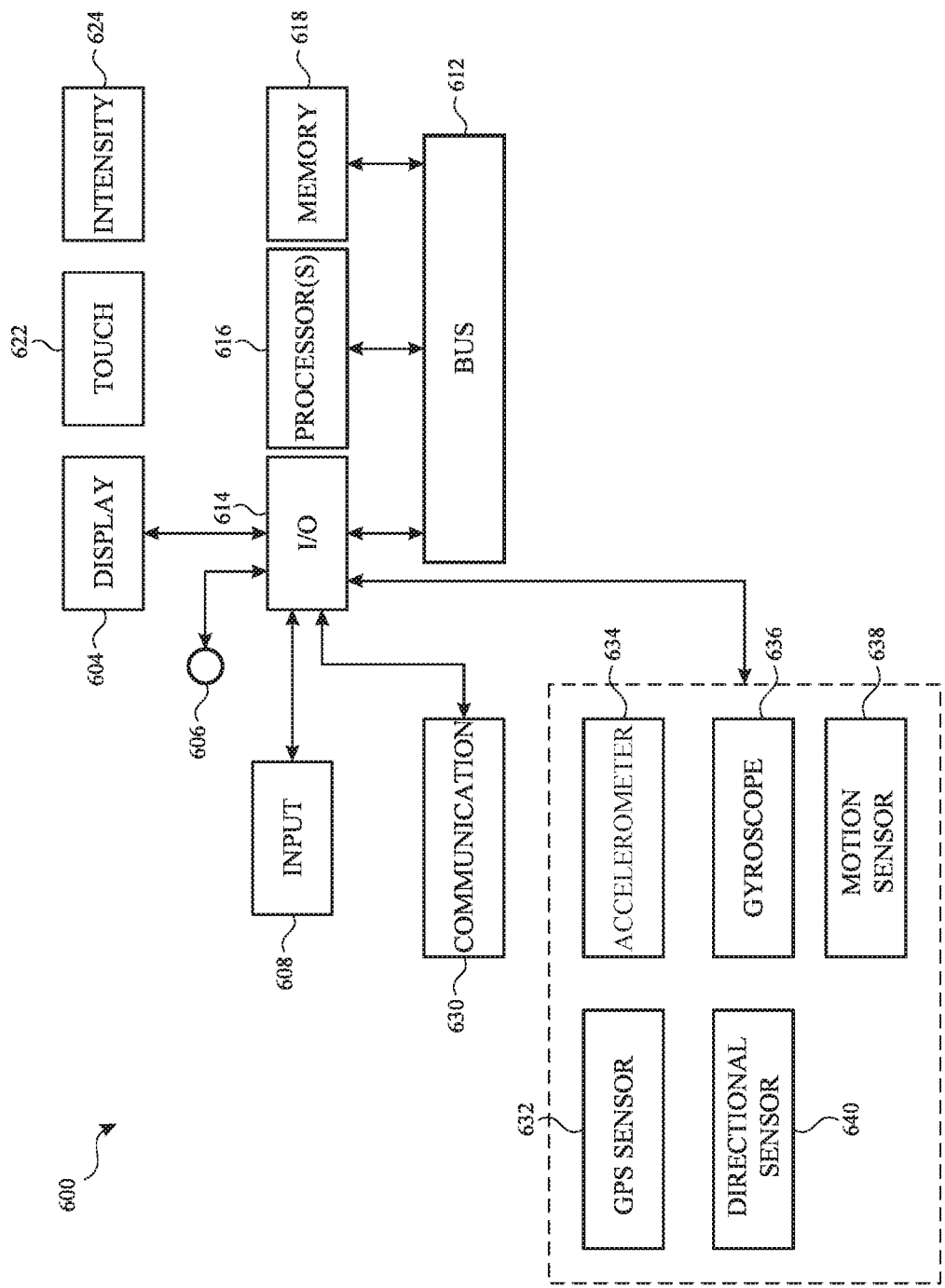
FIG. 6B is a block diagram illustrating a personal electronic device according to various examples.

FIG. 6B depicts exemplary personal electronic device 600. In some embodiments, device 600 can include some or all of the components described with respect to FIGS. 2A-2B and 4. Device 600 has bus 612 that operatively couples I/O section 614 with one or more computer processors 616 and memory 618. I/O section 614 can be connected to display 604, which can have touch-sensitive component 622 and, optionally, touch-intensity sensitive component 624. In addition, I/O section 614 can be connected with communication unit 630 for receiving application and operating system data using Wi-Fi, Bluetooth, near field communication (NFC), cellular, and/or other wireless communication techniques. Device 600 can include input mechanisms 606 and/or 608. Input mechanism 606 may be a rotatable input device or a depressible and rotatable input device, for example. Input mechanism 608 may be a button, in some examples.

Input mechanism 608 may be a microphone, in some examples. Personal electronic device 600 can include various sensors, such as GPS sensor 632, accelerometer 634, directional sensor 640 (e.g., compass), gyroscope 636, motion sensor 638, and/or a combination thereof, all of which can be operatively connected to I/O section 614.

Memory 618 of personal electronic device 600 can be a non-transitory computer-readable storage medium, for storing computer-executable instructions, which, when executed by one or more computer processors 616, for example, can cause the computer processors to perform the techniques described below, including process 1200 (FIGS. 12A-12D). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that may be displayed on the display screen of devices 200, 400, and/or 600 (FIGS. 2A, 4, and 6A-6B). For example, an image (e.g., icon), a button, and text (e.g., link) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs, sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
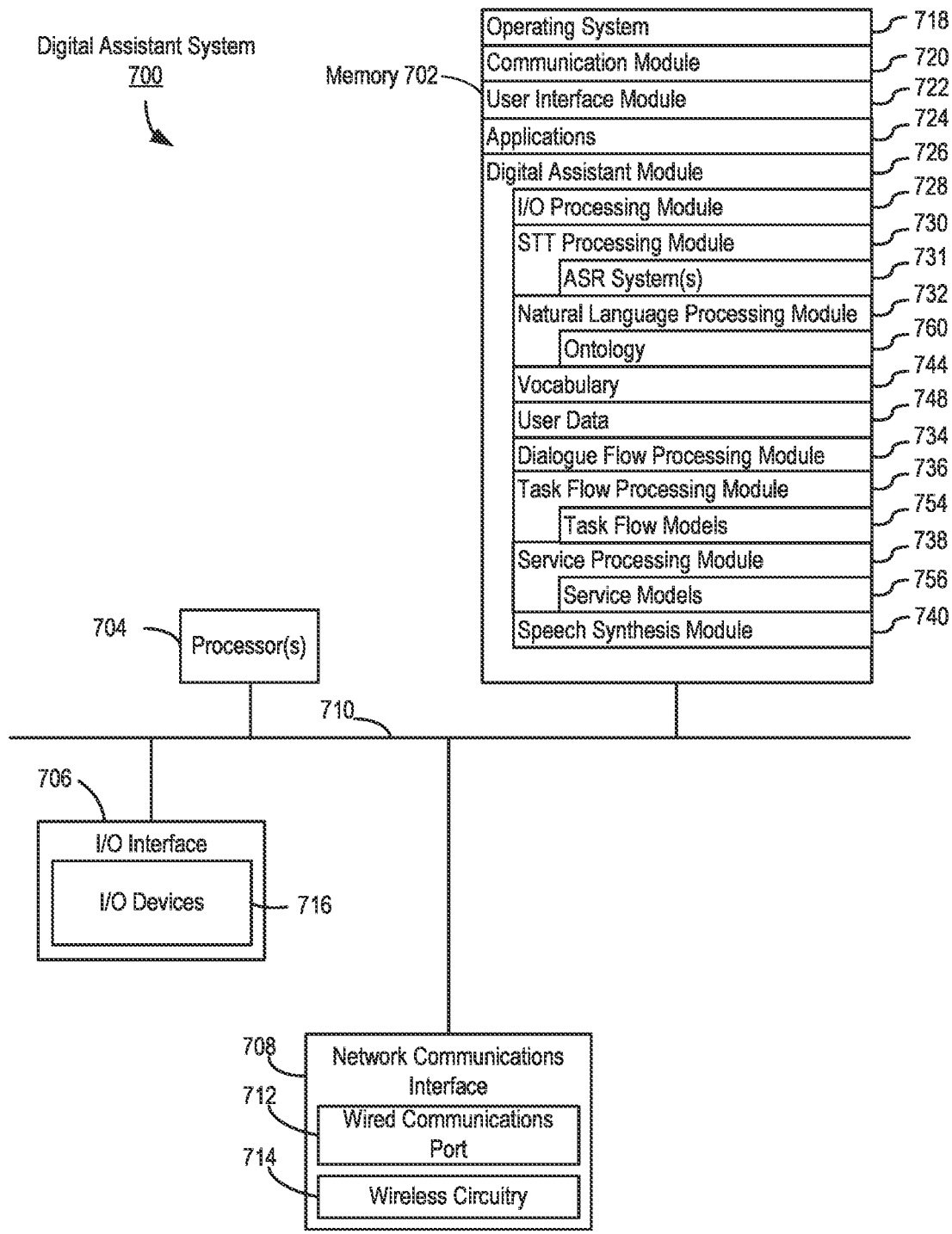
FIG. 7A is a block diagram illustrating a digital assistant system or a server portion thereof according to various examples.

FIG. 7A illustrates a block diagram of digital assistant system 700 in accordance with various examples. In some examples, digital assistant system 700 can be implemented on a standalone computer system. In some examples, digital assistant system 700 can be distributed across multiple computers. In some examples, some of the modules and functions of the digital assistant can be divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 can be an implementation of server system 108 (and/or DA server 106) shown in FIG. 1. It should be noted that digital assistant system 700 is only one example of a digital assistant system, and that digital assistant system 700 can have more or fewer components than shown, may combine two or more components, or may have a different configuration or arrangement of the components. The various components shown in FIG. 7A can be implemented in hardware, software instructions for execution by one or more processors, firmware, including one or more signal processing and/or application specific integrated circuits, or a combination thereof.

Digital assistant system 700 can include memory 702, one or more processors 704, input/output (I/O) interface 706, and network communications interface 708. These components can communicate with one another over one or more communication buses or signal lines 710.

In some examples, memory 702 can include a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 can couple input/output devices 716 of digital assistant system 700, such as displays, keyboards, touch screens, and microphones, to user interface module 722. I/O interface 706, in conjunction with user interface module 722, can receive user inputs (e.g., voice input, keyboard inputs, touch inputs, etc.) and process them accordingly. In some examples, e.g., when the digital assistant is implemented on a standalone user device, digital assistant system 700 can include any of the components and I/O communication interfaces described with respect to devices 200, 400, or 600 in FIGS. 2A, 4, 6A-6B, respectively. In some examples, digital assistant system 700 can represent the server portion of a digital assistant implementation, and can interact with the user through a client-side portion residing on a user device (e.g., devices 104, 200, 400, or 600).

In some examples, the network communications interface 708 can include wired communication port(s) 712 and/or wireless transmission and reception circuitry 714. The wired communication port(s) 712 can receive and send communication signals via one or more wired interfaces, e.g., Ethernet, Universal Serial Bus (USB), FIREWIRE, etc. The wireless circuitry 714 can receive and send RF signals and/or optical signals from/to communications networks and other communications devices. The wireless communications can use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 can enable communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, can store programs, modules, instructions, and data structures including all or a subset of: operating system 718, communications module 720, user interface module 722, one or more applications 724, and digital assistant module 726. In particular, memory 702, or the computer-readable storage media of memory 702, can store instructions for performing process 1200, described below. One or more processors 704 can execute these programs, modules, and instructions, and read/write from/to the data structures.

Operating system 718 (e.g., Darwin, RTXC, LINUX, UNIX, iOS, OS X, WINDOWS, or an embedded operating system such as VxWorks) can include various software components and/or drivers for controlling and managing general system tasks (e.g., memory management, storage device control, power management, etc.) and facilitates communications between various hardware, firmware, and software components.

Communications module 720 can facilitate communications between digital assistant system 700 with other devices over network communications interface 708. For example, communications module 720 can communicate with RF circuitry 208 of electronic devices such as devices 200, 400, and 600 shown in FIGS. 2A, 4, 6A-6B, respectively. Communications module 720 can also include various components for handling data received by wireless circuitry 714 and/or wired communications port 712.

User interface module 722 can receive commands and/or inputs from a user via I/O interface 706 (e.g., from a keyboard, touch screen, pointing device, controller, and/or microphone), and generate user interface objects on a display. User interface module 722 can also prepare and deliver outputs (e.g., speech, sound, animation, text, icons, vibrations, haptic feedback, light, etc.) to the user via the I/O interface 706 (e.g., through displays, audio channels, speakers, touch-pads, etc.).

Applications 724 can include programs and/or modules that are configured to be executed by one or more processors 704. For example, if the digital assistant system is implemented on a standalone user device, applications 724 can include user applications, such as games, a calendar application, a navigation application, or an email application. If digital assistant system 700 is implemented on a server, applications 724 can include resource management applications, diagnostic applications, or scheduling applications, for example.

Memory 702 can also store digital assistant module 726 (or the server portion of a digital assistant). In some examples, digital assistant module 726 can include the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules can have access to one or more of the following systems or data and models of the digital assistant module 726, or a subset or superset thereof: ontology 760, vocabulary index 744, user data 748, task flow models 754, service models 756, and ASR systems 731.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
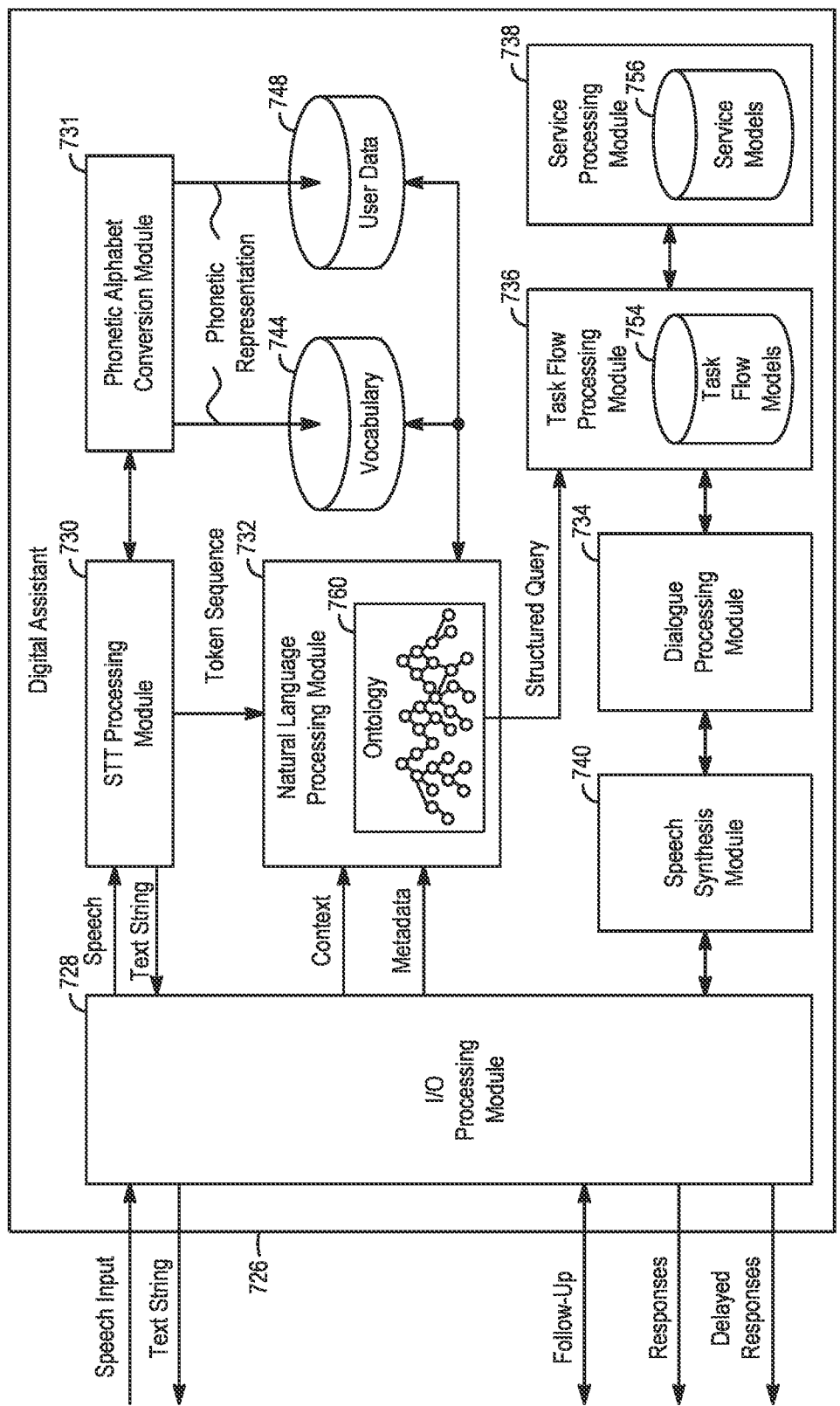
FIG. 7B illustrates the functions of the digital assistant shown in FIG. 7A according to various examples.

In some examples, as shown in FIG. 7B, I/O processing module 728 can interact with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 can optionally obtain contextual information associated with the user input from the user device, along with or shortly after the receipt of the user input. The contextual information can include user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 can also send follow-up questions to, and receive answers from, the user regarding the user request. When a user request is received by I/O processing module 728 and the user request can include speech input, I/O processing module 728 can forward the speech input to STT processing module 730 (or a speech recognizer) for speech-to-text conversions.

STT processing module 730 can include one or more ASR systems. The one or more ASR systems can process the speech input that is received through I/O processing module 728 to produce a recognition result. Each ASR system can include a front-end speech pre-processor. The front-end speech pre-processor can extract representative features from the speech input. For example, the front-end speech pre-processor can perform a Fourier transform on the speech input to extract spectral features that characterize the speech input as a sequence of representative multi-dimensional vectors. Further, each ASR system can include one or more speech recognition models (e.g., acoustic models and/or language models) and can implement one or more speech recognition engines. Examples of speech recognition models can include Hidden Markov Models, Gaussian-Mixture Models, Deep Neural Network Models, n-gram language models, and other statistical models. Examples of speech recognition engines can include the dynamic time warping based engines and weighted finite-state transducers (WFST) based engines. The one or more speech recognition models and the one or more speech recognition engines can be used to process the extracted representative features of the front-end speech pre-processor to produce intermediate recognitions results (e.g., phonemes, phonemic strings, and subwords), and ultimately, text recognition results (e.g., words, word strings, or sequence of tokens). In some examples, the speech input can be processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result can be passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 can include and/or access a vocabulary of recognizable words via phonetic alphabet conversion module 731. Each vocabulary word can be associated with one or more candidate pronunciations of the word represented in a speech recognition phonetic alphabet. In particular, the vocabulary of recognizable words can include a word that is associated with a plurality of candidate pronunciations. For example, the vocabulary may include the word "tomato" that is associated with the candidate pronunciations of /tə'meɪroʊ/ and /tə'mɑtoʊ/. Further, vocabulary words can be associated with custom candidate pronunciations that are based on previous speech inputs from the user. Such custom candidate pronunciations can be stored in STT processing module 730 and can be associated with a particular user via the user's profile on the device. In some examples, the candidate pronunciations for words can be determined based on the spelling of the word and one or more linguistic and/or phonetic rules. In some examples, the candidate pronunciations can be manually generated, e.g., based on known canonical pronunciations.

In some examples, the candidate pronunciations can be ranked based on the commonness of the candidate pronunciation. For example, the candidate pronunciation /tə'meɪroʊ/ can be ranked higher than /tə'mɑtoʊ/, because the former is a more commonly used pronunciation (e.g., among all users, for users in a particular geographical region, or for any other appropriate subset of users). In some examples, candidate pronunciations can be ranked based on whether the candidate pronunciation is a custom candidate pronunciation associated with the user. For example, custom candidate pronunciations can be ranked higher than canonical candidate pronunciations. This can be useful for recognizing proper nouns having a unique pronunciation that deviates from canonical pronunciation. In some examples, candidate pronunciations can be associated with one or more speech characteristics, such as geographic origin, nationality, or ethnicity. For example, the candidate pronunciation /tə'meɪroʊ/ can be associated with the United States, whereas the candidate pronunciation /tə'mɑtoʊ/ can be associated with Great Britain. Further, the rank of the candidate pronunciation can be based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) can be ranked higher than the candidate pronunciation /tə'mɑtoʊ/ (associated with Great Britain). In some examples, one of the ranked candidate pronunciations can be selected as a predicted pronunciation (e.g., the most likely pronunciation).

When a speech input is received, STT processing module 730 can be used to determine the phonemes corresponding to the speech input (e.g., using an acoustic model), and then attempt to determine words that match the phonemes (e.g., using a language model). For example, if STT processing module 730 can first identify the sequence of phonemes /tə'meɪroʊ/ corresponding to a portion of the speech input, it can then determine, based on vocabulary index 744, that this sequence corresponds to the word "tomato."

In some examples, STT processing module 730 can use approximate matching techniques to determine words in a voice input. Thus, for example, the STT processing module 730 can determine that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730 and attempt to associate the token sequence with one or more "actionable intents" recognized by the digital assistant. An "actionable intent" can represent a task that can be performed by the digital assistant and can have an associated task flow implemented in task flow models 754. The associated task flow can be a series of programmed actions and steps that the digital assistant takes in order to perform the task. The scope of a digital assistant's capabilities can be dependent on the number and variety of task flows that have been implemented and stored in task flow models 754 or, in other words, on the number and variety of "actionable intents" that the digital assistant recognizes. The effectiveness of the digital assistant, however, can also be dependent on the assistant's ability to infer the correct "actionable intent(s)" from the user request expressed in natural language.

In some examples, in addition to the sequence of words or tokens obtained from STT processing module 730, natural language processing module 732 can also receive contextual information associated with the user request, e.g., from I/O processing module 728. The natural language processing module 732 can optionally use the contextual information to clarify, supplement, and/or further define the information contained in the token sequence received from STT processing module 730. The contextual information can include, for example, user preferences, hardware and/or software states of the user device, sensor information collected before, during, or shortly after the user request, prior interactions (e.g., dialogue) between the digital assistant and the user, and the like. As described herein, contextual information can be dynamic, and can change with time, location, content of the dialogue, and other factors.

In some examples, the natural language processing can be based on, e.g., ontology 760. Ontology 760 can be a hierarchical structure containing many nodes, each node representing either an "actionable intent" or a "property" relevant to one or more of the "actionable intents" or other "properties." As noted above, an "actionable intent" can represent a task that the digital assistant is capable of performing, i.e., it is "actionable" or can be acted on. A "property" can represent a parameter associated with an actionable intent or a sub-aspect of another property. A linkage between an actionable intent node and a property node in ontology 760 can define how a parameter represented by the property node pertains to the task represented by the actionable intent node.

In some examples, ontology 760 can be made up of actionable intent nodes and property nodes. Within ontology 760, each actionable intent node can be linked to one or more property nodes either directly or through one or more intermediate property nodes. Similarly, each property node can be linked to one or more actionable intent nodes either directly or through one or more intermediate property nodes. For example, as shown in FIG. 7C, ontology 760 can include a "restaurant reservation" node (i.e., an actionable intent node). Property nodes "restaurant," "date/time" (for the reservation), and "party size" can each be directly linked to the actionable intent node (i.e., the "restaurant reservation" node).

Figure 7C:
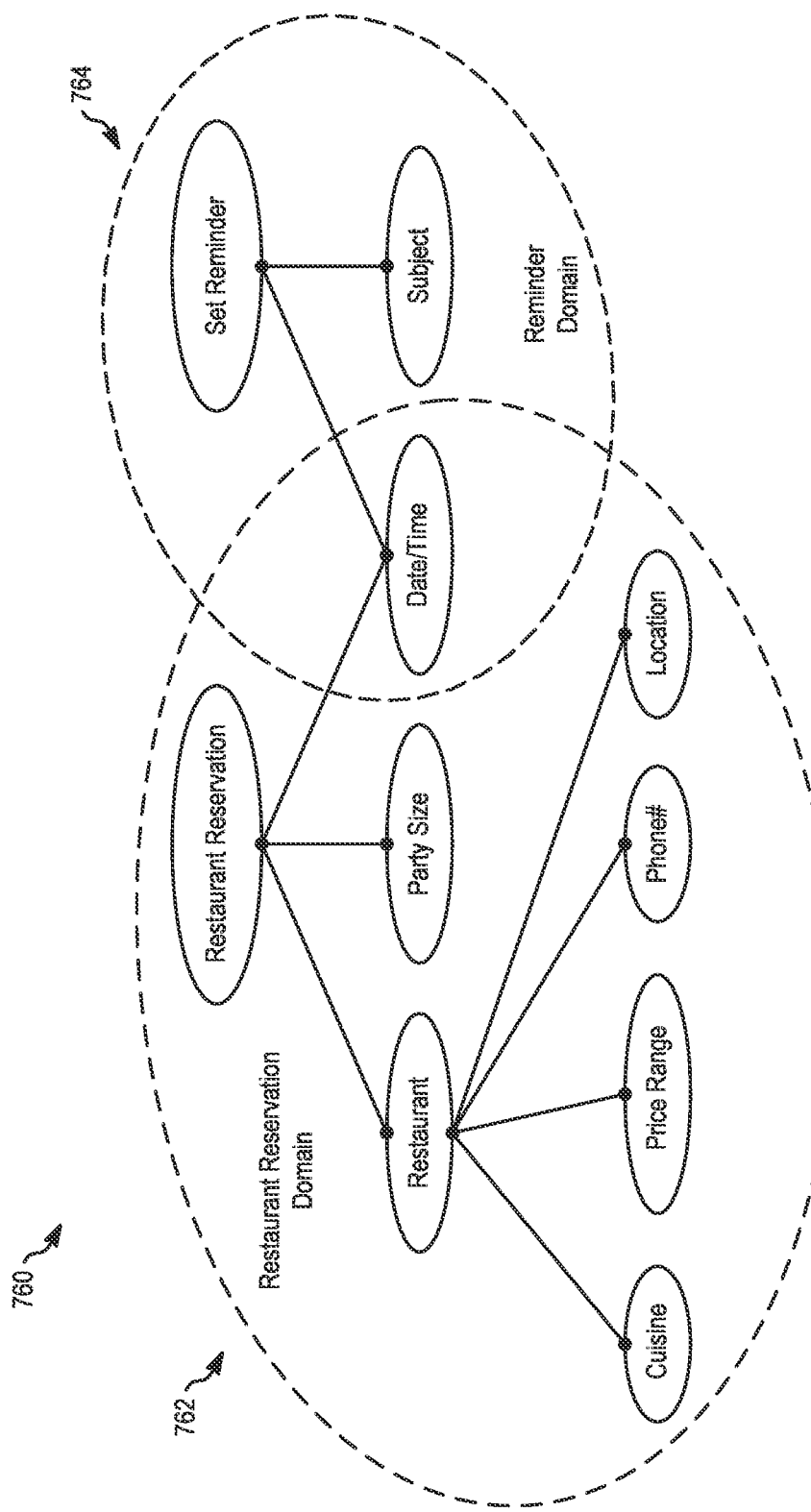
FIG. 7C illustrates a portion of an ontology according to various examples.

In addition, property nodes "cuisine," "price range," "phone number," and "location" can be sub-nodes of the property node "restaurant," and can each be linked to the "restaurant reservation" node (i.e., the actionable intent node) through the intermediate property node "restaurant." For another example, as shown in FIG. 7C, ontology 760 can also include a "set reminder" node (i.e., another actionable intent node). Property nodes "date/time" (for setting the reminder) and "subject" (for the reminder) can each be linked to the "set reminder" node. Since the property "date/time" can be relevant to both the task of making a restaurant reservation and the task of setting a reminder, the property node "date/time" can be linked to both the "restaurant reservation" node and the "set reminder" node in ontology 760.

An actionable intent node, along with its linked concept nodes, can be described as a "domain." In the present discussion, each domain can be associated with a respective actionable intent and refers to the group of nodes (and the relationships there between) associated with the particular actionable intent. For example, ontology 760 shown in FIG. 7C can include an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 can include the actionable intent node "set reminder," and property nodes "subject" and "date/time." In some examples, ontology 760 can be made up of many domains. Each domain can share one or more property nodes with one or more other domains. For example, the "date/time" property node can be associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains can include, for example, "find a movie," "initiate a phone call," "find directions," "schedule a meeting," "send a message," and "provide an answer to a question," "read a list," "providing navigation instructions," "provide instructions for a task," and so on. A "send a message" domain can be associated with a "send a message" actionable intent node, and may further include property nodes such as "recipient(s)," "message type," and "message body." The property node "recipient" can be further defined, for example, by the sub-property nodes such as "recipient name" and "message address."

In some examples, ontology 760 can include all the domains (and hence actionable intents) that the digital assistant is capable of understanding and acting upon. In some examples, ontology 760 can be modified, such as by adding or removing entire domains or nodes, or by modifying relationships between the nodes within the ontology 760.

In some examples, nodes associated with multiple related actionable intents can be clustered under a "super domain" in ontology 760. For example, a "travel" super-domain can include a cluster of property nodes and actionable intent nodes related to travel. The actionable intent nodes related to travel can include "airline reservation," "hotel reservation," "car rental," "get directions," "find points of interest," and so on. The actionable intent nodes under the same super domain (e.g., the "travel" super domain) can have many property nodes in common. For example, the actionable intent nodes for "airline reservation," "hotel reservation," "car rental," "get directions," and "find points of interest" can share one or more of the property nodes "start location," "destination," "departure date/time," "arrival date/time," and "party size."

In some examples, each node in ontology 760 can be associated with a set of words and/or phrases that are relevant to the property or actionable intent represented by the node. The respective set of words and/or phrases associated with each node can be the so-called "vocabulary" associated with the node. The respective set of words and/or phrases associated with each node can be stored in vocabulary index 744 in association with the property or actionable intent represented by the node. For example, returning to FIG. 7B, the vocabulary associated with the node for the property of "restaurant" can include words such as "food," "drinks," "cuisine," "hungry," "eat," "pizza," "fast food," "meal," and so on. For another example, the vocabulary associated with the node for the actionable intent of "initiate a phone call" can include words and phrases such as "call," "phone," "dial," "ring," "call this number," "make a call to," and so on. The vocabulary index 744 can optionally include words and phrases in different languages.

Natural language processing module 732 can receive the token sequence (e.g., a text string) from STT processing module 730, and determine what nodes are implicated by the words in the token sequence. In some examples, if a word or phrase in the token sequence is found to be associated with one or more nodes in ontology 760 (via vocabulary index 744), the word or phrase can "trigger" or "activate" those nodes. Based on the quantity and/or relative importance of the activated nodes, natural language processing module 732 can select one of the actionable intents as the task that the user intended the digital assistant to perform. In some examples, the domain that has the most "triggered" nodes can be selected. In some examples, the domain having the highest confidence value (e.g., based on the relative importance of its various triggered nodes) can be selected. In some examples, the domain can be selected based on a combination of the number and the importance of the triggered nodes. In some examples, additional factors are considered in selecting the node as well, such as whether the digital assistant has previously correctly interpreted a similar request from a user.

User data 748 can include user-specific information, such as user-specific vocabulary, user preferences, user address, user's default and secondary languages, user's contact list, and other short-term or long-term information for each user. In some examples, natural language processing module 732 can use the user-specific information to supplement the information contained in the user input to further define the user intent. For example, for a user request "invite my friends to my birthday party," natural language processing module 732 can be able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 can generate a structured query to represent the identified actionable intent. In some examples, the structured query can include parameters for one or more nodes within the domain for the actionable intent, and at least some of the parameters are populated with the specific information and requirements specified in the user request. For example, the user may say "Make me a dinner reservation at a sushi place at 7." In this case, natural language processing module 732 can be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some examples, based on the speech input and the text derived from the speech input using STT processing module 730, natural language processing module 732 can generate a partial structured query for the restaurant reservation domain, where the partial structured query includes the parameters {Cuisine="Sushi"} and {Time="7 pm"}. However, in this example, the user's speech input contains insufficient information to complete the structured query associated with the domain. Therefore, other necessary parameters such as {Party Size} and {Date} may not be specified in the structured query based on the information currently available. In some examples, natural language processing module 732 can populate some parameters of the structured query with received contextual information. For example, in some examples, if the user requested a sushi restaurant "near me," natural language processing module 732 can populate a {location} parameter in the structured query with GPS coordinates from the user device.

In some examples, natural language processing module 732 can pass the generated structured query (including any completed parameters) to task flow processing module 736 ("task flow processor"). Task flow processing module 736 can be configured to receive the structured query from natural language processing module 732, complete the structured query, if necessary, and perform the actions required to "complete" the user's ultimate request. In some examples, the various procedures necessary to complete these tasks can be provided in task flow models 754. In some examples, task flow models 754 can include procedures for obtaining additional information from the user and task flows for performing actions associated with the actionable intent.

As described above, in order to complete a structured query, task flow processing module 736 may need to initiate additional dialogue with the user in order to obtain additional information, and/or disambiguate potentially ambiguous speech inputs. When such interactions are necessary, task flow processing module 736 can invoke dialogue flow processing module 734 to engage in a dialogue with the user. In some examples, dialogue flow processing module 734 can determine how (and/or when) to ask the user for the additional information and receive and processes the user responses. The questions can be provided to and answers can be received from the users through I/O processing module 728. In some examples, dialogue flow processing module 734 can present dialogue output to the user via audio and/or visual output, and receive input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 can generate questions such as "For how many people?" and "On which day?" to pass to the user. Once answers are received from the user, dialogue flow processing module 734 can then populate the structured query with the missing information or pass the information to task flow processing module 736 to complete the missing information from the structured query.

Once task flow processing module 736 has completed the structured query for an actionable intent, task flow processing module 736 can proceed to perform the ultimate task associated with the actionable intent. Accordingly, task flow processing module 736 can execute the steps and instructions in the task flow model according to the specific parameters contained in the structured query. For example, the task flow model for the actionable intent of "restaurant reservation" can include steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 can perform the steps of: (1) logging onto a server of the ABC Café or a restaurant reservation system such as OPENTABLE®; (2) entering the date, time, and party size information in a form on the website; (3) submitting the form; and (4) making a calendar entry for the reservation in the user's calendar.

In some examples, task flow processing module 736 can employ the assistance of service processing module 738 ("service processing module") to complete a task requested in the user input or to provide an informational answer requested in the user input. For example, service processing module 738 can act on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service can be specified by a respective service model among service models 756. Service processing module 738 can access the appropriate service model for a service and generate requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by task flow processing module 736, service processing module 738 can establish a network connection with the online reservation service using the web address stored in the service model and send the necessary parameters of the reservation (e.g., time, date, party size) to the online reservation interface in a format according to the API of the online reservation service.

In some examples, natural language processing module 732, dialogue flow processing module 734, and task flow processing module 736 can be used collectively and iteratively to infer and define the user's intent, obtain information to further clarify and refine the user intent, and finally generate a response (i.e., an output to the user, or the completion of a task) to fulfill the user's intent. The generated response can be a dialogue response to the speech input that at least partially fulfills the user's intent. Further, in some examples, the generated response can be output as a speech output. In these examples, the generated response can be sent to speech synthesis module 740 (e.g., speech synthesizer) where it can be processed to synthesize the dialogue response in speech form. In yet other examples, the generated response can be data content relevant to satisfying a user request in the speech input.

Speech synthesis module 740 can be configured to synthesize speech outputs for presentation to the user. Speech synthesis module 740 synthesizes speech outputs based on text provided by the digital assistant. For example, the generated dialogue response can be in the form of a text string. Speech synthesis module 740 can convert the text string to an audible speech output. Speech synthesis module 740 can use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 can be configured to synthesize individual words based on phonemic strings corresponding to the words. For example, a phonemic string can be associated with a word in the generated dialogue response. The phonemic string can be stored in metadata associated with the word. Speech synthesis model 740 can be configured to directly process the phonemic string in the metadata to synthesize the word in speech form.

In some examples, instead of (or in addition to) using speech synthesis module 740, speech synthesis can be performed on a remote device (e.g., the server system 108), and the synthesized speech can be sent to the user device for output to the user. For example, this can occur in some implementations where outputs for a digital assistant are generated at a server system. And because server systems generally have more processing power or resources than a user device, it can be possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Functions of a Digital Assistant—Intelligent Search and Object Management FIGS. 8A-8F, 9A-9H, 10A-10B, 11A-11D, 12A-12D, and 13A-13C illustrate functionalities of performing a task using a search process or an object managing process by a digital assistant. In some examples, the digital assistant system (e.g., digital assistant system 700) is implemented by a user device according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device is a laptop computer, a desktop computer, or a tablet computer. The user device can operate in a multi-tasking environment, such as a desktop environment.

With references to FIGS. 8A-8F, 9A-9H, 10A-10B, 11A-11D, 12A-12D, and 13A-13C, in some examples, a user device provides various user interfaces (e.g., user interfaces 810, 910, 1010, 1110, 1210, and 1310). The user device displays the various user interfaces on a display (e.g., touch-sensitive display system 212, display 440) associated with the user device. The various user interfaces provide one or more affordances representing different processes (e.g., affordances 820, 920, 1020, 1120, 1220, and 1320 representing searching processes; and affordances 830, 930, 1030, 1130, 1230, and 1330 representing object managing processes). The one or more processes can be instantiated directly or indirectly by the user. For example, a user instantiates the one or more processes by selecting the affordances using an input device such as a keyboard, a mouse, a joystick, a finger, or the like. A user can also instantiate the one or more processes using a speech input, as described in more detail below. Instantiating a process includes invoking the process if the process is not already executing. If at least one instance of the process is executing, instantiating a process includes executing an existing instance of the process or generating a new instance of the process. For example, instantiating an object managing process includes invoking the object managing process, using an existing object managing process, or generate a new instance of the object managing process.

As shown in FIGS. 8A-8F, 9A-9H, 10A-10B, 11A-11D, 12A-12D, and 13A-13C, the user device displays, on a user interface (e.g., user interface 810, 910, 1010, 1110, 1210, and 1310) an affordance (e.g., affordance 840, 940, 1040, 1140, 1240, and 1340) to instantiate a digital assistant service. The affordance can be, for example, a microphone icon representing the digital assistant. The affordance can be displayed at any location on the user interfaces. For example, the affordance can be displayed on the dock (e.g., dock 808, 908, 1008, 1108, 1208, and 1308) at the bottom of the user interfaces, on the menu bar (e.g. menu bar 806, 906, 1006, 1106, 1206, and 1306) at the top of the user interfaces, in a notification center at the right side of the user interfaces, or the like. The affordance can also be displayed dynamically on the user interface. For example, the user device displays the affordance near an application user interface (e.g., an application window) such that the digital assistant service can be conveniently instantiated.

In some examples, the digital assistant is instantiated in response to receiving a pre-determined phrase. For example, the digital assistant is invoked in response to receiving a phrase such as "Hey, Assistant," "Wake up, Assistant," "Listen up, Assistant," "OK, Assistant," or the like. In some examples, the digital assistant is instantiated in response to receiving a selection of the affordance. For example, a user selects affordance 840, 940, 1040, 1140, 1240, and/or 1340 using an input device such as a mouse, a stylus, a finger, or the like. Providing a digital assistant on a user device consumes computing resources (e.g., power, network bandwidth, memory, and processor cycles). In some examples, the digital assistant is suspended or shut down until a user invokes it. In some examples, the digital assistant is active for various periods of time. For example, the digital assistant can be active and monitoring the user's speech input during the time that various user interfaces are displayed, that the user device is turned on, that the user device is hibernating or sleeping, that the user is logged off, or a combination thereof.

With reference to FIGS. 8A-8F, 9A-9H, 10A-10B, 11A-11D, 12A-12D, and 13A-13C, a digital assistant receives one or more speech inputs, such as speech inputs 852, 854, 855, 856, 952, 954, 1052, 1054, 1152, 1252, or 1352, from a user. The user provides various speech inputs for the purpose of, for example, performing a task using a searching process or an object managing process. In some examples, the digital assistant receives speech inputs directly from the user at the user device or indirectly through another electronic device that is communicatively connected to the user device. The digital assistant receives speech inputs directly from the user via, for example, a microphone (e.g., microphone 213) of the user device. The user device includes a device that is configured to operate in a multi-tasking environment, such as a laptop computer, a desktop computer, a tablet, a server, or the like. The digital assistant can also receive speech inputs indirectly through one or more electronic devices such as a headset, a smartphone, a tablet, or the like. For instance, the user may speak to a headset (not shown). The headset receives the speech input from the user and transmits the speech input or a representation of it to the digital assistant of the user device via, for example, a Bluetooth connection between the headset and the user device.

With reference to FIGS. 8A-8F, 9A-9H, 10A-10B, 11A-11D, 12A-12D, and 13A-13C, in some embodiments, the digital assistant (e.g., represented by affordance 840, 940, 1040, 1140, 1240, and 1340) identifies context information associated with the user device. The context information includes, for example, user-specific data, metadata associated with one or more objects, sensor data, and user device configuration data. An object can be a target or a component of a process (e.g., an object managing process) associated with performing a task or a graphical element currently displayed on screen, and the object or graphical element may have or may not currently have focus (e.g., be currently selected). For example, an object can include a file (e.g., a photo, a document), a folder, a communication (e.g., an email, a message, a notification, or a voicemail), a contact, a calendar, an application, an online resource, or the like. In some examples, the user-specific data includes log information, user preferences, the history of user's interaction with the user device, or the like. Log information indicates recent objects (e.g., a presentation file) used in a process. In some examples, metadata associated with one or more objects includes the title of the object, the time information of the object, the author of the object, the summary of the object, or the like. In some examples, the sensor data includes various data collected by a sensor associated with the user device. For example, the sensor data includes location data indicating the physical location of the user device. In some examples, the user device configuration data includes the current device configurations. For example, the device configurations indicate that the user device is communicatively connected to one or more electronic devices such as a smartphone, a tablet, or the like. As described in more detail below, the user device can perform one or more processes using the context information.

With reference to FIGS. 8A-8F, 9A-9H, 10A-10B, 11A-11D, 12A-12D, and 13A-13C, in response to receiving a speech input, the digital assistant determines a user intent based on the speech input. As described above, in some examples, the digital assistant processes a speech input via an I/O processing module (e.g., I/O processing module 728 as shown in FIG. 7B), an STT processing module (e.g., STT processing module 730 as shown in FIG. 7B), and a natural language processing module (e.g., natural language processing module 732 as shown in FIG. 7B). The I/O processing module forwards the speech input to an STT processing module (or a speech recognizer) for speech-to-text conversions. The speech-to-text conversion generates text based on the speech input. As described above, the STT processing module generates a sequence of words or tokens ("token sequence") and provides the token sequence to the natural language processing module. The natural language processing module performs natural language processing of the text and determines the user intent based on a result of the natural language processing. For example, the natural language processing module may attempt to associate the token sequence with one or more actionable intents recognized by the digital assistant. As described, once the natural language processing module identifies an actionable intent based on the user input, it generates a structured query to represent the identified actionable intent. The structured query includes one or more parameters associated with the actionable intent. The one or more parameters are used to facilitate the performance of a task based on the actionable intent.

In some embodiments, the digital assistant further determines whether the user intent is to perform a task using a searching process or an object managing process. The searching process is configured to search data stored internally or externally to the user device. The object managing process is configured to manage objects associated with the user device. Various examples of determination of the user intent are provided below in more detail with respect to FIGS. 8A-8F, 9A-9H, 10A-10B, 11A-11D, 12A-12D, and 13A-13C.

Figure 8A:
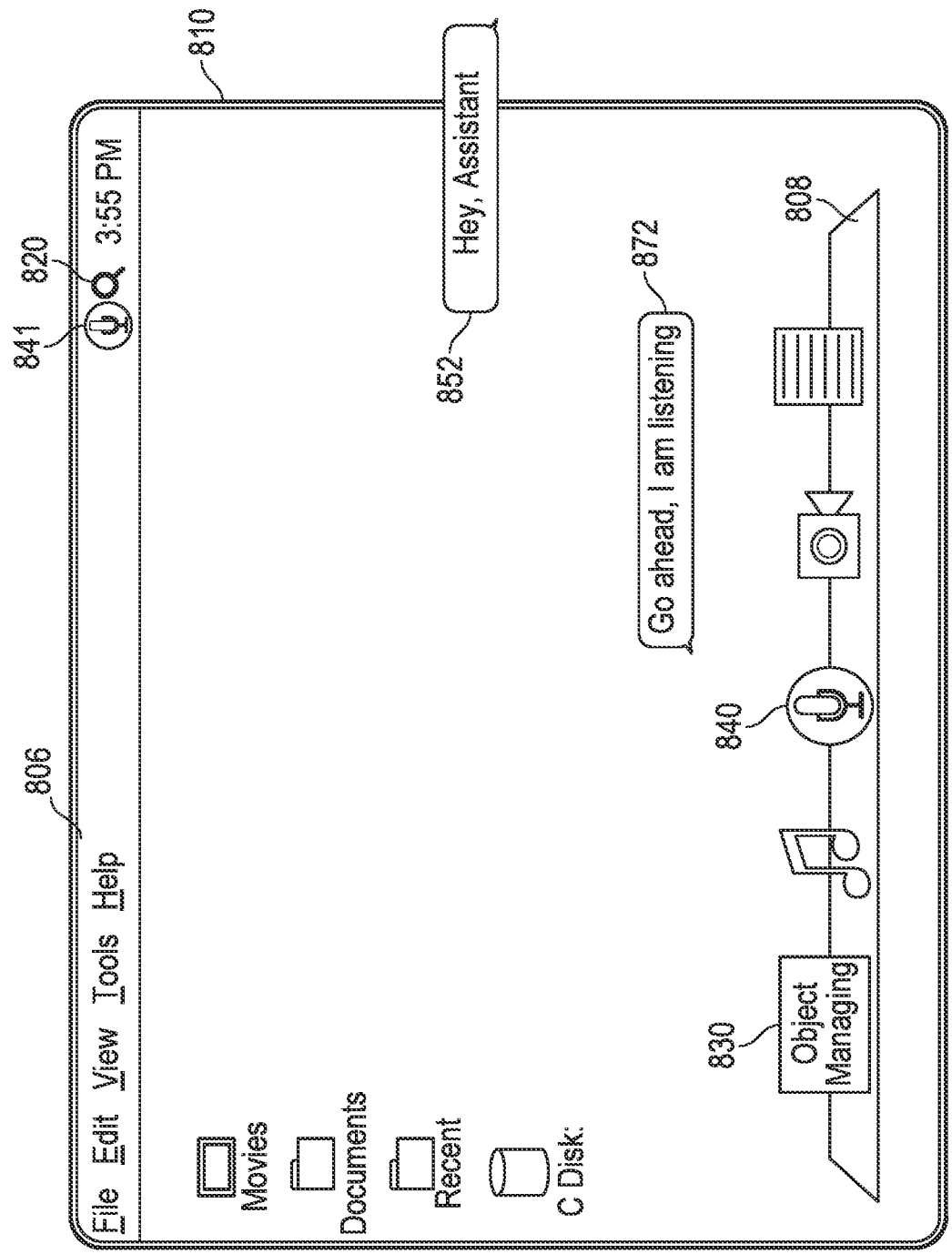
FIGS. 8A-8F illustrate functionalities of performing a task using a search process or an object managing process by a digital assistant according to various examples.

With reference to FIG. 8A, in some examples, a user device receives a speech input 852 from a user to instantiate the digital assistant. Speech input 852 includes, for example, "Hey, Assistant." In response to the speech input, the user device instantiates the digital assistant represented by affordance 840 or 841 such that the digital assistant is actively monitoring subsequent speech inputs. In some examples, the digital assistant provides a spoken output 872 indicating that it is instantiated. For example, spoken output 872 includes "Go ahead, I am listening." In some examples, the user device receives a selection of affordance 840 or affordance 841 from the user to instantiate the digital assistant. The selection of affordance is performed by using an input device such as a mouse, a stylus, a finger, or the like.

Figure 8B:
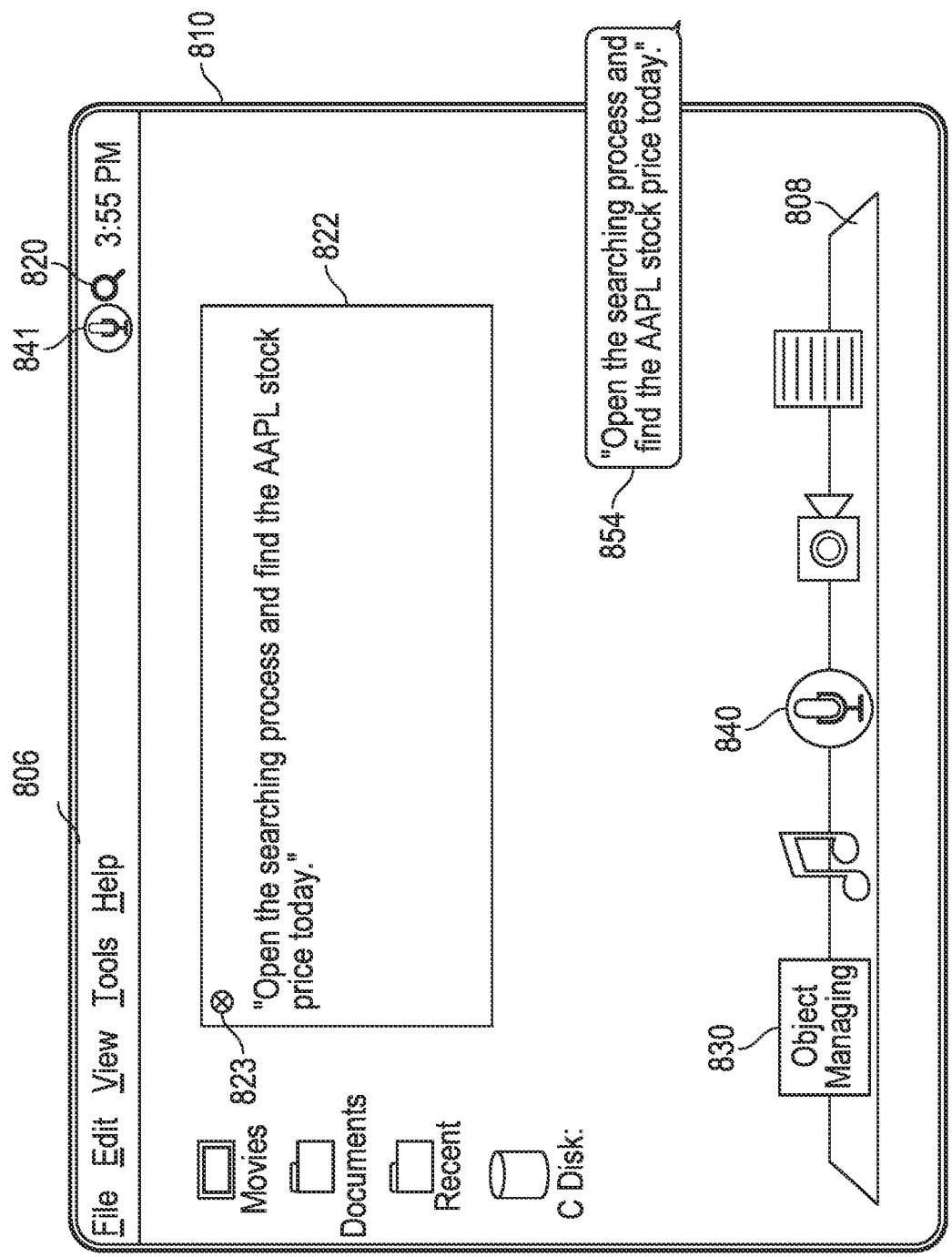

With reference to FIG. 8B, in some examples, the digital assistant receives a speech input 854. Speech input 854 includes, for example, "Open the searching process and find the AAPL stock price today," or simply "show me the AAPL stock price today." Based on speech input 854, the digital assistant determines the user intent. For example, to determine the user intent, the digital assistant determines that the actionable intent is obtaining online information and that one or more parameters associated with this actionable intent include "AAPL stock price," and "today."

As described, in some examples, the digital assistant further determines whether the user intent is to perform a task using a searching process or an object managing process. In some embodiments, to make the determination, the digital assistant determines whether the speech input includes one or more keywords representing the searching process or the object managing process. For example, the digital assistant determines that speech input 854 includes keywords or a phrase such as "open the searching process," indicating the user intent is to use the searching process to perform the task. As a result, the digital assistant determines that the user intent is to perform a task using the searching process.

As shown in FIG. 8B, in accordance with a determination the user intent is to perform the task using the searching process, the digital assistant performs the task using the searching process. As described, the natural language processing module of the digital assistant generates a structured query based on the user intent and passes the generated structured query to a task flow processing module (e.g., task flow processing module 736). The task flow processing module receives the structured query from the natural language processing module, completes the structured query, if necessary, and performs the actions required to "complete" the user's ultimate request. Performing the task using the searching process includes, for example, searching at least one object. In some embodiments, at least one object includes a folder, a file (e.g., a photo, an audio, a video), a communication (e.g., an email, a message, a notification, a voicemail), a contact, a calendar, an application (e.g., Keynote, Number, iTunes, Safari), an online informational source (e.g., Google, Yahoo, Bloomberg), or a combination thereof. In some examples, searching an object is based on metadata associated with the object. For example, the searching of a file or folder can use metadata such as a tag, a date, a time, an author, a title, a type of the file, a size, a page count, and/or a file location associated with the folder or file. In some examples, the file or folder is stored internally or externally to the user device. For example, the file or folder can be stored on the hard disk of the user device or stored on a cloud server. In some examples, searching a communication is based on metadata associated with the communication. For example, the searching of an email uses metadata such as the sender of the email, the receiver of the email, the sent/receive dates of the email, or the like.

As illustrated in FIG. 8B, in accordance with the determination that the user intent is to obtain the AAPL stock price using the searching process, the digital assistant performs the searching. For example, the digital assistant instantiates a searching process, represented by affordance 820, and causes the searching process to search today's AAPL stock price. In some examples, the digital assistant further causes the searching process to display a user interface 822 (e.g., a snippet or a window) providing text corresponding to speech input 854 (e.g., "Open the searching process and find the AAPL stock price today").

Figure 8C:
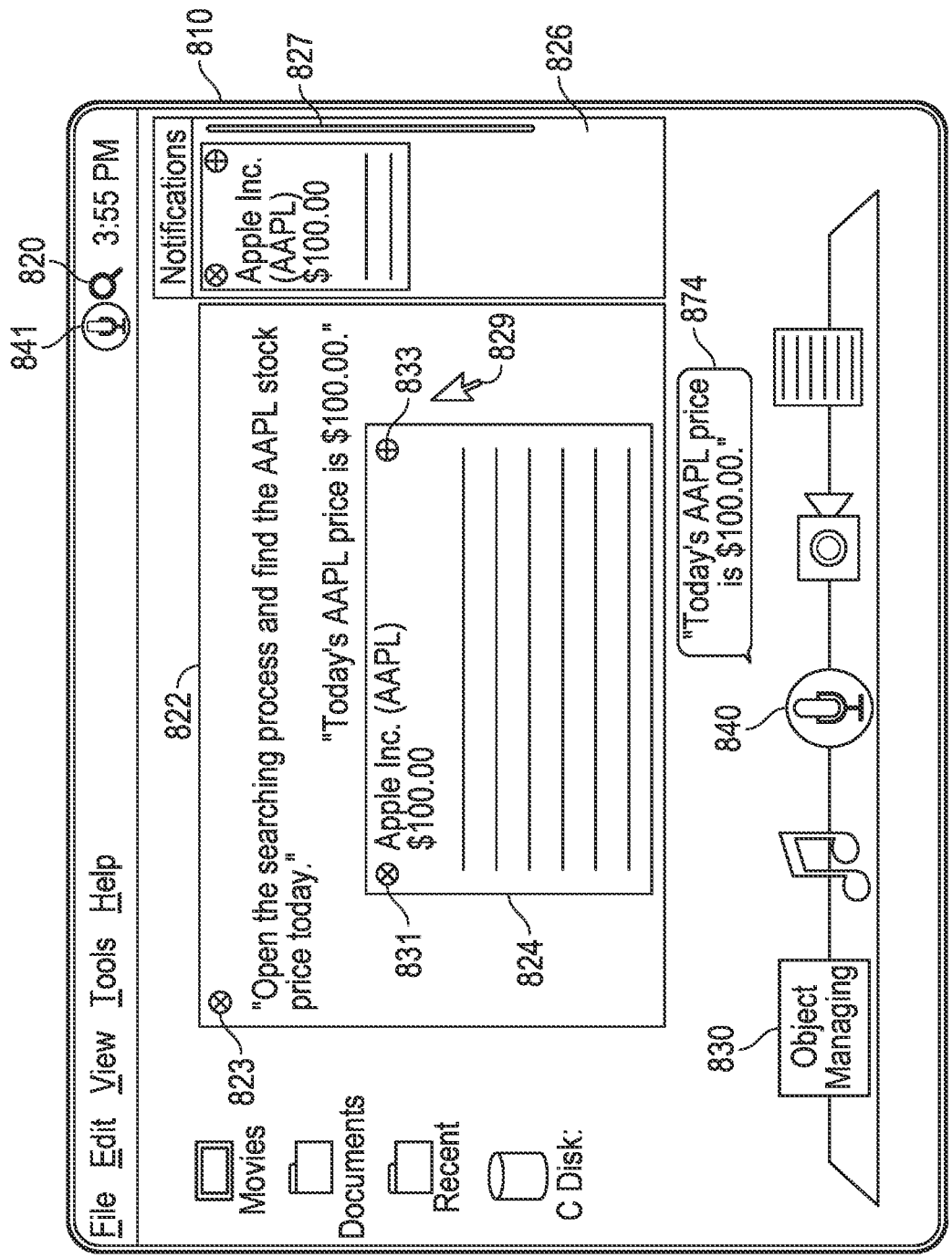

With reference to FIG. 8C, in some embodiments, the digital assistant provides a response based on a result of performing the task using the searching process. As illustrated in FIG. 8C, as a result of searching the AAPL stock price, the digital assistant displays a user interface 824 (e.g., a snippet or a window) providing the result of performing the task using the searching process. In some embodiments, user interface 824 is located within user interface 822 as a separate user interface. In some embodiments, user interfaces 824 and 822 are integrated together as a single user interface. On user interface 824, the search result of the stock price of AAPL is displayed. In some embodiments, user interface 824 further provides affordances 831 and 833. Affordance 831 enables closing of user interface 824. For example, if the digital assistant receives a user's selection of affordance 831, user interface 824 disappears or closes from the display of the user device. Affordance 833 enables moving or sharing of the search result displayed on user interface 824. For example, if the digital assistant receives the user's selection of affordance 833, it instantiates a process (e.g., the object managing process) to move or share user interface 824 (or the search result thereof) with a notification application. As shown in FIG. 8C, the digital assistant displays a user interface 826 that is associated with the notification application to provide the search result of AAPL stock price. In some embodiments, user interface 826 displays an affordance 827. Affordance 827 enables scrolling within user interface 826 such that the user can view the entire content (e.g., multiple notifications) within user interface 826 and/or indicates that relative position of the document with respect to its entire length and/or width. In some embodiments, user interface 826 displays results and/or dialog history (e.g., search results obtained from a current and/or past searching process) stored by the digital assistant. Further, in some examples, results of the performance the task are dynamically updated over time. For example, the AAPL stock price can be dynamically updated over time and displayed on user interface 826.

In some embodiments, the digital assistant also provides a spoken output corresponding to the search result. For example, the digital assistant (e.g., represented by affordance 840) provides a spoken output 874 including "Today's AAPL price is $100.00." In some examples, user interface 822 includes text corresponding to spoken output 874.

Figure 8D:
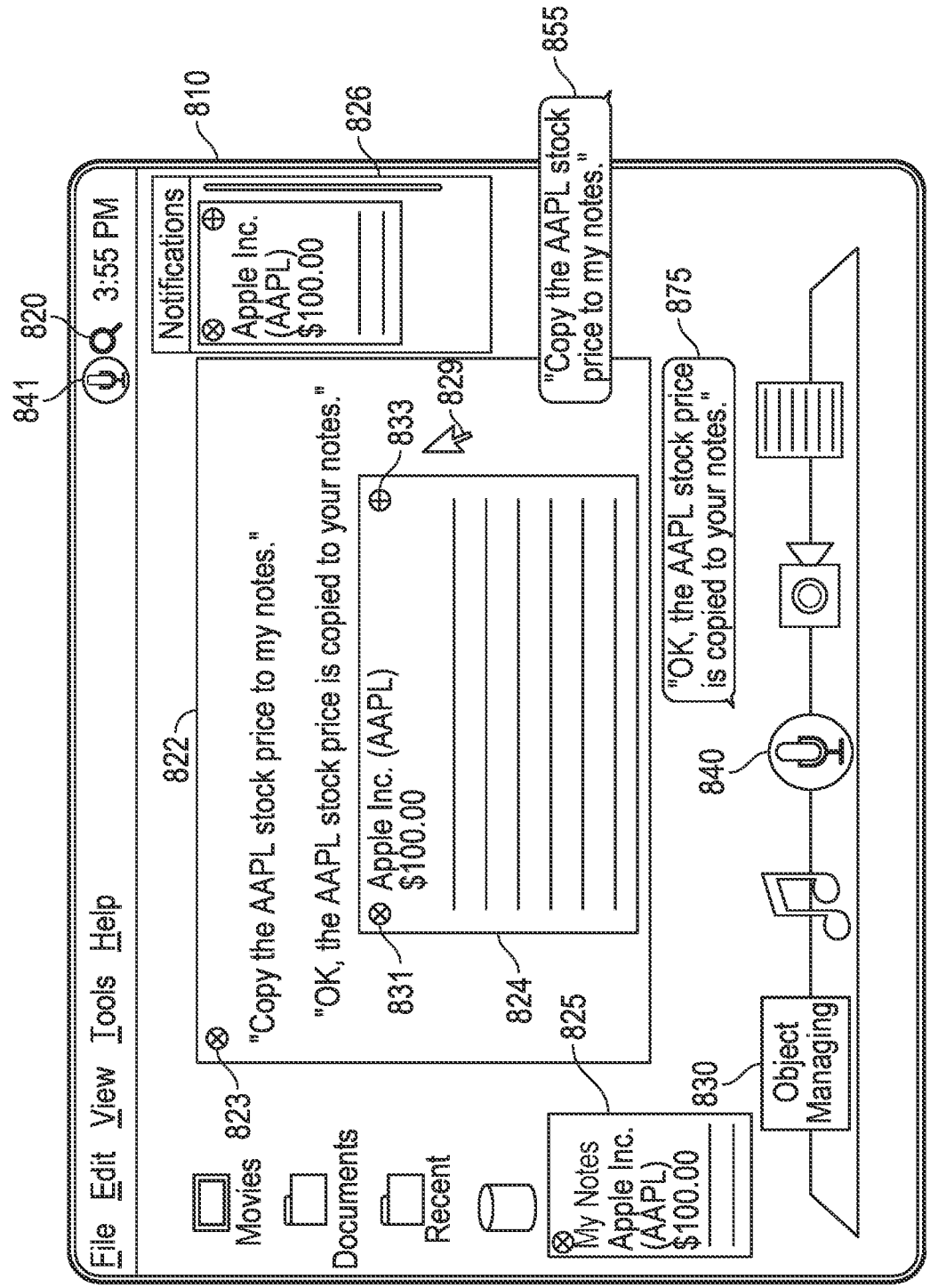

With reference to FIG. 8D, in some examples, the digital assistant instantiates a process (e.g., the object managing process) to move or share the search result displayed on user interface 824 in response to a subsequent speech input. For example, the digital assistant receives a speech input 855 such as "Copy the AAPL stock price to my notes." In response, the digital assistant instantiates a process to move or copy the search result (e.g., the AAPL stock price) to the user's note. As shown in FIG. 8D, in some examples, the digital assistant further displays a user interface 825 providing the copied or moved search result in user's note. In some examples, the digital assistant further provides a spoken output 875 such as "OK, the AAPL stock price is copied to your notes." In some examples, user interface 822 includes text corresponding to spoken output 875.

Figure 8E:
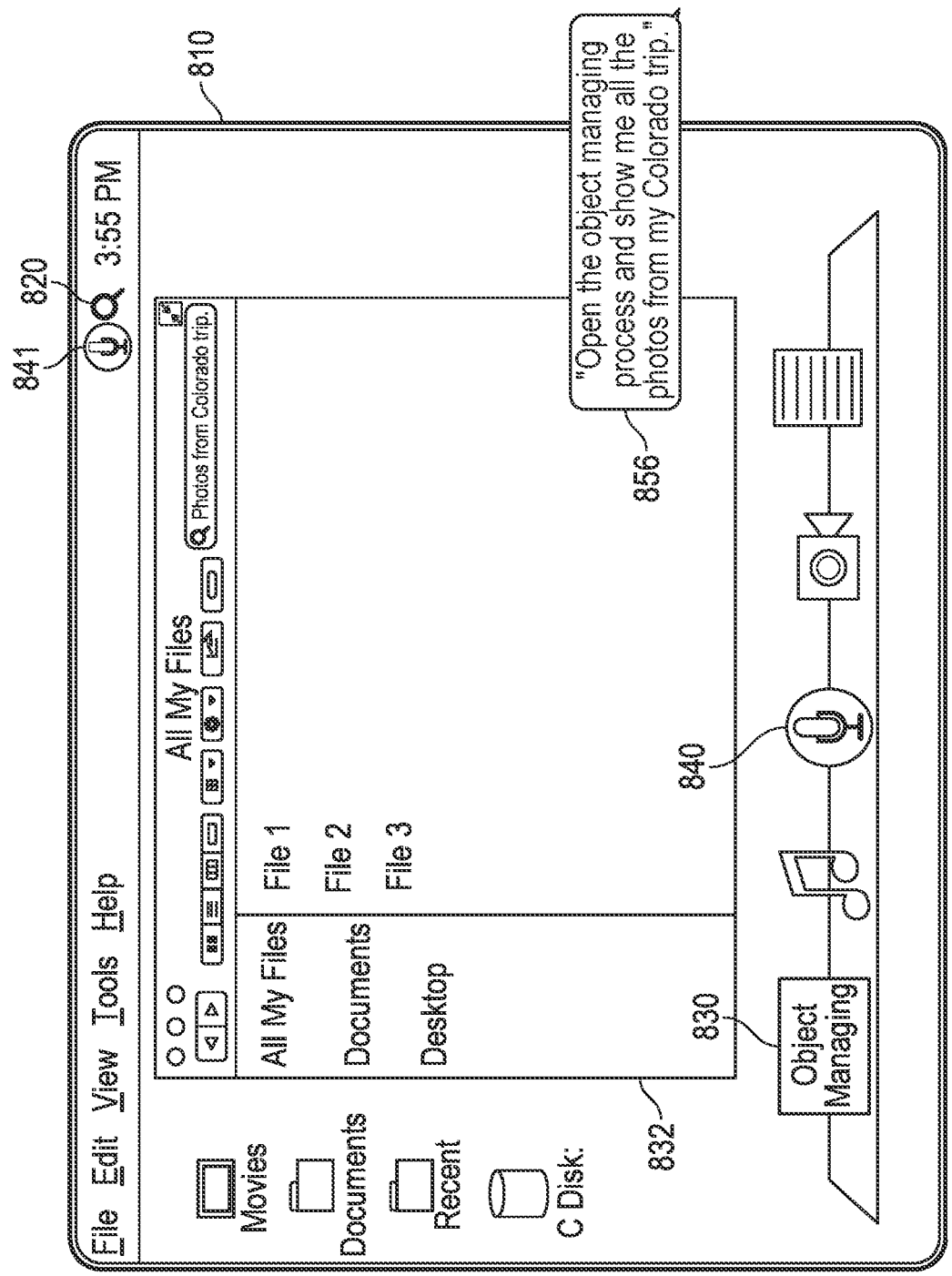

With reference to FIG. 8E, in some examples, the digital assistant determines that the user intent is to perform a task using the object managing process and performs the task using an object managing process. For example, the digital assistant receives a speech input 856 such as "Open the object managing process and show me all the photos from my Colorado trip," or simply "Show me all the photos from my Colorado trip." Based on speech input 856 and context information, the digital assistant determines the user intent. For example, the digital assistant determines that the actionable intent is to display photos and determines one or more parameters such as "all," and "Colorado trip." The digital assistant further determines which photos correspond to the user's Colorado trip using context information. As described, context information includes user-specific data, metadata of one or more objects, sensor data, and/or device configuration data. As an example, metadata associated with one or more files (e.g., file 1, file 2, and file 3 displayed in user interface 832) indicates that the file names includes the word "Colorado" or a city name of Colorado (e.g., "Denver"). The metadata may also indicate that a folder name includes the word "Colorado" or a city name of Colorado (e.g., "Denver"). As another example, sensor data (e.g., GPS data) indicates that the user was travelling within Colorado during a certain period of time. As a result, any photos the user took during that particular period of time are photos taken during the user's Colorado trip. As well, photos themselves may include geotagged metadata that associates the photo with the location at which it was taken. Based on the context information, the digital assistant determines that the user intent is to, for example, display photos stored in a folder having a folder name "Colorado trip," or display photos taken during the period of time that the user was travelling within Colorado.

As described, in some examples, the digital assistant determines whether the user intent is to perform a task using a searching process or an object managing process. To make such determination, the digital assistant determines whether the speech input includes one or more keywords representing the searching process or the object managing process. For example, the digital assistant determines that speech input 856 includes keywords or a phrase such as "open the object managing process," indicating that the user intent is to use the object managing process to perform the task.

In accordance with a determination the user intent is to perform the task using the object managing process, the digital assistant performs the task using the object managing process. For example, the digital assistant searches at least one object using the object managing process. In some examples, at least one object includes at least one of a folder or a file. A file can include at least one of a photo, an audio (e.g., a song), or a video (e.g., a movie). In some examples, searching a file or a folder is based on metadata associated with the folder or file. For example, the searching of a file or folder uses metadata such as a tag, a date, a time, an author, a title, a type of the file, a size, a page count, and/or a file location associated with the folder or file. In some examples, the file or folder can be stored internally or externally to the user device. For example, the file or folder can be stored on the hard disk of the user device or stored on a cloud server.

As illustrated in FIG. 8E, in accordance with the determination that the user intent is, for example, to display photos stored in a folder having a folder name "Colorado trip," or display photos taken during the period of time that the user was travelling within Colorado, the digital assistant performs the task using the object managing process. For example, the digital assistant instantiates an object managing process represented by affordance 830 and causes the object managing process to search for photos from the user's Colorado trip. In some examples, the digital assistant also causes the object managing process to display a snippet or a window (not shown) providing text of the user's speech input 856.

Figure 8F:
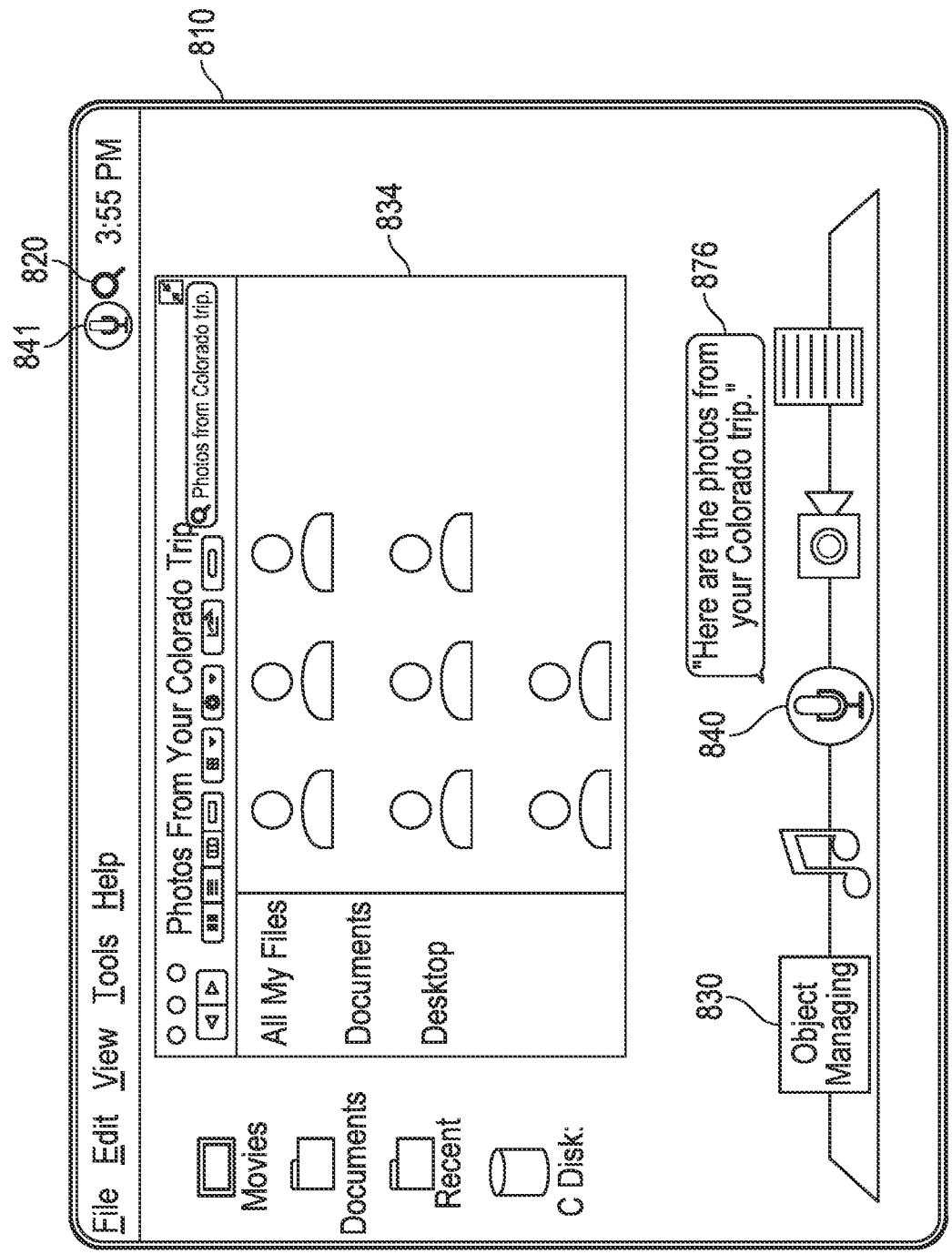

With reference to FIG. 8F, in some embodiments, the digital assistant further provides a response based on a result of performing the task using the object managing process. As illustrated in FIG. 8F, as a result of searching the photos of the user's Colorado trip, the digital assistant displays a user interface 834 (e.g., a snippet or a window) providing the result of performing the task using the object managing process. For example, on user interface 834, a preview of the photos is displayed. In some examples, the digital assistant instantiates a process (e.g., the object managing process) to perform additional tasks on the photos, such as inserting the photos to a document or attaching the photos to email. As described in more detail below, the digital assistant can instantiate a process to perform the additional tasks in response to a user's additional speech input. As well, the digital assistant can perform multiple tasks in response to a single speech input, such as "send the photos from my Colorado trip to my Mom by email." The digital assistant can also instantiate a process to perform such additional tasks in response to the user's input using an input device (e.g., a mouse input to select of one or more affordances or perform a drag-and-drop operation). In some embodiments, the digital assistant further provides a spoken output corresponding to the result. For example, the digital assistant provides a spoken output 876 including "Here are the photos from your Colorado trip."

Figure 9A:
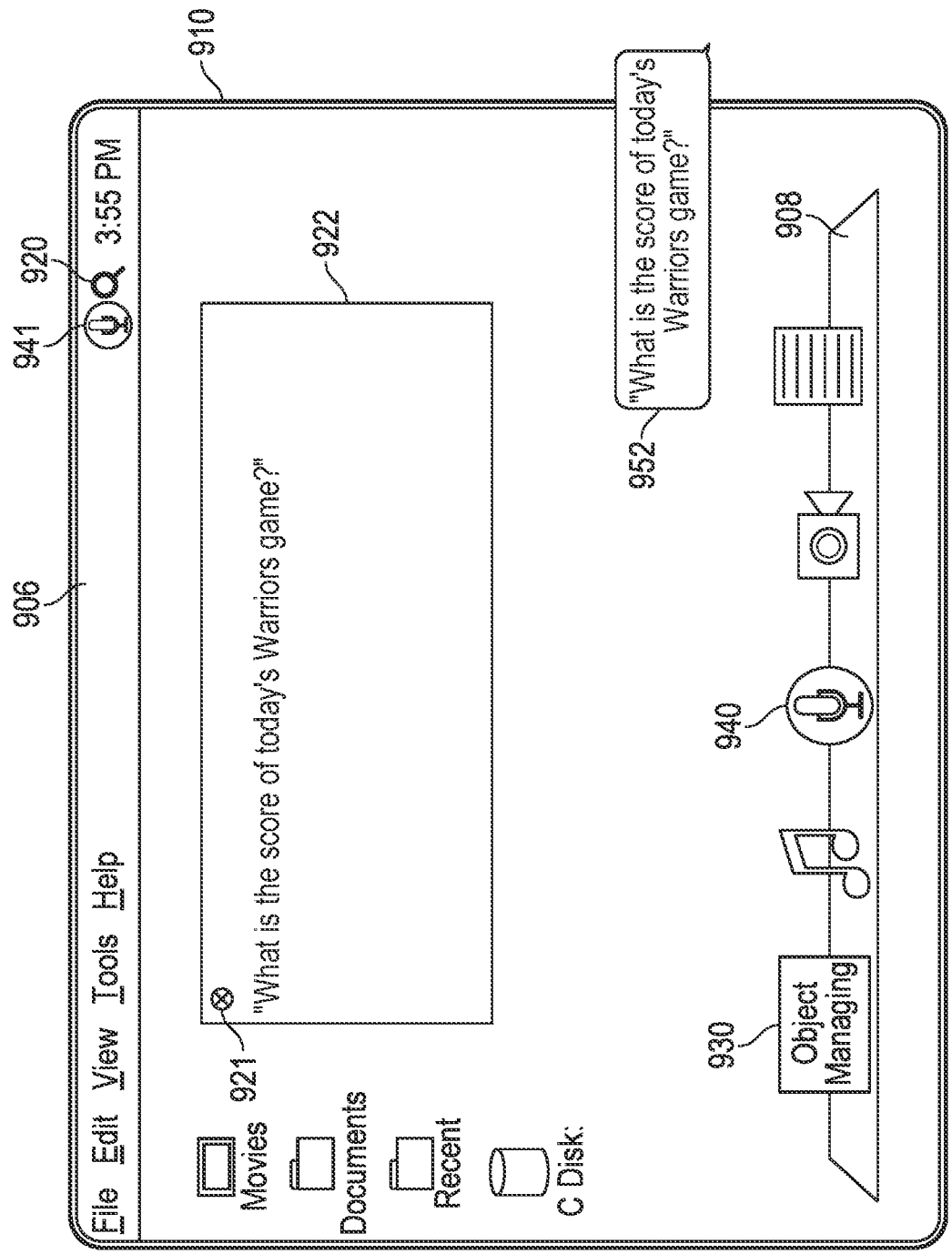
FIGS. 9A-9H illustrate functionalities of performing a task using a search process by a digital assistant according to various examples.

With reference to FIG. 9A, in some examples, user's speech input may not include one or more keywords indicating whether the user intent is to use the searching process or the object managing process. For example, the user provides a speech input 952 such as "What is the score of today's Warriors game?" Speech input 952 does not include keywords indicating "the searching process" or the "object managing process." As a result, the keywords may not be available for the digital assistant to determine whether the user intent is to perform the task using the searching process or the object managing process.

In some embodiments, to determine whether the user intent is to perform the task using the searching process or the object managing process, the digital assistant determines whether the task is associated with searching based on the speech input. In some examples, a task that is associated with searching can be performed by either the searching process or the object managing process. For example, both the searching process and the object managing process can search a folder and a file. In some examples, the searching process can further search a variety of objects including online information sources (e.g., websites), communications (e.g., emails), contacts, calendars, or the like. In some examples, the object managing process may not be configured to search certain objects such as online information sources.

In accordance with a determination that the task is associated with searching, the digital assistant further determines whether performing the task requires the searching process. As described, if a task is associated with searching, either the searching process or the object managing process can be used to perform the task. However, the object managing process may not be configured to search certain objects. As a result, to determine whether the user intent is to use the searching process or the object managing process, the digital assistant further determines whether the task requires the searching process. For example, as illustrated in FIG. 9A, based on speech input 952, the digital assistant determines that the user intent is, for example, to obtain the score of today's Warriors game. According to the user intent, the digital assistant further determines that performing the task requires searching online information sources and therefore is associated with searching. The digital assistant further determines whether performing the task requires the searching process. As described, in some examples, the searching process is configured to search online information sources such as websites, while the object managing process may not be configured to search such online information sources. As a result, the digital assistant determines that searching online information sources (e.g., searching Warriors' website to obtain the score) requires the searching process.

Figure 9B:
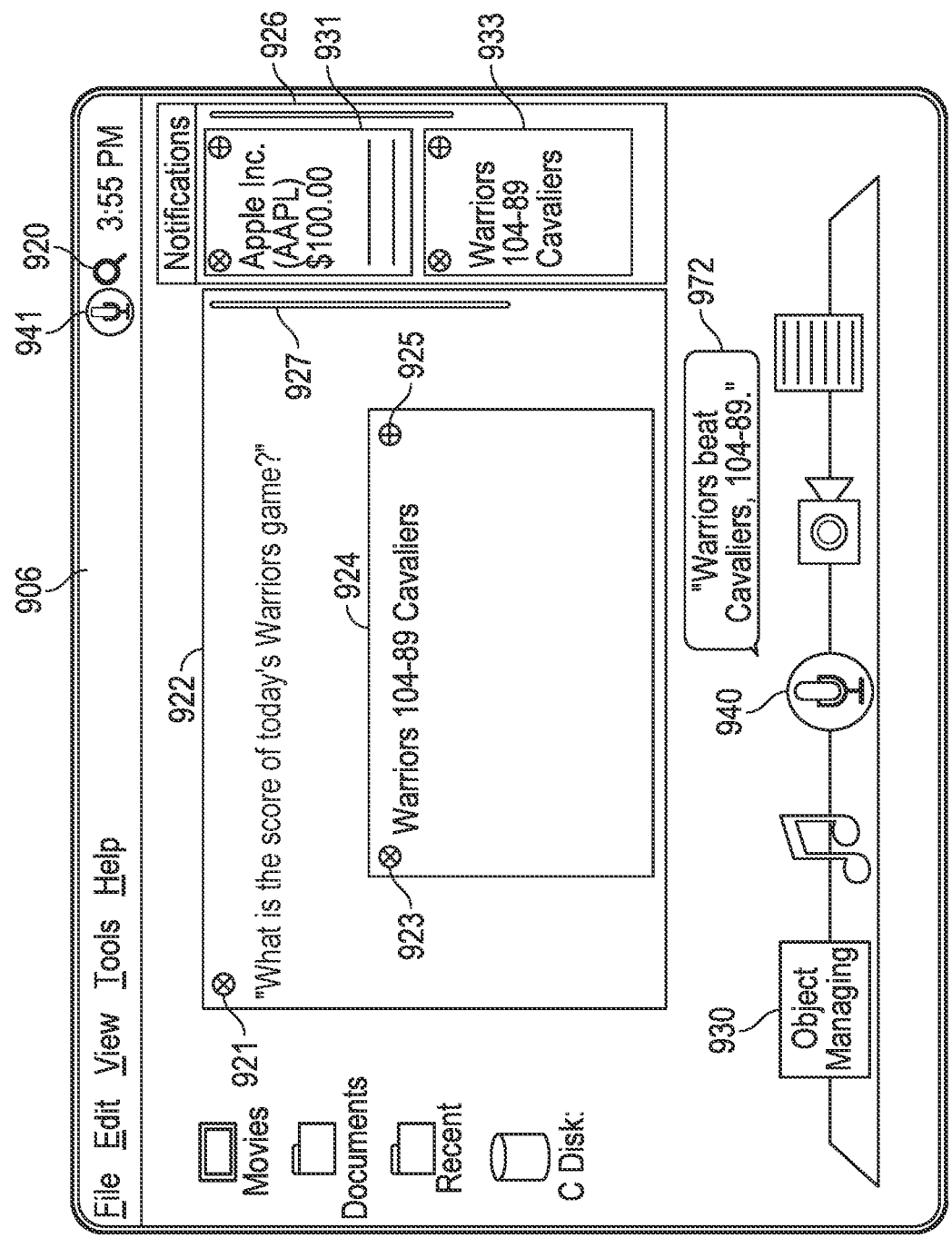

With reference to FIG. 9B, in some embodiments, in accordance with a determination that performing the task requires the searching process, the digital assistant performs the task using the searching process. For example, in accordance with the determination that searching the score of today's Warriors game requires the searching process, the digital assistant instantiates a searching process represented by affordance 920, and causes the searching process to search score of today's Warriors game. In some examples, the digital assistant further causes the searching process to display a user interface 922 (e.g., a snippet or a window) providing text of user speech input 952 (e.g., "What is the score of today's Warriors game?"). User interface 922 includes one or more affordances 921 and 927. Similar to described above, affordance 921 (e.g., a close button) enables closing of user interface 922 and affordance 927 (e.g., a scrolling bar) enables scrolling within user interface 922 such that the user can view the entire content within user interface 922.

With reference to FIG. 9B, in some examples, based on the search results, the digital assistant further provides one or more responses. As illustrated in FIG. 9B, as a result of searching the score of today's Warriors game, the digital assistant displays a user interface 924 (e.g., a snippet or a window) providing the result of performing the task using the searching process. In some embodiments, user interface 924 is located within user interface 922 as a separate user interface. In some embodiments, user interfaces 924 and 922 are integrated together as a single user interface. In some examples, the digital assistant displays the user interface 924 providing the current search results (e.g., the Warriors game score) together with another user interface (e.g., user interface 824 shown on FIG. 8C) providing prior search results (e.g., the AAPL stock price). In some embodiments, the digital assistant only displays user interface 924 providing the current search results and does not display another user interface providing prior search results. As illustrated in FIG. 9B, the digital assistant only displays user interface 924 to provide the current search results (e.g., the Warriors game score). In some examples, affordance 927 (e.g., a scrolling bar) enables scrolling within user interface 922 such that the user can view the prior search results. Further, in some examples, prior search results dynamically update or refresh, e.g., such that stock prices, sports score, weather forecast, etc., update over time.

As illustrated in FIG. 9B, on user interface 924, the search result of the score of today's Warriors game is displayed (e.g., Warriors 104-89 Cavaliers). In some embodiments, user interface 924 further provides affordances 923 and 925. Affordance 923 enables closing of user interface 924. For example, if the digital assistant receives a user's selection of affordance 923, user interface 924 disappears or closes from the display of the user device. Affordance 925 enables moving or sharing of the search result displayed on user interface 924. For example, if the digital assistant receives the user's selection of affordance 925, it moves or shares user interface 924 (or the search result thereof) with a notification application. As shown in FIG. 9B, the digital assistant displays user interface 926 that is associated with the notification application to provide the search result of Warriors game score. As described, results of the performance the task are dynamically updated over time. For example, the Warriors game score can be dynamically updated over time while the game is ongoing and displayed on user interface 924 (e.g., the snippet or window) and/or on user interface 926 (e.g., the notification application user interface). In some embodiments, the digital assistant further provides a spoken output corresponding to the search result. For example, the digital assistant represented by affordance 940 or 941 provides a spoken output 972 such as "Warriors beats Cavaliers, 104-89." In some examples, user interface 922 (e.g., a snippet or a window) provides text corresponding to spoken output 972.

Figure 9C:
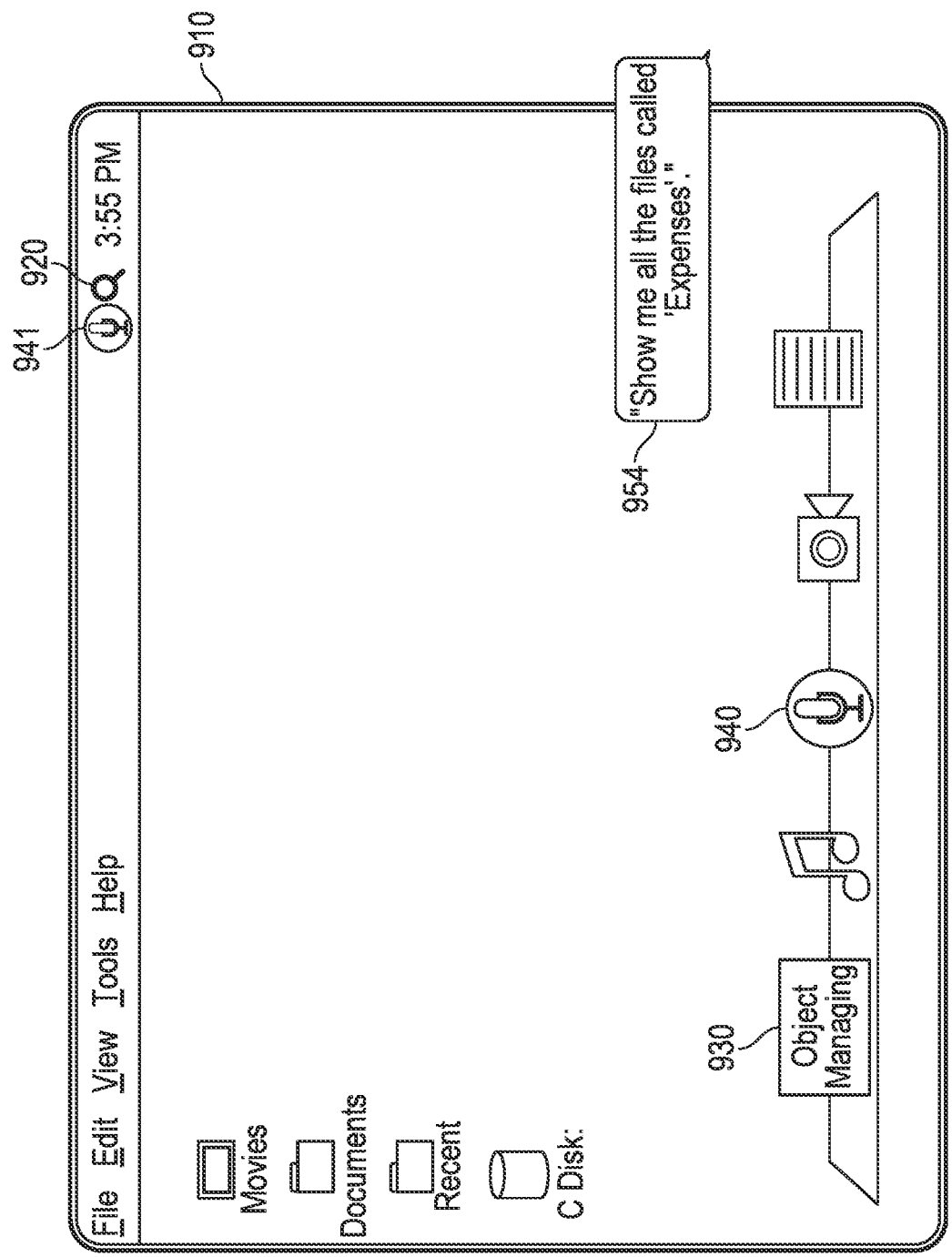

As described above, in some embodiments, the digital assistant determines whether the task is associated with searching, and in accordance with such a determination, the digital assistant determines whether performing the task requires the searching process. With reference to FIG. 9C, in some embodiments, the digital assistant determines that performing the task does not require the searching process. For example, as illustrated in FIG. 9C, the digital assistant receives a speech input 954 such as "Show me all the files called Expenses." Based on speech input 954 and context information, the digital assistant determines that user intent is to display all the files having the word "Expenses" (or a portion, a variation, a paraphrase thereof) contained in their file names, the metadata, the content of the files, or the like. According to the user intent, the digital assistant determines that the task to be performed includes searching all the files associated with the word "Expenses." As a result, the digital assistant determines that performing the task is associated with searching. As described above, in some examples, the searching process and the object managing process can both perform searching of files. As a result, the digital assistant determines that performing the task of searching all the files associated with the word "Expenses" does not require the searching process.

Figure 9D:
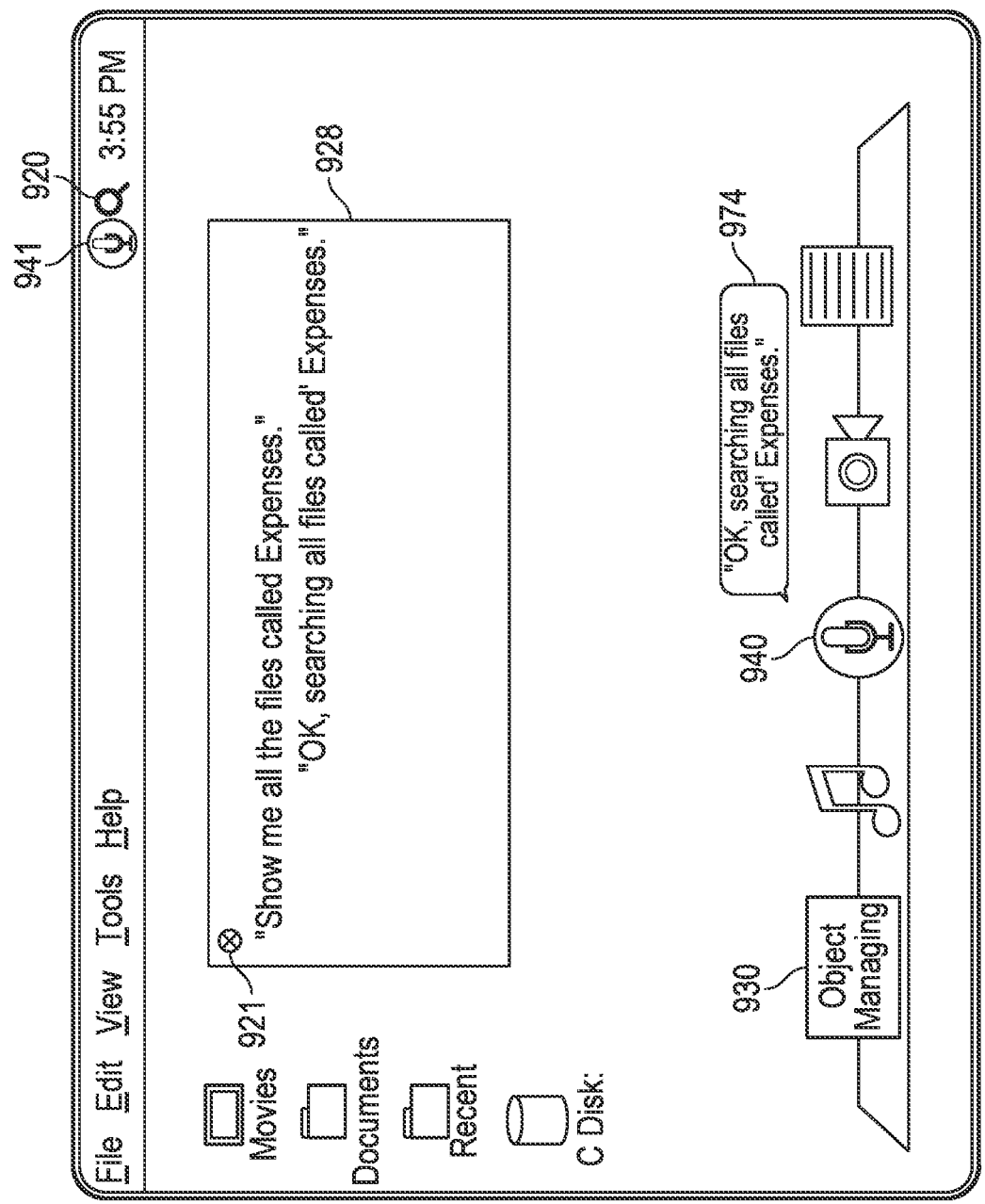

With reference to FIG. 9D, in some examples, in accordance with a determination that performing the task does not require the searching process, the digital assistant determines, based on a pre-determined configuration, whether the task is to be performed using the searching process or the object managing process. For example, if both the searching process and the object managing process can perform the task, a pre-determined configuration may indicate that the task is to be performed using the searching process. The pre-determined configuration can be generated and updated using context information such as user preferences or user-specific data. For example, the digital assistant determines that historically, for a particular user, the searching process was selected more frequently than the object managing process for file searching. As a result, the digital assistant generates or updates the pre-determined configuration to indicate that the searching process is the default process for searching files. In some examples, the digital assistant generates or updates the pre-determined configuration to indicate that the object managing process is the default process.

As illustrated in FIG. 9D, based on a pre-determined configuration, the digital assistant determines that the task of searching all the files associated with the word "Expense" is to be performed using the searching process. As a result, the digital assistant performs the searching of all the files associated with the word "Expenses" using the searching process. For example, the digital assistant instantiates a searching process represented by affordance 920 displayed on user interface 910, and causes the searching process to search all files associated with the word "Expenses." In some examples, the digital assistant further provides a spoken output 974, informing the user that the task is being performed. Spoken output 974 includes, for example, "OK, searching all files called 'Expenses'." In some examples, the digital assistant further causes the searching process to display a user interface 928 (e.g., a snippet or a window) providing text corresponding to speech input 954 and spoken output 974.

Figure 9E:
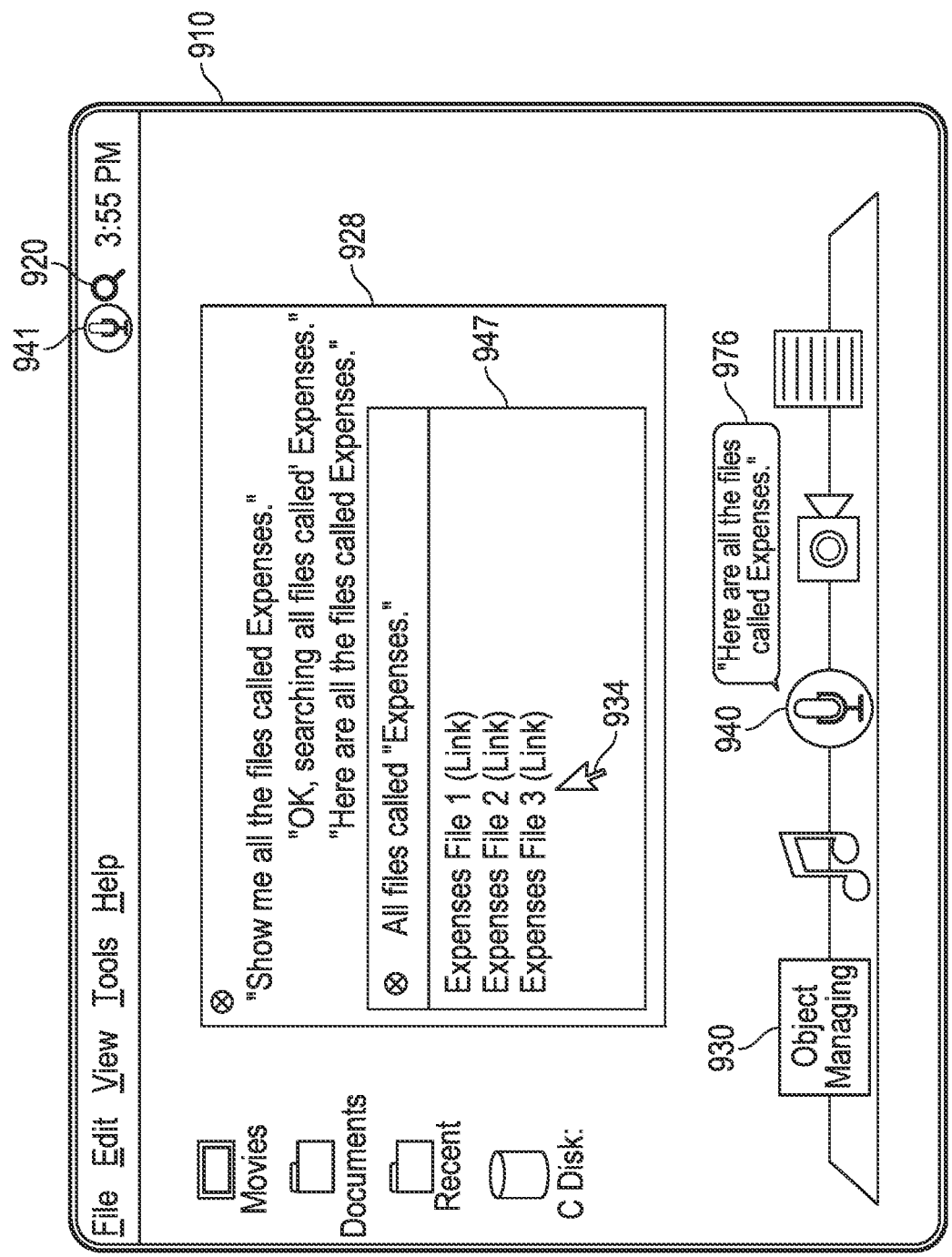

With reference to FIG. 9E, in some embodiments, the digital assistant further provides one or more responses based on a result of performing the task using the searching process. As illustrated in FIG. 9E, as a result of searching all files associated with the word "Expenses," the digital assistant displays a user interface 947 (e.g., a snippet or a window) providing the search results. In some embodiments, user interface 947 is located within user interface 928 as a separate user interface. In some embodiments, user interfaces 947 and 928 are integrated together as a single user interface. On user interface 947, a list of files that are associated with the word "Expenses" are displayed. In some embodiments, the digital assistant further provides a spoken output corresponding to the search result. For example, the digital assistant represented by affordance 940 or 941 provides a spoken output 976 such as "Here are all the files called Expenses." In some examples, the digital assistant further provides, on user interface 928, text corresponding to spoken output 976.

In some embodiments, the digital assistant provides one or more links associated with the result of performing the task using the searching process. A link enables instantiating a process (e.g., opening a file, invoking an object managing process) using the search result. As illustrated in FIG. 9E, on user interface 947, the list of files (e.g., Expenses File 1, Expenses File 2, Expenses File 3) represented by their file names can be associated with links. As an example, a link is displayed on the side of each file name. As another example, the file names is displayed in a particular color (e.g., blue) indicating that the file names are associated with links. In some examples, the file names associated with links are displayed in the same color as other items displayed on user interface 947.

Figure 9F:
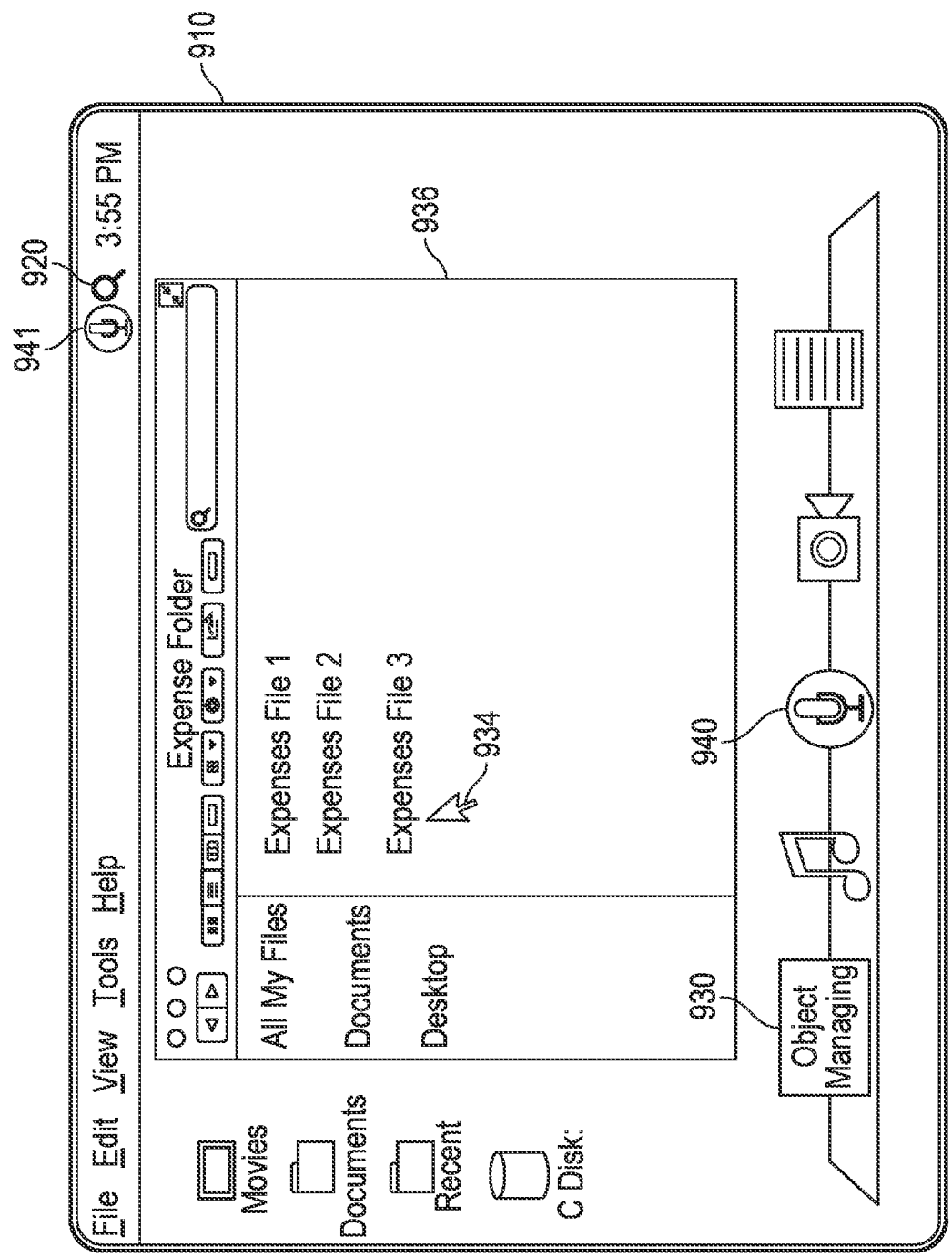

As described, a link enables instantiating a process using the search result. Instantiating a process includes invoking the process if the process is not already running. If at least one instance of the process is running, instantiating a process includes executing an existing instance of the process or generating a new instance of the process. For example, instantiating an object managing process includes invoking the object managing process, using an existing object managing process, or generating a new instance of the object managing process. As illustrated in FIGS. 9E-9F, a link displayed on user interface 947 enables managing an object (e.g., a file) associated with the link. For example, user interface 947 receives a user selection of a link (e.g., a selection by a cursor 934) associated with a file (e.g., "Expenses file 3"). In response, the digital assistant instantiates an object managing process represented by affordance 930 to enable managing of the file. As shown in FIG. 9F, the digital assistant displays a user interface 936 (e.g., a snippet or a window) providing the folder containing the file associated with the link (e.g., "Expenses file 3"). Using user interface 936, the digital assistant instantiates the object managing process to perform one or more additional tasks (e.g., copying, editing, viewing, moving, compressing, or the like) with respect to the files.

With reference back to FIG. 9E, in some examples, a link displayed on user interface 947 enables direct viewing and/or editing of the object. For example, the digital assistant, via user interface 947, receives a selection of a link (e.g., a selection by a cursor 934) associated with a file (e.g., "Expenses file 3"). In response, the digital assistant instantiates a process (e.g., a document viewing/editing process) to view and/or edit the file. In some examples, the digital assistant instantiates the process to view and/or edit the file without instantiating an object managing process. For example, the digital assistant directly instantiates a Number process or an Excel process to view and/or edit of the Expense file 3.

Figure 9G:
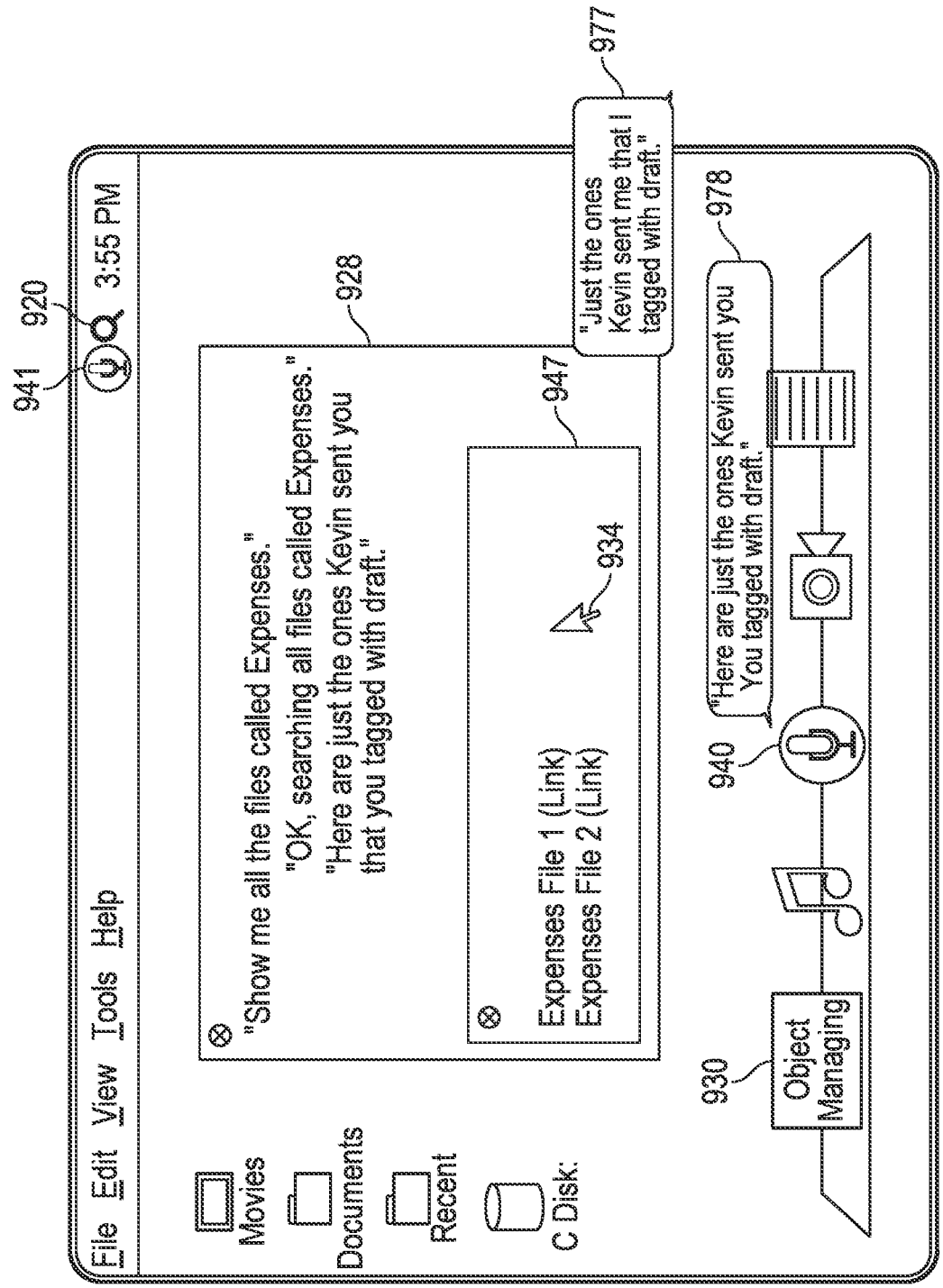

With reference to FIGS. 9E and 9G, in some examples, the digital assistant instantiates a process (e.g., the searching process) to refine the search results. As illustrated in FIGS. 9E and 9G, the user may desire to refine the search result displayed on user interface 947. For example, the user may desire to select one or more files from the search results. In some examples, the digital assistant receives, from the user, a speech input 977 such as "Just the ones Kevin sent me that I tagged with draft." Based on speech input 977 and context information, the digital assistant determines that the user intent is to display only the Expenses files that were sent from Kevin and that are associated with draft tags. Based on the user intent, the digital assistant instantiates a process (e.g., the searching process) to refine the search results. For example, as shown in FIG. 9G, based on the search result, the digital assistant determines that Expenses File 1 and Expense file 2 were sent from Kevin to the user and were tagged. As a result, the digital assistant continues to display these two files on user interface 947 and remove the Expense file 3 from user interface 947. In some examples, the digital assistant provides a spoken output 978 such as "Here are just the ones Kevin sent you that you tagged with draft." The digital assistant may further provide text corresponding to spoken output 978 on user interface 928.

Figure 9H:
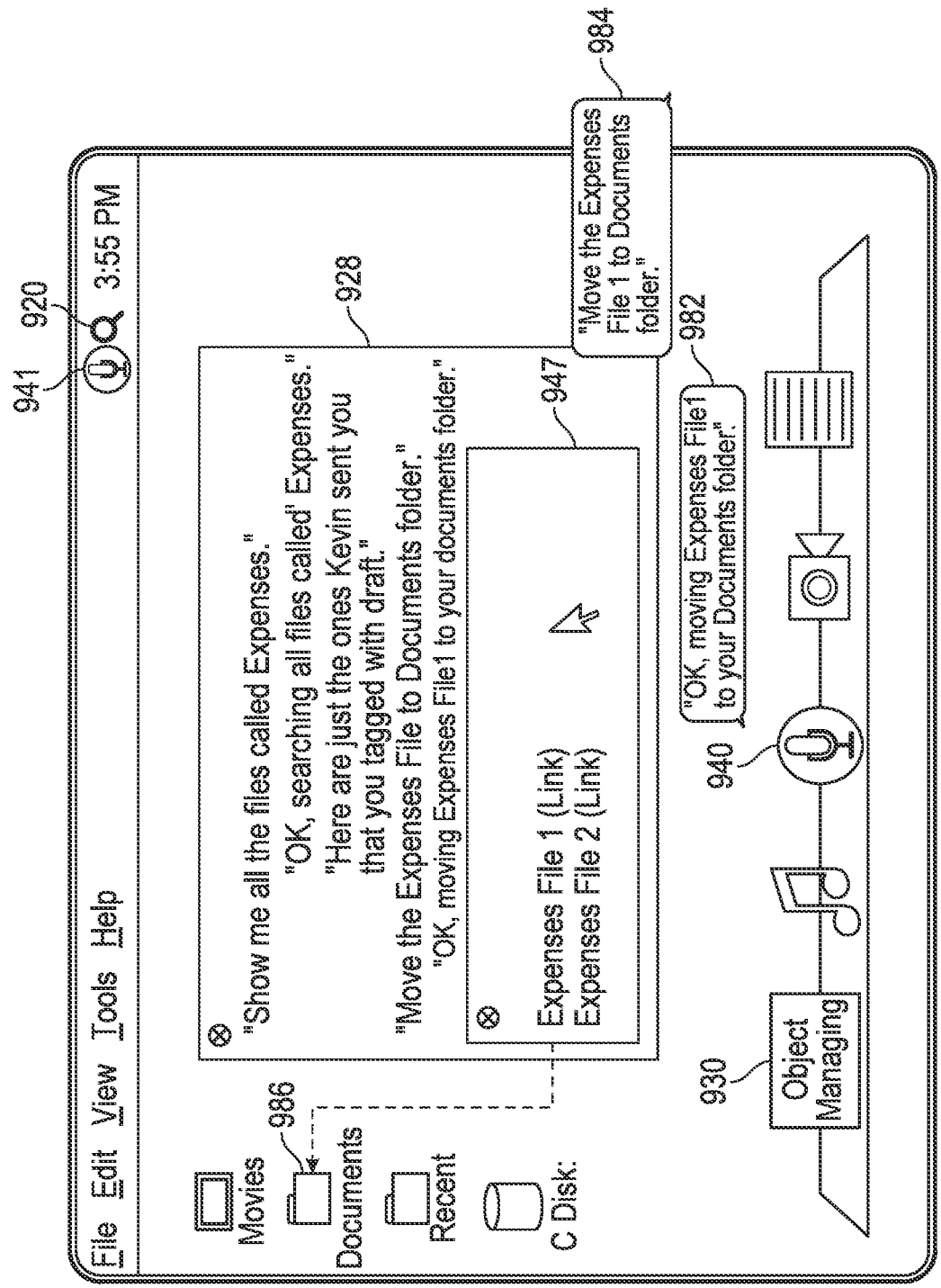

With reference to FIG. 9H, in some examples, the digital assistant instantiates a process (e.g., an object managing process) to perform an object managing task (e.g., coping, moving, sharing, etc.). For example, as shown in FIG. 9H, the digital assistant receives, from the user, a speech input 984 such as "Move the Expenses file 1 to Documents folder." Based on speech input 984 and context information, the digital assistant determines that the user intent is to copy or move Expense file 1 from its current folder to Document folder. In accordance with the user intent, the digital assistant instantiates a process (e.g., the object managing process) to copy or move Expense file 1 from its current folder to Document folder. In some examples, the digital assistant provides a spoken output 982 such as "Ok, moving Expenses File 1 to your Documents folder." In some examples, the digital assistant furthers provide text corresponding to spoken output 982 on user interface 928.

Figure 10B:
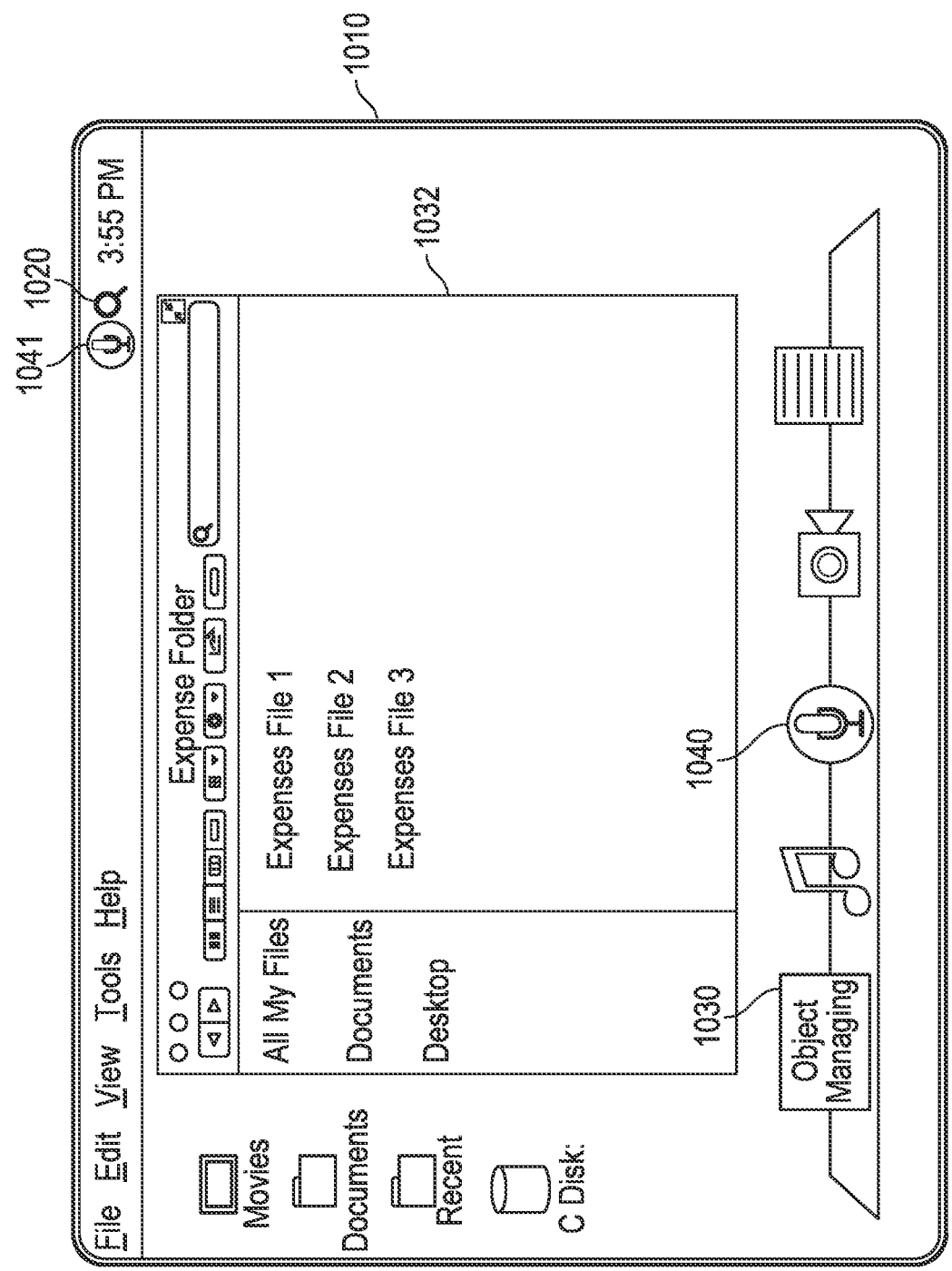

As described, in some examples, a user's speech input may not include keywords indicating whether the user intent is to perform the task using the search process or the object managing process. With reference to FIGS. 10A-10B, in some embodiments, the digital assistant determines that performing the task does not require the searching process. In accordance with the determination, the digital assistant provides a spoken output requesting the user to select the searching process or the object managing process. For example, as shown in FIG. 10A, the digital assistant receives, from the user, a speech input 1052 such as "Show me all the files called 'Expenses.'" Based on speech input 1052 and context information, the digital assistant determines that the user intent is to display all the files associated with the word "Expense." In accordance with the user intent, the digital assistant further determines that the task can be performed by either the searching process or the object managing process, and therefore does not require the search process. In some examples, the digital assistant provides a spoken output 1072 such as "Do you want to search using the searching process or the object managing process?" In some examples, the digital assistant receives, from the user, a speech input 1054 such as "Object managing process." Speech input 1054 thus indicates that the user intent is to perform the task using the object managing process. According to the selection, for example, the digital assistant instantiates an object managing process represented by affordance 1030 to search all the files associated with the word "Expenses." As shown in FIG. 10B, similar to those described above, as a result of the searching, the digital assistant displays a user interface 1032 (e.g., a snippet or a window) providing a folder containing the files associated with the word "Expenses". Similar to those described above, using user interface 1032, the digital assistant instantiates the object managing process to perform additional one or more tasks (e.g., copying, editing, viewing, moving, compressing, or the like) with respect to the files.

Figure 11A:
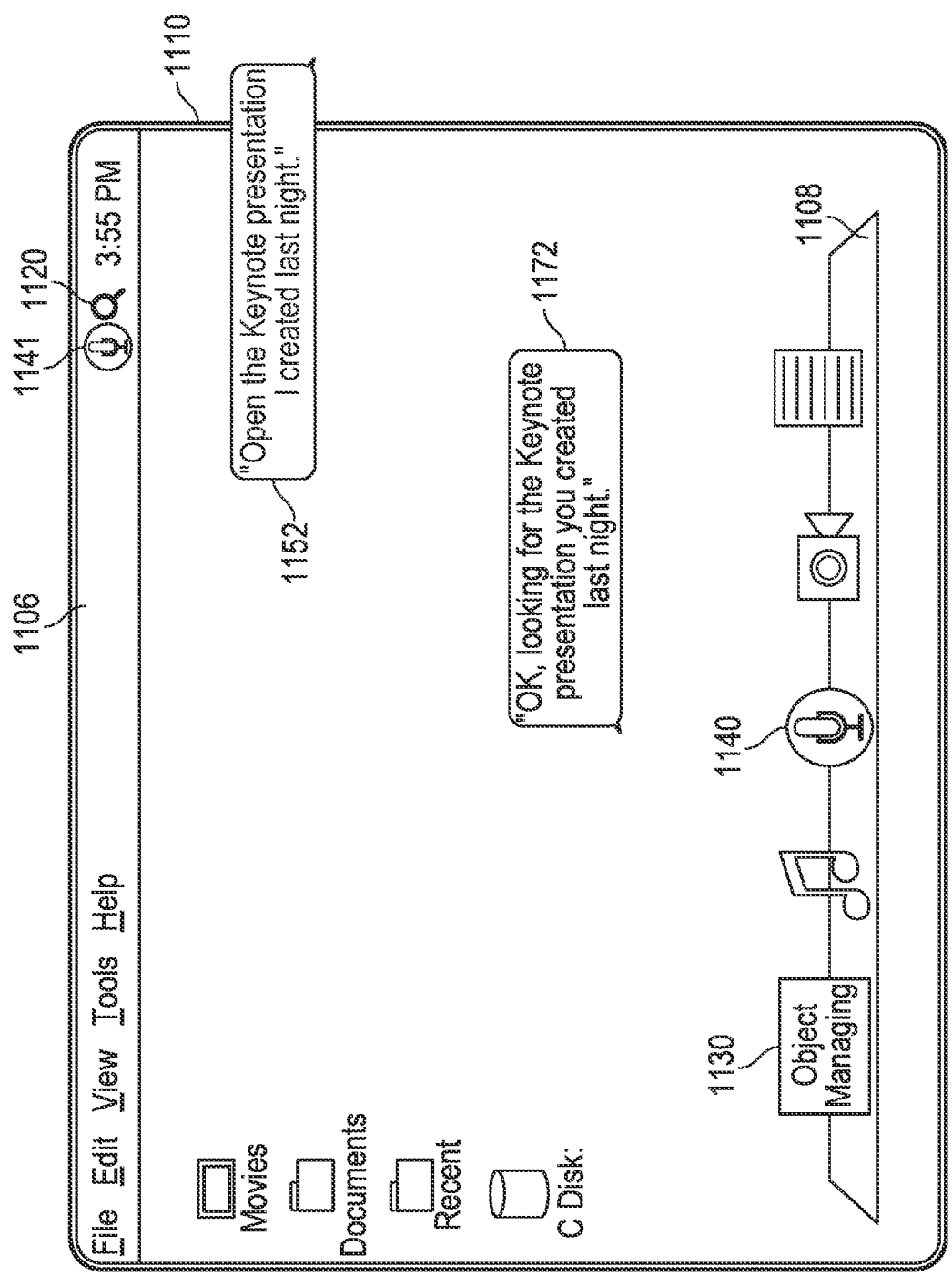
Figure 11B:
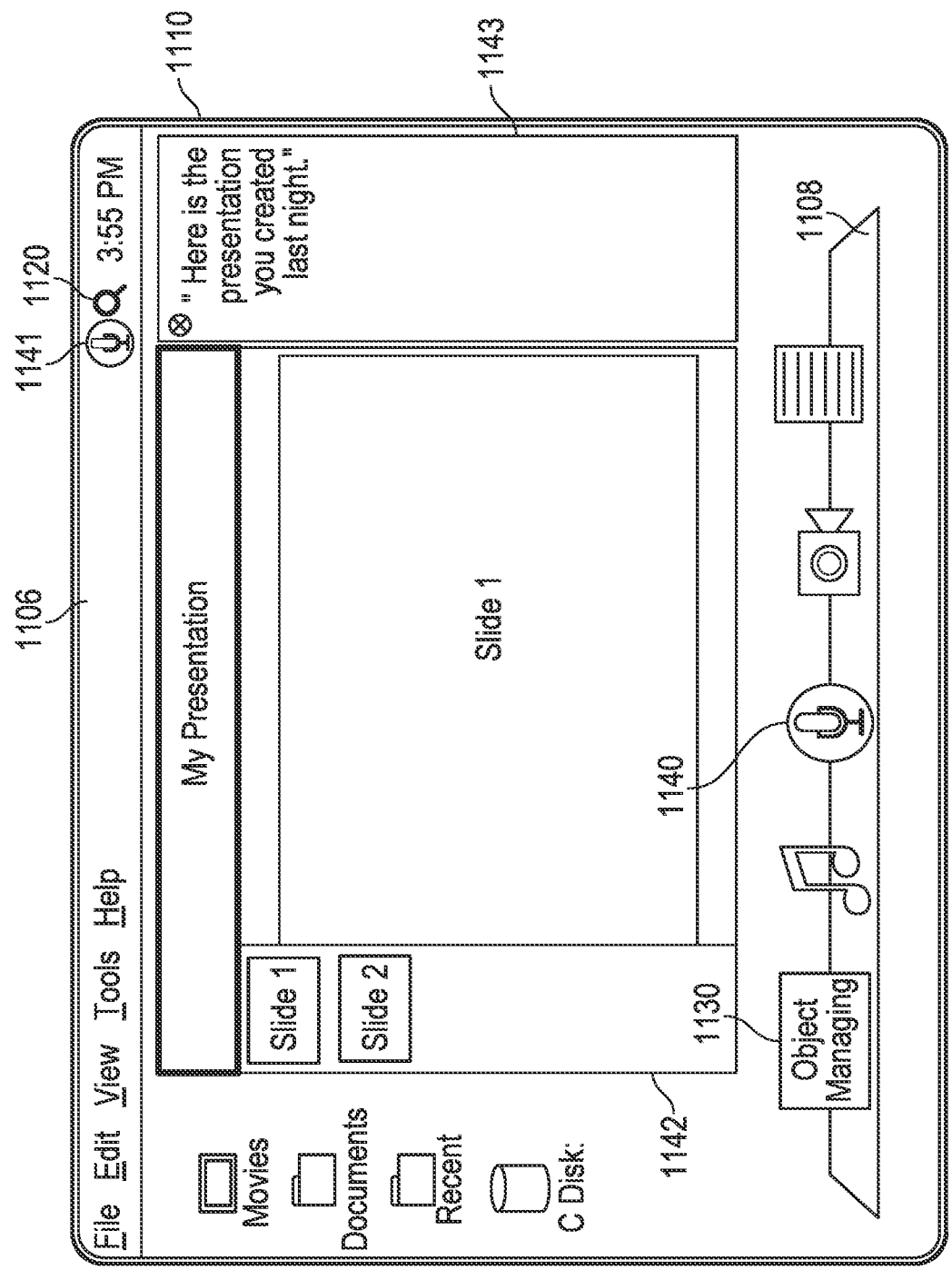

With reference to FIGS. 11A-11B, in some embodiments, the digital assistant identifies context information and determines the user intent based on the context information and the user's speech input. As illustrated in FIG. 11A, the digital assistant represented by affordance 1140 or 1141 receives a speech input 1152 such as "Open the Keynote presentation I created last night." In response to receiving speech input 1152, the digital assistant identifies context information such as the history of the user's interaction with the user device, the metadata associated with files that the user recently worked on, or the like. For example, the digital assistant identifies the metadata such as the date, the time, and the type of files the user worked on yesterday from 6p.m.-2a.m. Based on the identified context information and speech input 1152, the digital assistant determines that the user intent includes searching a Keynote presentation file associated with metadata indicating that the file was edited approximately 6p.m.-12a.m yesterday; and instantiating a process (e.g., a Keynote process) to open the presentation file.

In some examples, the context information includes application names or identifications (IDs). For example, a user's speech input provides "Open the Keynote presentation," "find my Pages document," or "find my HotNewApp documents." The context information includes the application names (e.g., Keynote, Pages, HotNewApp) or application IDs. In some examples, the context information is dynamically updated or synchronized. For example, the context information is updated in real time after the user installs a new application named HotNewApp. In some examples, the digital assistant identifies the dynamically updated context information and determines the user intent. For example, the digital assistant identifies the application names Keynote, Pages, HotNewApp or their IDs and determines the user intent according to the application names/IDs and speech inputs.

In accordance with the user intent, the digital assistant further determines whether the user intent is to perform the task using the searching process or the object managing process. As described, the digital assistant makes such determination based on one or more keywords included in the speech input, based on whether the task requires the searching process, based on a pre-determined configuration, and/or based on the user's selection. As illustrated in FIG. 11A, speech input 1152 does not include keywords that indicate whether the user intent is to use the searching process or the object managing process. As a result, the digital assistant determines, for example, based on a pre-determined configuration that the user intent is to use the object managing process. In accordance with the determination, the digital assistant instantiate an object managing process to search a Keynote presentation file associated with metadata that indicates the file was edited approximately 6p.m.-12a.m yesterday. In some embodiments, the digital assistant further provides a spoken output 1172 such as "OK, looking for the Keynote presentation you created last night."

In some embodiments, context information is used in performing the task. For example, application names and/or IDs can be used to form a query for searching the application and/or objects (e.g., files) associated with the application names/IDs. In some examples, a server (e.g., server 108) forms a query using the application names (e.g., Keynote, Pages, HotNewApp) and/or IDs and sends the query to the digital assistant of a user device. Based on the query, the digital assistant instantiates a searching process or an object managing process to search one or more applications and/or objects. In some examples, the digital assistant only searches the objects (e.g., files) that correspond to the application name/ID. For example, if a query includes an application name "Pages," the digital assistant only searches Pages files and does not search other files (e.g., Word files) that can be opened by a Pages application. In some examples, the digital assistant searches all objects that is associated with the application name/ID in the query.

Figure 11C:
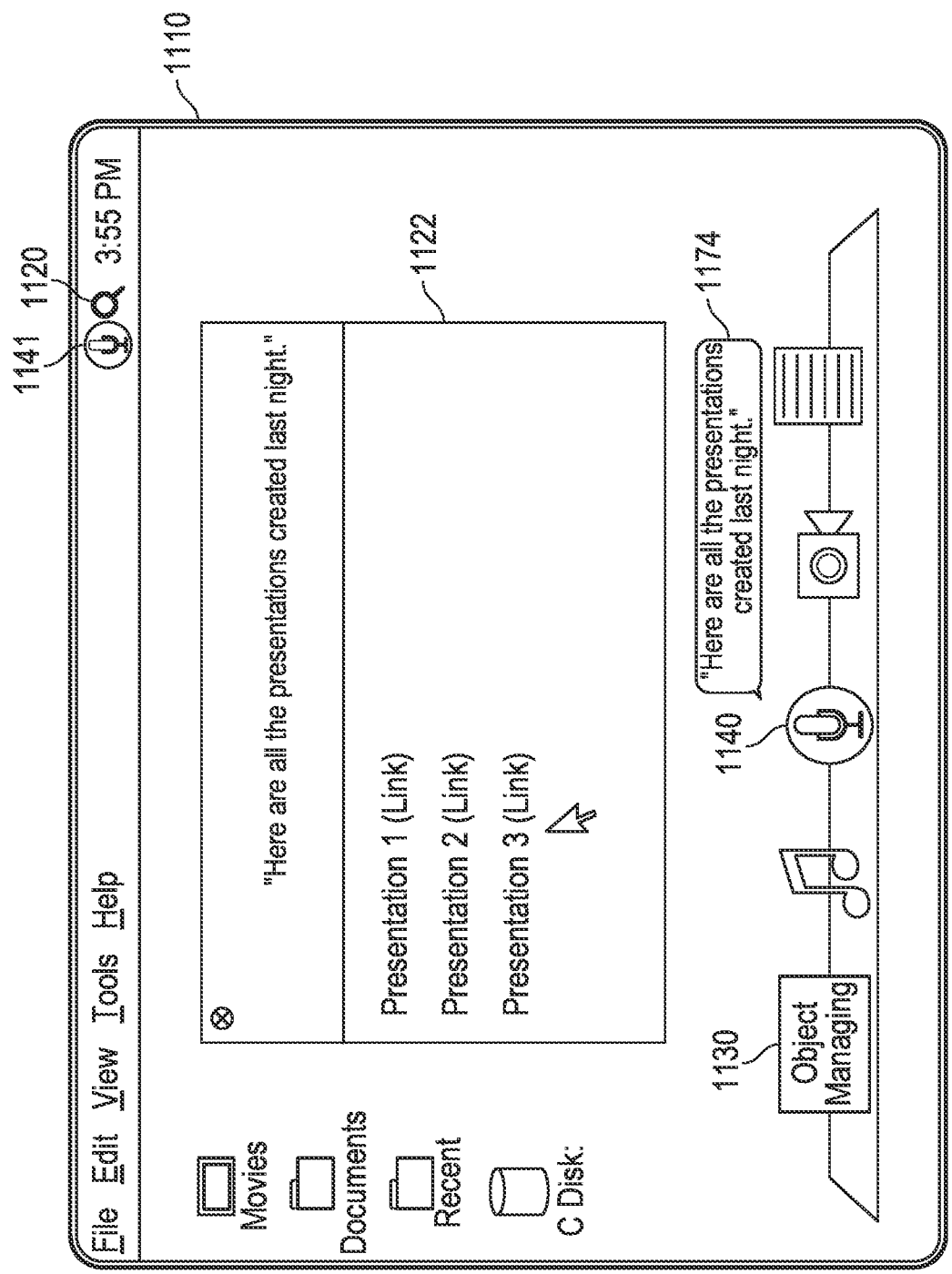

With references to FIGS. 11B-11C, in some embodiments, the digital assistant provides one or more responses in accordance with a confidence level associated with the results of performing the task. Inaccuracies may exist or arise during the determination of the user intent, the determination of whether the user intent is to perform the task using the searching process or the object managing process, and/or the performance of the task. In some examples, the digital assistant determines a confidence level representing the accuracy of determining the user intent based on the speech input and context information, the accuracy of determining whether the user intent is to perform the task using the searching process or the object managing process, the accuracy of performing the task using the searching process or the object managing process, or a combination thereof.

Continuing the above example illustrated in FIG. 11A, based on speech input 1152 such as "Open the Keynote presentation I created last night," the digital assistant instantiates an object managing process to perform a search of a Keynote presentation file associated with metadata that indicates the file was edited approximately 6p.m.-12a.m yesterday. The search result may include a single file that fully matches the search criteria. That is, the single file is a presentation file that was edited approximately 6p.m.-12a.m yesterday. Accordingly, the digital assistant determines that the accuracy of the search is high and thus determines that the confidence level is high. As another example, the search result may include a plurality of files that partially match the search criteria. For instance, no file is a presentation file that was edited approximately 6p.m.-12a.m yesterday, or multiple files are presentation files that were edited approximately 6p.m.-12a.m yesterday. Accordingly, the digital assistant determines that the accuracy of the search is medium or low and thus determines that the confidence level is medium or low.

As illustrated in FIGS. 11B-11C, the digital assistant provides a response in accordance with the determination of the confidence level. In some examples, the digital assistant determines whether the confidence level is greater than or equal to a threshold confidence level. In accordance with a determination that the confidence level is greater than or equal to the threshold confidence level, the digital assistant provides a first response. In accordance with a determination that the confidence level is less than a threshold confidence level, the digital assistant provides a second response. In some examples, the second response is different from the first response. As shown in FIG. 11B, if the digital assistant determines that the confidence level is greater than or equal to a threshold confidence level, the digital assistant instantiates a process (e.g., a Keynote process represented by user interface 1142) to enable the viewing and editing of the file. In some examples, the digital assistant provides a spoken output such as "Here is the presentation you created last night," and displays the text of the spoken output in a user interface 1143. As shown in FIG. 11C, if the digital assistant determines that the confidence level is less than a threshold confidence level, the digital assistant displays a user interface 1122 (e.g., a snippet or a window) providing a list of candidate files. Each of the candidate files may partially satisfy the search criteria. In some embodiments, the confidence level can be pre-determined and/or dynamically updated based on user preferences, historical accuracy rates, or the like. In some examples, the digital assistant further provides a spoken output 1174 such as "Here are all the presentations created last night," and displays the text corresponding to spoken output 1174 on user interface 1122.

With reference to FIG. 11D, in some embodiments, the digital assistant instantiates a process (e.g., the Keynote presentation process) to perform additional tasks. Continuing with the above example, as shown in FIGS. 11B and 11D, the user may desire to display the presentation file in a full screen mode. The digital assistant receives, from the user, a speech input 1154 such as "Make it full screen." Based on speech input 1154 and context information, the digital assistant determines that the user intent is to display the presentation file in a full screen mode. In accordance with the user intent, the digital assistant causes the Keynote presentation process to display the slides in a full-screen mode. In some examples, the digital assistant provides a spoken output 1176 such as "OK, showing your presentation in full screen."

Figure 12A:
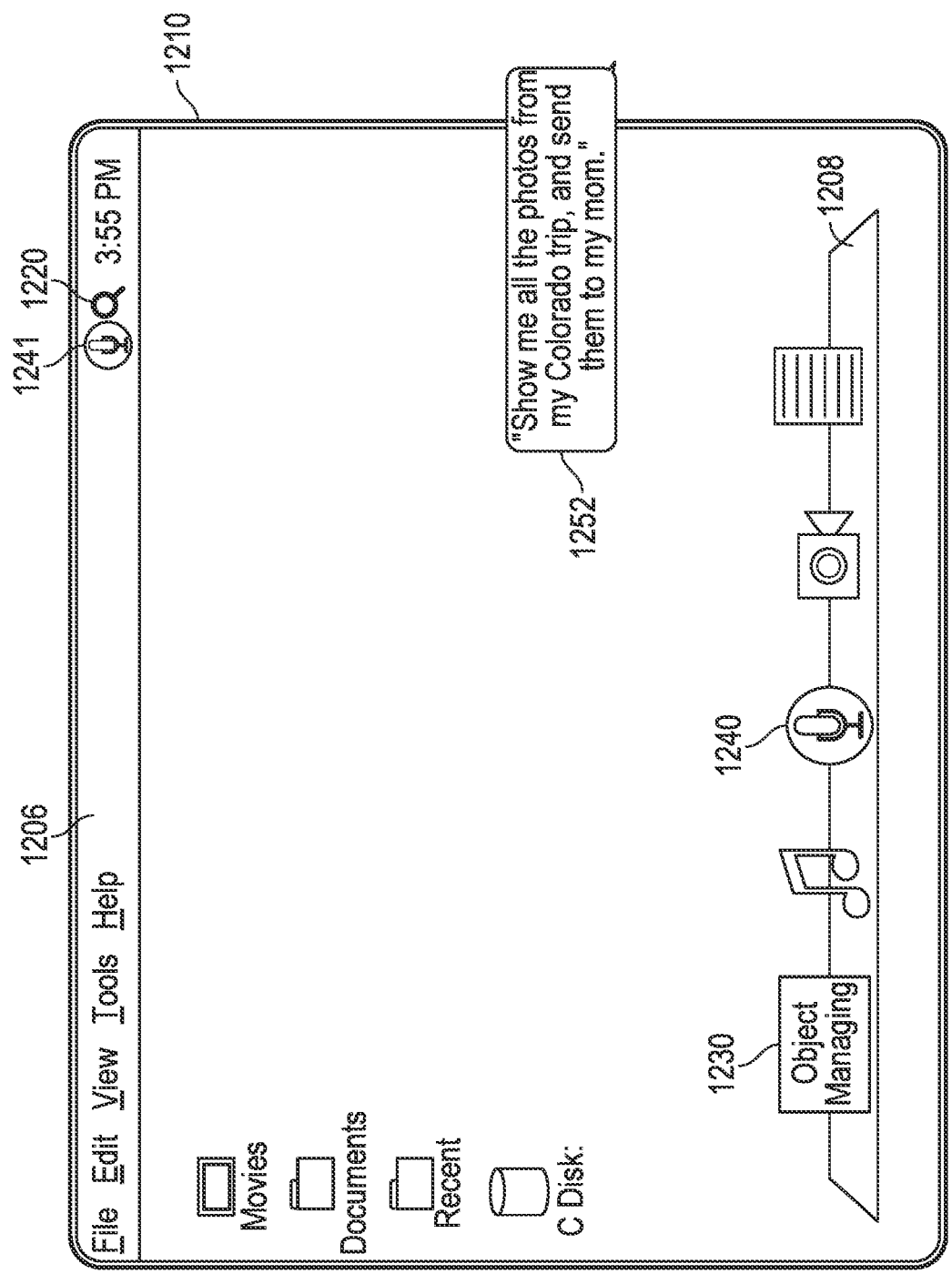
FIGS. 12A-12D illustrate functionalities of performing a task using a search process or an object managing process by a digital assistant according to various examples.
Figure 12B:
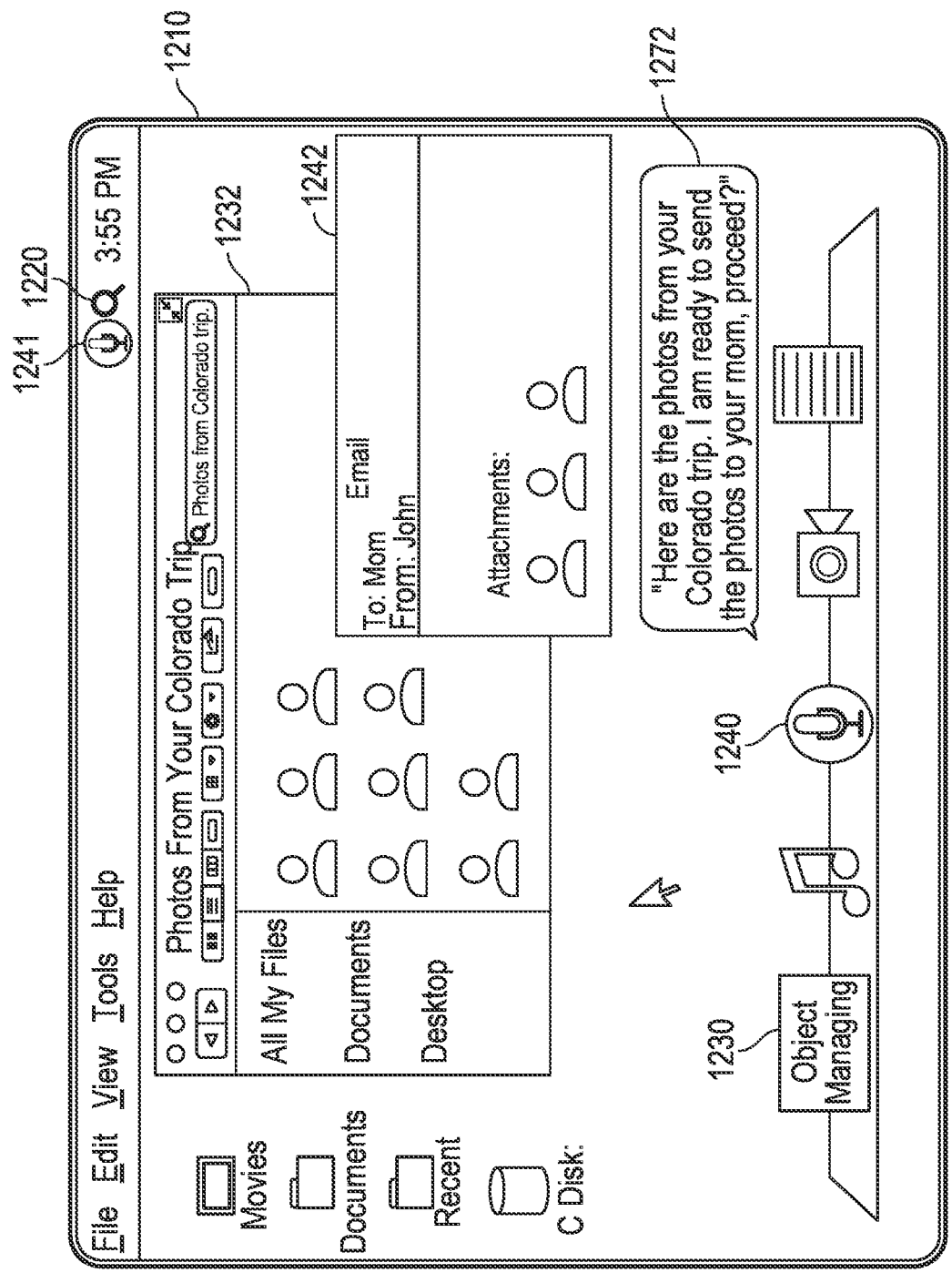
Figure 12C:
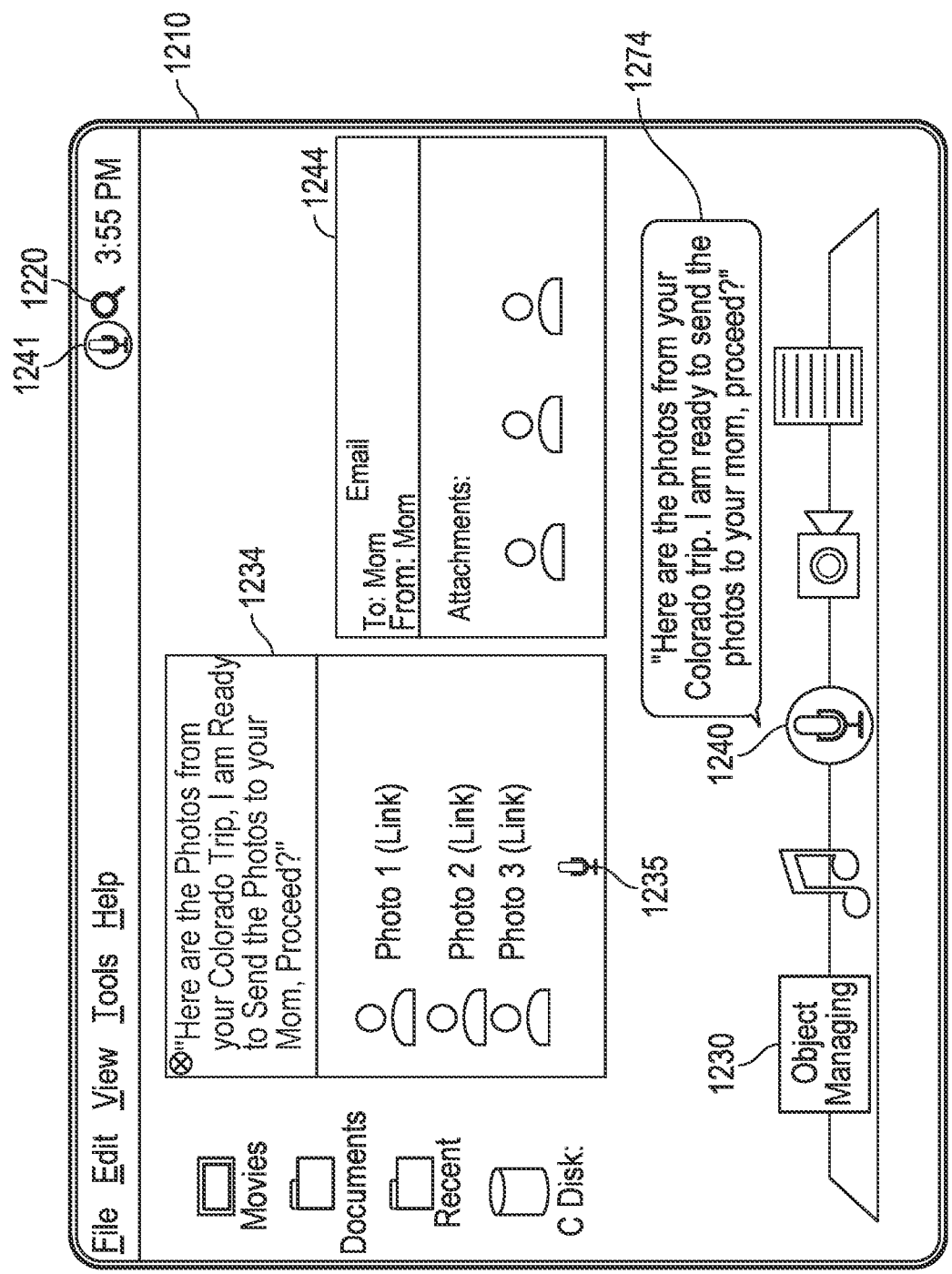

With reference to FIGS. 12A-12C, in some embodiments, the digital assistant determines, based on a single speech input or an utterance, that the user intent is to perform a plurality of tasks. In accordance with the user intent, the digital assistant further instantiates one or more processes to perform the plurality of tasks. For example, as shown in FIG. 12A, the digital assistant represented by affordance 1240 or 1241 receives a single speech input 1252 such as "Show me all the photos from my Colorado trip, and send them to my mom." Based on speech input 1252 and context information, the digital assistant determines that the user intent is to perform a first task and a second task. Similar to those described above, the first task is to display photos stored in a folder having a folder name "Colorado trip," or display photos taken during the period of time that the user is travelling within Colorado. With respect to the second task, the context information may indicate that a particular email address stored in the user's contacts is tagged as the user's mom. Accordingly, the second task is to send an email containing the photos associated with the Colorado trip to the particular email address.

In some examples, the digital assistant determines, with respect to each task, whether the user intent is to perform the task using the searching process or the object managing process. As an example, the digital assistant determines that the first task is associated with searching and the user intent is to perform the first task using the object managing process. As illustrated in FIG. 12B, in accordance with a determination the user intent is to perform the first task using the object managing process, the digital assistant instantiates the object managing process to search photos associated with the user's Colorado trip. In some examples, the digital assistant displays a user interface 1232 (e.g., a snippet or a window) providing a folder including the search result (e.g., photos 1, 2, and 3). As another example, the digital assistant determines that the first task is associated with searching and the user intent is to perform the first task using the searching process. As illustrated in FIG. 12C, in accordance with a determination the user intent is to perform the first task using the searching process, the digital assistant instantiates the searching process to search photos associated with the user's Colorado trip. In some examples, the digital assistant displays a user interface 1234 (e.g., a snippet or a window) providing photos and/or links associated with the search result (e.g., photos 1, 2, and 3).

As another example, the digital assistant determines that the second task (e.g., sending an email containing the photos associated with the Colorado trip to the particular email address) is not associated with searching or associated with managing an object. In accordance with the determination, the digital assistant determines whether the task can be performed using a process that is available to the user device. For example, the digital assistant determines that the second task can be performed using an email process at the user device. In accordance with the determination, the digital assistant instantiates the process to perform the second task. As illustrated in FIGS. 12B-12C, the digital assistant instantiates the email process and displays user interfaces 1242 and 1244 associated with the email process. The email process attaches the photos associated with the user's Colorado trip to email messages. As shown in FIGS. 12B-12C, in some embodiments, the digital assistant further provides spoken outputs 1272 and 1274 such as "Here are the photos from your Colorado trip. I am ready to send the photos to your mom, proceed?" In some examples, the digital assistant displays text corresponding to spoken output 1274 on user interface 1244. In response to spoken outputs 1272 and 1274, the user provides a speech input such as "OK." Upon receiving the speech input from the user, the digital assistant causes the email process to send out the email messages.

Techniques for performing a plurality of tasks based on multiple commands contained within a single speech input or an utterance may be found, for example, in related applications: U.S. patent application Ser. No. 14/724,623, titled "MULTI-COMMAND SINGLE UTTERANCE INPUT METHOD," filed May 28, 2015, which claims the benefit of priority of U.S. Provisional Patent Application No. 62/005,556, entitled "MULTI-COMMAND SINGLE UTTERANCE INPUT METHOD," filed on May 30, 2014; and U.S. Provisional Patent Application No. 62/129,851, entitled "MULTI-COMMAND SINGLE UTTERANCE INPUT METHOD," filed on Mar. 8, 2015. Each of these applications is hereby incorporated by reference in their entirety.

Figure 12D:
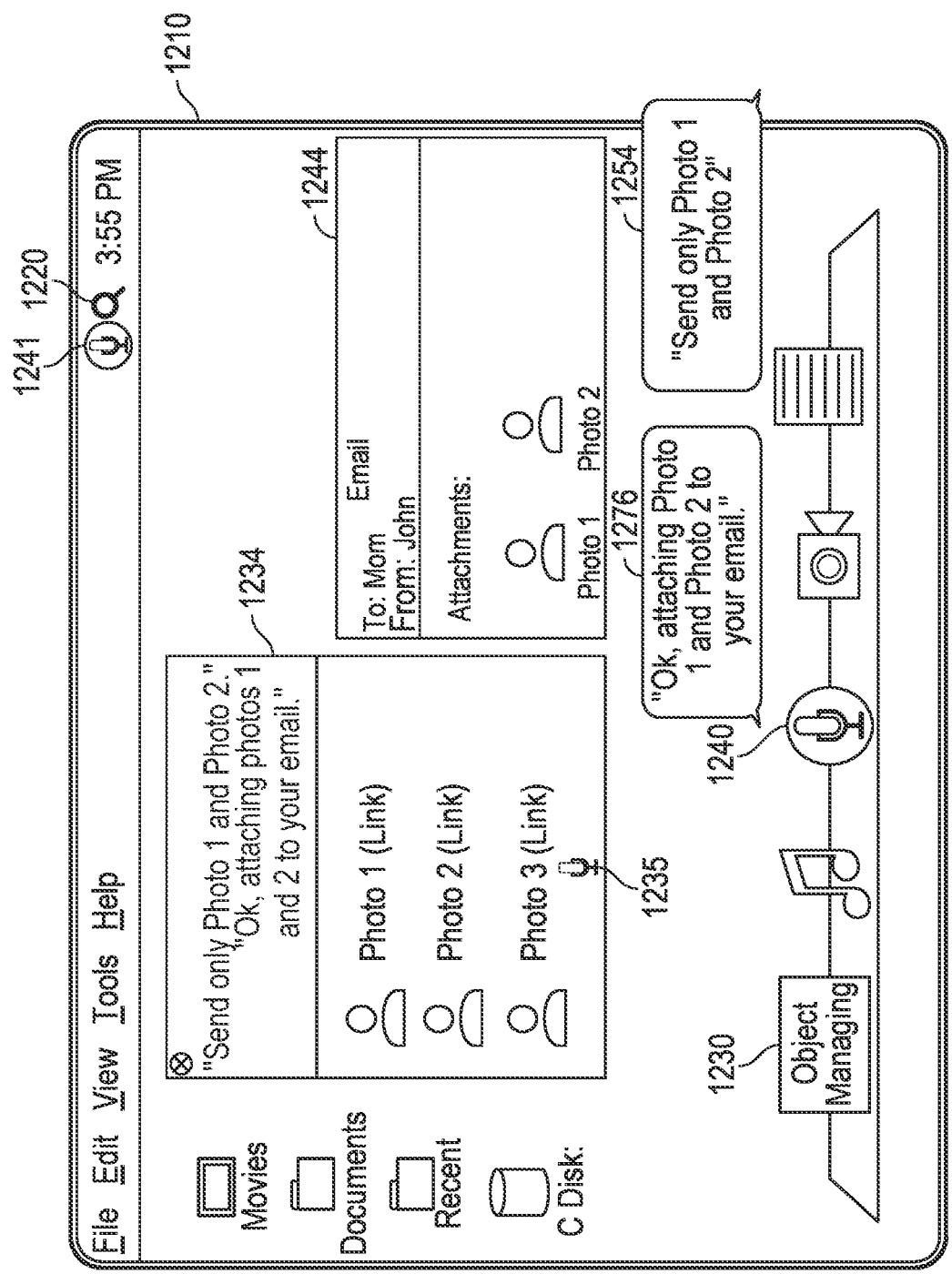

As illustrated in FIGS. 12C-12D, in some examples, the digital assistant causes a process to perform additional tasks based on the user's additional speech inputs. For example, in view of the search result displayed in user interface 1234, the user may desire to send some, but not all, of the photos. The user provides a speech input 1254 such as "Send only Photo 1 and Photo 2." In some examples, the digital assistant receives speech input 1254 after the user selects affordance 1235 (e.g., a microphone icon displayed on user interface 1234). The digital assistant determines, based on speech input 1254 and context information, that the user intent is to send an email attaching only Photo 1 and Photo 2. In accordance with the user intent, the digital assistant causes the email process to remove Photo 3 from the email message. In some examples, the digital assistant provides a spoken output 1276, such as "OK, attaching Photo 1 and Photo 2 to your email," and displays the text corresponding to spoken output 1276 on user interface 1234.

Figure 13A:
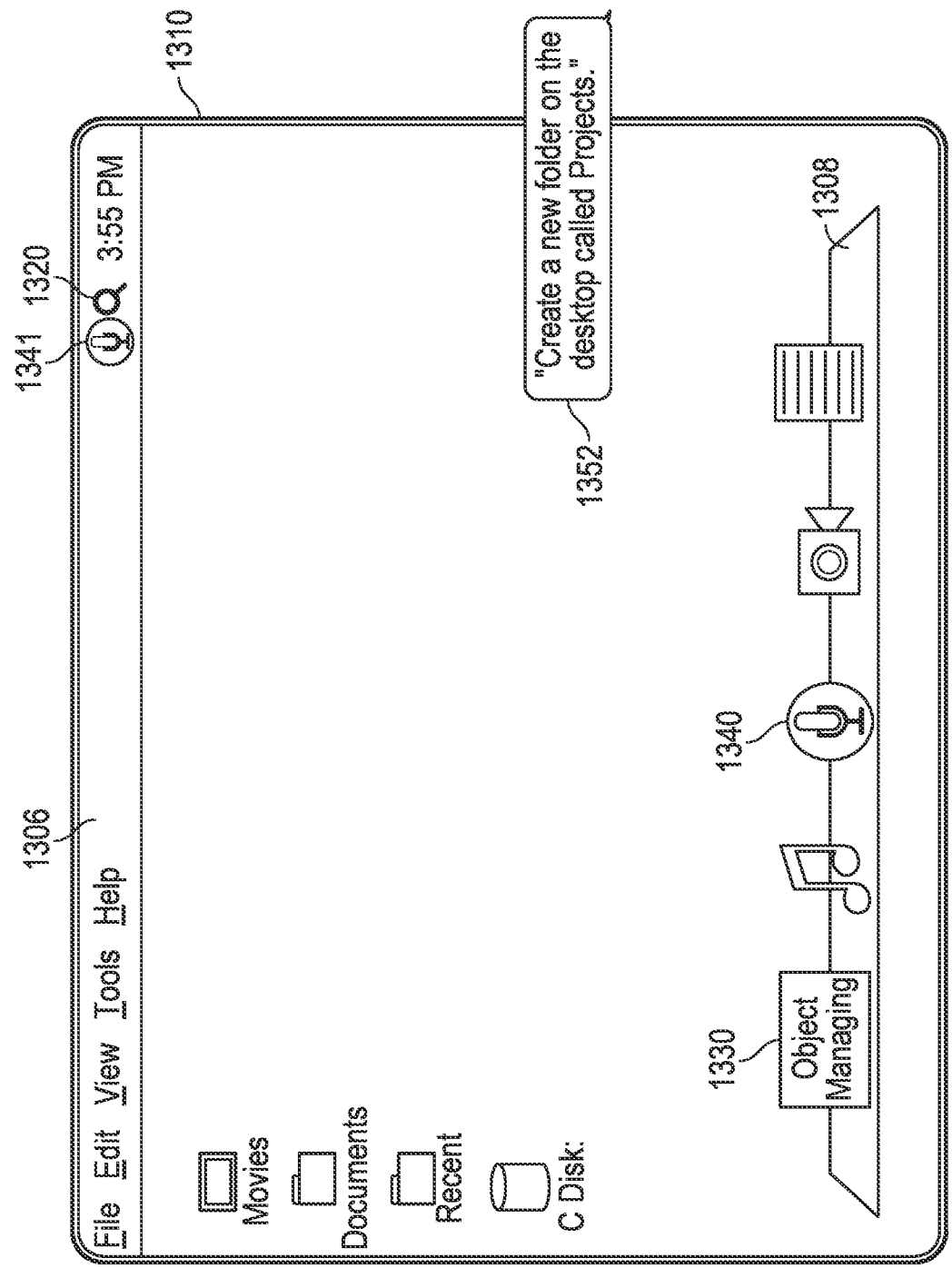
FIGS. 13A-13C illustrate functionalities of performing a task using an object managing process by a digital assistant according to various examples.

With reference to FIG. 13A, in some embodiments, in accordance with a determination that the task is not associated with searching, the digital assistant determines whether the task is associated with managing at least one object. As illustrated in FIG. 13A, for example, the digital assistant receives a speech input 1352 such as "Create a new folder on the desktop called Projects." Based on speech input 1352 and context information, the digital assistant determines that the user intent is to generate a new folder at the desktop with a folder name "Projects." The digital assistant further determines that the user intent is not associated with searching, and instead is associated with managing an object (e.g., a folder). Accordingly, the digital assistant determines that the user intent is to perform a task using the object managing process.

In some examples, in accordance with the determination that the user intent is to perform the task using the object managing process, the digital assistant performs the task using the object managing process. Performing the task using the object managing process can include, for example, creating at least one object (e.g., creating a folder or a file), storing at least one object (e.g., storing a folder, a file, or a communication), and compressing at least one object (e.g., compressing folders and files). Performing the task using the object managing process can further include, for example, copying or moving at least one object from a first physical or virtual storage to a second physical or virtual storage. For instance, the digital assistant instantiates an object managing process to cut and paste a file from the user device to a flash drive or a cloud drive.

Performing the task using the object managing process can further include, for example, deleting at least one object stored in a physical or virtual storage (e.g., deleting a folder or a file) and/or recovering at least one object stored at a physical or virtual storage (e.g., recovering a deleted folder or a deleted file). Performing the task using the object managing process can further include, for example, marking at least one object. In some examples, marking of an object can be visible or invisible. For example, the digital assistant can cause the object managing process to generate a "like" sign for a social media post, to tag an email, to mark a file, or the like. The marking may be visible by displaying, for example, a flag, a sign, or the like. The marking may also be performed with respect to the metadata of the object such that a storage (e.g., a memory) content of the metadata is varied. The metadata may or may not be visible.

Performing the task using the object managing process can further include, for example, backing up at least one object according to a predetermined time period for backing up or upon the user's request. For example, the digital assistant can cause the object managing process to instantiate a backup program (e.g., time machine program) to backup folders and files. The backup can be performed automatically according to a pre-determined schedule (e.g., once a day, a week, a month, or the like) or according to a user request.

Performing the task using the object managing process can further include, for example, sharing at least one object among one or more electronic devices communicatively connected to the user device. For example, the digital assistant can cause the object managing process to share a photo stored on the user device with another electronic device (e.g., the user's smartphone or tablet).

Figure 13B:
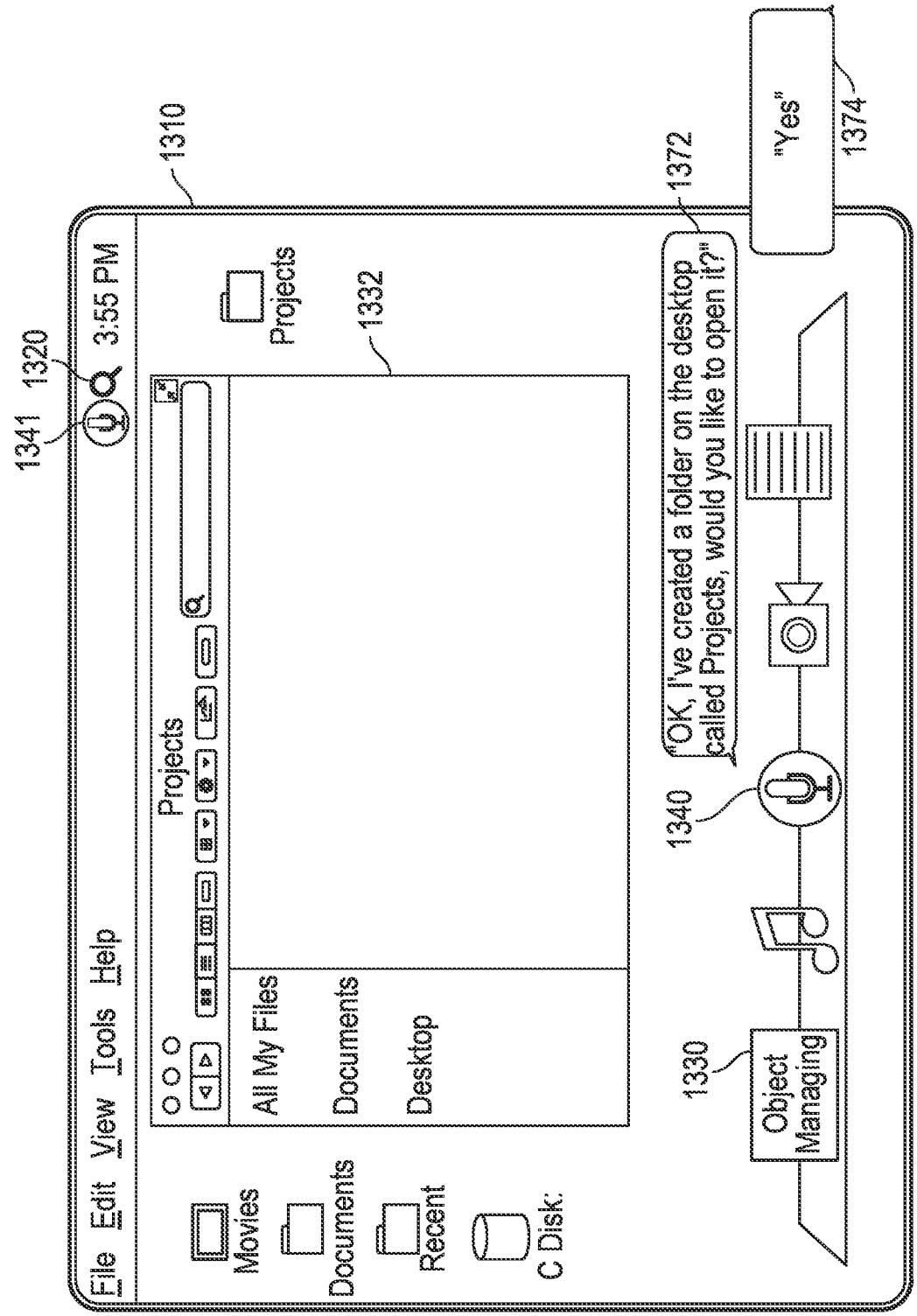

As illustrated in FIG. 13B, in accordance with the determination that the user intent is to perform the task using the object managing process, the digital assistant performs the task using the object managing process. For example, the digital assistant instantiates an object managing process to generate a folder named "Projects" on the desktop of user interface 1310. In some examples, the digital assistant can cause the object managing process to further open the folder either automatically or in response to an additional user input. For example, the digital assistant provides a spoken output 1372 such as "OK, I've created a folder on the desktop called Projects, would you like to open it?" The user provides a speech input 1374 such as "Yes." In response to the user's speech input 1374, the digital assistant causes the object managing process to open the Projects folder and display a user interface 1332 corresponding to the Projects folder.

Figure 13C:
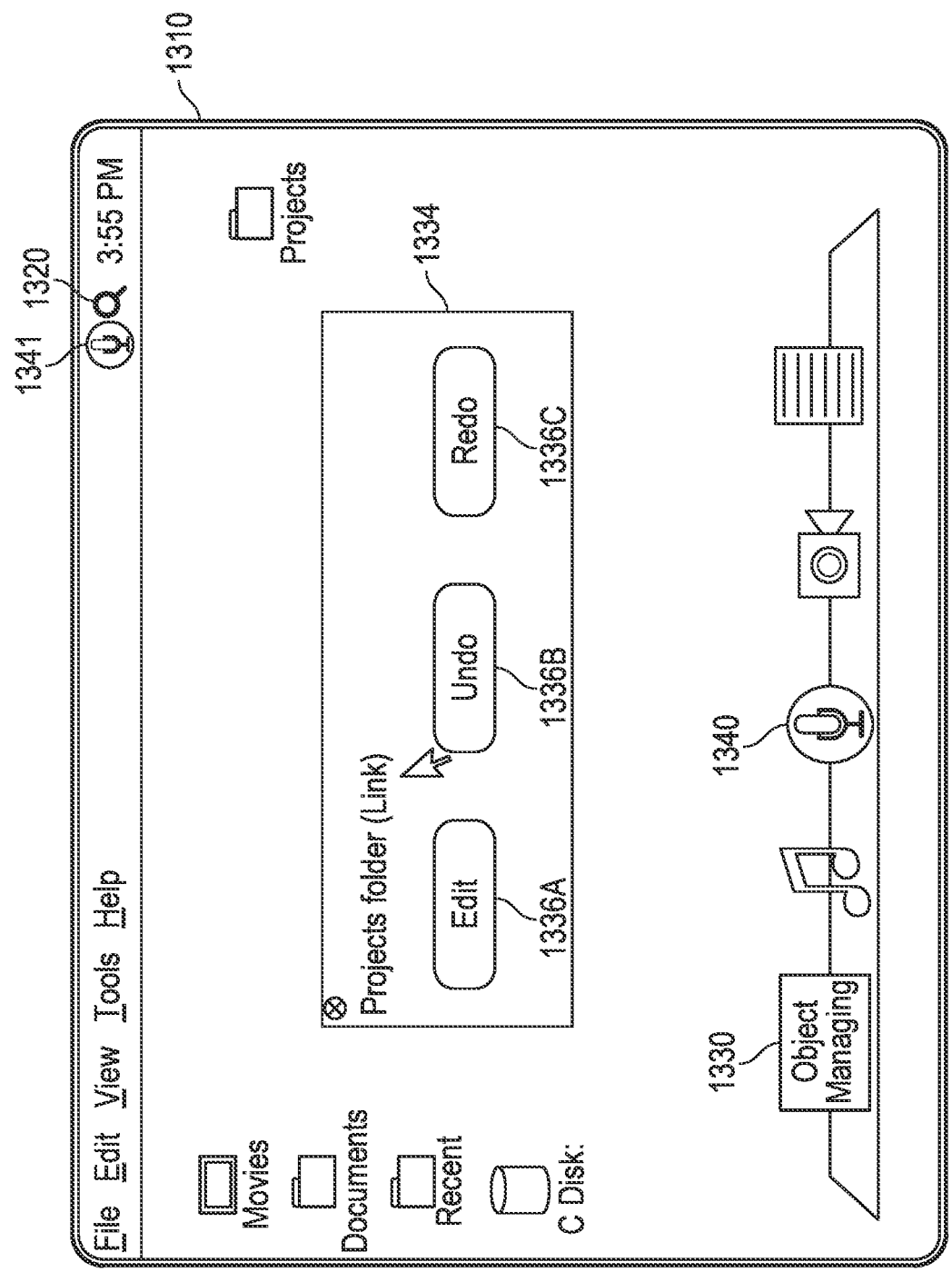

With reference to FIG. 13C, in some embodiments, the digital assistant provides one or more affordances that enable the user to manipulate the result of performing the task using the searching process or the object managing process. The one or more affordances include, for example, an edit button, a cancel button, a redo button, an undo button, or the like. For example, as shown in FIG. 13C, after generating the folder named "Projects" on the desktop, the digital assistant provides a user interface 1334, which displays an edit button 1336A, an undo button 1336B, and a redo button 1336C. In some examples, the edit button 1336A enables the user to edit one or more aspects of the object (e.g., edit the name of the Projects folder); the undo button 1336B enables the user to reverse the last task performed by the object managing process (e.g., delete the Projects folder); and the redo button 1336C enables the user to repeat the last task performed by the object managing process (e.g., creating another folder using the object managing process). It is appreciated that the digital assistant can provide any desired affordances to enable the user to perform any manipulation of the result of performing a task using the searching process or the object managing process.

As described, the digital assistant can determine whether the user intent is to perform a task using a searching process or an object managing process. In some examples, the digital assistant determines that the user intent is not associated with the searching process or the object managing process. For example, the user provides a speech input such as "start dictation." The digital assistant determines that the task of dictation is not associated with searching. In some examples, in accordance with a determination that the task is not associated with searching, the digital assistant further determines whether the task is associated with managing at least one object. For example, the digital assistant determines that the task of dictation is also not associated with managing an object, such as copying, moving, or deleting a file, a folder, or an email. In some examples, in accordance with a determination that the task is not associated with managing an object, the digital assistant determines whether the task can be performed using a process available to the user device. For example, the digital assistant determines that the task of dictation can be performed using a dictation process that is available to the user device. In some examples, the digital assistant initiates a dialog with the user with respect to performing the task using a process available to the user device. For example, the digital assistant provides a spoken output such as "OK, starting dictation." or "Would you like to dictate in this presentation you are working now?" After providing the spoken output, the digital assistant receives a response from the user, for example, confirming that the user intent is to dictate in the presentation the user is currently working on.

5. Exemplary Functions of a Digital Assistant—Continuity

FIGS. 14A-14D, 15A-15D, 16A-16C, and 17A-17E illustrate functionalities of performing a task at a user device or a first electronic device using remotely located content by a digital assistant. In some examples, the digital assistant system (e.g., digital assistant system 700) is implemented by a user device (e.g., devices 1400, 1500, 1600, and 1700) according to various examples. In some examples, the user device, a server (e.g., server 108), or a combination thereof, may implement a digital assistant system (e.g., digital assistant system 700). The user device can be implemented using, for example, device 104, 200, or 400. In some examples, the user device can be a laptop computer, a desktop computer, or a tablet computer. The user device operates in a multi-tasking environment, such as a desktop environment.

With references to FIGS. 14A-14D, 15A-15D, 16A-16C, and 17A-17E, in some examples, a user device (e.g., devices 1400, 1500, 1600, and 1700) provides various user interfaces (e.g., user interfaces 1410, 1510, 1610, and 1710). Similar to those described above, the user device displays the various user interfaces on a display, and the various user interfaces enable the user to instantiate one or more processes (e.g., a movie process, a photo process, a web-browsing process).

As shown in FIGS. 14A-14D, 15A-15D, 16A-16C, and 17A-17E, similar to those described above, the user device (e.g., devices 1400, 1500, 1600, and 1700) displays, on a user interface (e.g., user interfaces 1410, 1510, 1610, and 1710) an affordance (e.g., affordance 1440, 1540, 1640, and 1740) to instantiate a digital assistant service. Similar to those described above, in some examples, the digital assistant is instantiated in response to receiving a pre-determined phrase. In some examples, the digital assistant is instantiated in response to receiving a selection of the affordance.

With reference to FIGS. 14A-14D, 15A-15D, 16A-16C, and 17A-17E, in some embodiments, a digital assistant receives one or more speech inputs, such as speech inputs 1452, 1454, 1456, 1458, 1552, 1554, 1556, 1652, 1654, 1656, 1752, and 1756 from a user. The user may provide various speech inputs for the purpose of, for example, performing a task at the user device (e.g., devices 1400, 1500, 1600, and 1700) or at a first electronic device (e.g., electronic devices 1420, 1520, 1530, 1522, 1532, 1620, 1622, 1630, 1720, and 1730) using remotely located content. Similar to those described above, in some examples, the digital assistant can receive speech inputs directly from the user at the user device or indirectly through another electronic device that is communicatively connected to the user device.

With reference to FIGS. 14A-14D, 15A-15D, 16A-16C, and 17A-17E, in some embodiments, the digital assistant identifies context information associated with the user device. The context information includes, for example, user-specific data, sensor data, and user device configuration data. In some examples, the user-specific data includes log information indicating user preferences, the history of user's interaction with the user device (e.g., devices 1400, 1500, 1600, and 1700), and/or electronic devices communicative connected to the user device, or the like. For example, user-specific data indicates that the user recently took a self-portrait photo using an electronic device 1420 (e.g., a smartphone); that the user recently accessed a podcast, webcast, movie, song, audio book, or the like. In some examples, the sensor data includes various data collected by a sensor associated with the user device or other electronic devices. For example, the sensor data includes GPS location data indicating the physical location of the user device or electronic devices communicatively connected to the user device at any time point or during any time period. For example, the sensor data indicates that a photo stored in electronic device 1420 was taken at Hawaii. In some examples, the user device configuration data includes the current or historical device configurations. For example, the user device configuration data indicates that the user device is currently communicatively connected to some electronic devices but disconnected from other electronic devices. The electronic devices includes, for example, a smartphone, a set-top box, a tablet, or the like. As described in more detail below, the context information can be used in determining a user intent and/or in performing one or more tasks.

With reference to FIGS. 14A-14D, 15A-15D, 16A-16C, and 17A-17E, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "show the selfie I just took," the digital assistant determines that the actionable intent is to display a photo, and the parameters include a self-portrait that the user recently took during the past few days. In some embodiments, the digital assistant further determines the user intent based on the speech input and context information. For example, the context information indicates that the user device is communicatively connected to the user's phone using a Bluetooth connection and indicates that a self-portrait photo was added to the user's phone two days ago. As a result, the digital assistant determines that the user intent is to display a photo that is a self-portrait that was added to the user's phone two days ago. Determining the user intent based on speech input and context information is described in more detail below in various examples.

In some embodiments, in accordance with user intent, the digital assistant further determines whether the task is to be performed at the user device or at a first electronic device communicatively connected to the user device. Various examples of the determination are provided below in more detail with respect to FIGS. 14A-14D, 15A-15D, 16A-16C, and 17A-17E.

Figure 14A:
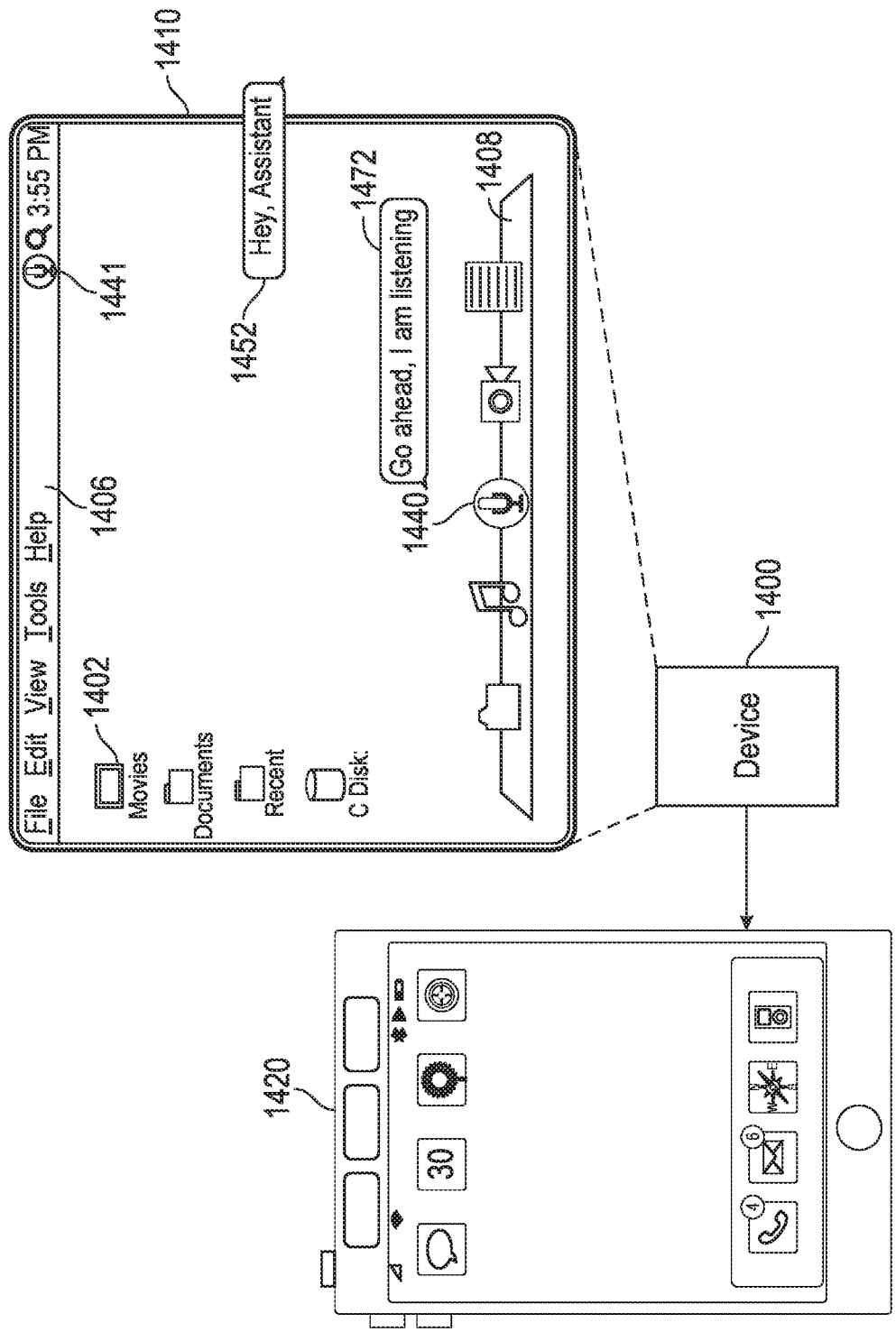
FIGS. 14A-14D illustrate functionalities of performing a task at a user device using remotely located content by a digital assistant according to various examples.

With reference to FIG. 14A, in some examples, user device 1400 receives a speech input 1452 from a user to invoke the digital assistant. As shown in FIG. 14A, in some examples, the digital assistant is represented by affordances 1440 or 1441 displayed on user interface 1410. Speech input 1452 includes, for example, "Hey, Assistant." In response to speech input 1452, user device 1400 invokes the digital assistant such that the digital assistant actively monitors subsequent speech inputs. In some examples, the digital assistant provides a spoken output 1472 indicating that it is invoked. For example, spoken output 1472 includes "Go ahead, I am listening." As shown in FIG. 14A, in some examples, user device 1400 is communicatively connected to one or more electronic devices such as electronic device 1420. Electronic device 1420 can communicate with user device 1400 using wired or wireless networks. For example, electronic device 1420 communicates with user device 1400 using Bluetooth connections such that voice and data (e.g., audio and video files) can be exchanged between the two devices.

Figure 14B:
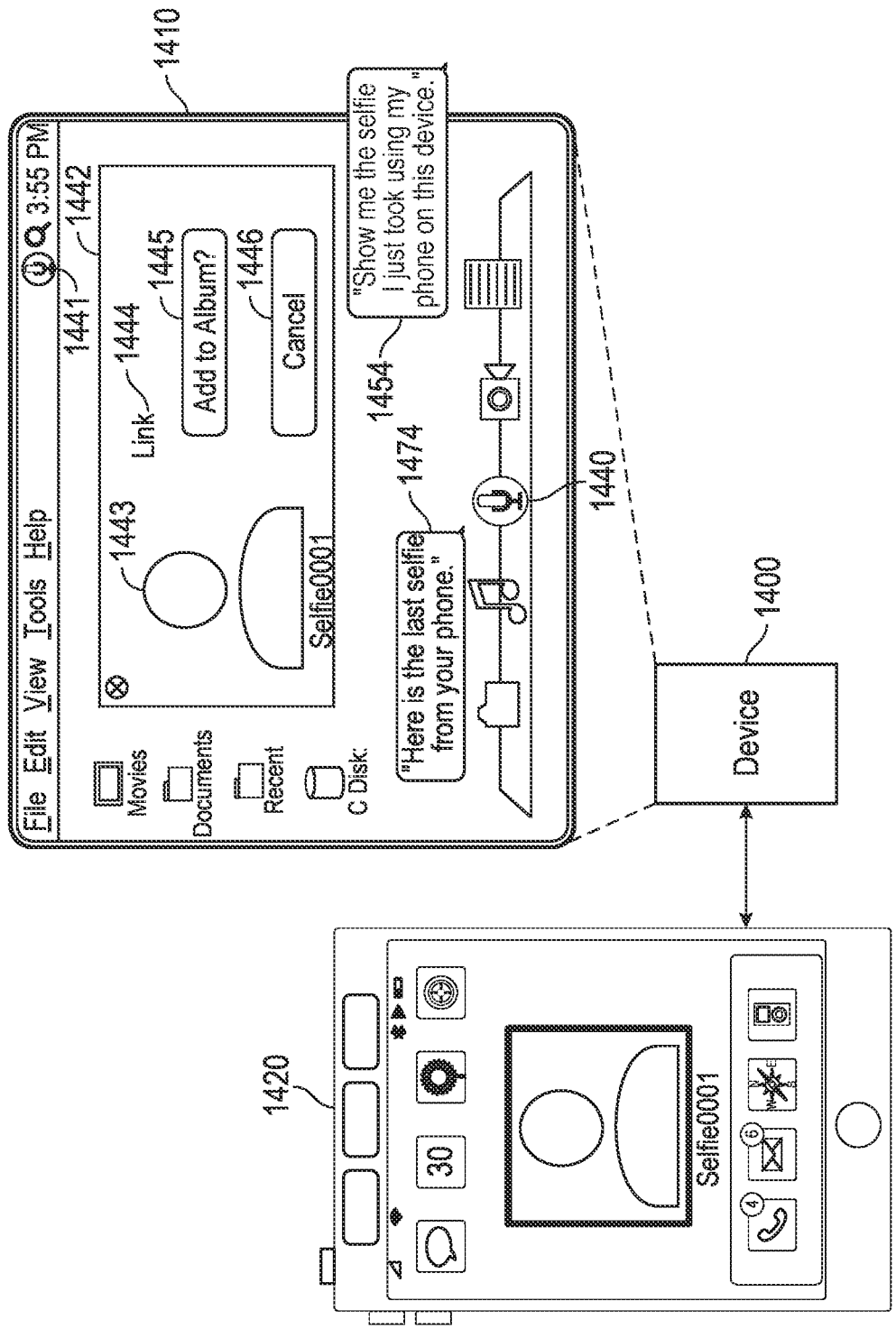

With reference to FIG. 14B, in some examples, the digital assistant receives a speech input 1454 such as "Show me the selfie I just took using my phone on this device." Based on speech input 1454 and/or context information, the digital assistant determines the user intent. For example, as shown in FIG. 14B, context information indicates that the user device 1400 is communicatively connected to electronic device 1420 using wired or wireless networks (e.g., a Bluetooth connection, a Wi-Fi connection, or the like). Context information also indicates that the user recently took a self-portrait, which is stored in electronic device 1420 with a name "selfie0001." As a result, the digital assistant determines that the user intent is to display the photo named selfie0001 stored in electronic device 1420. Alternatively, the photo may have been tagged with photo recognition software as containing the user's face and be identified accordingly.

As described, in accordance with the user intent, the digital assistant further determines whether the task is to be performed at the user device or at a first electronic device communicatively connected to the user device. In some embodiments, determining whether the task is to be performed at the user device or at the first electronic device is based on one or more keywords included in the speech input. For example, the digital assistant determines that speech input 1454 includes keywords or a phrase such as "on this device," indicating the task is to be performed on user device 1400. As a result, the digital assistant determines that displaying the photo named selfie0001 stored in electronic device 1420 is to be performed at user device 1400. User device 1400 and electronic device 1420 are different devices. For example, user device 1400 can be a laptop computer, and electronic device 1420 can be a phone.

In some embodiments, the digital assistant further determines whether the content associated with the performance of the task is located remotely. Content is located remotely if at or near the time the digital assistant determines which device is to perform the task, at least a portion of the content for performing the task is not stored in the device that is determined to perform the task. For example, as shown in FIG. 14B, at or near the time the digital assistant of user device 1400 determines that the user intent is to display the photo named selfie0001 at user device 1400, the photo named selfie0001 is not stored at user device 1400 and instead is stored at electronic device 1420 (e.g., a smartphone). Accordingly, the digital assistant determines that the photo is located remotely to user device 1400.

As illustrated in FIG. 14B, in some embodiments, in accordance with a determination that the task is to be performed at the user device and content for performing the task is located remotely, the digital assistant of the user device receives the content for performing the task. In some examples, the digital assistant of the user device 1400 receives at least a portion of the content stored in the electronic device 1420. For example, to display the photo named selfie0001, the digital assistant of user device 1400 sends a request to electronic device 1420 to obtain the photo named selfie0001. Electronic device 1420 receives the request and, in response, transmits the photo named selfie0001 to user device 1400. The digital assistant of user device 1400 then receives the photo named selfie0001.

As illustrated in FIG. 14B, in some embodiments, after receiving the remotely located content, the digital assistant provides a response at the user device. In some examples, providing a response includes performing the task using the received content. For example, the digital assistant of user device 1400 displays a user interface 1442 (e.g., a snippet or a window) providing a view 1443 of the photo named selfie0001. View 1443 can be a preview (e.g., a thumbnail), an icon, or a full view of the photo named selfie0001.

In some examples, providing a response includes providing a link that is associated with the task to be performed at the user device. A link enables instantiating of a process. As described, instantiating a process includes invoking the process if the process is not already running. If at least one instance of the process is running, instantiating a process includes executing an existing instance of the process or generating a new instance of the process. As shown in FIG. 14B, user interface 1442 may provide a link 1444 associated with view 1443 of the photo named selfie0001. Link 1444 enables, for example, instantiating a photo process to view a full representation of the photo or edit the photo. As an example, link 1444 is displayed on the side of view 1443. As another example, view 1443 can itself include or incorporate link 1444 such that a selection of view 1443 instantiates a photo process.

In some embodiments, providing a response includes providing one or more affordances that enable the user to further manipulate the results of the performance of the task. As shown in FIG. 14B, in some examples, the digital assistant provides affordances 1445 and 1446 on user interface 1442 (e.g., a snippet or a window). Affordance 1445 can include a button for adding a photo to an album, and affordance 1446 can include a button for canceling view 1443 of the photo. The user may select one or both of affordances 1445 and 1446. In response to the selection of affordance 1445, for example, a photo process adds the photo associated with view 1443 to an album. In response to the selection of affordance 1446, for example, a photo process removes view 1443 from user interface 1442.

In some embodiments, providing a response includes providing a spoken output according to the task to be performed at the user device. As illustrated in FIG. 14B, the digital assistant represented by affordances 1440 or 1441 provides a spoken output 1474 such as "Here is the last selfie from your phone."

Figure 14C:
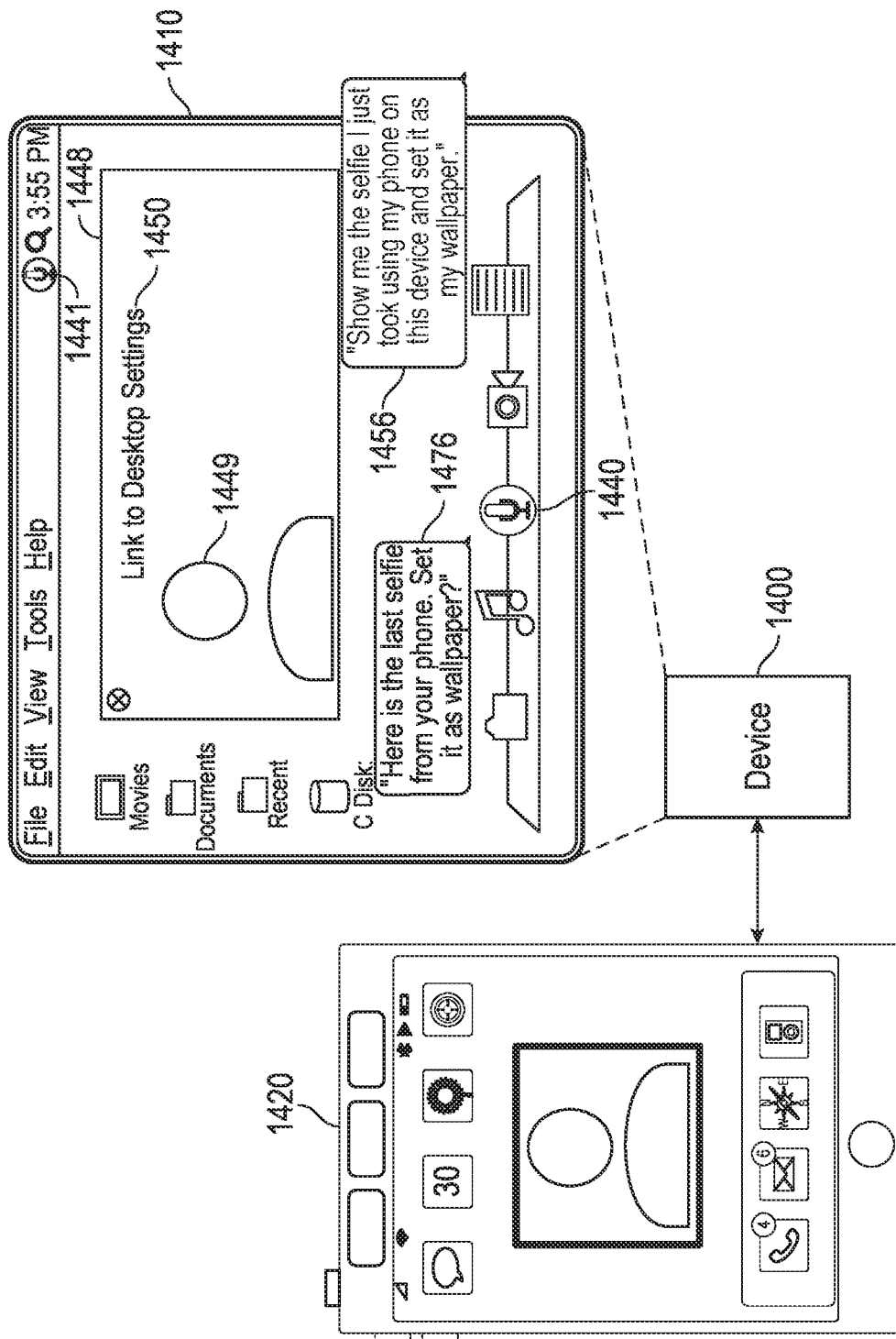

With reference to FIG. 14C, in some examples, based on a single speech input/utterance and context information, the digital assistant determines that the user intent is to perform a plurality of tasks. As shown in FIG. 14C, the digital assistant receives a speech input 1456 such as "Show me the selfie I just took using my phone on this device and set it as my wallpaper." Based on speech input 1456 and context information, the digital assistant determines that the user intent is to perform a first task of displaying the photo named selfie0001 stored at electronic device 1420 and performs a second task of setting the photo named selfie0001 as the wallpaper. Thus, based on a single speech input 1456, the digital assistant determines that the user intent is to perform multiple tasks.

In some embodiments, the digital assistant determines whether the plurality of tasks is to be performed at the user device or at an electronic device communicatively connected to the user device. For example, using the keywords "this device" included in speech input 1456, the digital assistant determines that the plurality of tasks is to be performed at user device 1400. Similar to those described above, the digital assistant further determines whether the content for performing at least one task is located remotely. For example, the digital assistant determines that the content for performing at least the first task (e.g., displaying the photo named selfie0001) is located remotely. In some embodiments, in accordance with a determination that the plurality of tasks is to be performed at the user device and content for performing at least one task is located remotely, the digital assistant requests the content from another electronic device (e.g., electronic device 1420), receives the content for performing the tasks, and provides a response at the user device.

In some embodiments, providing a response includes performing the plurality of tasks. For example, as illustrated in FIG. 14C, providing a response includes performing the first task of displaying a view 1449 of the photo named selfie0001, and performing the second task of setting the photo named selfie0001 as the wallpaper. In some examples, the digital assistant automatically configures the wallpaper to be the photo named selfie0001 using a desktop settings configuration process. In some examples, the digital assistant provides a link to desktop settings 1450, enabling the user to manually configure the wallpaper using the photo named selfie0001. For example, the user may select the link to desktop settings 1450 by using an input device such as a mouse, a stylus, or a finger. Upon receiving the selection of the link to desktop setting 1450, the digital assistant initiates the desktop setting configuration process that enables the user to select the photo named selfie0001 and set it as the wallpaper of user device 1400.

As illustrated in FIG. 14C, in some examples, the digital assistant initiates a dialog with the user and facilitates the configuration of the wallpaper in response to receiving a speech input from the user. For example, the digital assistant provides a spoken output 1476 such as "Here is the last selfie from your phone. Set is as wallpaper?" The user provides a speech input such as "OK." Upon receiving the speech input, the digital assistant instantiates the desktop settings configuration process to configure the wallpaper as the photo named selfie0001.

Figure 14D:
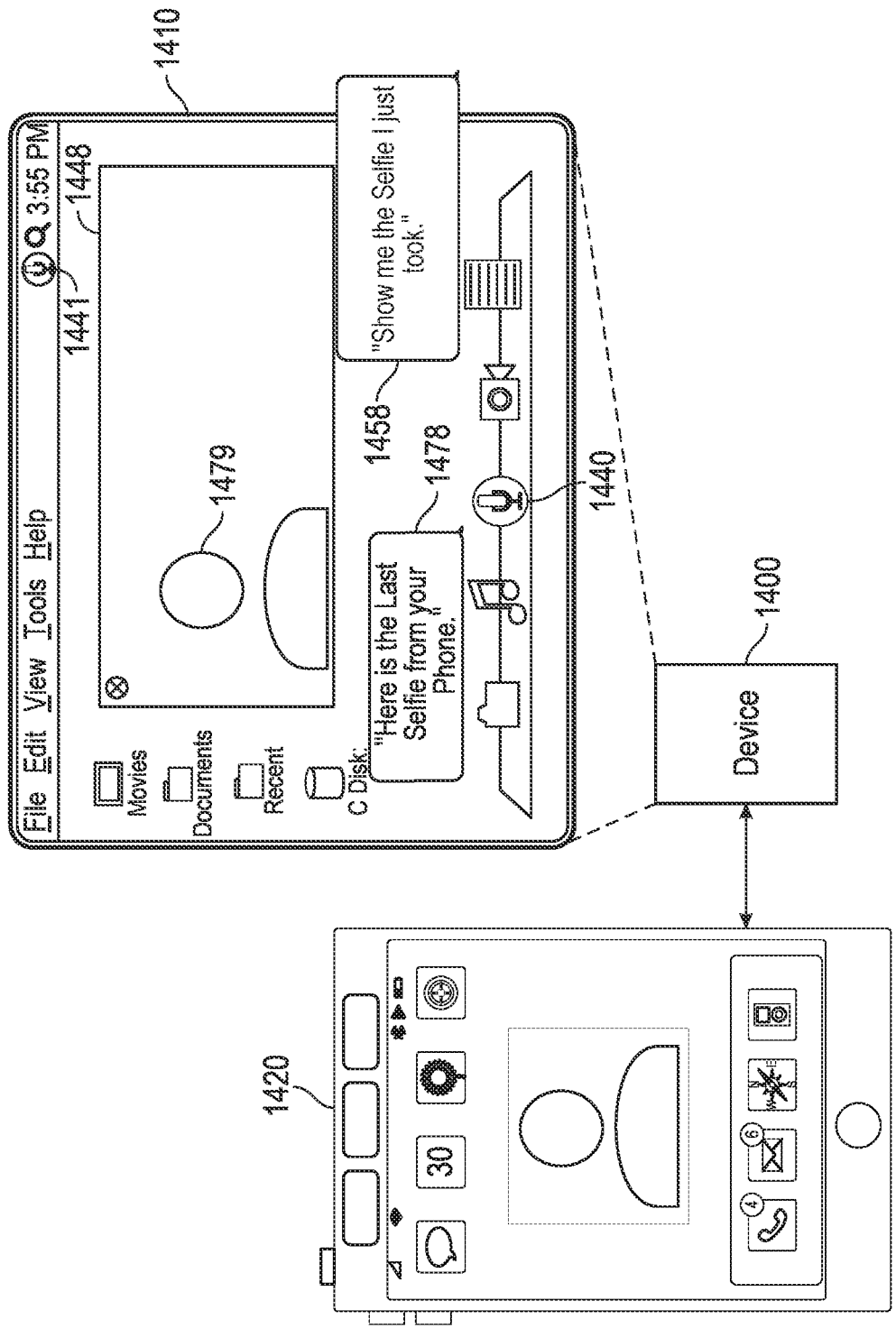

As described, in some examples, the digital assistant determines the user intent based on the speech input and context information. With reference to FIG. 14D, in some examples, the speech input may not include information sufficient to determine the user intent. For example, the speech input may not indicate the location of the content for performing the task. As shown in FIG. 14D, the digital assistant receives a speech input 1458 such as "Show me the selfie I just took." Speech input 1458 does not include one or more keywords indicating which photo is to be displayed or the location of the selfie to be displayed. As a result, the user intent may not be determined based solely on speech input 1458. In some examples, the digital assistant determines the user intent based on speech input 1458 and context information. For example, based on context information, the digital assistant determines that user device 1400 is communicatively connected to electronic device 1420. In some examples, the digital assistant instantiates a searching process to search for photos that the user recently took at user device 1400 and electronic device 1420. Based on the search result, the digital assistant determines that a photo named selfie0001 is stored in electronic device 1420. Accordingly, the digital assistant determines that the user intent is to display the photo named selfie0001 located at electronic device 1420. In some examples, if the user intent cannot be determined based on the speech input and context information, the digital assistant initiates a dialog with the user to further clarify or disambiguate the user intent.

As illustrated in FIG. 14D, in some examples, the speech input may not include one or more keywords indicating whether a task is to be performed at the user device or at an electronic device communicatively connected to the user device. For example, speech input 1458 does not indicate whether the task of displaying the selfie is to be performed at user device 1400 or at electronic device 1420. In some examples, the digital assistant determines whether a task is to be performed at the user device or at an electronic device based on context information. As an example, the context information indicates that the digital assistant receives speech input 1458 at user device 1400, not at electronic device 1420. As a result, the digital assistant determines that the task of displaying the selfie is to be performed at user device 1400. As another example, context information indicates that a photo is to be displayed on electronic device 1420 according to user preferences. As a result, the digital assistant determines that the task of displaying the selfie is to be performed at electronic device 1420. It is appreciated that the digital assistant can determine whether a task is to be performed at the user device or at an electronic device based on any context information.

Figure 15A:
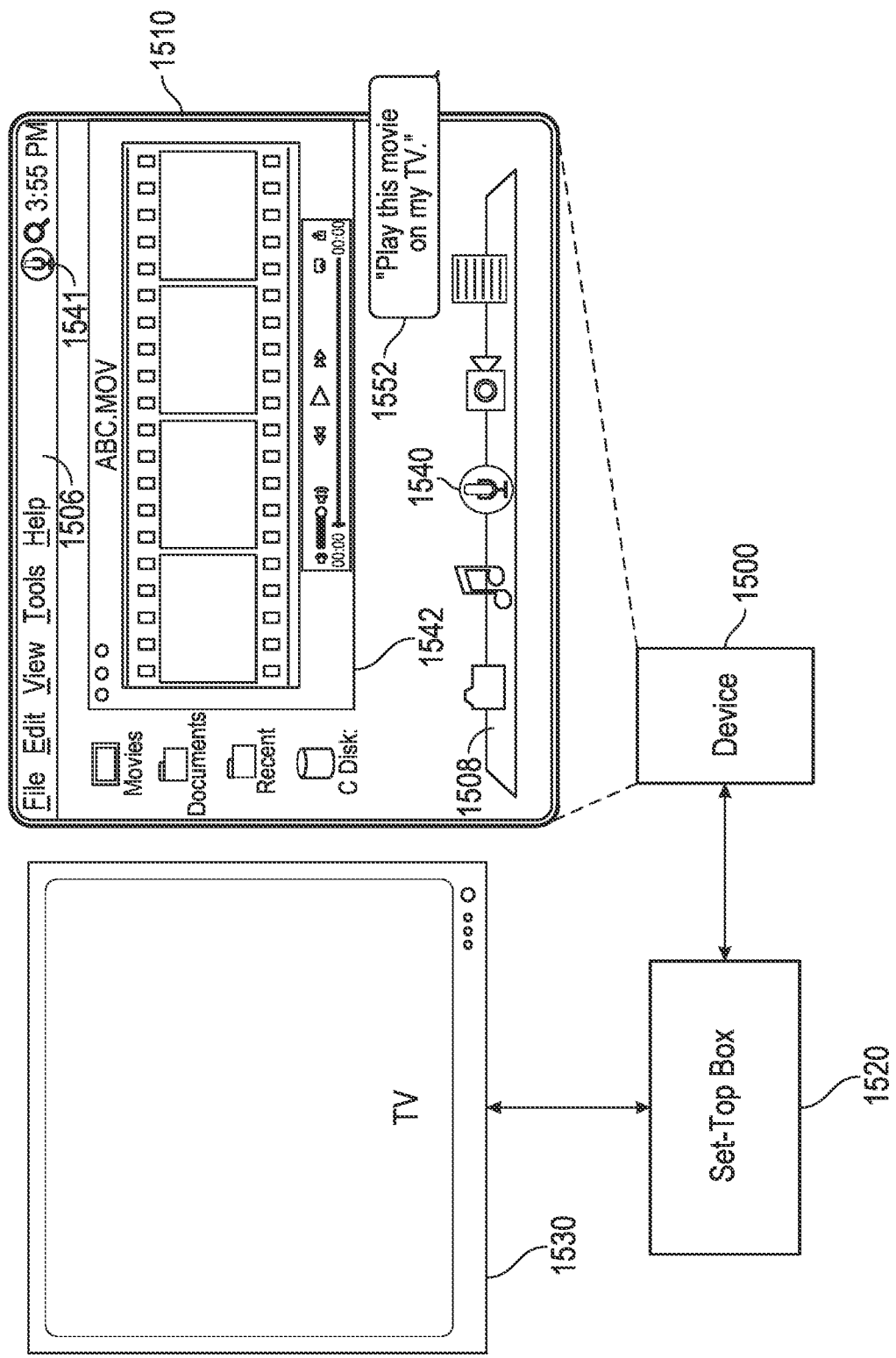
FIGS. 15A-15D illustrate functionalities of performing a task at a first electronic device using remotely located content by a digital assistant according to various examples.

With reference to FIG. 15A, in some embodiments, a digital assistant determines that the task is to be performed at an electronic device (e.g., electronic device 1520 and/or 1530) communicatively connected to the user device (e.g., user device 1500) and determine that the content is located remotely to the electronic device. As shown in FIG. 15A, in some examples, the digital assistant receives a speech input 1552 such as "Play this movie on my TV." As described, the digital assistant can determine the user intent based on speech input 1552 and context information. For example, context information indicates that user interface 1542 is displaying a movie named ABC.mov. As a result, the digital assistant determines that the user intent is to play the movie named ABC.mov.

In accordance with the user intent, the digital assistant furthers determine whether the task is to be performed at the user device or at a first electronic device communicatively connected to the user device. In some embodiments, determining whether the task is to be performed at the user device or at the first electronic device is based on one or more keywords included in the speech input. For example, speech input 1552 includes the words or phrase "on my TV." In some examples, context information indicates that user device 1500 is connected to a set-top box 1520 and/or a TV 1530 using, for example, a wired connection, a Bluetooth connection, or a Wi-Fi connection. As a result, the digital assistant determines that the task of playing the movie named ABC.mov is to be performed on set-top box 1520 and/or TV 1530.

In some embodiments, the digital assistant further determines whether the content associated with the performance of the task is located remotely. As described, content is located remotely if at or near the time the digital assistant determines which device is to perform the task, at least a portion of the content for performing the task is not stored in the device that is determined to perform the task. For example, as shown in FIG. 15A, at or near the time the digital assistant of user device 1500 determines that movie ABC.mov is to be played at set-top box 1520 and/or TV 1530, at least a portion of the movie ABC.mov is stored at user device 1500 (e.g., a laptop computer) and/or a server (not shown) and is not stored at set-top box 1520 and/or TV 1530. Accordingly, the digital assistant determines that the movie ABC.mov is located remotely to set-top box 1520 and/or TV 1530.

Figure 15B:
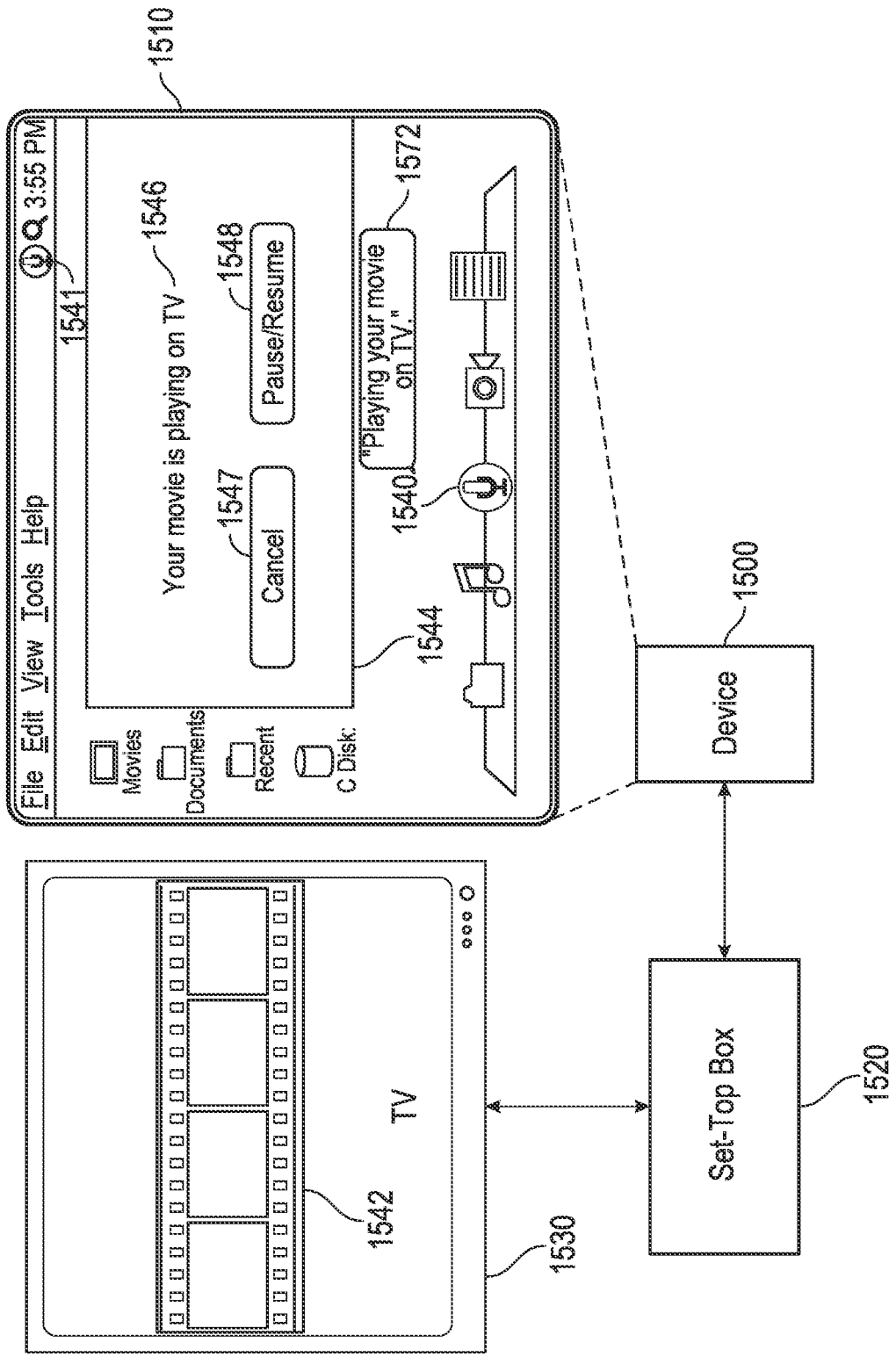

With reference to FIG. 15B, in accordance with a determination that the task is to be performed at the first electronic device (e.g., set-top box 1520 and/or TV 1530) and the content for performing the task is located remotely to the first electronic device, the digital assistant of the user device provides the content to the first electronic device to perform the task. For example, to play the movie ABC.mov on set-top box 1520 and/or TV 1530, the digital assistant of user device 1500 transmits at least a portion of the movie ABC.mov to set-top box 1520 and/or TV 1530.

In some examples, instead of providing the content from the user device, the digital assistant of the user device causes at least a portion of the content to be provided from another electronic device (e.g., a server) to the first electronic device to perform the task. For example, the movie ABC.mov is stored in a server (not shown) and not at user device 1500. As a result, the digital assistant of user device 1500 causes at least a portion of the movie named ABC.mov to be transmitted from the server to set-top box 1520 and/or TV 1530. In some examples, the content for performing the task is provided to set-top box 1520, which then transmits the content to TV 1530. In some examples, the content for performing the task is provided to TV 1530 directly.

As illustrated in FIG. 15B, in some examples, after the content is provided to the first electronic device (e.g., set-top box 1520 and/or TV 1530), the digital assistant of user device 1500 provides a response at user device 1500. In some examples, providing the response includes causing the task to be performed at set-top box 1520 and/or TV 1530 using the content. For example, the digital assistant of user device 1500 sends a request to set-top box 1520 and/or TV 1530 to initiate a multimedia process to play the movie ABC.mov. In response to the request, set-top box 1520 and/or TV 1530 initiates the multimedia process to play the movie ABC.mov.

In some examples, the task to be performed at the first electronic device (e.g., set-top box 1520 and/or TV 1530) is a continuation of a task performed remotely to the first electronic device. For example, as illustrated in FIGS. 15A-15B, the digital assistant of user device 1500 has caused a multimedia process of user device 1500 to play a portion of the movie ABC.mov at user device 1500. In accordance with the determination that the user intent is to play the movie ABC.mov at the first electronic device (e.g., set-top box 1520 and/or TV 1530), the digital assistant of user device 1500 causes the first electronic device to continue playing the rest of the movie ABC.mov rather than start playing from the beginning. As a result, the digital assistant of user device 1500 enables the user to continuously watch the movie.

As illustrated in FIG. 15B, in some embodiments, providing a response includes providing one or more affordances that enable the user to further manipulate the results of the performance of the task. As shown in FIG. 15B, in some examples, the digital assistant provides affordances 1547 and 1548 on a user interface 1544 (e.g., a snippet or a window). Affordance 1547 can be a button for cancelling the playing of movie ABC.mov on the first electronic device (e.g., set-top box 1520 and/or TV 1530). Affordance 1548 can be a button to pause or resume the playing of movie ABC.mov that is playing on the first electronic device. The user may select affordance 1547 or 1548 using an input device such as a mouse, a stylus, or a finger. Upon receiving a selection of affordance 1547, for example, the digital assistant causes the playing of movie ABC.mov on the first electronic device to stop. In some examples, after the playing on the first electronic device stops, the digital assistant also causes the playing of movie ABC.mov on user device 1500 to resume. Upon receiving a selection of affordance 1548, for example, the digital assistant causes the playing of movie ABC.mov on the first electronic device to pause or resume.

In some embodiments, providing a response includes providing a spoken output according to the task to be performed at the first electronic device. As illustrated in FIG. 15B, the digital assistant represented by affordance 1540 or 1541 provides a spoken output 1572 such as "Playing your movie on TV."

Figure 15C:
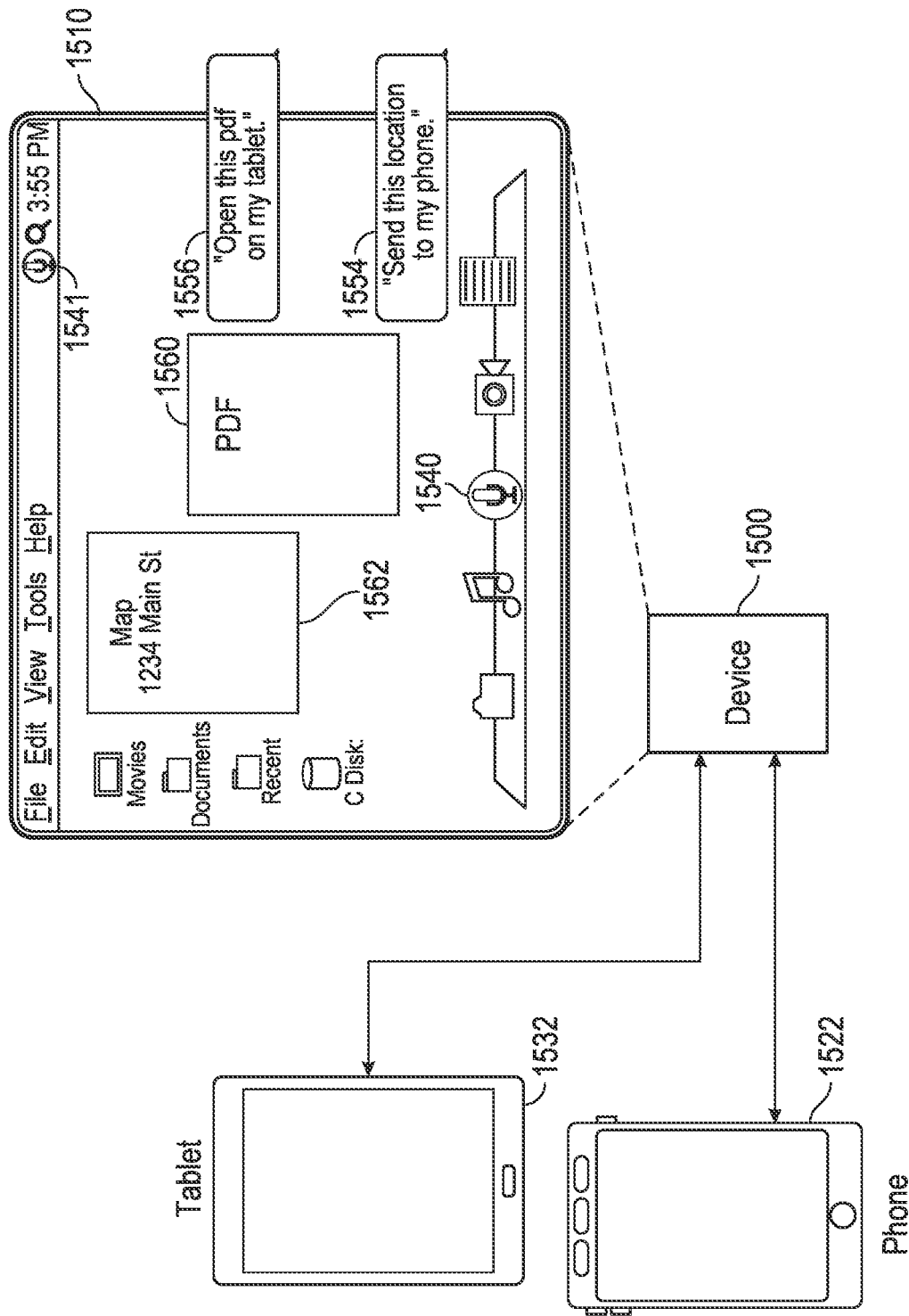

As described, in accordance with a determination that the task is to be performed at a first electronic device and the content for performing the task is located remotely to the first electronic device, the digital assistant provides the content for performing the task to the first electronic device. With reference to FIG. 15C, the content for performing the task can include, for example, a document (e.g., document 1560) or location information. For instance, the digital assistant of user device 1500 receives a speech input 1556 such as "Open this pdf on my tablet." The digital assistant determines that the user intent is to perform a task of displaying document 1560 and determines that the task is to be performed at a tablet 1532 that is communicatively connected to user device 1500. As a result, the digital assistant provides document 1560 to tablet 1532 to be displayed. As another example, the digital assistant of user device 1500 receives a speech input 1554 such as "Send this location to my phone." The digital assistant determines that the user intent is to perform a task of navigation using the location information and determines that the task is to be performed at phone 1522 (e.g., a smartphone) that is communicatively connected to user device 1500. As a result, the digital assistant provides location information (e.g., 1234 Main St.) to phone 1522 to perform the task of navigation.

Figure 15D:
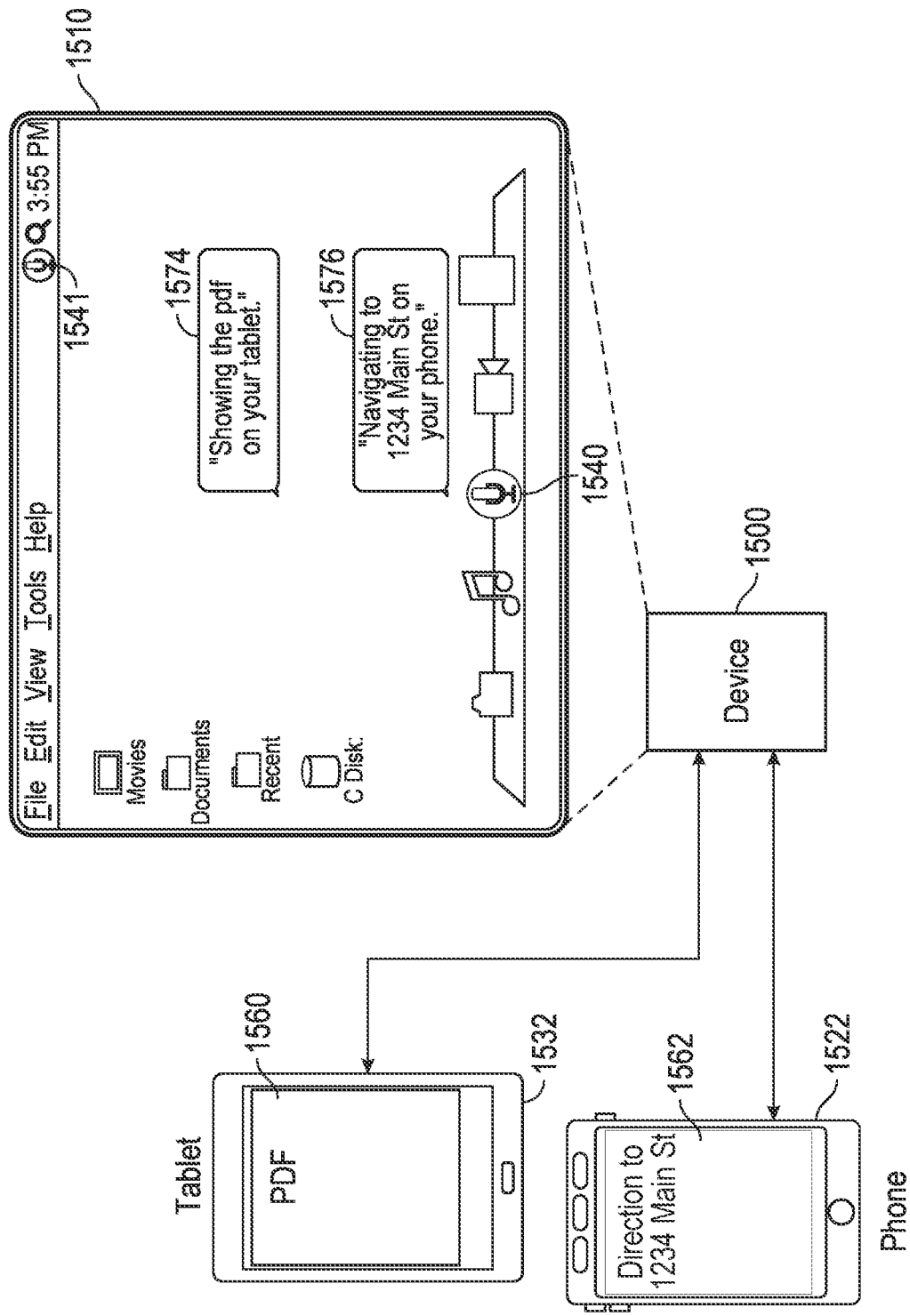

As described, in some examples, after providing the content for performing the task to the first electronic device, the digital assistant provides a response at the user device. In some embodiments, providing the response includes causing the task to be performed at the first electronic device. For example, as shown in FIG. 15D, the digital assistant of user device 1500 transmits a request to phone 1522 to perform the task of navigating to the location 1234 Main St. The digital assistant of user device 1500 further transmits a request to tablet 1532 to perform the task of displaying document 1560. In some examples, providing the response at the user device includes providing a spoken output according to the task to be performed at the first electronic device. As illustrated in FIG. 15D, the digital assistant provides a spoken output 1574 such as "Showing the pdf on your tablet" and a spoken output 1576 such as "navigating to 1234 Main St on your phone."

Figure 16A:
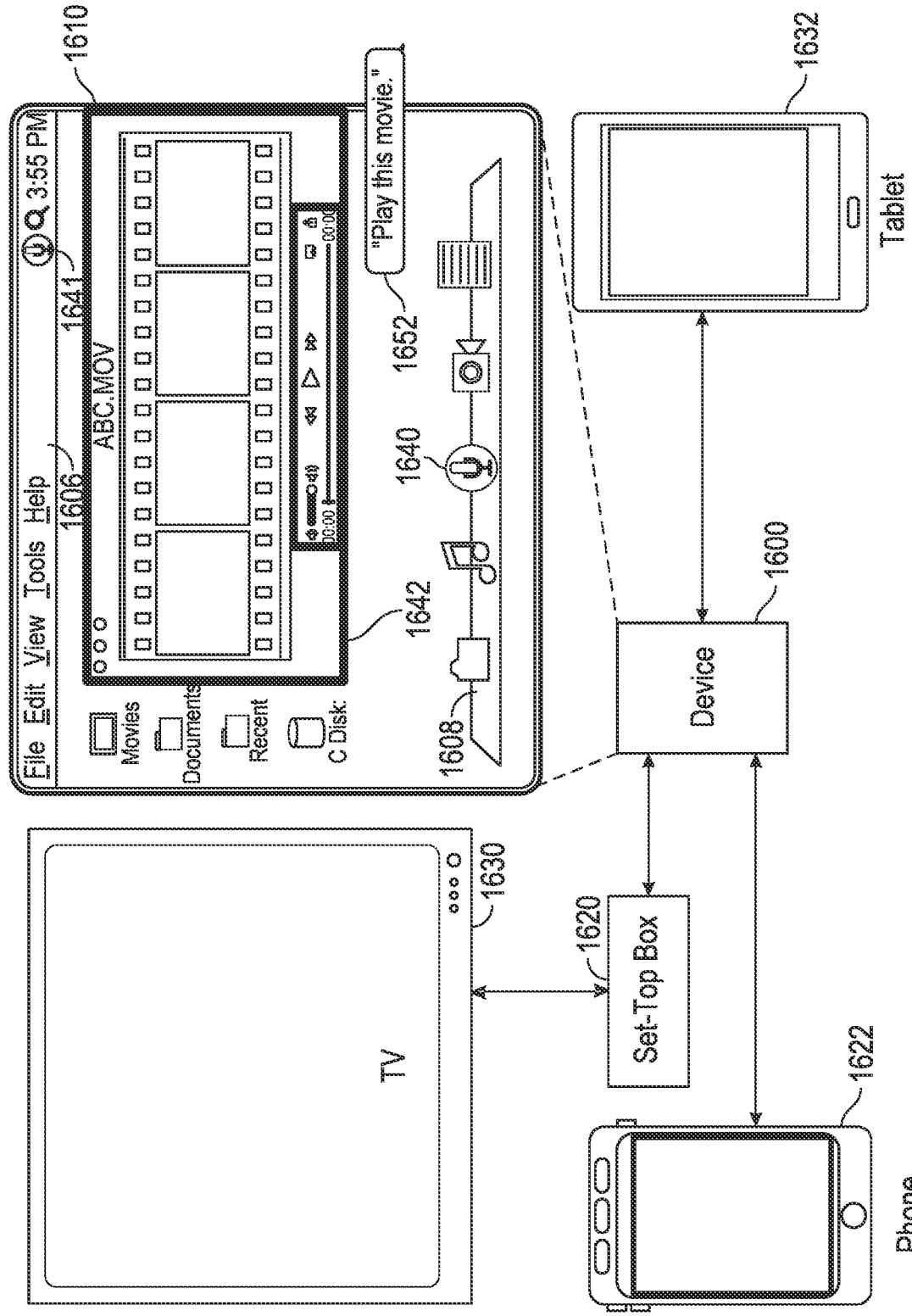
FIGS. 16A-16C illustrate functionalities of performing a task at a first electronic device using remotely located content by a digital assistant according to various examples.

As described, in some examples, the speech input may not include one or more keywords indicating whether a task is to be performed at the user device or at a first electronic device communicatively connected to the user device. With reference to FIG. 16A, for example, the digital assistant receives a speech input 1652 such as "Play this movie." Speech input 1652 does not indicate whether the task of playing the movie is to be performed at user device 1600 or at a first electronic device (e.g., set-top box 1620 and/or TV 1630, phone 1622, or tablet 1632).

In some embodiments, to determine whether the task is to be performed at the user device or at a first electronic device, the digital assistant of the user device determines whether performing the task at the user device satisfies performance criteria. Performance criteria facilitate evaluating the performance of the task. For example, as illustrated in FIG. 16A, the digital assistant determines that the user intent is to perform the tasking of playing the movie ABC.mov. Performance criteria for playing a movie include, for example, the quality criteria of playing a movie (e.g., 480p, 720p, 1080p), the smoothness criteria of playing the movie (e.g., no delay or waiting), the screen size criteria (e.g., a minimum screen size of 48 inches), the sound effect criteria (e.g., stereo sounds, number of speakers), or the like. The performance criteria can be pre-configured and/or dynamically updated. In some examples, the performance criteria are determined based on context information such as user-specific data (e.g., user preferences), device configuration data (e.g., screen resolution and size of the electronic devices), or the like.

In some examples, the digital assistant of user device 1600 determines that performing the task at the user device satisfies the performance criteria. For example, as illustrated in FIG. 16A, user device 1600 may have a screen resolution, a screen size, and sound effect that satisfy the performance criteria of playing the movie ABC.mov, which may be a low-resolution online video. In accordance with a determination that performing the task at user device 1600 satisfies the performance criteria, the digital assistant determines that the task is to be performed at user device 1600.

Figure 16B:
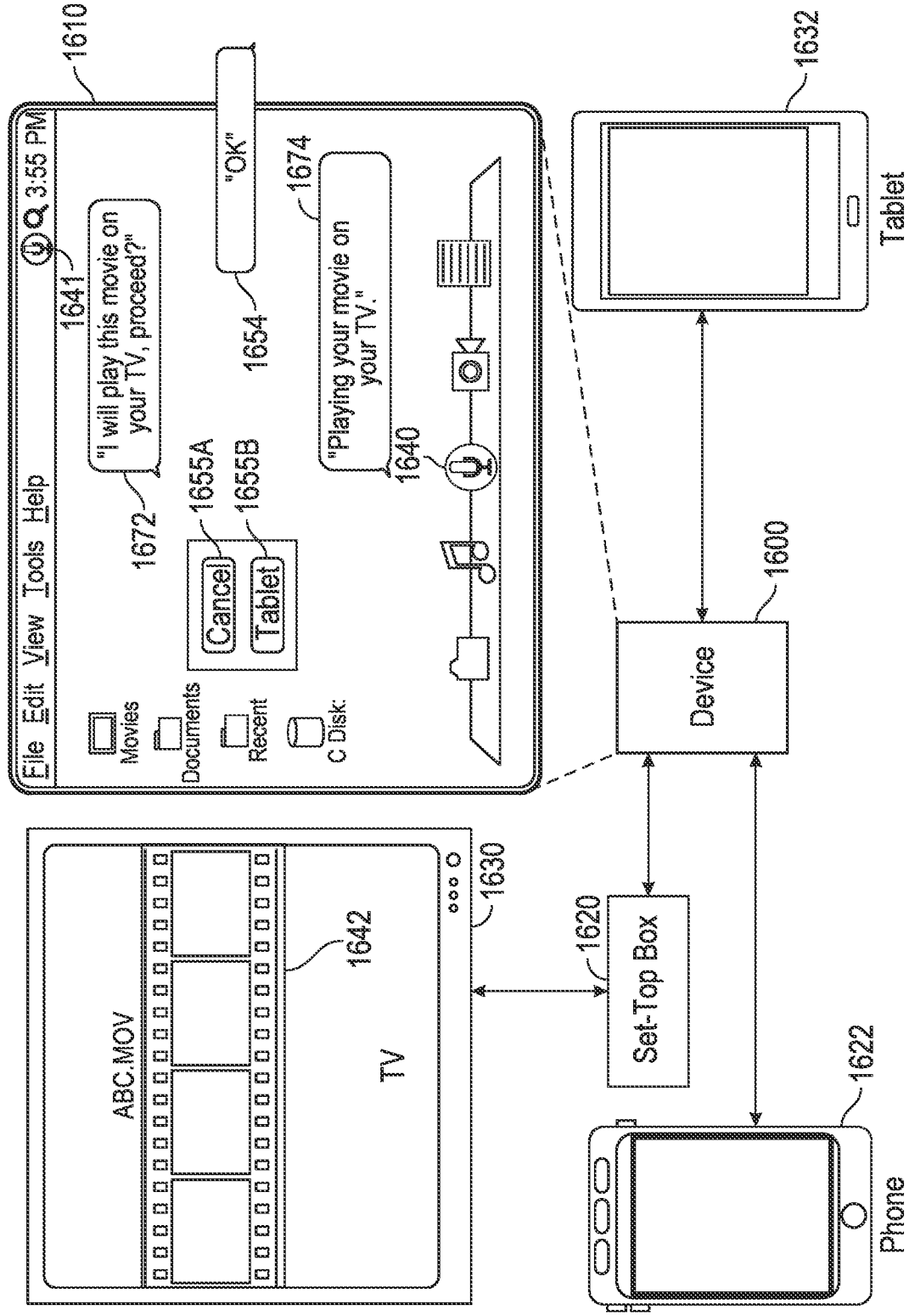

In some examples, the digital assistant of user device 1600 determines that performing the task at the user device does not satisfy the performance criteria. For example, user device 1600 may not have the screen size, the resolution, and/or the sound effect to satisfy the performance criteria of playing the movie ABC.mov, which may be a high-resolution Blu-ray video. In some examples, in accordance with a determination that performing the task at the user device does not satisfy the performance criteria, the digital assistant of user device 1600 determines whether performing the task at the first electronic device satisfies the performance criteria. As illustrated in FIG. 16B, the digital assistant of user device 1600 determines that performing the task of playing the movie ABC.mov at set-top box 1620 and/or TV 1630 satisfies the performance criteria. For example, set-top box 1620 and/or TV 1630 may have a screen size of 52 inches, may have a 1080p resolution, and may have eight speakers connected. As a result, the digital assistant determines that the task is to be performed at set-top box 1620 and/or TV 1630.

In some examples, the digital assistant of user device 1600 determines that performing the task at the first electronic device does not satisfy the performance criteria. In accordance with the determination, the digital assistant determines whether performing the task at the second electronic device satisfies the performance criteria. For example, as illustrated in FIG. 16B, TV 1630 may have a screen resolution (e.g., 720p) that does not satisfy the performance criteria (e.g., 1080p). As a result, the digital assistant determines whether any one of phone 1622 (e.g., a smartphone) or tablet 1632 satisfies the performance criteria.

In some examples, the digital assistant determines which device provides the optimum performance of the task. For example, as illustrated in FIG. 16B, the digital assistant evaluates or estimates the performance of the task of playing movie ABC.mov on each of user device 1600, set-top box 1620 and TV 1630, phone 1622, and tablet 1632. Based on the evaluation or estimation, the digital assistant determines whether performing the task at one device (e.g., user device 1600) is better than at another device (e.g., phone 1622) and determines a device for optimum performance.

As described, in some examples, in accordance with the determination of a device for performing the task, the digital assistant provides a response at user device 1600. In some embodiments, providing a response includes providing a spoken output according to the task to be performed at the device. As illustrated in FIG. 16B, the digital assistant represented by affordances 1640 or 1641 provides a spoken output 1672 such as "I will play this movie on your TV, proceed?" In some examples, the digital assistant receives a speech input 1654 such as "OK" from the user. In response, the digital assistant causes the movie ABC.mov to be played at, for example, set-top box 1620 and TV 1630 and provides a spoken output 1674 such as "Playing your movie on your TV."

In some examples, providing a response includes providing one or more affordances that enable the user to select another electronic device for performance of the task. As illustrated in FIG. 16B, for example, the digital assistant provides affordances 1655A-B (e.g., a cancel button and a tablet button). Affordance 1655A enables the user to cancel playing the movie ABC.mov at set-top box 1620 and TV 1630. Affordance 1655B enables the user to select tablet 1632 to continue playing the movie ABC.mov.

Figure 16C:
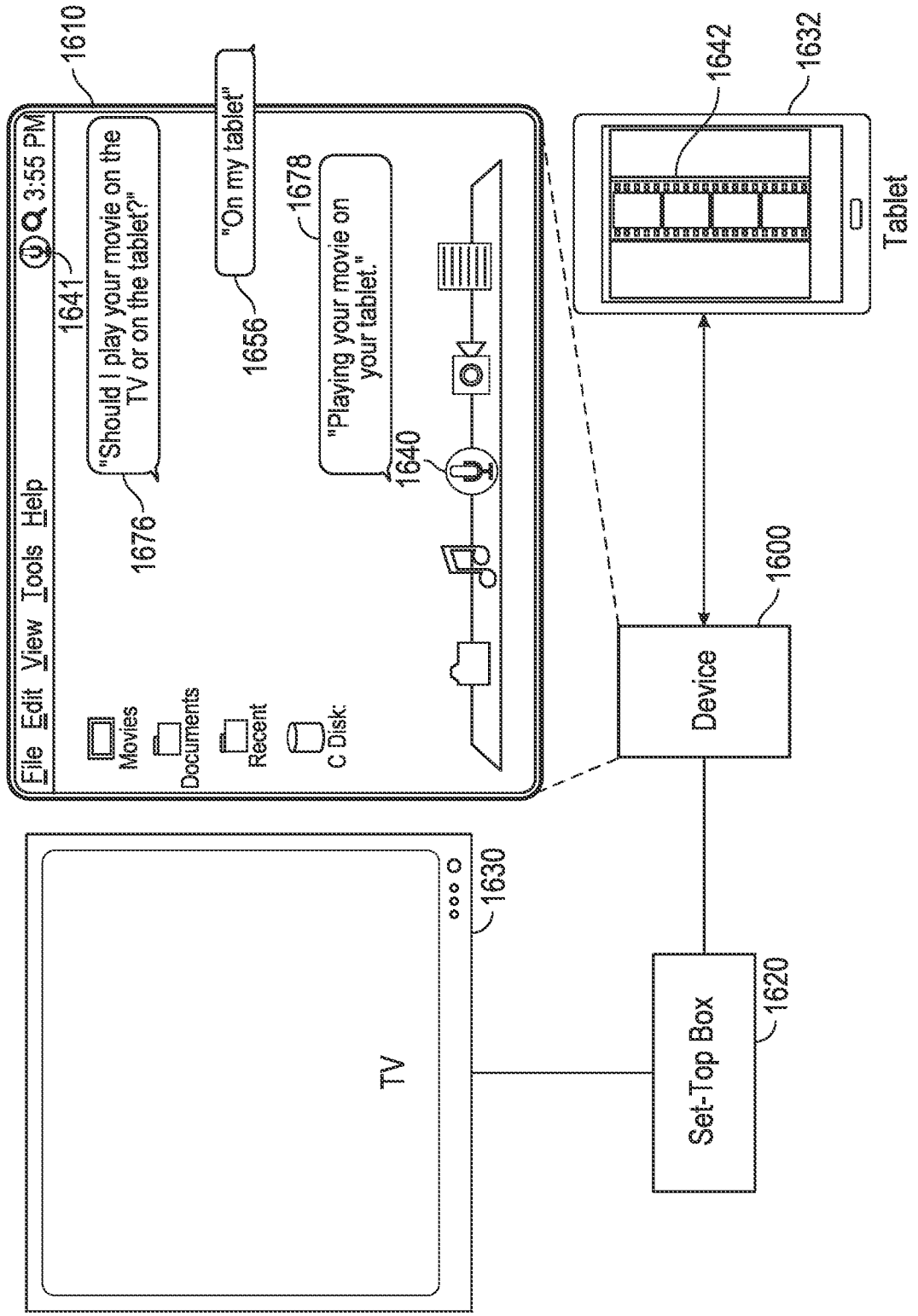

With reference to FIG. 16C, in some embodiments, to determine a device for performing a task, the digital assistant of user device 1600 initiates a dialog with the user. For example, the digital assistant provides a spoken output 1676 such as "Should I play your movie on the TV or on the tablet?" The user provides a speech input 1656 such as "On my tablet." Upon receiving speech input 1656, the digital assistant determines that the task of playing the movie is to be performed at tablet 1632, which is communicatively connected to user device 1600. In some examples, the digital assistant further provides a spoken output 1678 such as "Playing your movie on your tablet."

Figure 17A:
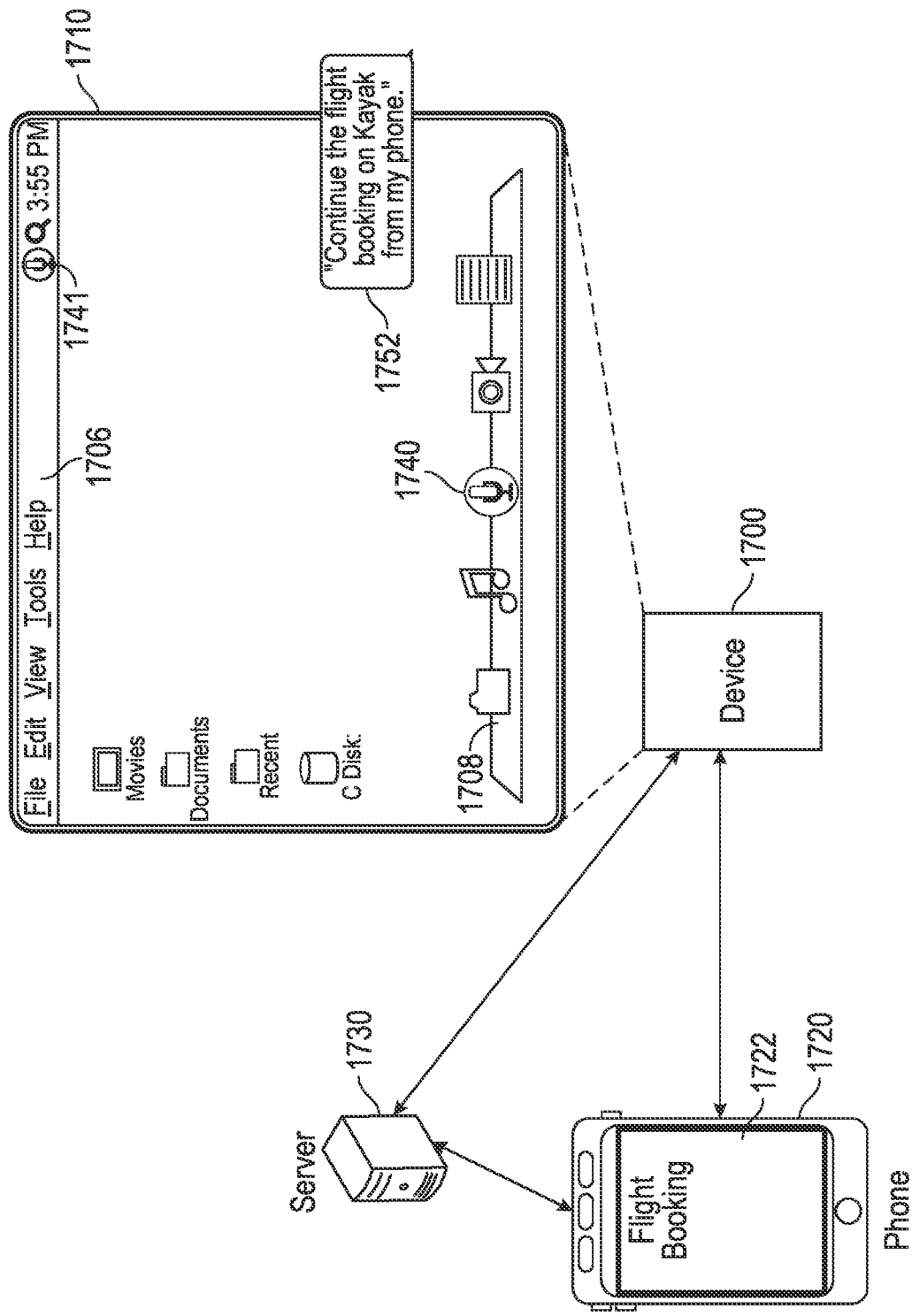
FIGS. 17A-17E illustrate functionalities of performing a task at a user device using remotely located content by a digital assistant according to various examples.

With reference to FIG. 17A, in some embodiments, a digital assistant of a user device 1700 continues to perform a task that was partially performed remotely at a first electronic device. In some embodiments, the digital assistant of a user device continues to perform the task using content received from a third electronic device. As illustrated in FIG. 17A, in some examples, phone 1720 may have been performing a task of flight booking using content from a third electronic device such as a server 1730. For example, the user may have been using phone 1720 to book flights from Kayak.com. As a result, phone 1720 receives content transmitted from server 1730 that is associated with Kayak.com. In some examples, the user may be interrupted while booking his or her flight on phone 1720 and may desire to continue the flight booking using user device 1700. In some examples, the user may desire to continue the flight booking simply because using user device 1700 is more convenient. Accordingly, the user may provide a speech input 1752 such as "Continue the flight booking on Kayak from my phone."

Figure 17B:
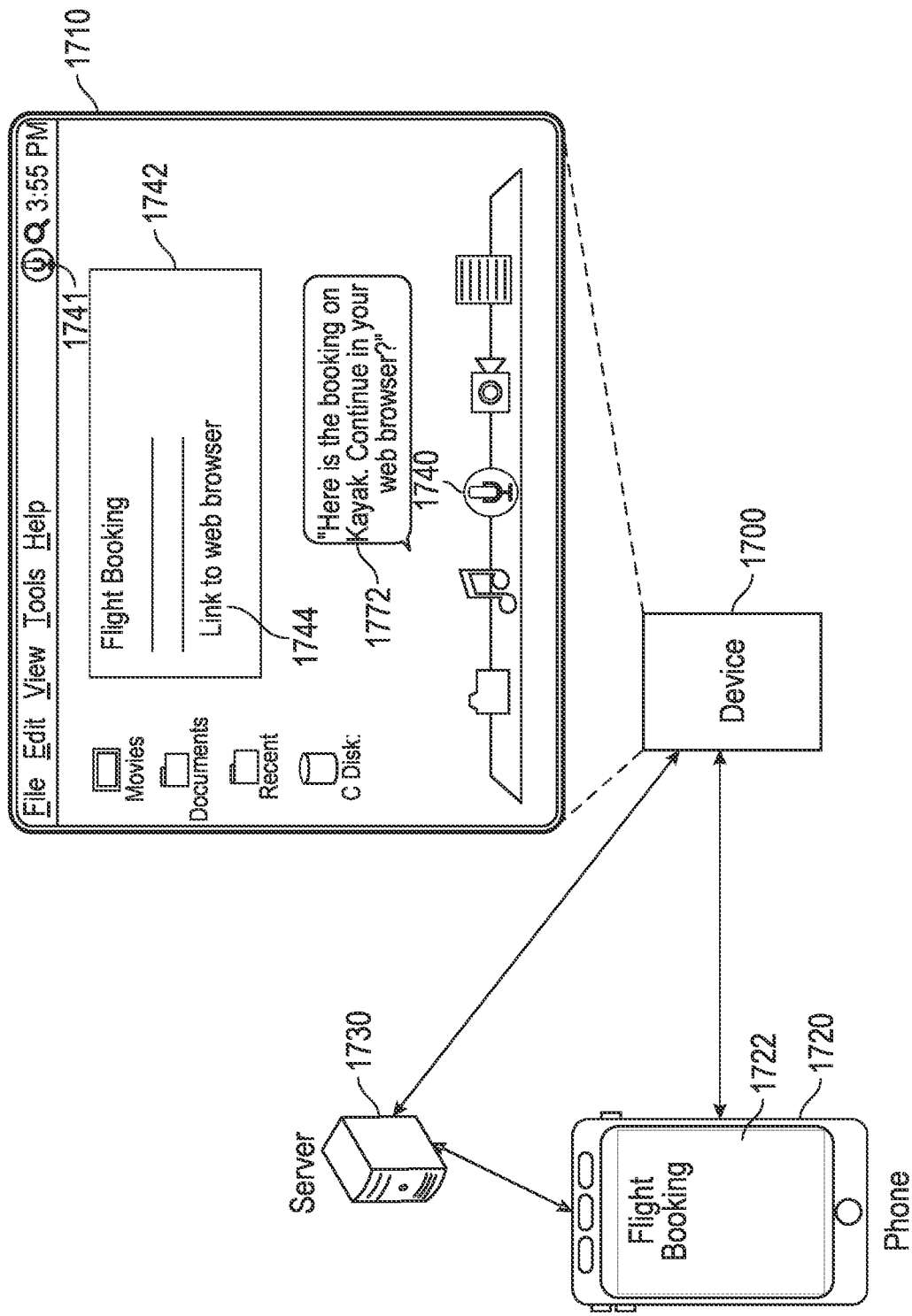

With reference to FIG. 17B, upon receiving speech input 1752, the digital assistant determines the user intent is to perform a task of flight booking. In some examples, the digital assistant further determines that the task is to be performed at user device 1700 based on context information. For example, the digital assistant determines that speech input 1752 is received at user device 1700 and therefore determines that the task is to be performed at user device 1700. In some examples, the digital assistant further uses context information such as user preferences (e.g., user device 1700 is used frequently in the past for flight booking) to determine that the task is to be performed at user device 1700.

As shown in FIG. 17B, in accordance with the determination that the task is to be performed at the user device 1700, and the content for performing the task is located remotely, the digital assistant receives the content for performing the task. In some examples, the digital assistant receives the at least a portion of the content from phone 1720 (e.g., a smartphone) and/or at least a portion of the content from server 1730. For example, the digital assistant receives data representing the status of flight booking from phone 1720 such that user device 1700 can continue the flight booking. In some examples, the data representing the status of flight booking is stored at server 1730, such as a server associated with Kayak.com. The digital assistant thus receives data from server 1730 for continuing the flight booking.

As illustrated in FIG. 17B, after receiving the content from phone 1720 and/or server 1730, the digital assistant provides a response at user device 1700. In some examples, providing the response includes continuing to perform the task of flight booking that was partially performed remotely at phone 1720. For example, the digital assistant displays a user interface 1742 enabling the user to continue booking the flight on Kayak.com. In some examples, providing the response includes providing a link associated with the task to be performed at user device 1700. For example, the digital assistant displays a user interface 1742 (e.g., a snippet or a window) providing the current status of flight booking (e.g., showing available flights). User interface 1742 also provides a link 1744 (e.g., a link to a web browser) for continuing performing the task of flight booking. In some embodiments, the digital assistant also provides a spoken output 1772 such as "Here is the booking on Kayak. Continue in your web browser?"

Figure 17C:
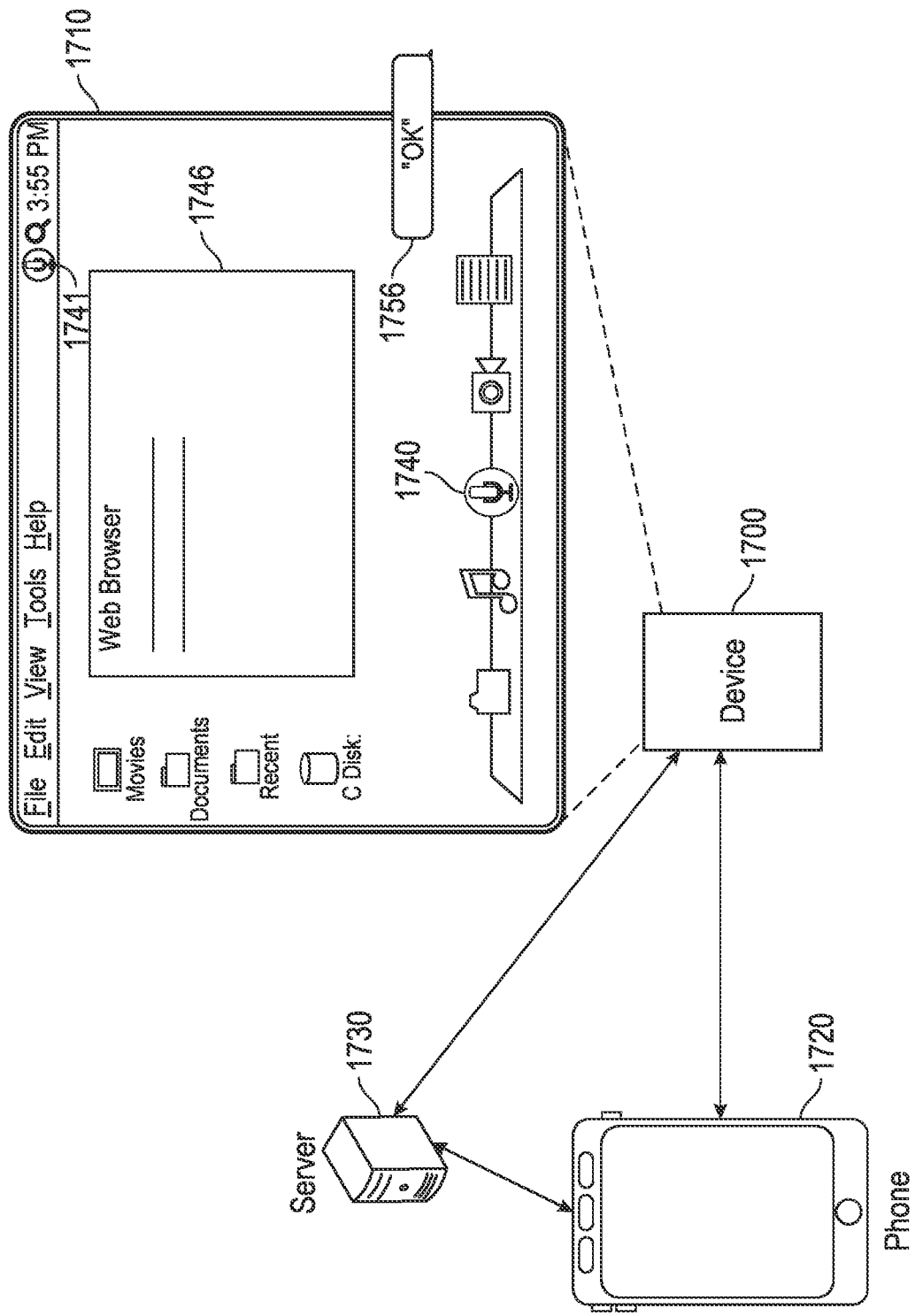

As shown in FIGS. 17B-17C, for example, if the user selects link 1744, the digital assistant instantiates a web browsing process and displays a user interface 1746 (e.g., a snippet or a window) for continuing the flight booking task. In some examples, in response to spoken output 1772, the user provides a speech input 1756 such as "OK" confirming that the user desires to continue flight book using a web browser of user device 1700. Upon receiving speech input 1756, the digital assistant instantiates a web browsing process and displays user interface 1746 (e.g., a snippet or a window) for continuing the flight booking task.

Figure 17D:
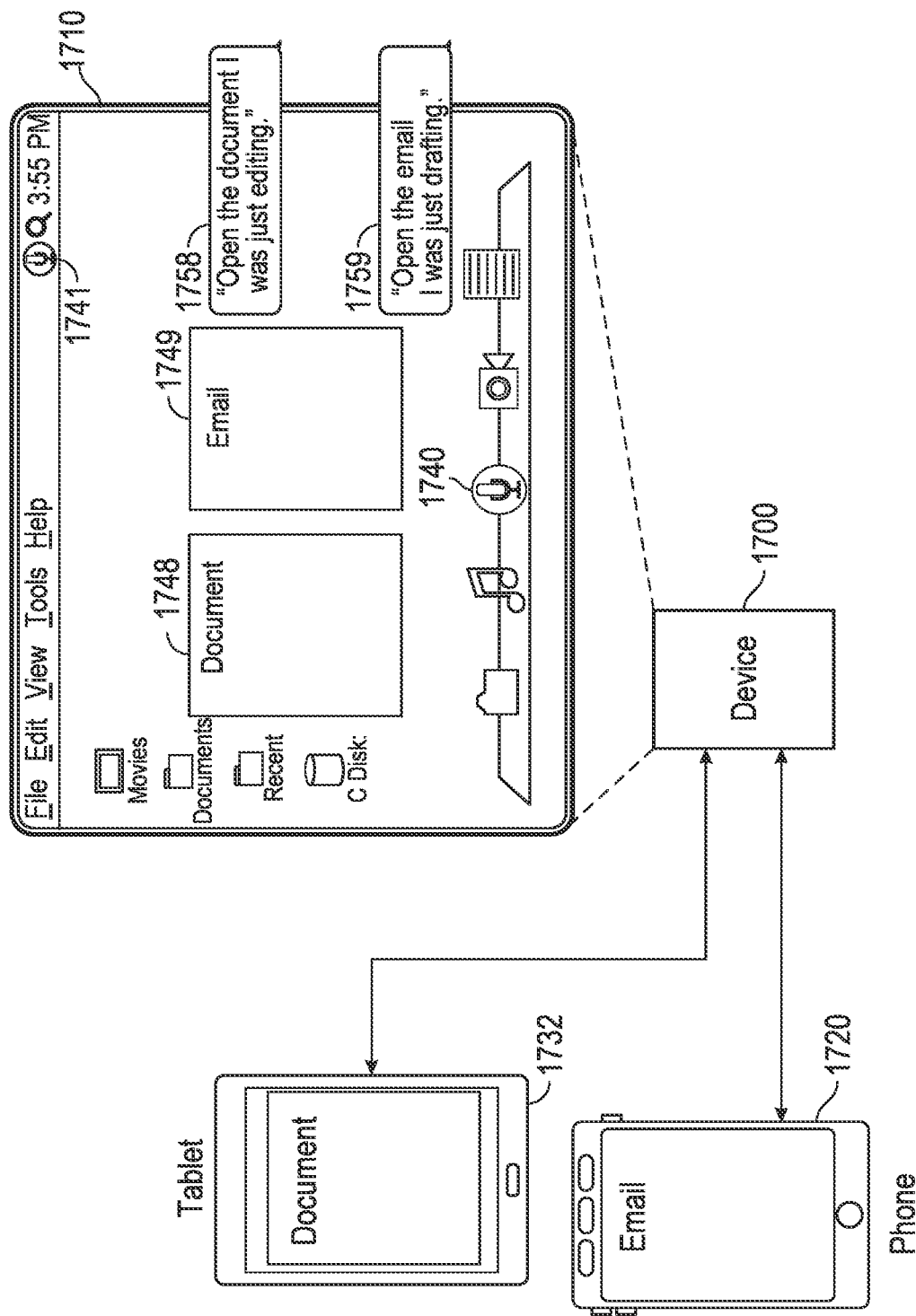

With reference to FIG. 17D, in some embodiments, a digital assistant of a user device 1700 continues to perform a task that was partially performed remotely at a first electronic device. In some embodiments, the digital assistant of the user device continues to perform the task using content received from the first electronic device, rather than a third electronic device such as a server. As illustrated in FIG. 17D, in some examples, the first electronic device (e.g., phone 1720 or tablet 1732) may have been performing a task. For example, the user may have been using phone 1720 to compose an email or using tablet 1732 to edit a document such as a photo. In some examples, the user is interrupted while using phone 1720 or tablet 1732, and/or desires to continue the performance of the task using user device 1700. In some examples, the user may desire to continue the performance of the task simply because using user device 1700 is more convenient (e.g., a larger screen). Accordingly, the user may provide a speech input 1758 such as "Open the document I was just editing" or speech input 1759 such as "Open the email I was just drafting."

With reference to FIG. 17D, upon receiving speech input 1758 or 1759, the digital assistant determines the user intent is to perform a task of editing a document or composing an email. Similar to those described above, in some examples, the digital assistant further determines that the task is to be performed at user device 1700 based on context information, and determines that the content for performing the task is located remotely. Similar to described above, in some examples, the digital assistant determines, based on context information (e.g., user-specific data), that the content is located remotely at the first electronic device (e.g., at phone 1720 or tablet 1732), rather than at a server. As shown in FIG. 17D, in accordance with the determination that the task is to be performed at the user device 1700 and the content for performing the task is located remotely, the digital assistant receives the content for performing the task. In some examples, the digital assistant receives the at least a portion of the content from phone 1720 (e.g., a smartphone) and/or at least a portion of the content from tablet 1730. After receiving the content from phone 1720 and/or tablet 1732, the digital assistant provides a response at user device 1700, such as displaying a user interface 1748 for the user to continue editing the document and/or displaying a user interface 1749 for the user to continue composing the email. It is appreciated that the digital assistant of user device 1700 can also cause a first electronic device to continue performing a task that was partially performed remotely at the user device 1700. For example, the user may be composing an email on user device 1700 and may need to leave. The user provides a speech input such as "Open the email I was drafting on my phone." Based on the speech input, the digital assistant determines the user intent is to continue performing the task on phone 1720 and the content is located remotely at the user device 1700. In some examples, the digital assistant provides the content for performing the task to the first electronic device and causes the first electronic device to continue performing the task, similar to those described above.

Figure 17E:
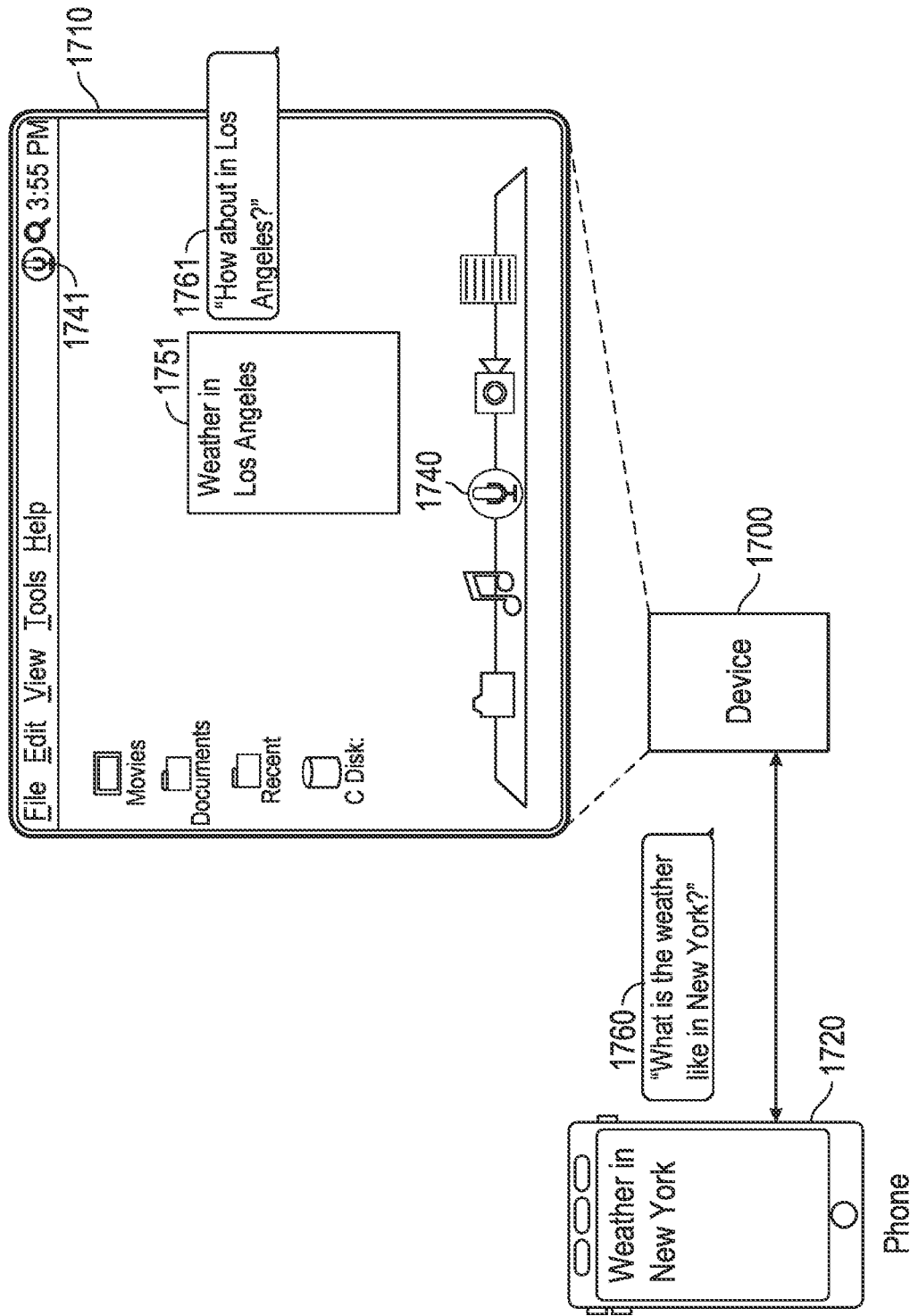

With reference to FIG. 17E, in some embodiments, continuing to performing a task is based on context information that is shared or synchronized among a plurality of devices including, for example, user device 1700 and first electronic device (e.g., phone 1720). As described, in some examples, the digital assistant determines a user intent based on the speech input and context information. The context information can be stored locally or remotely. For example, as shown in FIG. 17E, the user provides a speech input 1760 such as "What is the weather like in New York?" to phone 1720. A digital assistant of phone 1720 determines the user intent, performs the task to obtain the weather information in New York, and displays the weather information of New York on a user interface of phone 1720. The user subsequently provides a speech input 1761 such as "How about in Los Angeles?" to user device 1700. In some examples, the digital assistant of user device 1700 determines the user intent using context information stored at and/or shared by phone 1720, either directly or through a server. The context information includes, for example, historical user data associated with phone 1720, conversational state, system state, etc. Both the historical user data and conversational state indicate that user was inquiring about weather information. Accordingly, the digital assistant of user device 1700 determines that the user intent is to obtain the weather information in Los Angeles. Based on the user intent, the digital assistant of user device 1700 receives the weather information from, for example, a server, and provides a user interface 1751 displaying the weather information on user device 1710.

6. Exemplary Functions of a Digital Assistant—Voice-Enabled System Configuration Management FIGS. 18A-18F and 19A-19D illustrate functionalities of providing system configuration information or performing a task in response to a user request by a digital assistant. In some examples, the digital assistant system (e.g., digital assistant system 700) can be implemented by a user device according to various examples. In some examples, the user device, a server (e.g., server 108), or a combination thereof, may implement a digital assistant system (e.g., digital assistant system 700). The user device is implemented using, for example, device 104, 200, or 400. In some examples, the user device is a laptop computer, a desktop computer, or a tablet computer. The user device operates in a multi-tasking environment, such as a desktop environment.

With references to FIGS. 18A-18F and 19A-19D, in some examples, a user device provides various user interfaces (e.g., user interfaces 1810 and 1910). Similar to those described above, the user device displays the various user interfaces on a display and the various user interfaces enable the user to instantiate one or more processes (e.g., system configuration processes).

As shown in FIGS. 18A-18F and 19A-19D, similar to those described above, the user device displays, on a user interface (e.g., user interfaces 1810 and 1910), an affordance (e.g., affordance 1840 and 1940) to facilitate the instantiation of a digital assistant service.

Similar to those described above, in some examples, the digital assistant is instantiated in response to receiving a pre-determined phrase. In some examples, the digital assistant is instantiated in response to receiving a selection of the affordance.

With reference to FIGS. 18A-18F and 19A-19D, in some embodiments, a digital assistant receives one or more speech inputs, such as speech inputs 1852, 1854, 1856, 1858, 1860, 1862, 1952, 1954, 1956, and 1958 from a user. The user provides various speech inputs for the purpose of managing one or more system configurations of the user device. The system configurations can include audio configurations, date and time configurations, dictation configuration, display configurations, input device configurations, notification configurations, printing configurations, security configurations, backup configurations, application configurations, user interface configurations, or the like. To manage audio configurations, a speech input may include "Mute my microphone," "Turn the volume all the up," "Turn the volume up 10%," or the like. To manage date and time configurations, a speech input may include "What is my time zone?", "Change my time zone to Cupertino Time," "Add a clock for London time zone," or the like. To manage dictation configurations, a speech input may include "Turn on dictation," "Turn off dictation," "Dictation in Chinese," "Enable advanced commands," or the like. To manage display configurations, a speech input may include "Make my screen brighter," "Increase the contrast my 20%," "Extend my screen to a second monitor," "Mirror my display," or the like. To manage input device configurations, a speech input may include "Connect my Bluetooth keyboard," "Make my mouse pointer bigger," or the like. To manage network configurations, a speech input may include "Turn Wi-Fi on," "Turn Wi-Fi off," "Which Wi-Fi network am I connected to?", "Am I connected to my phone?", or the like. To manage notification configuration, a speech input may include "Turn on Do not Disturb," "Stop showing me these notifications," "Show only new emails," "No alert for text message," or the like. To manage printing configurations, a speech input may include "Does my printer have enough ink?", "Is my printer connected?", or the like. To manage security configurations, a speech input may include "Change password for John's account," "Turn on firewall," "Disable cookie," or the like. To manage backup configurations, a speech input may include "Run backup now," "Set backup interval to once a month," "Recover the July 4 backup of last year," or the like. To manage application configurations, a speech input may include "Change my default web browser to Safari," "Automatically log in to Messages application each time I sign in," or the like. To manage user interface configurations, a speech input may include "Change my desktop wallpapers," "Hide the dock," "Add Evernote to the Dock," or the like. Various examples of using speech inputs to manage system configurations are described below in more details.

Similar to those described above, in some examples, the digital assistant receives speech inputs directly from the user at the user device or indirectly through another electronic device that is communicatively connected to the user device.

With reference to FIGS. 18A-18F and 19A-19D, in some embodiments, the digital assistant identifies context information associated with the user device. The context information includes, for example, user-specific data, sensor data, and user device configuration data. In some examples, the user-specific data includes log information indicating user preferences, the history of user's interaction with the user device, or the like. For example, user-specific data indicates the last time the user's system was backed up; and that the user's preferences of a particular Wi-Fi network when several Wi-Fi networks are available or the like. In some examples, the sensor data includes various data collected by a sensor. For example, the sensor data indicates a printer ink level collected by a printer ink level sensor. In some examples, the user device configuration data includes the current and historical device configurations. For example, the user device configuration data indicates that the user device is currently communicatively connected to one or more electronic devices using Bluetooth connections. The electronic devices may include, for example, a smartphone, a set-top box, a tablet, or the like. As described in more detail below, the user device can determine user intent and/or perform one or more processes using the context information.

With reference to FIGS. 18A-18F and 19A-19D, similar to those described above, in response to receiving a speech input, the digital assistant determines a user intent based on the speech input. The digital assistant determines the user intent based on a result of natural language processing. For example, the digital assistant identifies an actionable intent based on the user input, and generates a structured query to represent the identified actionable intent. The structured query includes one or more parameters associated with the actionable intent. The one or more parameters can be used to facilitate the performance of a task based on the actionable intent. For example, based on a speech input such as "Turn the volume up by 10%," the digital assistant determines that the actionable intent is to adjust the system volume, and the parameters include setting the volume to be 10% higher than the current volume level. In some embodiments, the digital assistant also determines the user intent based on the speech input and context information. For example, the context information may indicate that the current volume of the user device is at 50%. As a result, upon receiving the speech input such as "Turn the volume up by 10%," the digital assistant determines that the user intent is to increase the volume level to 60%. Determining the user intent based on speech input and context information is described in more detail below in various examples.

In some embodiments, the digital assistant further determines whether the user intent indicates an informational request or a request for performing a task. Various examples of the determination are provided below in more detail with respect to FIGS. 18A-18F and 19A-19D.

Figure 18A:
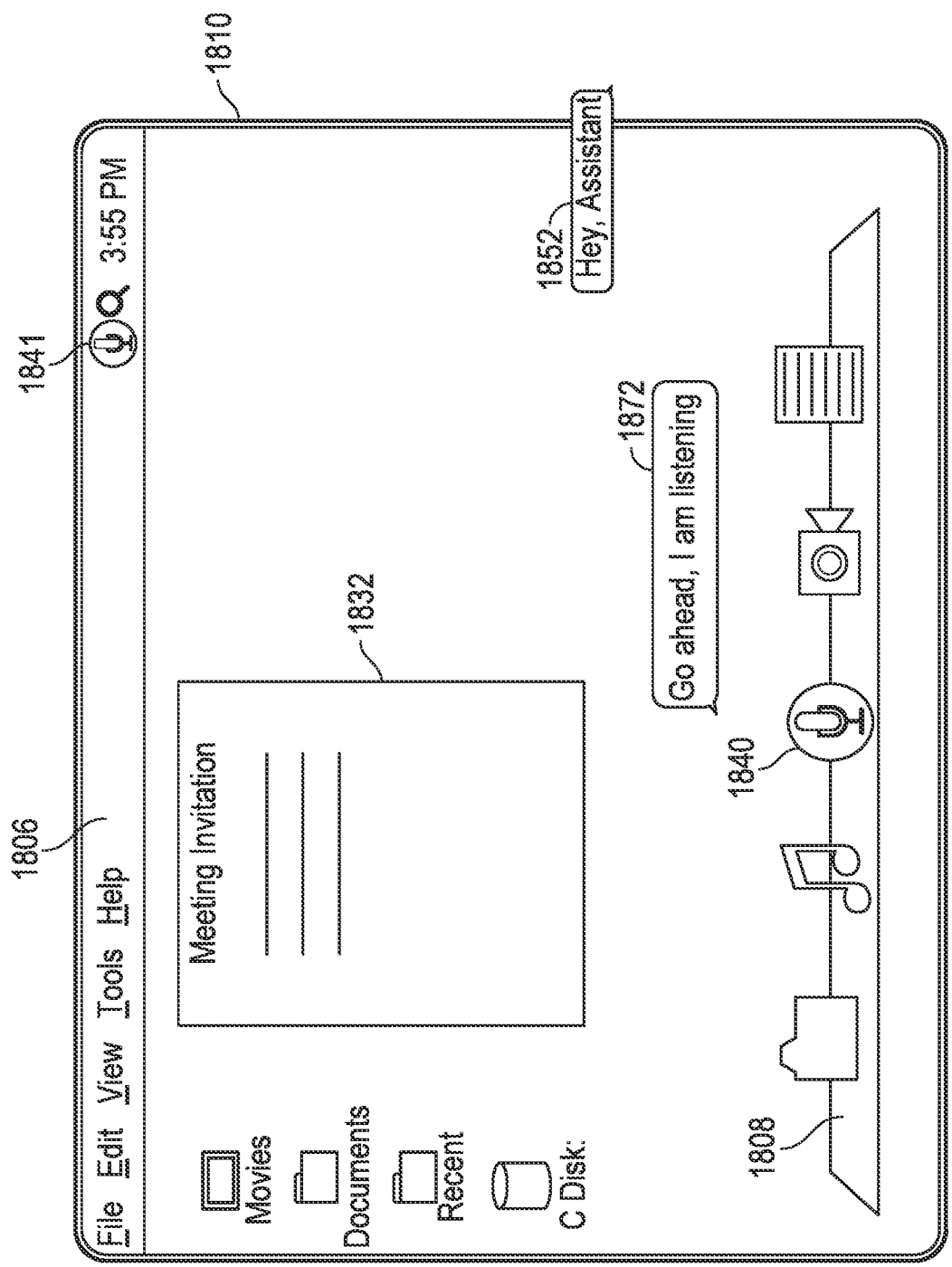
FIGS. 18A-18F illustrate functionalities of providing system configuration information in response to an informational request of the user by a digital assistant according to various examples.

With reference to FIG. 18A, in some examples, the user device displays a user interface 1832 associated with performing a task. For example, the task includes composing a meeting invitation. In composing the meeting invitation, the user may desire to know the time zone of the user device so that the meeting invitation can be properly composed. In some examples, the user provides a speech input 1852 to invoke the digital assistant represented by affordance 1840 or 1841. Speech input 1852 includes, for example, "Hey, Assistant." The user device receives the speech input 1852 and, in response, invokes the digital assistant such that the digital assistant actively monitors subsequent speech inputs. In some examples, the digital assistant provides a spoken output 1872 indicating that it is invoked. For example, spoken output 1872 includes "Go ahead, I am listening."

Figure 18B:
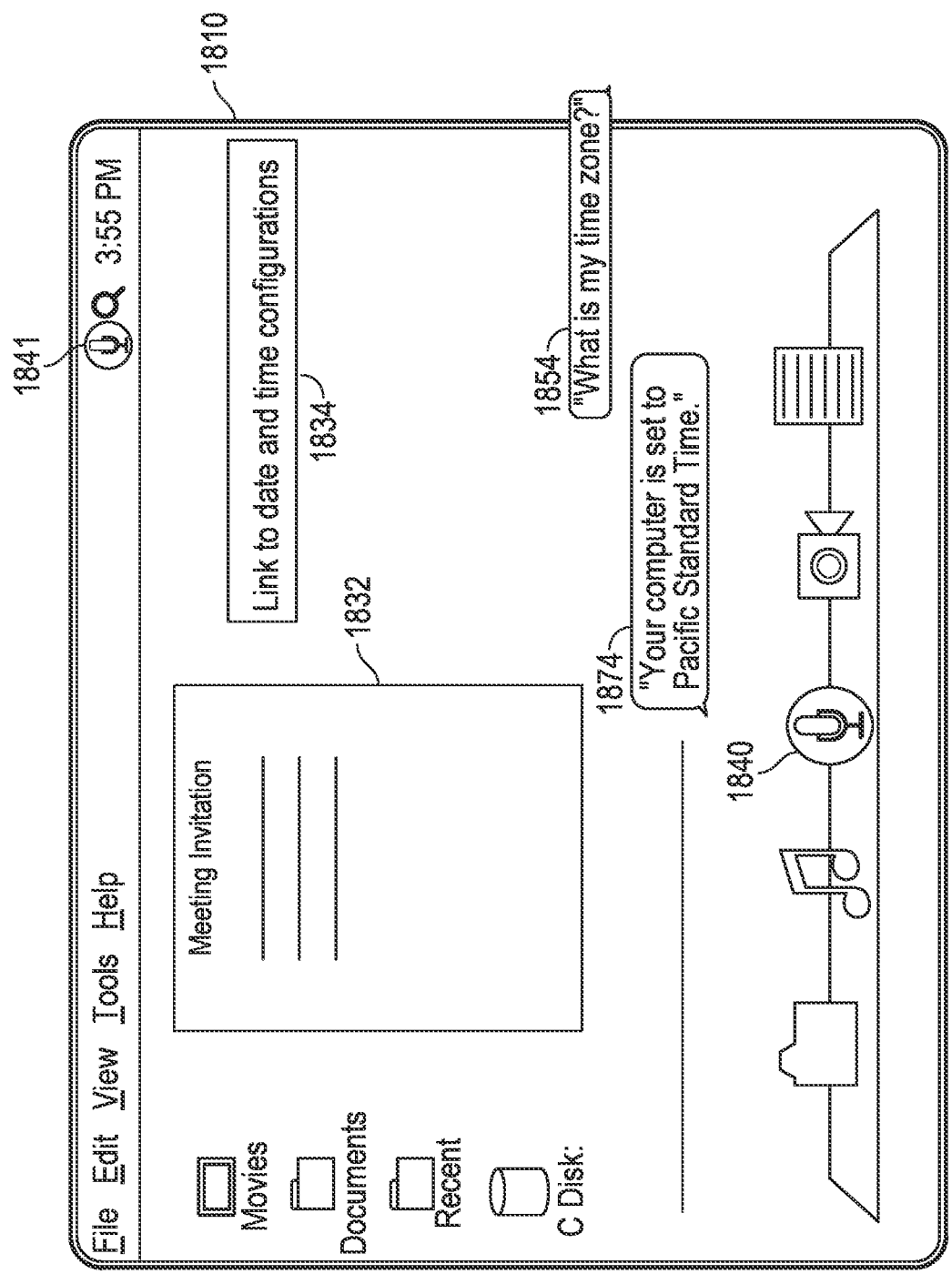

With reference to FIG. 18B, in some examples, the user provides a speech input 1854 such as "What is my time zone?" The digital assistant determines that the user intent is to obtain the time zone of the user device. The digital assistant further determines whether the user intent indicates an informational request or a request for performing a task. In some examples, determining whether the user intent indicates an informational request or a request for performing a task includes determining whether the user intent is to vary a system configuration. For example, based on the determination that the user intent is to obtain the time zone of the user device, the digital assistant determines that no system configuration is to be varied. As a result, the digital assistant determines that the user intent indicates an informational request.

In some embodiments, in accordance with a determination that the user intent indicates an informational request, the digital assistant provides a spoken response to the informational request. In some examples, the digital assistant obtains status of one or more system configurations according to the informational request, and provides the spoken response according to the status of one or more system configurations. As shown in FIG. 18B, the digital assistant determines that the user intent is to obtain the time zone of the user device, and this user intent indicates an informational request. Accordingly, the digital assistant obtains the time zone status from the time and date configuration of the user device. The time zone status indicates, for example, the user device is set to the Pacific time zone. Based on the time zone status, the digital assistant provides a spoken output 1874 such as "Your computer is set to Pacific Standard Time." In some examples, the digital assistant further provides a link associated with the informational request. As illustrated in FIG. 18B, the digital assistant provides a link 1834, enabling the user to further manage the data and time configurations. In some examples, the user uses an input device (e.g., a mouse) to select link 1834. Upon receiving the user's selection of link 1834, the digital assistant instantiates a date and time configuration process and displays an associated date and time configuration user interface. The user can thus use the date and time configuration user interface to further manage the date and time configurations.

Figure 18C:
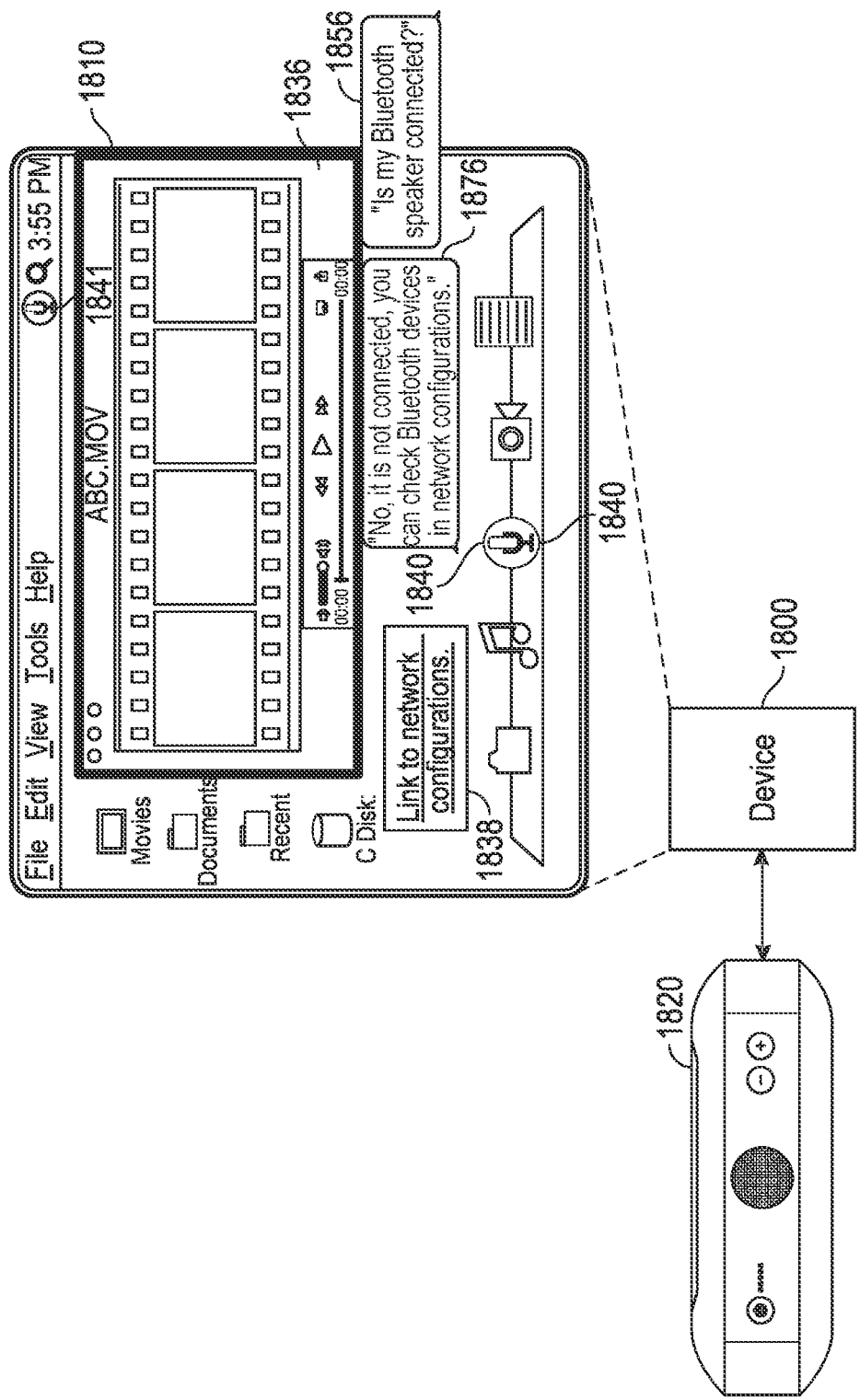

With reference to FIG. 18C, in some examples, the user device displays a user interface 1836 associated with performing a task. For example, the task includes playing a video (e.g., ABC.mov). To enhance the experience of watching the video, the user may desire to use a speaker and may want to know whether a Bluetooth speaker is connected. In some examples, the user provides a speech input 1856 such as "Is my Bluetooth speaker connected?" The digital assistant determines that the user intent is to obtain the connection status of the Bluetooth speaker 1820. The digital assistant further determines that obtaining the connection status of the Bluetooth speaker 1820 does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18C, the digital assistant obtains the connection status from the network configuration of the user device. The connection status indicates, for example, user device 1800 is not connected to a Bluetooth speaker 1820. Based on the connection status, the digital assistant provides a spoken output 1876 such as "No, it is not connected, you can check Bluetooth devices in the network configurations." In some examples, the digital assistant further provides a link associated with the informational request. As illustrated in FIG. 18C, the digital assistant provides a link 1838, enabling the user to further manage the network configurations. In some examples, the user uses an input device (e.g., a mouse) to select link 1838. Upon receiving the user's selection of link 1838, the digital assistant instantiates a network configuration process and displays an associated network configuration user interface.

The user can thus use the network configuration user interface to further manage the network configurations.

Figure 18D:
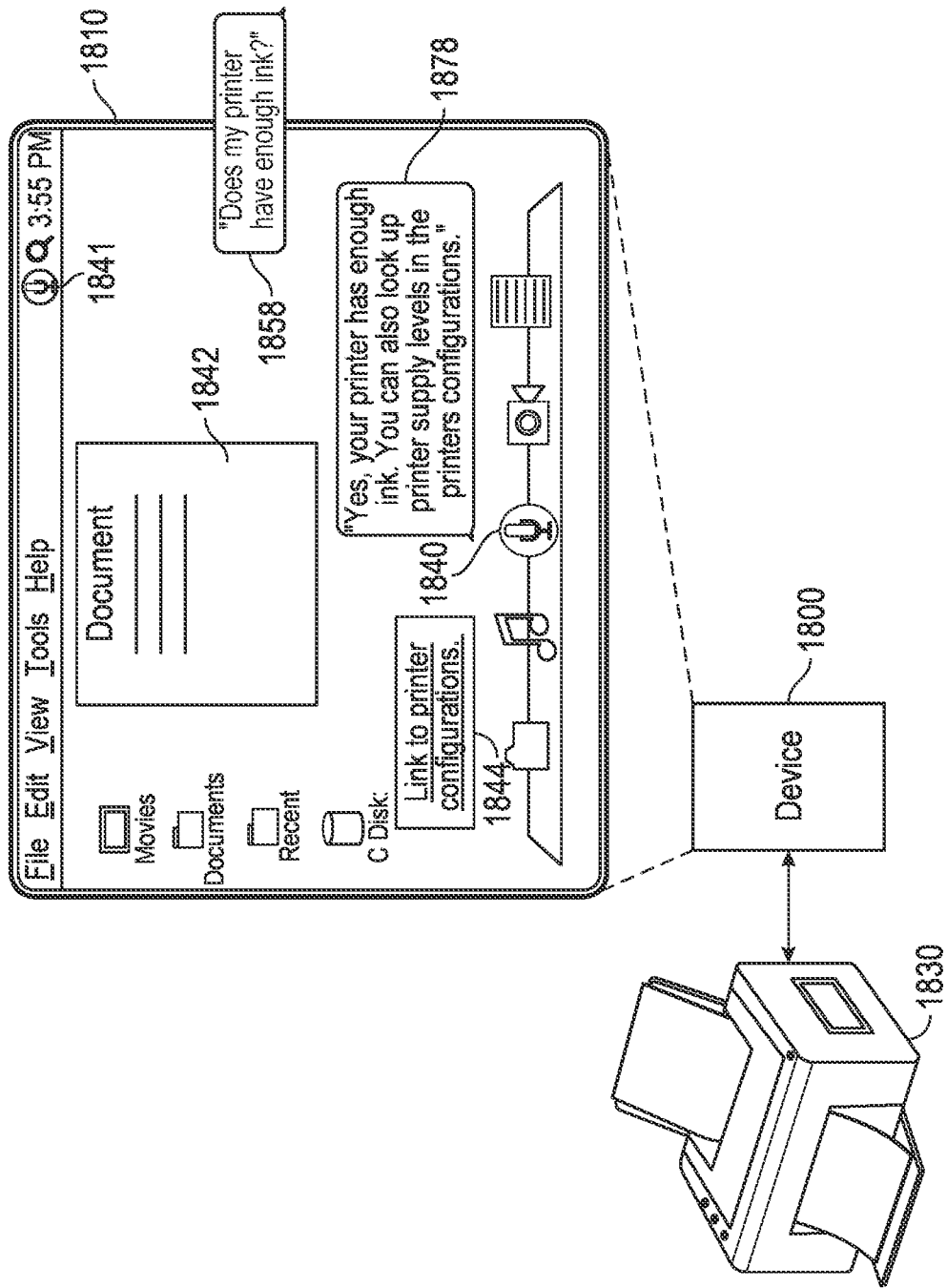

With reference to FIG. 18D, in some examples, the user device displays a user interface 1842 associated with performing a task. For example, the task includes viewing and/or editing a document. The user may desire to print out the document and may want to know whether a printer 1830 has enough ink for the printing job. In some examples, the user provides a speech input 1858 such as "Does my printer have enough ink?" The digital assistant determines that the user intent is to obtain printer ink level status of the printer. The digital assistant further determines that the obtaining the printer level status does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18D, the digital assistant obtains the printer ink level status from the printing configuration of the user device. The printer ink level status indicates, for example, the printer ink level of printer 1830 is at 50%. Based on the connection status, the digital assistant provides a spoken output 1878 such as "Yes, your printer has enough ink. You can also look up printer supply levels in the printer configurations." In some examples, the digital assistant further provides a link associated with the informational request. As illustrated in FIG. 18D, the digital assistant provides a link 1844, enabling the user to further manage the printer configurations. In some examples, the user uses an input device (e.g., a mouse) to select link 1844. Upon receiving the user's selection of the link, the digital assistant instantiates a printer configuration process and displays an associated printer configuration user interface. The user can thus use the printer configuration user interface to further manage the printer configurations.

Figure 18E:
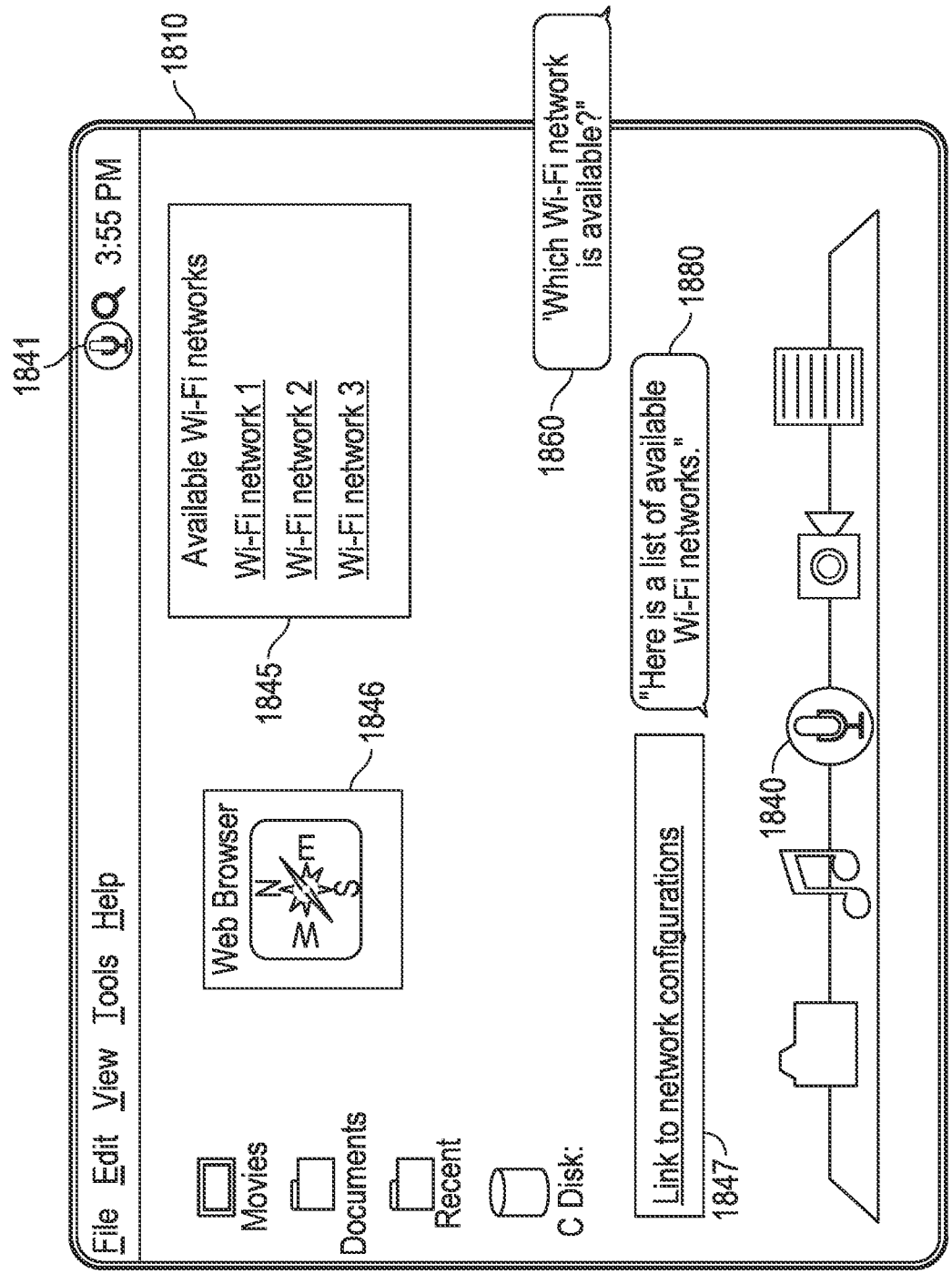

With reference to FIG. 18E, in some examples, the user device displays a user interface 1846 associated with performing a task. For example, the task includes browsing Internet using a web browser (e.g., Safari). To browse the Internet, the user may desire to know available Wi-Fi networks and select one Wi-Fi network to connect. In some examples, the user provides a speech input 1860 such as "Which Wi-Fi networks are available?" The digital assistant determines that the user intent is to obtain a list of available Wi-Fi networks. The digital assistant further determines that obtaining the list of available Wi-Fi networks does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18E, the digital assistant obtains status of currently available Wi-Fi networks from the network configuration of the user device. The status of currently available Wi-Fi networks indicates, for example, Wi-Fi network 1, Wi-Fi network 2, and Wi-Fi network 3 are available. In some examples, the status further indicates the signal strength of each of the Wi-Fi networks. The digital assistant displays a user interface 1845 providing information according to the status. For example, user interface 1845 provides the list of available Wi-Fi networks. The digital assistant also provides a spoken output 1880 such as "Here is a list of available Wi-Fi networks." In some examples, the digital assistant further provides a link associated with the informational request. As illustrated in FIG. 18E, the digital assistant provides a link 1847, enabling the user to further manage the network configurations. In some examples, the user uses an input device (e.g., a mouse) to select link 1847. Upon receiving the user's selection of the link 1847, the digital assistant instantiates a network configuration process and displays an associated network configuration user interface. The user can thus use the network configuration user interface to further manage the configurations.

Figure 18F:
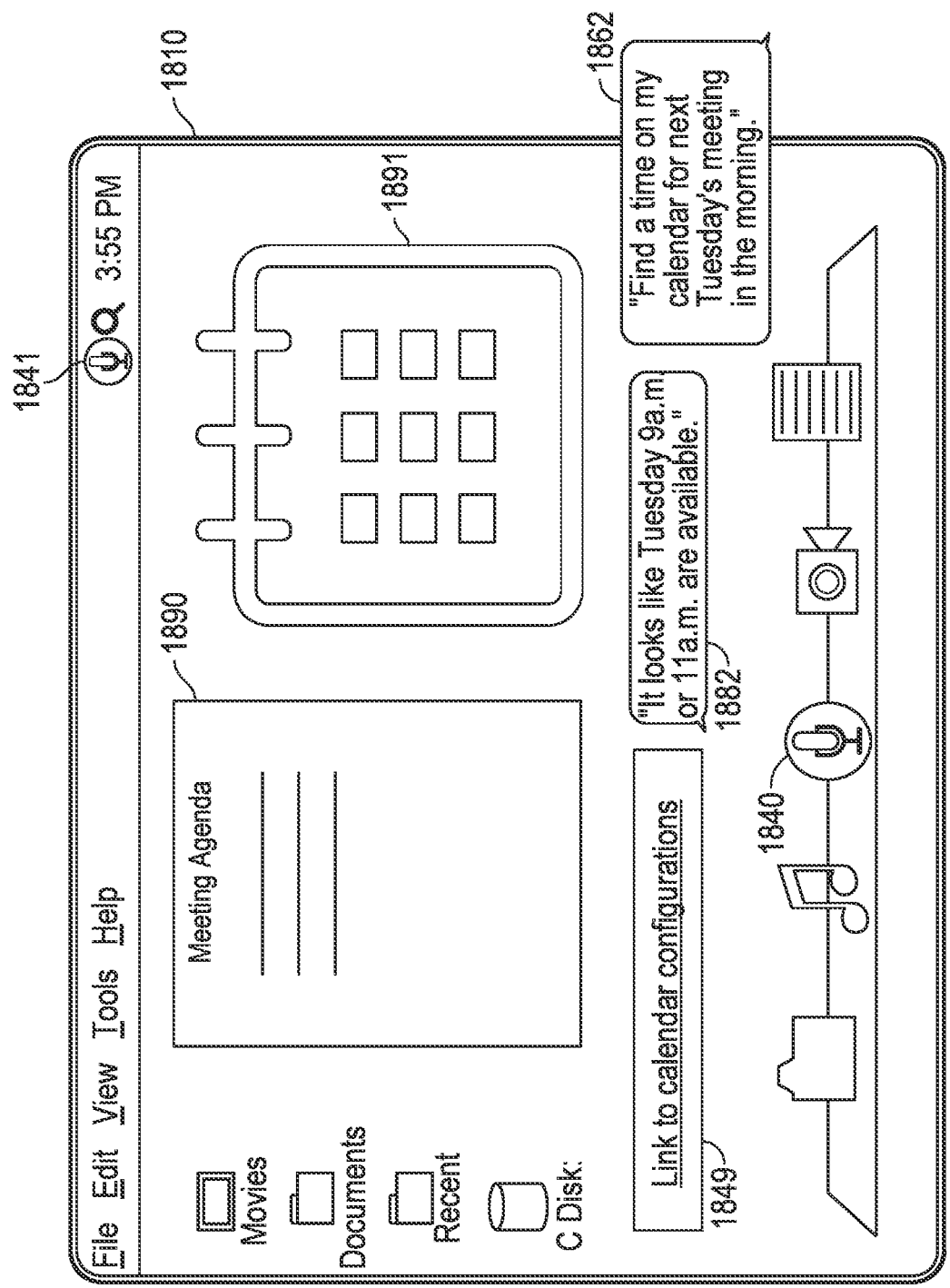

With reference to FIG. 18F, in some examples, the user device displays a user interface 1890 associated with performing a task. For example, the task includes preparing a meeting agenda. In preparing a meeting agenda, the user may desire to find a date and time for the meeting. In some examples, the user provides a speech input 1862 such as "Find a time on my calendar for next Tuesday's meeting in the morning." The digital assistant determines that the user intent is to find an available time slot on the user's calendar on Tuesday morning. The digital assistant further determines that finding a time slot does not vary any system configuration and therefore is an informational request.

In some embodiments, in accordance with a determination that the user intent indicates an informational request, the digital assistant obtains status of system configurations according to the informational request, and provides the spoken response according to the status of the system configurations. As shown in FIG. 18F, the digital assistant obtains status of user's calendar from calendar configurations. The status of user's calendar indicates, for example, 9a.m. or 11a.m. on Tuesday is still available. The digital assistant displays a user interface 1891 providing information according to the status. For example, user interface 1891 provides the user's calendar in the proximity of the date and time the user requested. In some examples, the digital assistant also provides a spoken output 1882 such as "It looks like Tuesday 9a.m. or 11 a.m is available." In some examples, the digital assistant further provides a link associated with the informational request. As illustrated in FIG. 18F, the digital assistant provides a link 1849, enabling the user to further manage the calendar configurations. In some examples, the user uses an input device (e.g., a mouse) to select link 1849. Upon receiving the user's selection of link 1849, the digital assistant instantiates a calendar configuration process and displays an associated calendar configuration user interface. The user can thus use the calendar configuration user interface to further manage the configurations.

Figure 19A:
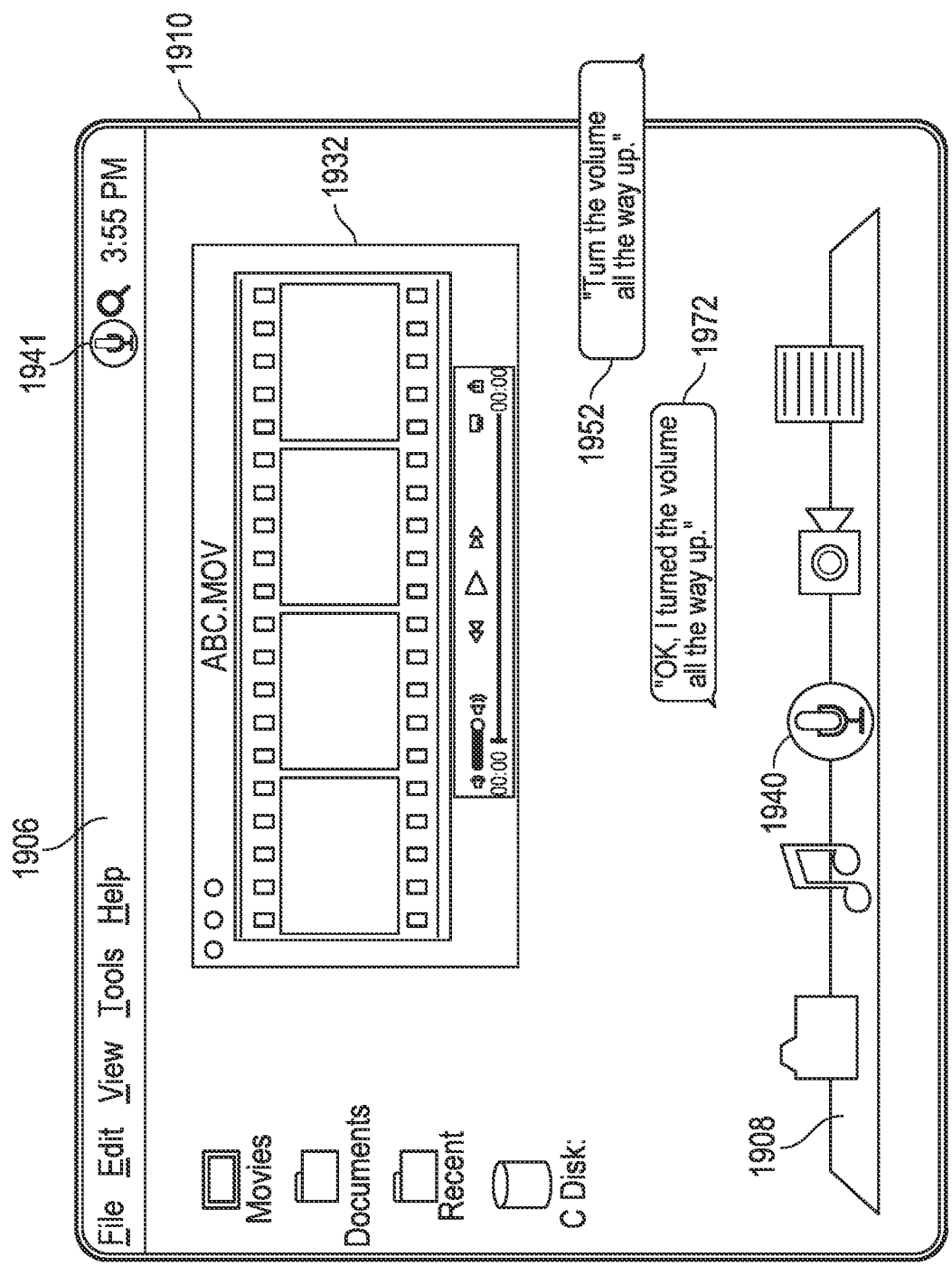
FIGS. 19A-19D illustrate functionalities of performing a task in response to a user request by a digital assistant according to various examples.

With reference to FIG. 19A, the user device displays a user interface 1932 associated with performing a task. For example, the task includes playing a video (e.g., ABC.mov). While the video is playing, the user may desire to turn up the volume. In some examples, the user provides a speech input 1952 such as "Turn the volume all the way up." The digital assistant determines that the user intent is to increase the volume to its maximum level. The digital assistant further determines whether the user intent indicates an informational request or a request for performing a task. For example, based on the determination that the user intent is to increase the volume of the user device, the digital assistant determines that an audio configuration is to be varied, and therefore the user intent indicates a request for performing a task.

In some embodiments, in accordance with a determination that the user intent indicates a request for performing a task, the digital assistant instantiates a process associated with the user device to perform the task. Instantiating a process includes invoking the process if the process is not already running. If at least one instance of the process is running, instantiating a process includes executing an existing instance of the process or generating a new instance of the process. For example, instantiating an audio configuration process includes invoking the audio configuration process, using an existing audio configuration process, or generating a new instance of the audio configuration process. In some examples, instantiating a process includes performing the task using the process. For example, as illustrated in FIG. 19A, in accordance with the user intent to increase the volume to its maximum level, the digital assistant instantiates an audio configuration process to set the volume to its maximum level. In some examples, the digital assistant further provides a spoken output 1972 such as "OK, I turned the volume all the way up."

Figure 19B:
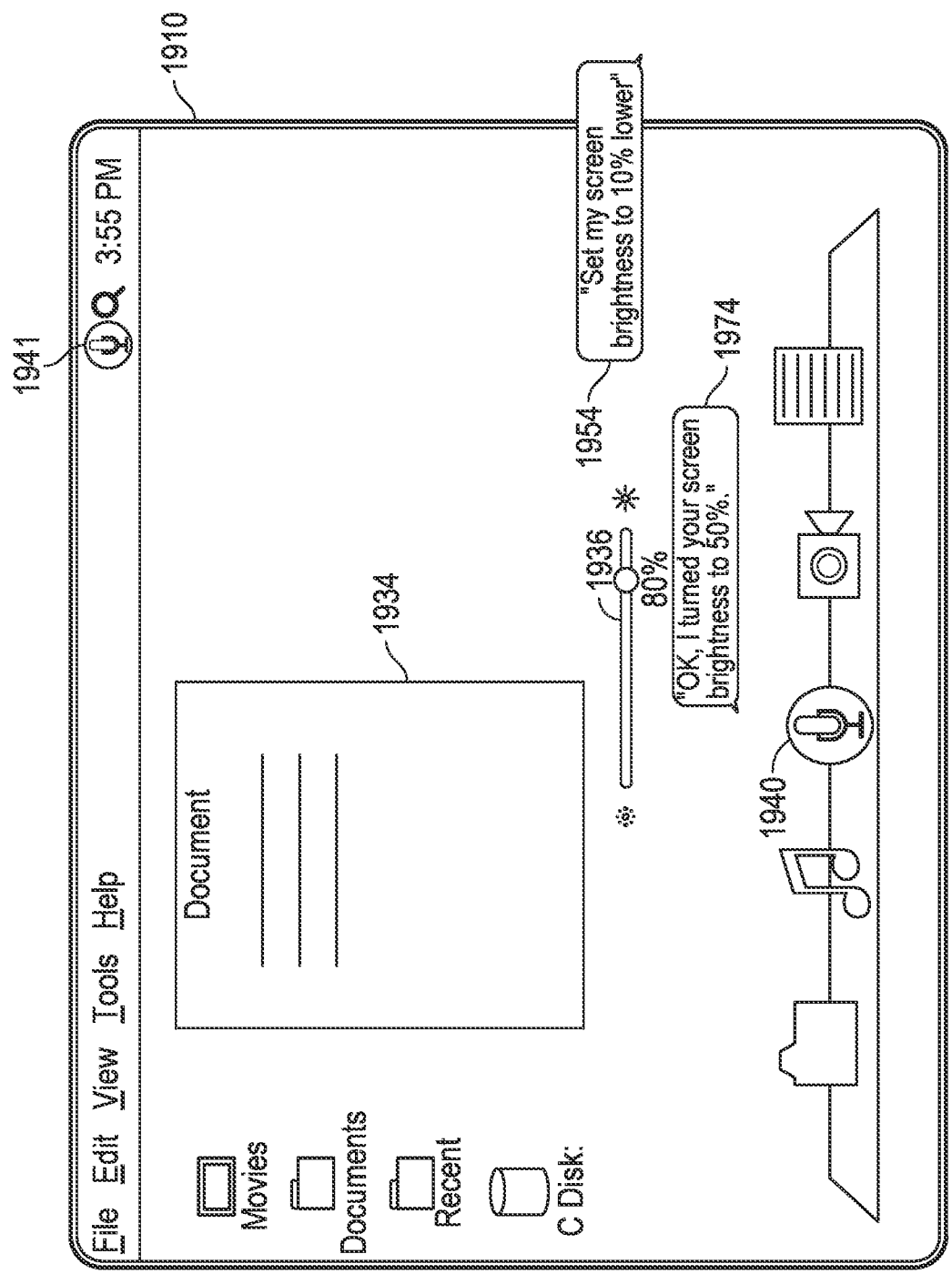

With reference to FIG. 19B, the user device displays a user interface 1934 associated with performing a task. For example, the task includes viewing or editing a document. The user may desire to lower the screen brightness for eye protection. In some examples, the user provides a speech input 1954 such as "Set my screen brightness to 10% lower." The digital assistant determines the user intent based on speech input 1954 and context information. For example, context information indicates that the current brightness configuration is at 90%. As a result, the digital assistant determines that the user intent is to reduce the brightness level from 90% to 80%. The digital assistant further determines whether the user intent indicates an informational request or a request for performing a task. For example, based on the determination that the user intent is to change the screen brightness to 80%, the digital assistant determines that a display configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19B, in accordance with the user intent to change the brightness level, the digital assistant instantiates a display configuration process to reduce the brightness level to 80%. In some examples, the digital assistant further provides a spoken output 1974 such as "OK, I turned your screen brightness to 80%." In some examples, as illustrated in FIG. 19B, the digital assistant provides an affordance 1936 enabling the user to manipulate a result of performing the task. For example, affordance 1936 can be a sliding bar allowing the user to further change the brightness level.

Figure 19C:
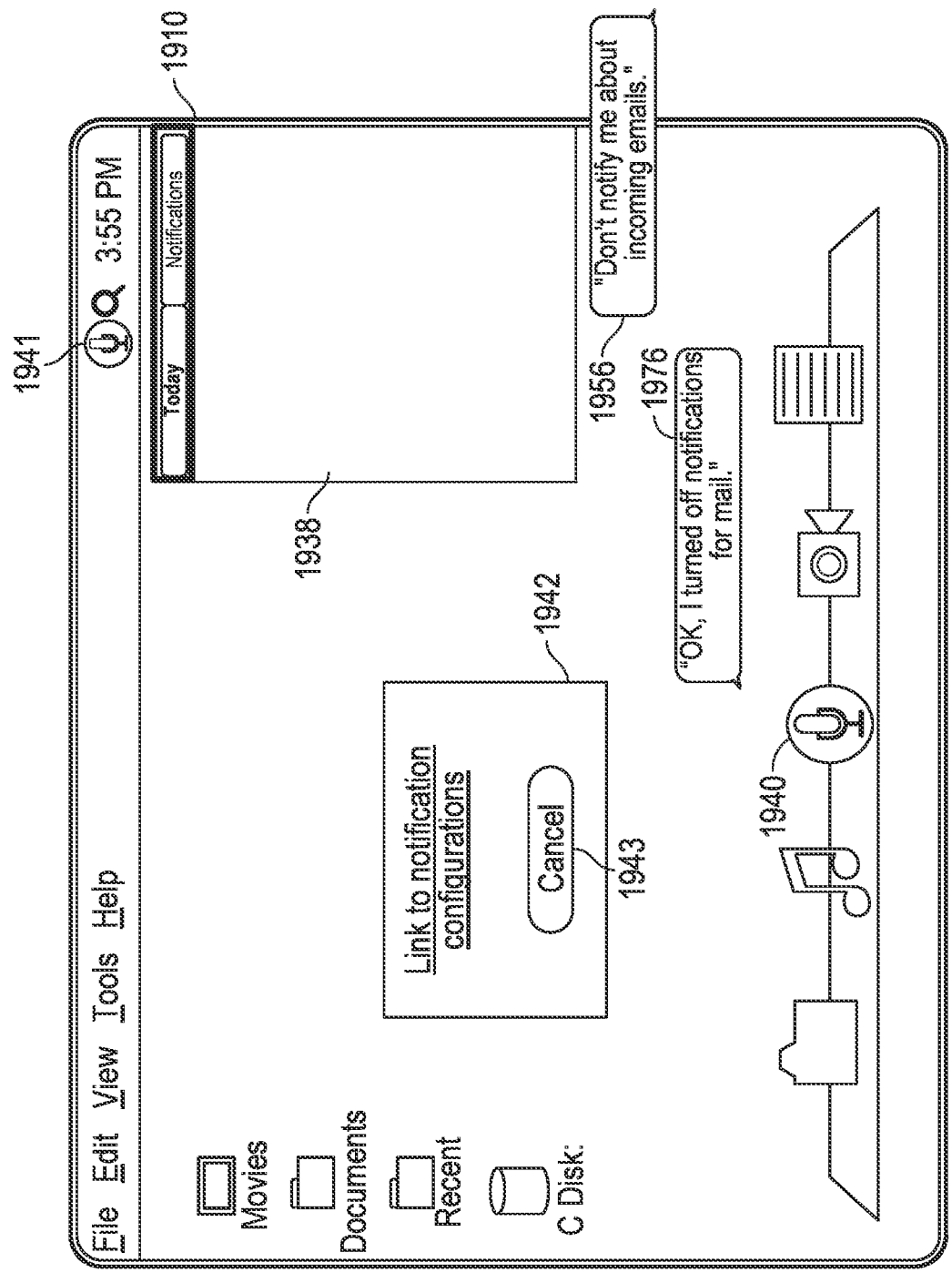

With reference to FIG. 19C, the user device displays a user interface 1938 associated with performing a task. For example, the task includes providing one or more notifications. A notification can include an alert of an email, a message, a reminder, or the like. In some examples, notifications are provided in user interface 1938. A notification can be displayed or provided to the user in real time or shortly after it is available at the user device. For example, a notification appears on user interface 1938 and/or user interface 1910 shorted after the user device receives it. Sometimes, the user may be performing an important task (e.g., editing a document) and may not want to be disturbed by the notifications. In some examples, the user provides a speech input 1956 such as "Don't notify me about incoming emails." The digital assistant determines that the user intent is to turn off the alert of emails. Based on the determination that the user intent is to turn off the alert of incoming emails, the digital assistant determines that a notification configuration is to be varied, and therefore the user intent indicates a request for performing a task.

In some embodiments, in accordance with a determination that the user intent indicates a request for performing a task, the digital assistant instantiates a process to perform the task. For example, as illustrated in FIG. 19C, in accordance with the user intent, the digital assistant instantiates a notification configuration process to turn off the alert of emails. In some examples, the digital assistant further provides a spoken output 1976 such as "OK, I turned off notifications for mail." In some examples, as illustrated in FIG. 19C, the digital assistant provides a user interface 1942 (e.g., a snippet or a window) enabling the user to manipulate a result of performing the task. For example, user interface 1942 provides an affordance 1943 (e.g., a cancel button). If the user desires to continue receiving notification of emails, for example, the user can select affordance 1943 to turn the notifications of emails back on. In some examples, the user can also provide another speech input, such as "Notify me of incoming emails" to turn on the notification of emails.

Figure 19D:
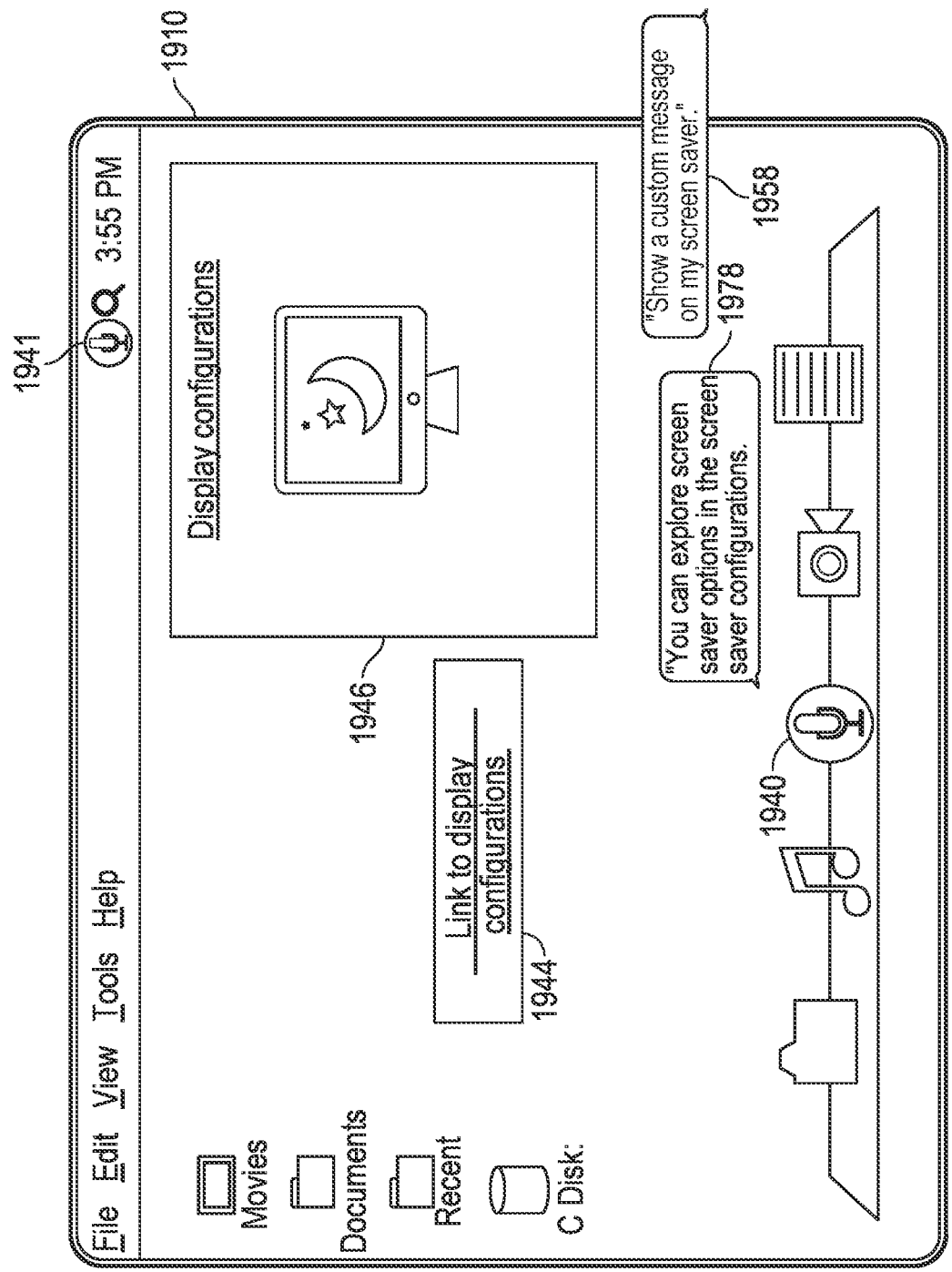

With reference to FIG. 19D, in some embodiments, the digital assistant may not be able to complete a task based on user's speech input and can thus provide a user interface to enable the user to perform the task. As shown in FIG. 19D, in some examples, the user provides a speech input 1958 such as "Show a custom message on my screen saver." The digital assistant determines that the user intent is to change the screen saver settings to show a custom message. The digital assistant further determines that the user intent is to vary a display configuration, and therefore the user intent indicates a request for performing a task.

In some embodiments, in accordance with a determination that the user intent indicates a request for performing a task, the digital assistant instantiates a process associated with the user device to perform the task. In some examples, if the digital assistant cannot complete the task based on the user intent, it provides a user interface enabling the user to perform the task. For example, based on speech input 1958, the digital assistant may not be able to determine the content of the custom message that is to be shown on the screen saver and therefore cannot complete the task of displaying the custom message. As illustrated in FIG. 19D, in some examples, the digital assistant instantiates a display configuration process and provides a user interface 1946 (e.g., a snippet or a window) to enable the user to manually change the screen saver settings. As another example, the digital assistant provides a link 1944 (e.g., a link to the display configurations) enabling the user to perform the task. The user selects link 1944 by using an input device such as a mouse, a finger, or a stylus. Upon receiving the user's selection, the digital assistant instantiates a display configuration process and displays user interface 1946 to enable the user to change the screen saver settings. In some examples, the digital assistant further provides a spoken output 1978 such as "You can explore screen saver options in the screen saver configurations."

7. Process for Operating a Digital Assistant—Intelligent Search and Object Management.

FIGS. 20A-20G illustrate a flow diagram of an exemplary process 2000 for operating a digital assistant in accordance with some embodiments. Process 2000 may be performed using one or more devices 104, 108, 200, 400, or 600 (FIG. 1, 2A, 4, or 6A-6B). Operations in process 2000 are, optionally, combined or split, and/or the order of some operations is, optionally, changed.

Figure 20A:
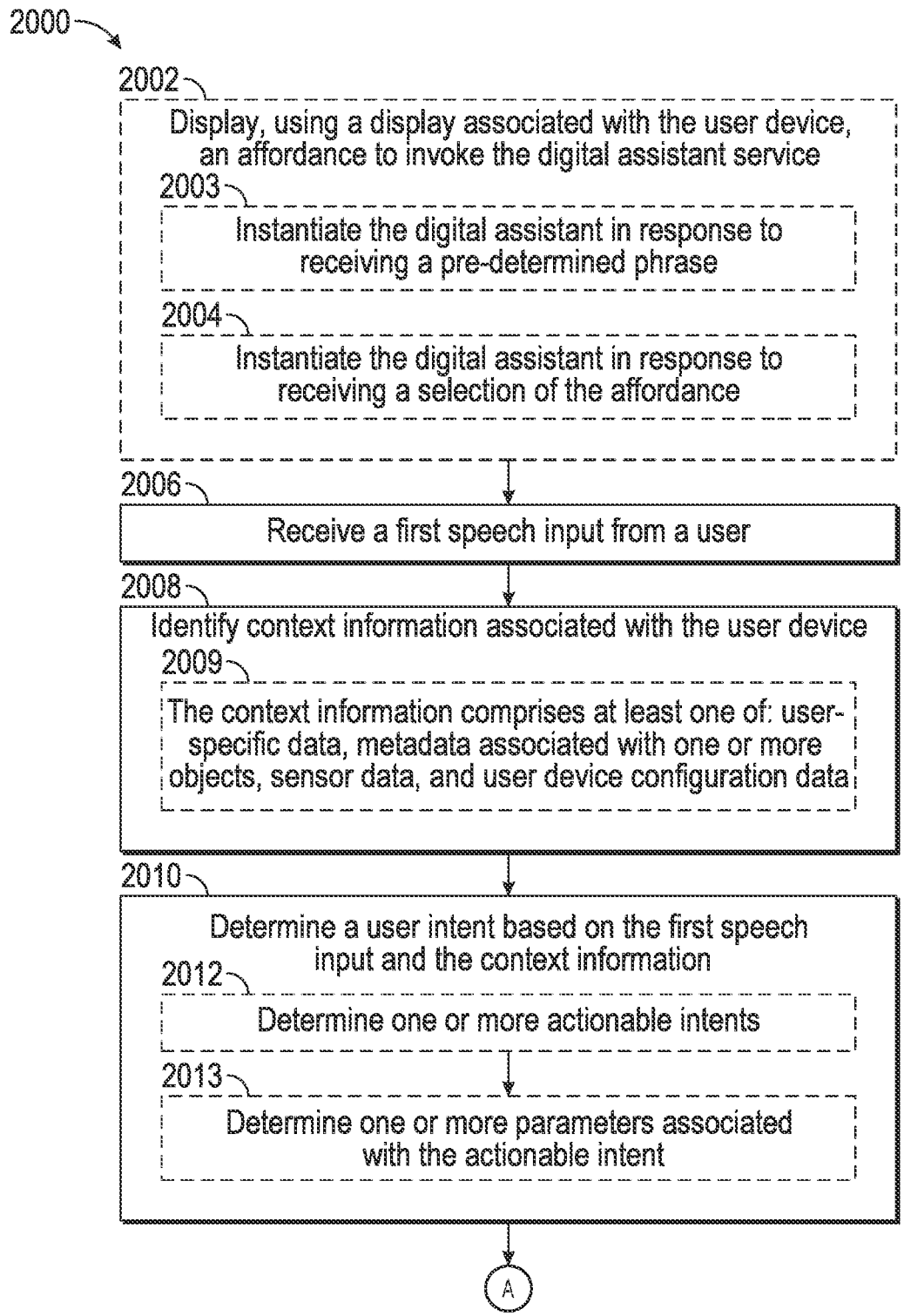
FIGS. 20A-20G illustrate a flow diagram of an exemplary process for operating a digital assistant according to various examples.

With reference to FIG. 20A, at block 2002, prior to receiving a first speech input, an affordance to invoke a digital assistant service is displayed on a display associated with a user device. At block 2003, the digital assistant is invoked in response to receiving a pre-determined phrase. At block 2004, the digital assistant is invoked in response to receiving a selection of the affordance.

At block 2006, a first speech input is received from a user. At block 2008, context information associated with the user device is identified. At block 2009, the context information includes at least one of: user-specific data, metadata associated with one or more objects, sensor data, and user device configuration data.

At block 2010, a user intent is determined based on the first speech input and the context information. At block 2012, to determine the user intent, one or more actionable intents are determined. At block 2013, one or more parameters associated with the actionable intent are determined.

Figure 20B:
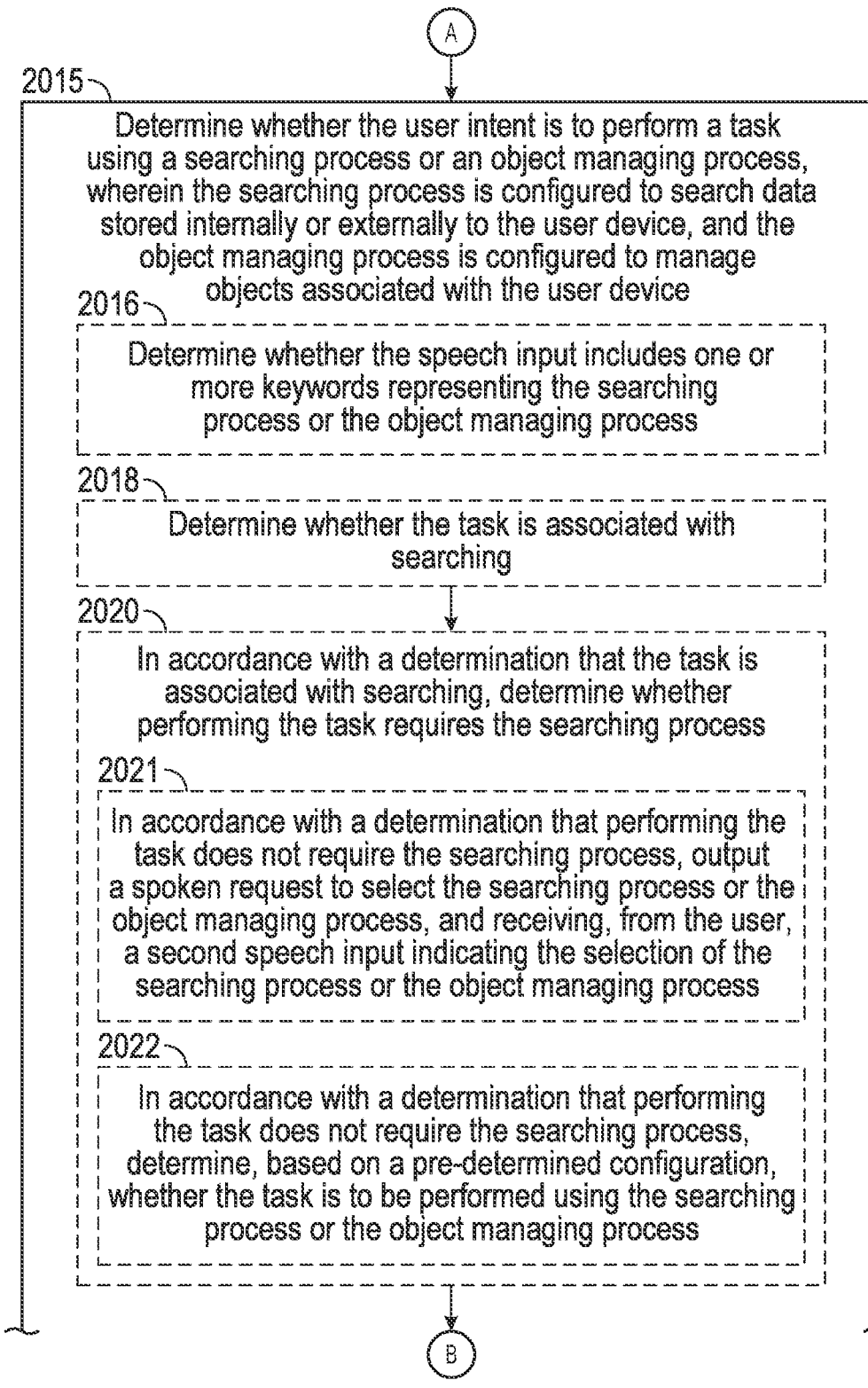

With reference to FIG. 20B, at block 2015, it is determined whether the user intent is to perform a task using a searching process or an object managing process. The searching process is configured to search data stored internally or externally to the user device, and the object managing process is configured to manage objects associated with the user device. At block 2016, it is determined whether the speech input includes one or more keywords representing the searching process or the object managing process. At block 2018, it is determined whether the task is associated with searching. At block 2020, in accordance with a determination that the task is associated with searching, it is determined whether performing the task requires the searching process. At block 2021, in accordance with a determination that performing the task does not require the searching process, a spoken request to select the searching process or the object managing process is outputted, and a second speech input is received from the user. The second speech input indicates the selection of the searching process or the object managing process.

At block 2022, in accordance with a determination that performing the task does not require the searching process, it is determined, based on a pre-determined configuration, whether the task is to be performed using the searching process or the object managing process.

Figure 20C:
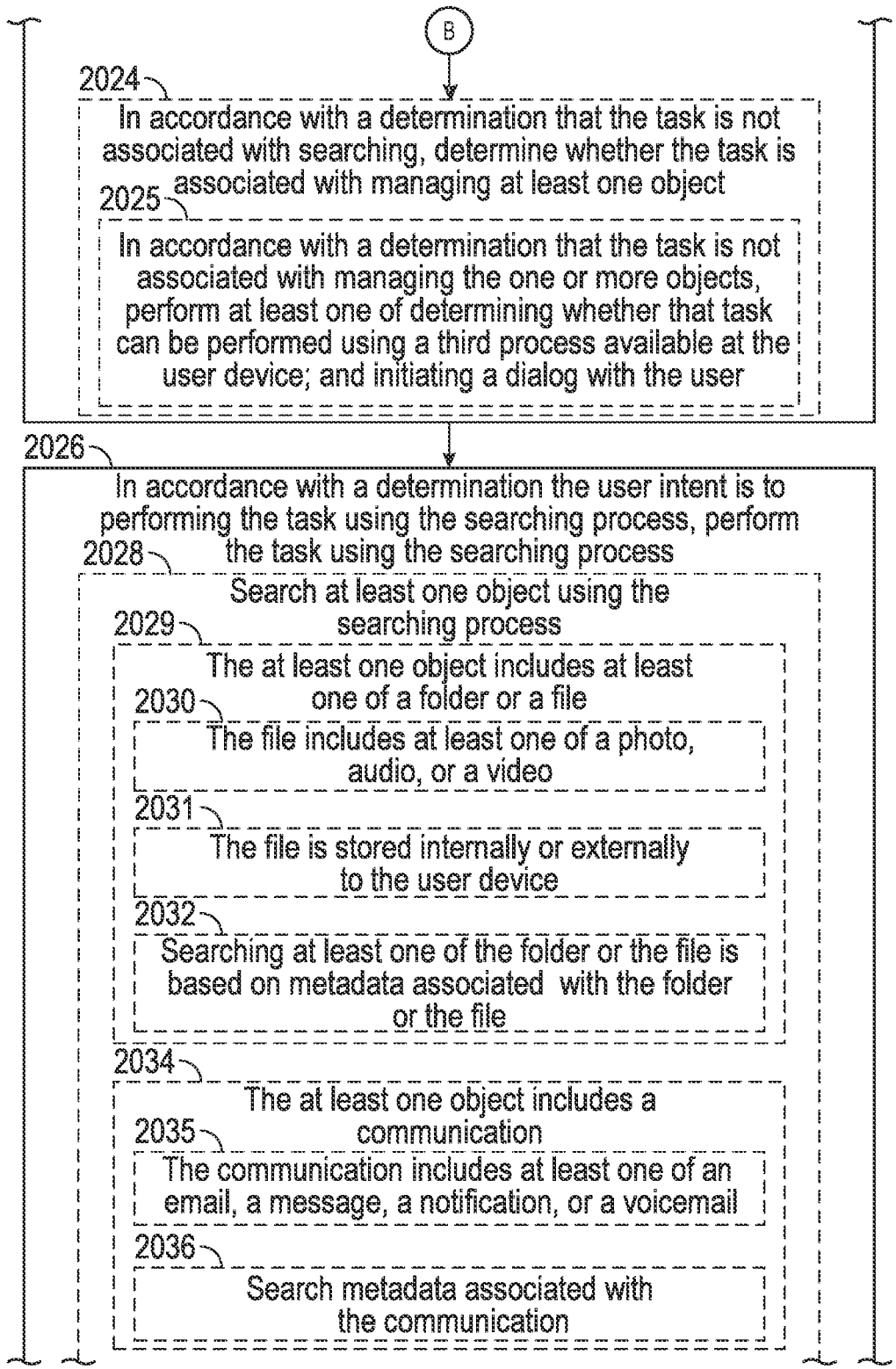

With reference to FIG. 20C, at block 2024, in accordance with a determination that the task is not associated with searching, it is determined whether the task is associated with managing at least one object. At block 2025, in accordance with a determination that the task is not associated with managing the at least one object, at least one of the following is performed: determining whether that task can be performed using a fourth process available to the user device and initiating a dialog with the user.

At block 2026, in accordance with a determination the user intent is to perform the task using the searching process, the task is performed using the searching process. At block 2028, at least one object is searched using the searching process. At block 2029, the at least one object includes at least one of a folder or a file. At block 2030, the file includes at least one of a photo, audio, or a video. At block 2031, the file is stored internally or externally to the user device. At block 2032, searching at least one of the folder or the file is based on metadata associated with the folder or the file. At block 2034, the at least one object includes a communication. At block 2035, the communication includes at least one of an email, a message, a notification, or a voicemail. At block 2036, metadata associated with the communication is searched.

Figure 20D:
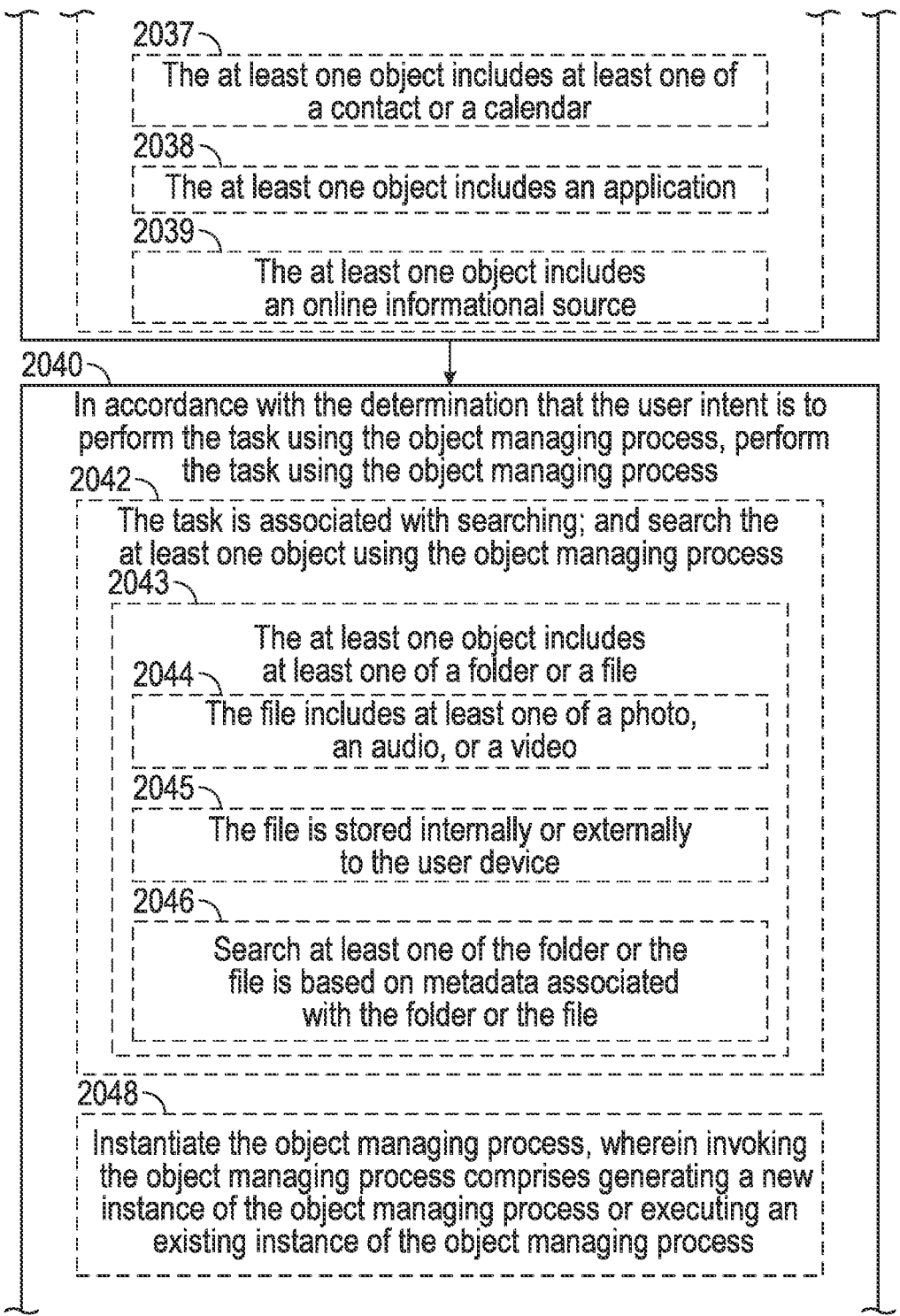

With reference to FIG. 20D, at block 2037, the at least one object includes at least one of a contact or a calendar. At block 2038, the at least one object includes an application. At block 2039, the at least one object includes an online informational source.

At block 2040, in accordance with the determination that the user intent is to perform the task using the object managing process, the task is performed using the object managing process. At block 2042, the task is associated with searching, and the at least one object is searched using the object managing process. At block 2043, the at least one object includes at least one of a folder or a file. At block 2044, the file includes at least one of a photo, an audio, or a video. At block 2045, the file is stored internally or externally to the user device. At block 2046, searching at least one of the folder or the file is based on metadata associated with the folder or the file.

At block 2048, the object managing process is instantiated. Instantiating the object managing process includes invoking the object managing process, generating a new instance of the object managing process, or executing an existing instance of the object managing process.

Figure 20E:
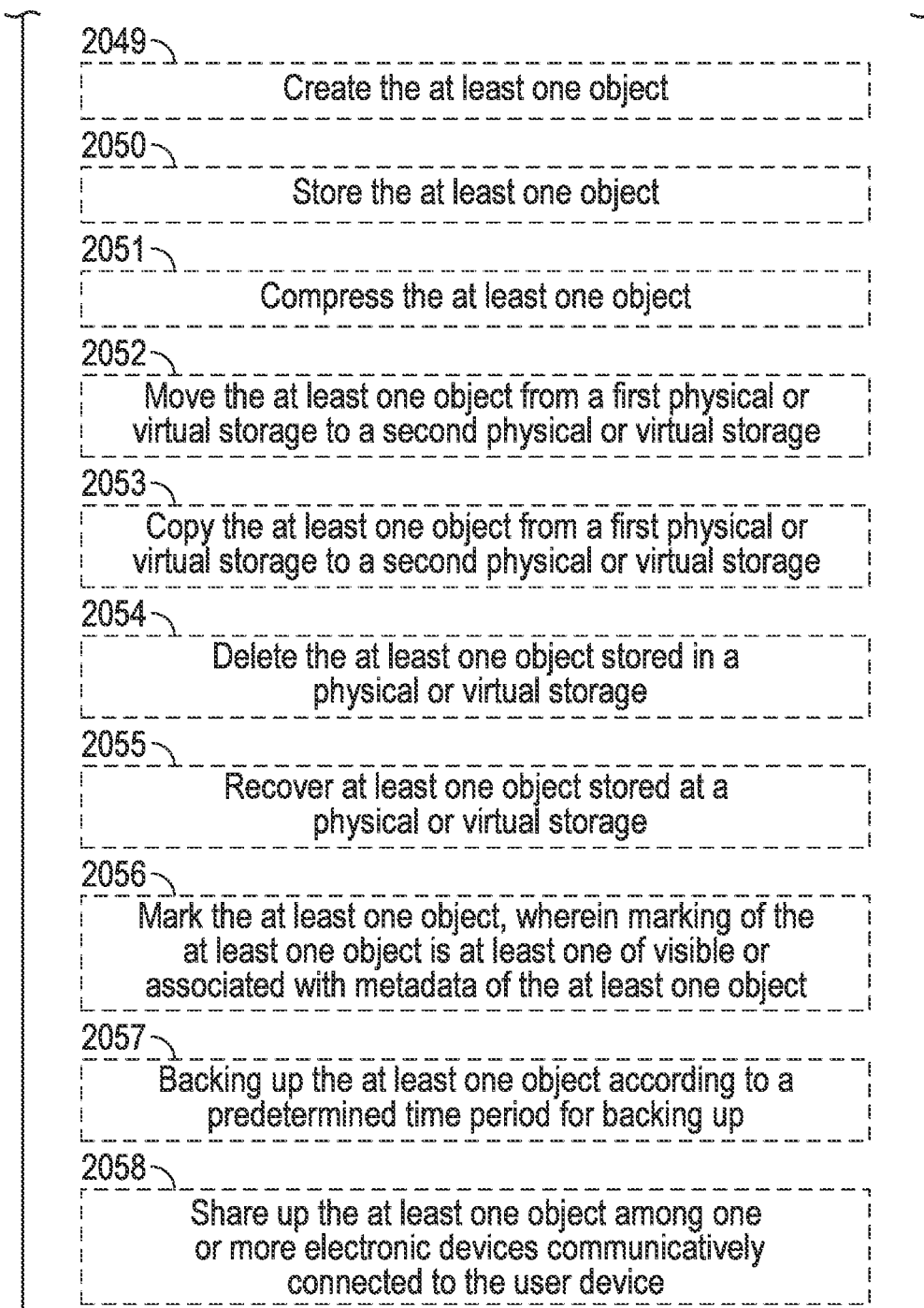

With reference to FIG. 20E, at block 2049, the at least one object is created. At block 2050, the at least one object is stored. At block 2051, the at least one object is compressed. At block 2052, the at least one object is moved from a first physical or virtual storage to a second physical or virtual storage. At block 2053, the at least one object is copied from a first physical or virtual storage to a second physical or virtual storage. At block 2054, the at least one object stored in a physical or virtual storage is deleted. At block 2055, the at least one object stored at a physical or virtual storage is recovered. At block 2056, the at least one object is marked. Marking of the at least one object is at least one of visible or associated with metadata of the at least one object. At block 2057, the at least one object is backup according to a predetermined time period for backing up. At block 2058, the at least one object is shared among one or more electronic devices communicatively connected to the user device.

Figure 20F:
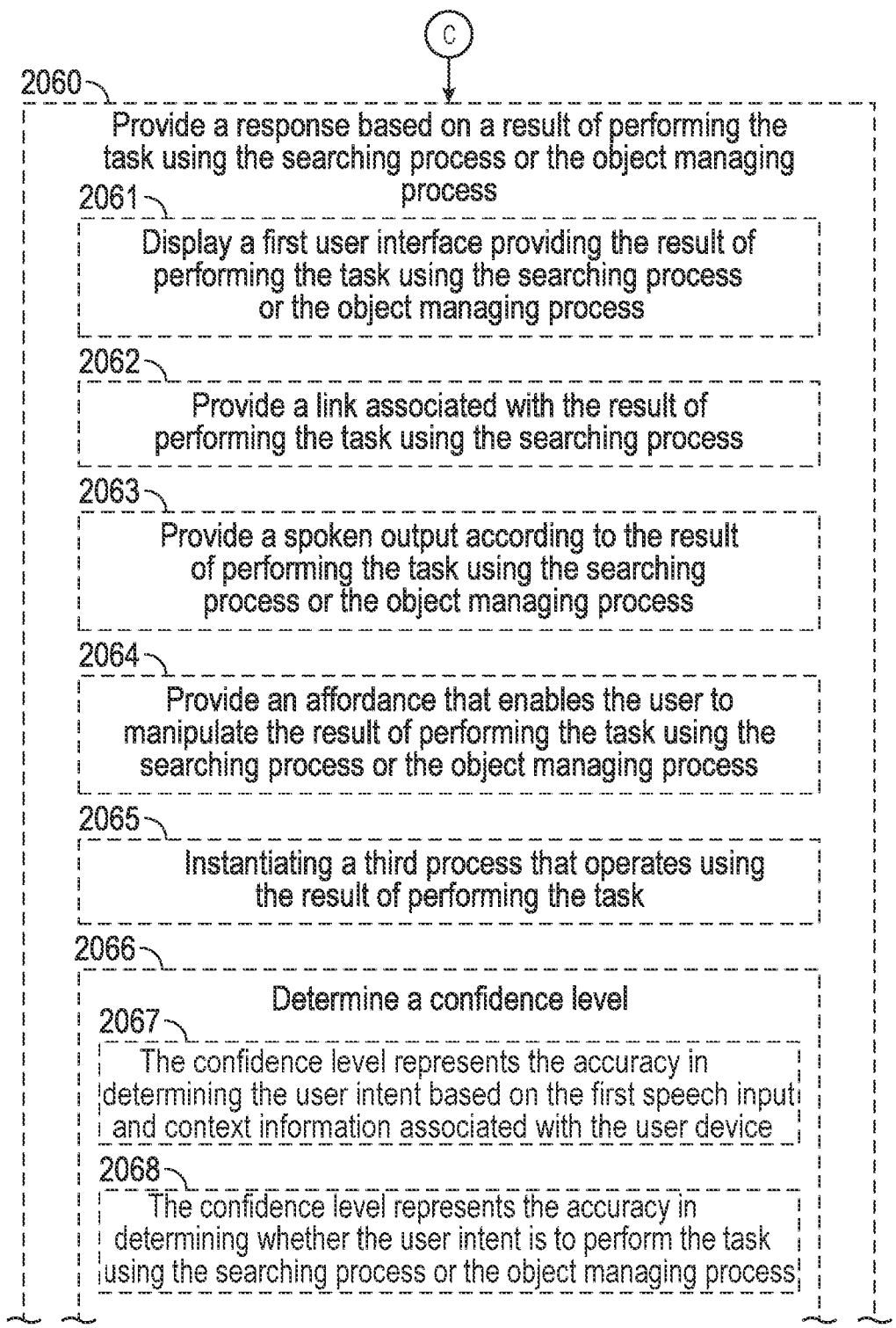

With reference to FIG. 20F, at block 2060, a response is provided based on a result of performing the task using the searching process or the object managing process. At block 2061, a first user interface is displayed providing the result of performing the task using the searching process or the object managing process. At block 2062, a link associated with the result of performing the task using the searching process is displayed. At block 2063, a spoken output is provided according to the result of performing the task using the searching process or the object managing process.

At block 2064, it is provided an affordance that enables the user to manipulate the result of performing the task using the searching process or the object managing process. At block 2065, it is instantiated a third process that operates using the result of performing the task.

With reference to FIG. 20F, at block 2066, a confidence level is determined. At block 2067, the confidence level represents the accuracy in determining the user intent based on the first speech input and context information associated with the user device. At block 2068, the confidence level represents the accuracy in determining whether the user intent is to perform the task using the searching process or the object managing process.

Figure 20G:
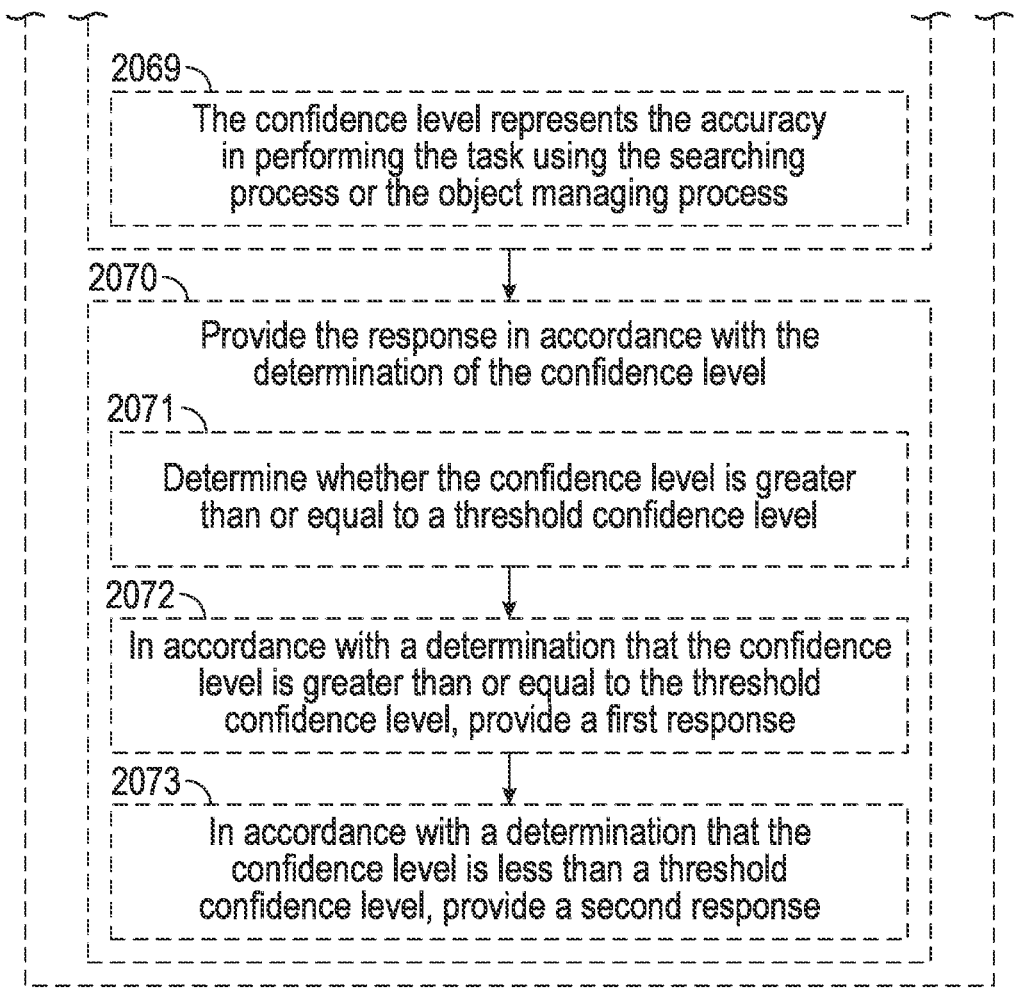

With reference to FIG. 20G, at block 2069, the confidence level represents the accuracy in performing the task using the searching process or the object managing process.

At block 2070, the response is provided in accordance with the determination of the confidence level. At block 2071, it is determined whether the confidence level is greater than or equal to a threshold confidence level. At block 2072, in accordance with a determination that the confidence level is greater than or equal to the threshold confidence level, a first response is provided. At block 2073, in accordance with a determination that the confidence level is less than a threshold confidence level, a second response is provided.

8. Process for Operating a Digital Assistant—Continuity.

FIGS. 21A-21E illustrate a flow diagram of an exemplary process 2100 for operating a digital assistant in accordance with some embodiments. Process 2100 may be performed using one or more devices 104, 108, 200, 400, 600, 1400, 1500, 1600, or 1700 (FIGS. 1, 2A, 4, 6A-6B, 14A-14D, 15A-15D, 16A-16C, and 17A-17E). Operations in process 2100 are, optionally, combined or split and/or the order of some operations is, optionally, changed.

Figure 21A:
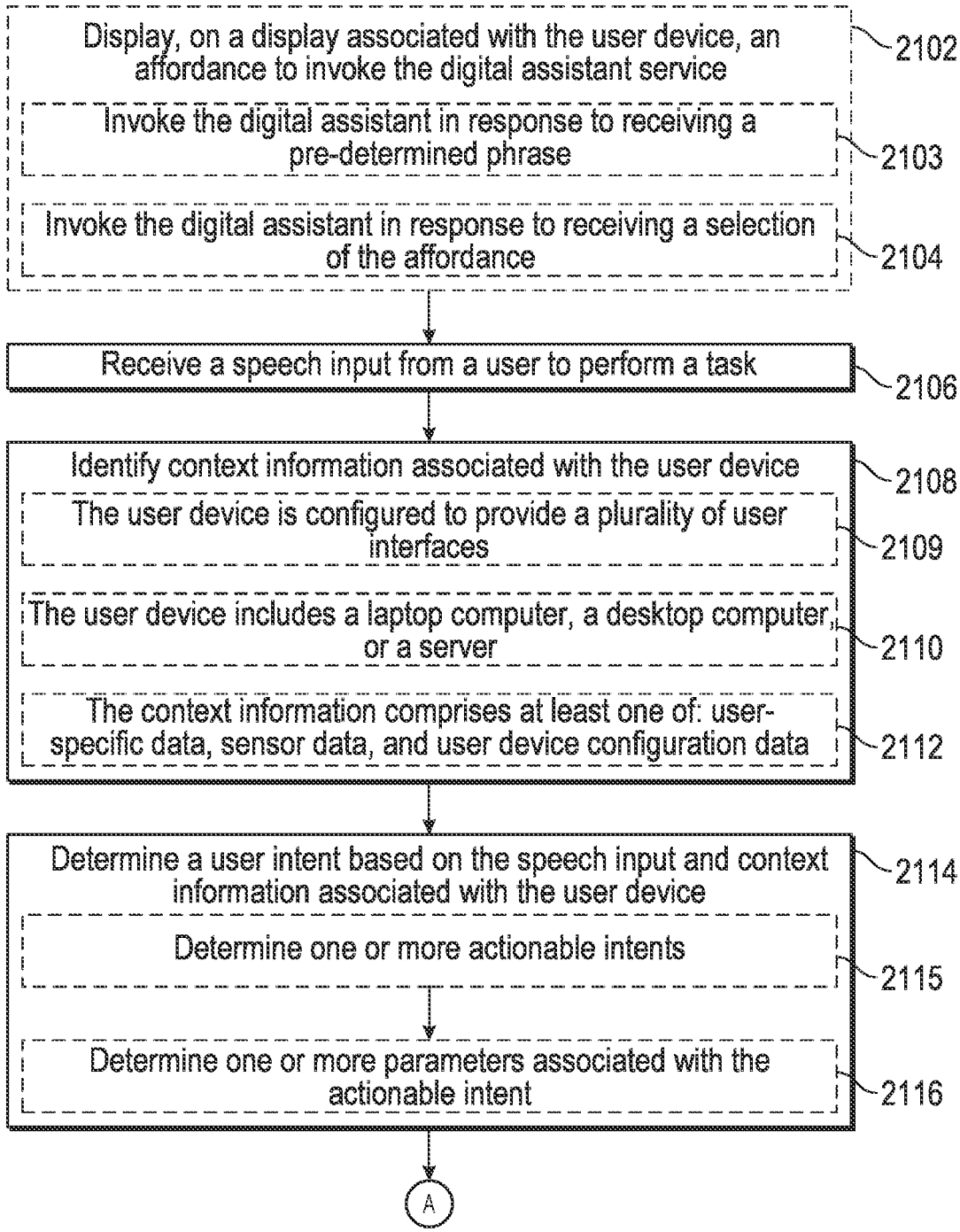
FIGS. 21A-21E illustrate a flow diagram of an exemplary process for operating a digital assistant according to various examples.

With reference to FIG. 21A, at block 2102, prior to receiving a first speech input, an affordance to invoke a digital assistant service is displayed on a display associated with a user device. At block 2103, the digital assistant is invoked in response to receiving a pre-determined phrase. At block 2104, the digital assistant is invoked in response to receiving a selection of the affordance.

At block 2106, a first speech input is received from a user to perform a task. At block 2108, context information associated with the user device is identified. At block 2109, the user device is configured to provide a plurality of user interfaces. At block 2110, the user device includes a laptop computer, a desktop computer, or a server. At block 2112, the context information includes at least one of: user-specific data, metadata associated with one or more objects, sensor data, and user device configuration data.

At block 2114, a user intent is determined based on the speech input and the context information. At block 2115, to determine the user intent, one or more actionable intents are determined. At block 2116, one or more parameters associated with the actionable intent are determined.

Figure 21B:
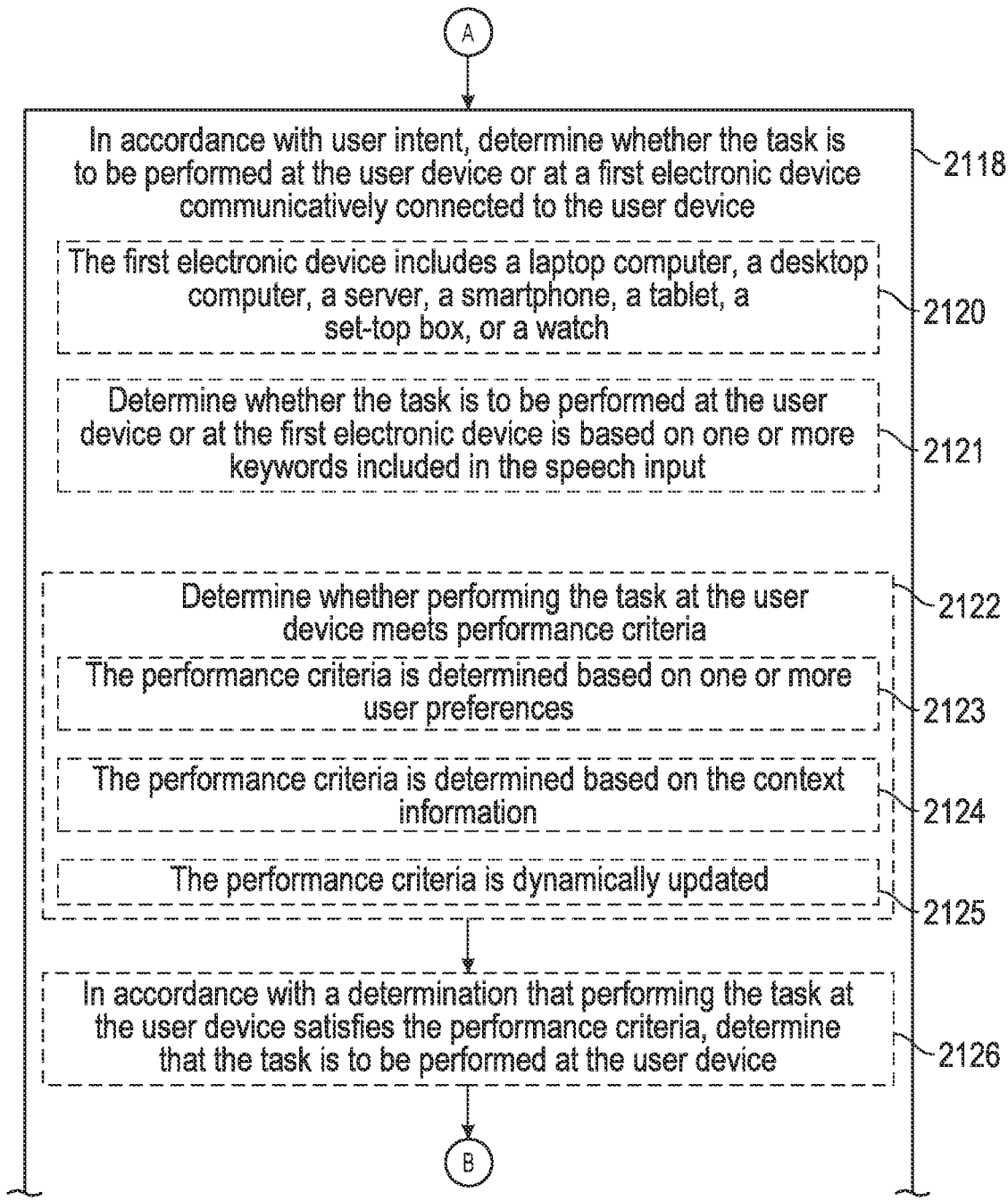

With reference to FIG. 21B, at block 2118, in accordance with user intent, it is determined whether the task is to be performed at the user device or at a first electronic device communicatively connected to the user device. At block 2120, the first electronic device includes a laptop computer, a desktop computer, a server, a smartphone, a tablet, a set-top box, or a watch. At block 2121, determining whether the task is to be performed at the user device or at the first electronic device is based on one or more keywords included in the speech input. At block 2122, it is determined whether performing the task at the user device satisfies performance criteria. At block 2123, the performance criteria are determined based on one or more user preferences. At block 2124, the performance criteria are determined based on the device configuration data. At block 2125, the performance criteria are dynamically updated. At block 2126, in accordance with a determination that performing the task at the user device satisfies the performance criteria, it is determined that the task is to be performed at the user device.

Figure 21C:
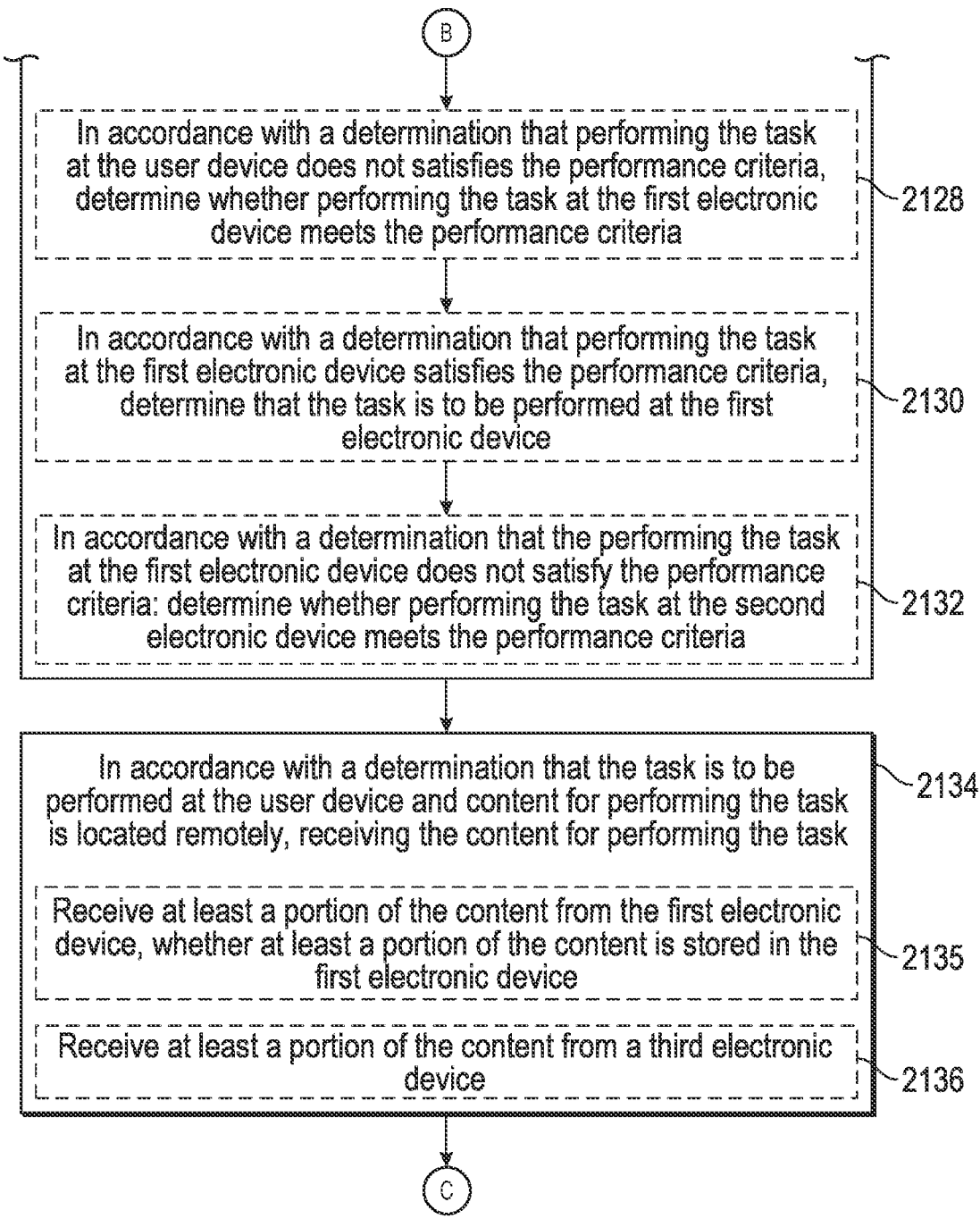

With reference to FIG. 21C, at block 2128, in accordance with a determination that performing the task at the user device does not satisfy the performance criteria, it is determined whether performing the task at the first electronic device satisfies the performance criteria. At block 2130, in accordance with a determination that performing the task at the first electronic device satisfies the performance criteria, it is determined that the task is to be performed at the first electronic device. At block 2132, in accordance with a determination that performing the task at the first electronic device does not meet the performance criteria, it is determined whether performing the task at the second electronic device satisfies the performance criteria.

At block 2134, in accordance with a determination that the task is to be performed at the user device and content for performing the task is located remotely, the content for performing the task is received. At block 2135, at least a portion of the content is received from the first electronic device. At least a portion of the content is stored in the first electronic device. At block 2136, at least a portion of the content is received from a third electronic device.

Figure 21D:
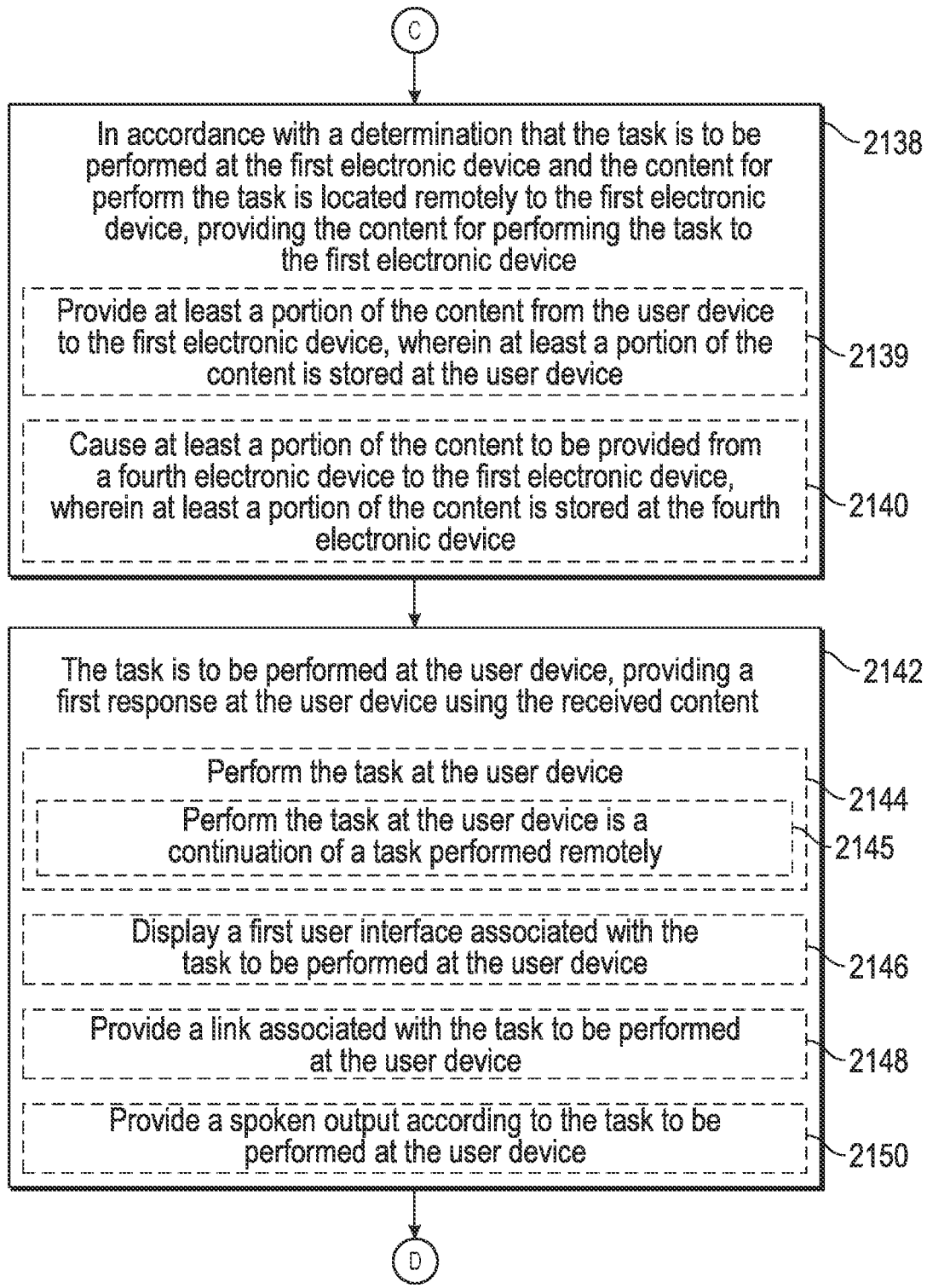

With reference to FIG. 21D, at block 2138, in accordance with a determination that the task is to be performed at the first electronic device and the content for performing the task is located remotely to the first electronic device, the content for performing the task is provided to the first electronic device. At block 2139, at least a portion of the content is provided from the user device to the first electronic device. At least a portion of the content is stored at the user device. At block 2140, at least a portion of the content is caused to be provided from a fourth electronic device to the first electronic device. At least a portion of the content is stored at the fourth electronic device.

At block 2142, the task is to be performed at the user device. A first response is provided at the user device using the received content. At block 2144, the task is performed at the user device. At block 2145, performing the task at the user device is a continuation of a task partially performed remotely to the user device. At block 2146, a first user interface is displayed associated with the task to be performed at the user device. At block 2148, a link associated with the task is to be performed at the user device. At block 2150, a spoken output is provided according to the task to be performed at the user device.

Figure 21E:
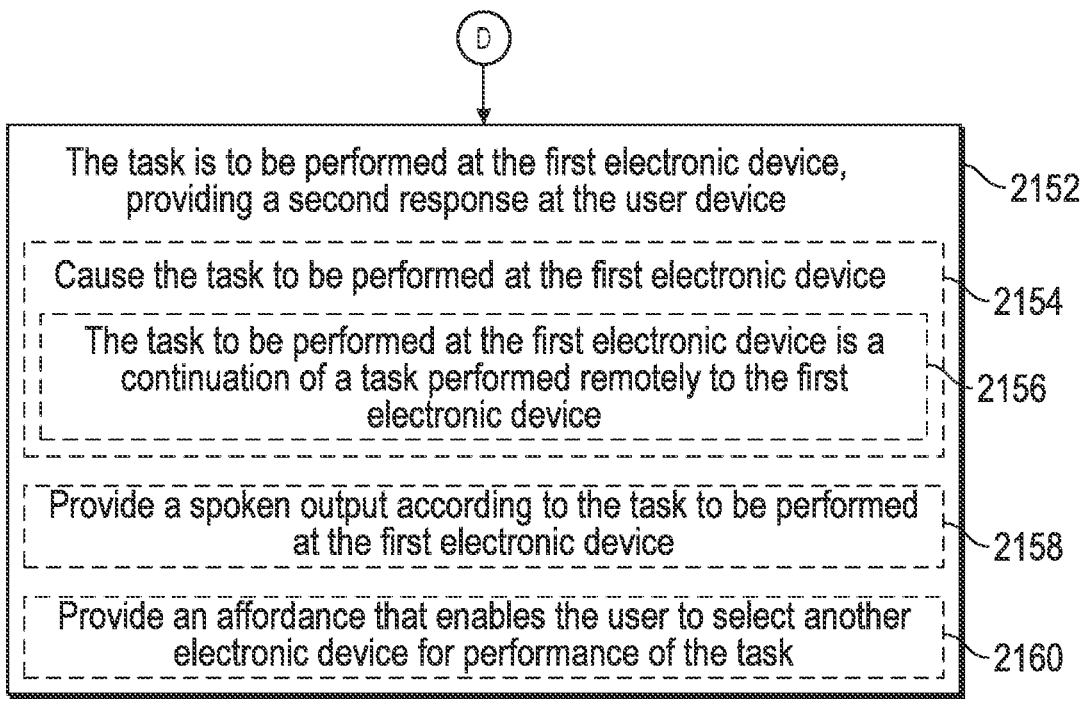

With reference to FIG. 21E, at block 2152, the task is to be performed at the first electronic device, and a second response is provided at the user device. At block 2154, the task is to be performed at the first electronic device. At block 2156, the task to be performed at the first electronic device is a continuation of a task performed remotely to the first electronic device. At block 2158, a spoken output is provided according to the task to be performed at the first electronic device. At block 2160, a spoken output is provided according to the task to be performed at the first electronic device.

9. Process for Operating a Digital Assistant—System Configuration Management.

FIGS. 22A-22D illustrate a flow diagram of an exemplary process 2200 for operating a digital assistant in accordance with some embodiments. Process 2200 may be performed using one or more devices 104, 108, 200, 400, 600, or 1800 (FIGS. 1, 2A, 4, 6A-6B, and 18C-18D). Operations in process 2200 are, optionally, combined or split, and/or the order of some operations is, optionally, changed.

Figure 22A:
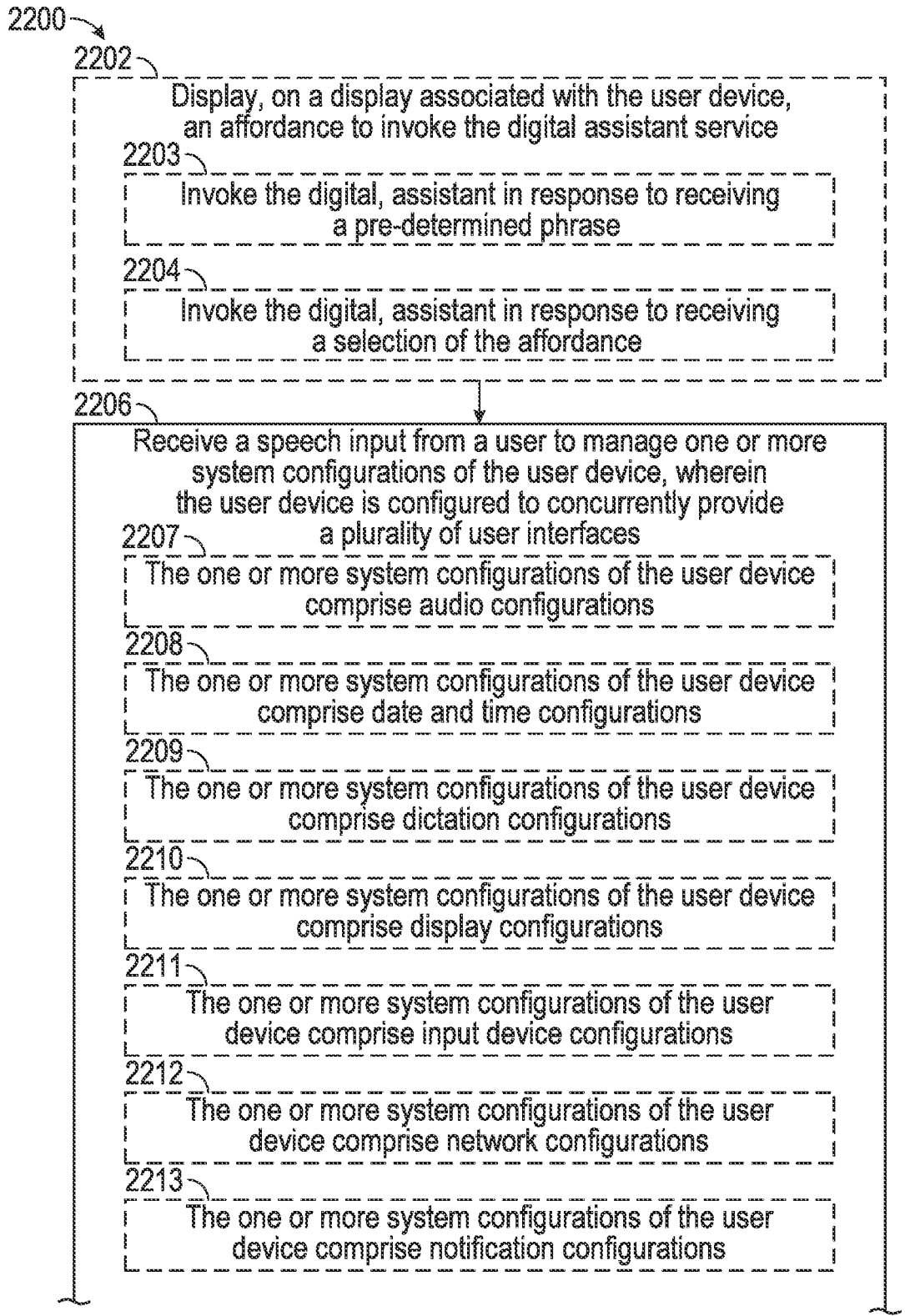
FIGS. 22A-22D illustrate a flow diagram of an exemplary process for operating a digital assistant according to various examples.

With reference to FIG. 22A, at block 2202, prior to receiving a speech input, an affordance to invoke a digital assistant service is displayed on a display associated with a user device. At block 2203, the digital assistant is invoked in response to receiving a pre-determined phrase. At block 2204, the digital assistant is invoked in response to receiving a selection of the affordance.

At block 2206, a speech input is received from a user to manage one or more system configurations of the user device. The user device is configured to concurrently provide a plurality of user interfaces. At block 2207, the one or more system configurations of the user device comprise audio configurations. At block 2208, the one or more system configurations of the user device comprise date and time configurations. At block 2209, the one or more system configurations of the user device comprise dictation configurations. At block 2210, the one or more system configurations of the user device comprise display configurations. At block 2211, the one or more system configurations of the user device comprise input device configurations. At block 2212, the one or more system configurations of the user device comprise network configurations. At block 2213, the one or more system configurations of the user device comprise notification configurations.

Figure 22B:
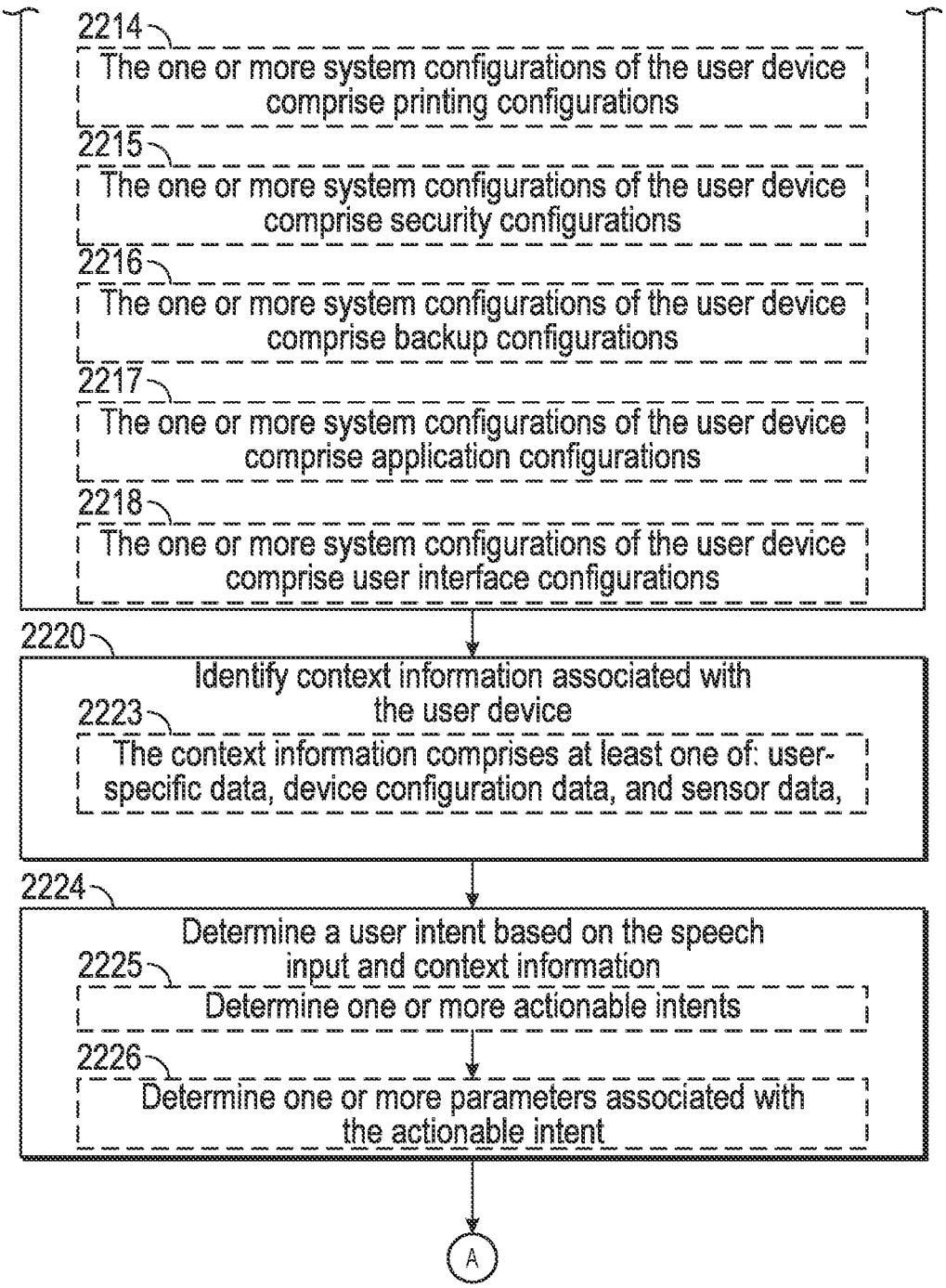

With reference to FIG. 22B, at block 2214, the one or more system configurations of the user device comprise printer configurations. At block 2215, the one or more system configurations of the user device comprise security configurations. At block 2216, the one or more system configurations of the user device comprise backup configurations. At block 2217, the one or more system configurations of the user device comprise application configurations. At block 2218, the one or more system configurations of the user device comprise user interface configurations.

At block 2220, context information associated with the user device is identified. At block 2223, the context information comprises at least one of: user-specific data, device configuration data, and sensor data. At block 2224, the user intent is determined based on the speech input and the context information. At block 2225, one or more actionable intents are determined. At block 2226, one or more parameters associated with the actionable intent are determined.

Figure 22C:
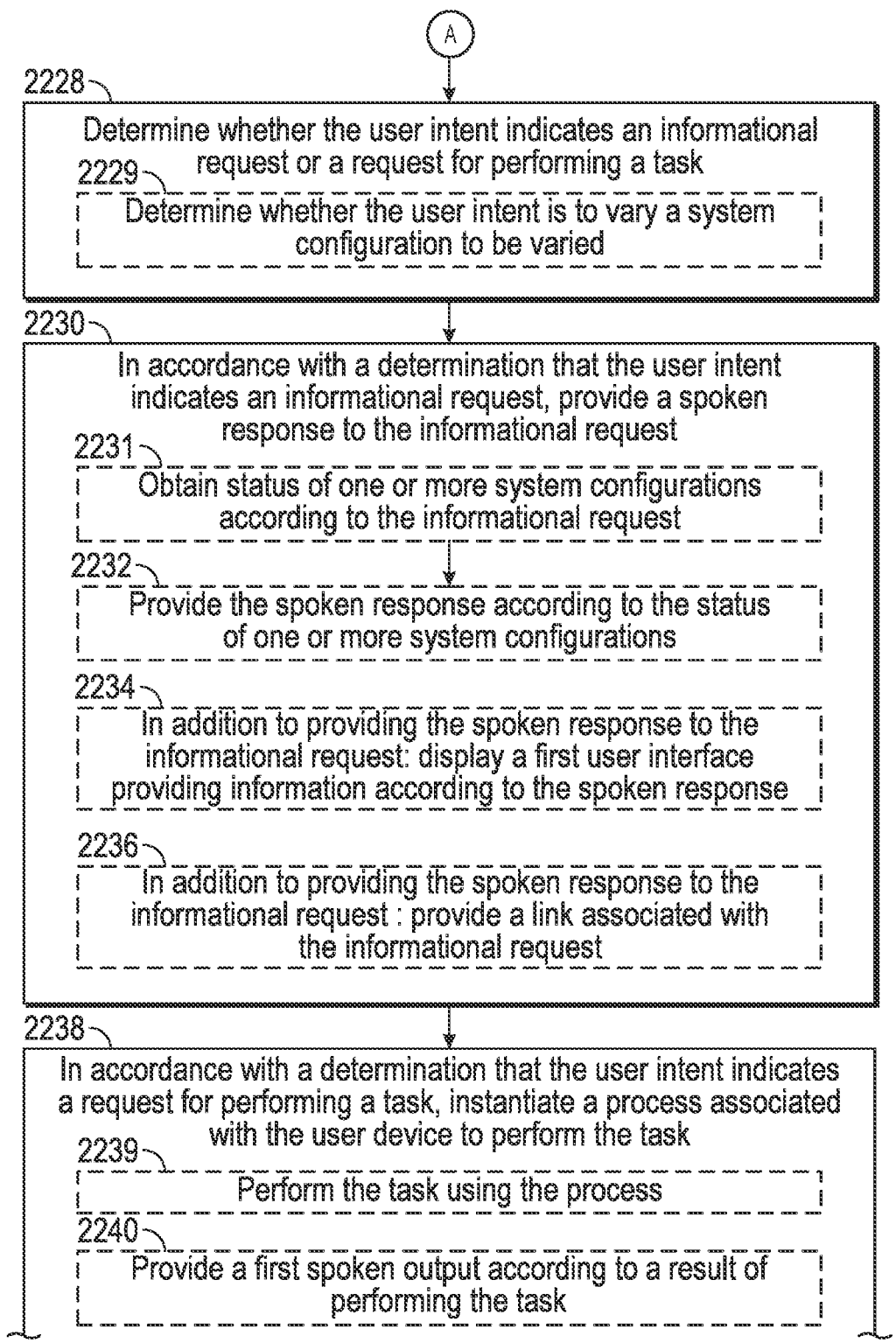

With reference to FIG. 22C, at block 2228, it is determined whether the user intent indicates an informational request or a request for performing a task. At block 2229, it is determined whether the user intent is to vary a system configuration.

At block 2230, in accordance with a determination that the user intent indicates an informational request, a spoken response is provided to the informational request. At block 2231, status of one or more system configurations is obtained according to the informational request. At block 2232, the spoken response is provided according to the status of one or more system configurations.

At block 2234, in addition to providing the spoken response to the informational request, a first user interface is displayed to provide information according to the status of the one or more system configurations. At block 2236, in addition to providing the spoken response to the informational request, a link associated with the informational request is provided.

At block 2238, in accordance with a determination that the user intent indicates a request for performing a task, a process associated with the user device is instantiated to perform the task. At block 2239, the task is performed using the process. At block 2240, a first spoken output is provided according to a result of performing the task.

Figure 22D:
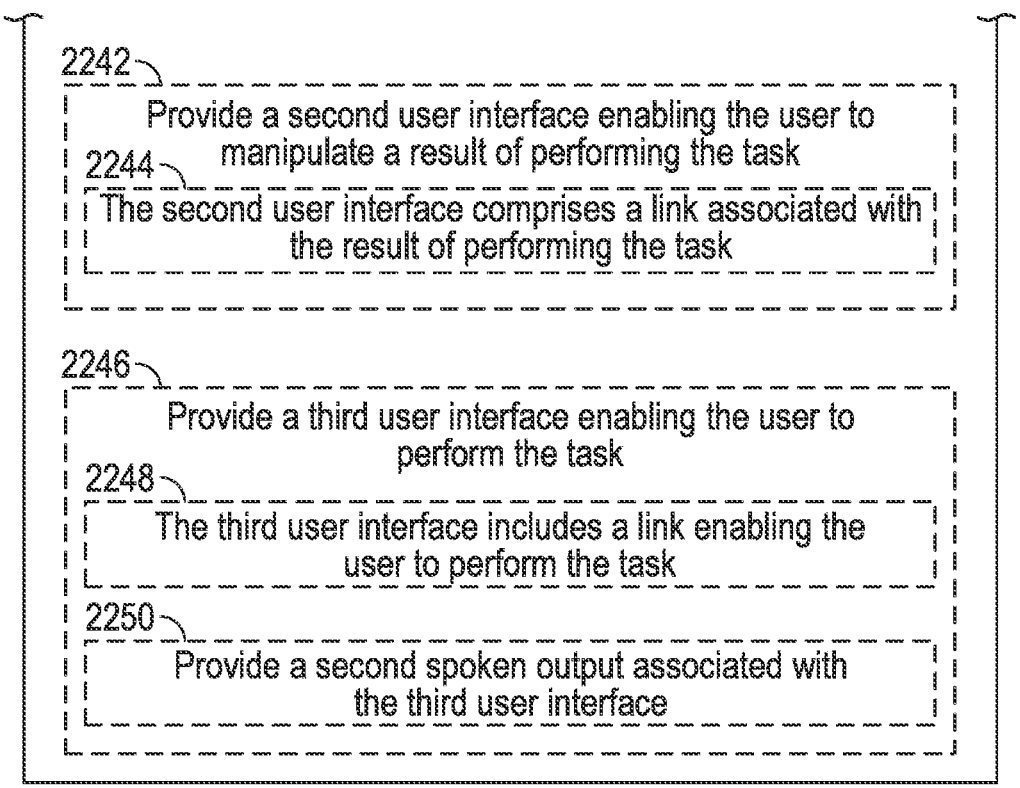

With reference to FIG. 22D, at block 2242, a second user interface is provided to enable the user to manipulate a result of performing the task. At block 2244, the second user interface comprises a link associated with the result of performing the task.

At block 2246, a third user interface is provided to enable the user to perform the task. At block 2248, the third user interface includes a link enabling the user to perform the task. At block 2250, a second spoken output associated with the third user interface is provided.

10. Electronic Device—Intelligent Search and Object Management

Figure 23:
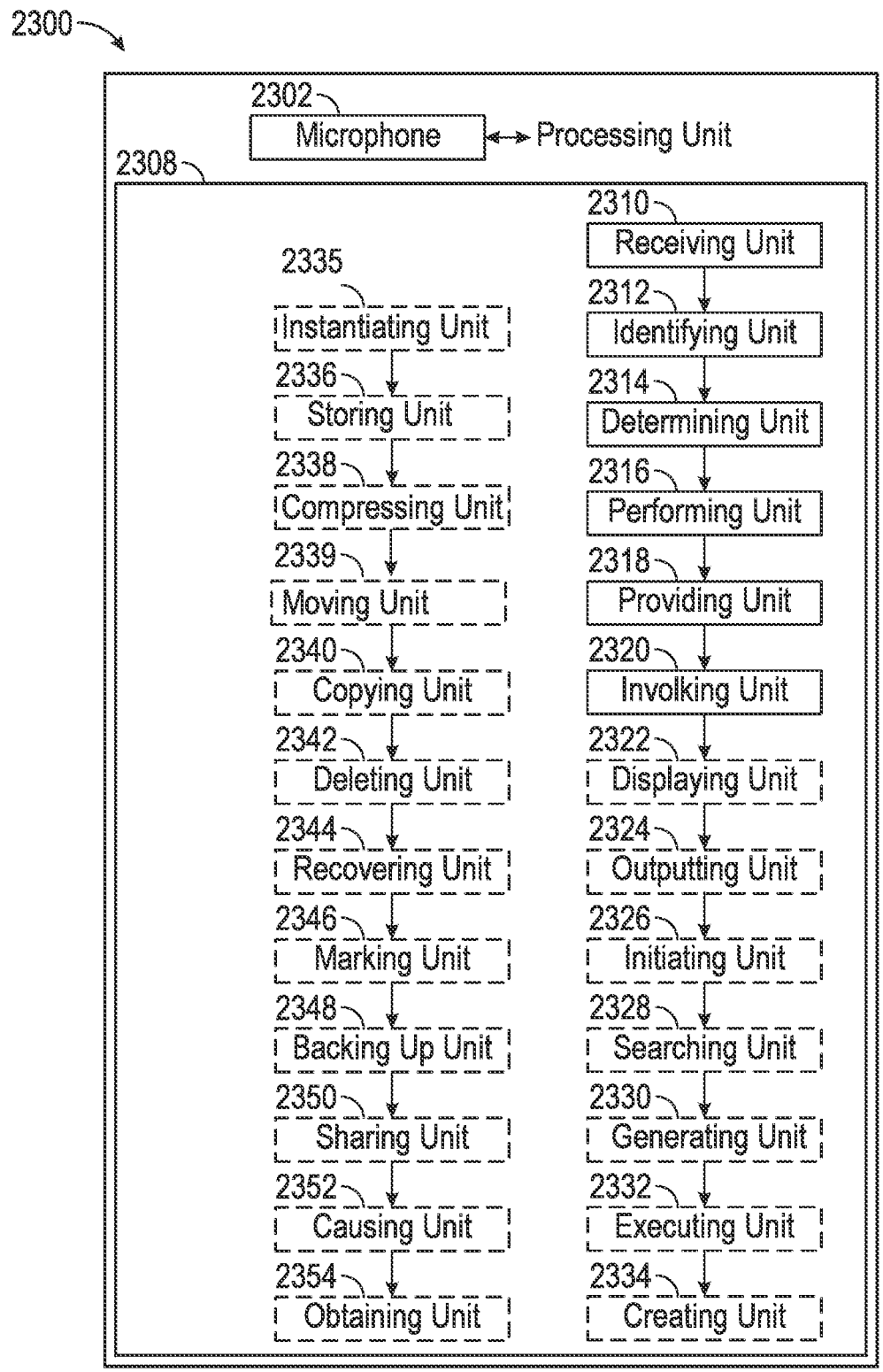
FIG. 23 illustrates a block diagram of an electronic device according to various examples.

FIG. 23 shows a functional block diagram of electronic device 2300 configured in accordance with the principles of the various described examples, including those described with reference to FIGS. 8A-8F, 9A-9H, 10A-10B, 11A-11F, 12A-12D, 13A-13C, 14A-14D, 15A-15D, 16A-16C, 17A-17E, 18A-18F, and 19A-19D. The functional blocks of the device can be optionally implemented by hardware, software, or a combination of hardware and software to carry out the principles of the various described examples. It is understood by persons of skill in the art that the functional blocks described in FIG. 23 can be optionally combined or separated into sub-blocks to implement the principles of the various described examples. Therefore, the description herein optionally supports any possible combination, separation, or further definition of the functional blocks described herein.

As shown in FIG. 23, electronic device 2300 can include a microphone 2302 and processing unit 2308. In some examples, processing unit 2308 includes a receiving unit 2310, a an identifying unit 2312, a determining unit 2314, a performing unit 2316, a providing unit 2318, an instantiating unit 2320, a displaying unit 2322, an outputting unit 2324, an initiating unit 2326, a searching unit 2328, a generating unit 2330, an executing unit 2332, a creating unit 2334, an instantiating unit 2335, a storing unit 2336, a compressing unit 2338, a copying unit 2340, a deleting unit 2342, a recovering unit 2344, a marking unit 2346, a backing up unit 2348, a sharing unit 2350, a causing unit 2352, and an obtaining unit 2354.

In some examples, the processing unit 2308 is configured to receive (e.g., with the receiving unit 2310) a first speech input from a user; identify (e.g., with the identifying unit 2312) context information associated with the user device; and determine (e.g., with the determining unit 2314) a user intent based on the first speech input and the context information.

In some examples, the processing unit 2308 is configured to determine (e.g., with the determining unit 2314) whether the user intent is to perform a task using a searching process or an object managing process. The searching process is configured to search data stored internally or externally to the user device, and the object managing process is configured to manage objects associated with the user device.

In some examples, in accordance with a determination the user intent is to perform the task using the searching process, the processing unit 2308 is configured to perform (e.g., with the performing unit 2316) the task using the searching process. In some examples, in accordance with the determination that the user intent is to perform the task using the object managing process, the processing unit 2308 is configured to perform (e.g., with the performing unit 2316) the task using the object managing process.

In some examples, prior to receiving the first speech input, the processing unit 2308 is configured to display (e.g., with the displaying unit 2322), on a display associated with the user device, an affordance to invoke the digital assistant service.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine (e.g., with the determining unit 2314) one or more actionable intents; and determine (e.g., with determining unit 2314) one or more parameters associated with the actionable intent.

In some examples, the context information comprises at least one of: user-specific data, metadata associated with one or more objects, sensor data, and user device configuration data.

In some examples, the processing unit 2308 is configured to determine (e.g., with the determining unit 2314) whether the speech input includes one or more keywords representing the searching process or the object managing process.

In some examples, the processing unit 2308 is configured to determine (e.g., with the determining unit 2314) whether the task is associated with searching. In accordance with a determination that the task is associated with searching, the processing unit 2308 is configured to determine (e.g., with the determining unit 2314) whether performing the task requires the searching process; and in accordance with a determination that the task is not associated with searching, determine (e.g., with the determining unit 2314) whether the task is associated with managing at least one object.

In some examples, the task is associated with searching, and in accordance with a determination that performing the task does not require the searching process, the processing unit 2308 is configured to output (e.g., with the outputting unit 2324) a spoken request to select the searching process or the object managing process and receive (e.g., with the receiving unit 2310), from the user, a second speech input indicating the selection of the searching process or the object managing process.

In some examples, the task is associated with searching, and in accordance with a determination that performing the task does not require the searching process, the processing unit 2308 is configured to determine (e.g., with the determining unit 2314), based on a pre-determined configuration, whether the task is to be performed using the searching process or the object managing process.

In some examples, the task is not associated with searching, and in accordance with a determination that the task is not associated with managing the at least one object, the processing unit 2308 is configured to perform (e.g., with the performing unit 2316) at least one of: determining (e.g., with the determining unit 2314) whether that task can be performed using a fourth process available to the user device; and initiating (e.g., with the initiating unit 2326) dialog with the user.

In some examples, the processing unit 2308 is configured to search (e.g., with the searching unit 2328) at least one object using the searching process.

In some examples, the at least one object includes at least one of a folder or a file. The file includes at least one of a photo, audio, or a video. The file is stored internally or externally to the user device.

In some examples, searching at least one of the folder or the file is based on metadata associated with the folder or the file.

In some examples, the at least one object includes a communication. The communication includes at least one of an email, a message, a notification, or a voicemail.

In some examples, the processing unit 2308 is configured to search (e.g., with the searching unit 2328) metadata associated with the communication.

In some examples, the at least one object includes at least one of a contact or a calendar.

In some examples, the at least one object includes an application.

In some examples, the at least one object includes an online informational source.

In some examples, the task is associated with searching, and the processing unit 2308 is configured to search (e.g., with the searching unit 2328) the at least one object using the object managing process.

In some examples, the at least one object includes at least one of a folder or a file. The file includes at least one of a photo, an audio, or a video. The file is stored internally or externally to the user device.

In some examples, searching at least one of the folder or the file is based on metadata associated with the folder or the file.

In some examples, the processing unit 2308 is configured to instantiate (e.g., with the instantiating unit 2335) the object managing process. Instantiating of the object managing process includes invoking the object managing process, generating a new instance of the object managing process, or executing an existing instance of the object managing process.

In some examples, the processing unit 2308 is configured to create (e.g., with the creating unit 2334) the at least one object.

In some examples, the processing unit 2308 is configured to store (e.g., with the storing unit 2336) the at least one object.

In some examples, the processing unit 2308 is configured to compress (e.g., with the compressing unit 2338) the at least one object.

In some examples, the processing unit 2308 is configured to move (e.g., with the moving unit 2339) the at least one object from a first physical or virtual storage to a second physical or virtual storage.

In some examples, the processing unit 2308 is configured to copy (e.g., with the copying unit 2340) the at least one object from a first physical or virtual storage to a second physical or virtual storage.

In some examples, the processing unit 2308 is configured to delete (e.g., with the deleting unit 2342) the at least one object stored in a physical or virtual storage.

In some examples, the processing unit 2308 is configured to recover (e.g., with the recovering unit 2344) at least one object stored at a physical or virtual storage.

In some examples, the processing unit 2308 is configured to mark (e.g., with the marking unit 2346) the at least one object. Marking of the at least one object is at least one of visible or associated with metadata of the at least one object.

In some examples, the processing unit 2308 is configured to back up (e.g., with the backing up unit 2348) the at least one object according to a predetermined time period for backing up.

In some examples, the processing unit 2308 is configured to share (e.g., with the sharing unit 2350) the at least one object among one or more electronic devices communicatively connected to the user device.

In some examples, the processing unit 2308 is configured to provide (e.g., with the providing unit 2318) a response based on a result of performing the task using the searching process or the object managing process.

In some examples, the processing unit 2308 is configured to display (e.g., with the displaying unit 2322) a first user interface providing the result of performing the task using the searching process or the object managing process.

In some examples, the processing unit 2308 is configured to provide (e.g., with the providing unit 2318) a link associated with the result of performing the task using the searching process.

In some examples, the processing unit 2308 is configured to provide (e.g., with the providing unit 2318) a spoken output according to the result of performing the task using the searching process or the object managing process.

In some examples, the processing unit 2308 is configured to provide (e.g., with the providing unit 2318) an affordance that enables the user to manipulate the result of performing the task using the searching process or the object managing process.

In some examples, the processing unit 2308 is configured to instantiate (e.g., with the instantiating unit 2335) a third process that operates using the result of performing the task.

In some examples, the processing unit 2308 is configured to determine (e.g., with the determining unit 2314) a confidence level; and provide (e.g., with providing unit 2318) the response in accordance with the determination of the confidence level.

In some examples, the confidence level represents the accuracy in determining the user intent based on the first speech input and context information associated with the user device.

In some examples, the confidence level represents the accuracy in determining whether the user intent is to perform the task using the searching process or the object managing process.

In some examples, the confidence level represents the accuracy in performing the task using the searching process or the object managing process.

In some examples, the processing unit 2308 is configured to determine (e.g., with the determining unit 2314) whether the confidence level is greater than or equal to a threshold confidence level. In accordance with a determination that the confidence level is greater than or equal to the threshold confidence level, the processing unit 2308 is configured to provide (e.g., with the providing unit 2318) a first response; and in accordance with a determination that the confidence level is less than a threshold confidence level, the processing unit 2308 is configured to provide (e.g., with the providing unit 2318) a second response.

11. Electronic Device—Continuity

In some examples, the processing unit 2308 is configured to receive (e.g., with the receiving unit 2310) a speech input from a user to perform a task; identify (e.g., with the identifying unit 2312) context information associated with the user device; and determine (e.g., with the determining unit 2314) a user intent based on the speech input and context information associated with the user device.

In some examples, the processing unit 2308 is configured to, in accordance with user intent, determine (e.g., with the determining unit 2314) whether the task is to be performed at the user device or at a first electronic device communicatively connected to the user device.

In some examples, in accordance with a determination that the task is to be performed at the user device and content for performing the task is located remotely, the processing unit 2308 is configured to receive (e.g., with the receiving unit 2310) the content for performing the task.

In some examples, in accordance with a determination that the task is to be performed at the first electronic device and the content for performing the task is located remotely to the first electronic device, the processing unit 2308 is configured to provide (e.g., with the providing unit 2318) the content for performing the task to the first electronic device.

In some examples, the user device is configured to provide a plurality of user interfaces.

In some examples, the user device includes a laptop computer, a desktop computer, or a server.

In some examples, the first electronic device includes a laptop computer, a desktop computer, a server, a smartphone, a tablet, a set-top box, or a watch.

In some examples, the processing unit 2308 is configured to, prior to receiving the speech input, display (e.g., with the displaying unit 2322), on a display of the user device, an affordance to invoke the digital assistant.

In some examples, the processing unit 2308 is configured to invoke (e.g., with the invoking unit 2320) the digital assistant in response to receiving a pre-determined phrase.

In some examples, the processing unit 2308 is configured to invoke (e.g., with the invoking unit 2320) the digital assistant in response to receiving a selection of the affordance.

In some examples, the processing unit 2308 is configured to determine (e.g., with the determining unit 2314) one or more actionable intents; and determine (e.g., with the determining unit 2314) one or more parameters associated with the actionable intent.

In some examples, the context information comprises at least one of: user-specific data, sensor data, and user device configuration data.

In some examples, determining whether the task is to be performed at the user device or at the first electronic device is based on one or more keywords included in the speech input.

In some examples, the processing unit 2308 is configured to determine (e.g., with determining unit 2314) whether performing the task at the user device satisfies performance criteria.

In some examples, in accordance with a determination that performing the task at the user device satisfies the performance criteria, the processing unit 2308 is configured to determine (e.g., with the determining unit 2314) that the task is to be performed at the user device.

In some examples, in accordance with a determination that performing the task at the user device does not satisfy the performance criteria, the processing unit 2308 is configured to determine (e.g., with the determining unit 2314) whether performing the task at the first electronic device satisfies the performance criteria.

In some examples, in accordance with a determination that performing the task at the first electronic device satisfies the performance criteria, the processing unit 2308 is configured to determine (e.g., with the determining 2314) that the task is to be performed at the first electronic device.

In some examples, in accordance with a determination that the performing the task at the first electronic device does not meet the performance criteria, the processing unit 2308 is configured to determine (e.g., with the determining unit 2314) whether performing the task at the second electronic device satisfies the performance criteria.

In some examples, the performance criteria are determined based on one or more user preferences.

In some examples, the performance criteria are determined based on the device configuration data.

In some examples, the performance criteria are dynamically updated.

In some examples, in accordance with a determination that the task is to be performed at the user device and content for performing the task is located remotely, the processing unit 2308 is configured to receive (e.g., with the receiving unit 2310) at least a portion of the content from the first electronic device, wherein at least a portion of the content is stored in the first electronic device.

In some examples, in accordance with a determination that the task is to be performed at the user device and content for performing the task is located remotely, the processing unit 2308 is configured to receive (e.g., with the receiving unit 2310) at least a portion of the content from a third electronic device.

In some examples, in accordance with a determination that the task is to be performed at the first electronic device and the content for performing the task is located remotely to the first electronic device, the processing unit 2308 is configured to provide (e.g., with the providing unit 2318) at least a portion of the content from the user device to the first electronic device, wherein at least a portion of the content is stored at the user device.

In some examples, in accordance with a determination that the task is to be performed at the first electronic device and the content for performing the task is located remotely to the first electronic device, the processing unit 2308 is configured to cause (e.g., with the causing unit 2352) at least a portion of the content to be provided from a fourth electronic device to the first electronic device. At least a portion of the content is stored at the fourth electronic device.

In some examples, the task is to be performed at the user device, and processing unit 2308 is configured to provide (e.g., with the providing unit 2318) a first response at the user device using the received content.

In some examples, the processing unit 2308 is configured to perform (e.g., with the performing unit 2316) the task at the user device.

In some examples, performing the task at the user device is a continuation of a task partially performed remotely to the user device.

In some examples, the processing unit 2308 is configured to display (e.g., with the displaying unit 2322) a first user interface associated with the task to be performed at the user device.

In some examples, the processing unit 2308 is configured to provide (e.g., with the providing unit 2318) a link associated with the task to be performed at the user device.

In some examples, the processing unit 2308 is configured to provide (e.g., with the providing unit 2318) a spoken output according to the task to be performed at the user device.

In some examples, the task is to be performed at the first electronic device, and the processing unit 2308 is configured to provide (e.g., with the providing unit 2318) a second response at the user device.

In some examples, the processing unit 2308 is configured to cause (e.g., with the causing unit 2352) the task to be performed at the first electronic device.

In some examples, the task to be performed at the first electronic device is a continuation of a task performed remotely to the first electronic device.

In some examples, the processing unit 2308 is configured to provide (e.g., with the providing unit 2318) a spoken output according to the task to be performed at the first electronic device.

In some examples, the processing unit 2308 is configured to provide (e.g., with the providing unit 2318) an affordance that enables the user to select another electronic device for performance of the task.

12. Electronic Device—System Configuration Management

In some examples, the processing unit 2308 is configured to receive (e.g., with the receiving unit 2310) a speech input from a user to manage one or more system configurations of the user device. The user device is configured to concurrently provide a plurality of user interfaces.

In some examples, the processing unit 2308 is configured to identify (e.g., with the identifying unit 2312) context information associated with the user device; and determine (e.g., with the determining unit 2314) a user intent based on the speech input and context information.

In some examples, the processing unit 2308 is configured to determine (e.g., with the determining unit 2314) whether the user intent indicates an informational request or a request for performing a task.

In some examples, in accordance with a determination that the user intent indicates an informational request, the processing unit 2308 is configured to provide (e.g., with the providing unit 2318) a spoken response to the informational request.

In some examples, in accordance with a determination that the user intent indicates a request for performing a task, the processing unit 2308 is configured to instantiate (e.g., with the instantiating unit 2335) a process associated with the user device to perform the task.

In some examples, the processing unit 2308 is configured to, prior to receiving the speech input, display (e.g., with the displaying unit 2322) on a display of the user device, an affordance to invoke the digital assistant.

In some examples, the processing unit 2308 is configured to invoke (e.g., with the invoking unit 2320) the digital assistant service in response to receiving a pre-determined phrase.

In some examples, the processing unit 2308 is configured to invoke (e.g., with the invoking unit 2320) the digital assistant service in response to receiving a selection of the affordance.

In some examples, the one or more system configurations of the user device comprise audio configurations.

In some examples, the one or more system configurations of the user device comprise date and time configurations.

In some examples, the one or more system configurations of the user device comprise dictation configurations.

In some examples, the one or more system configurations of the user device comprise display configurations.

In some examples, the one or more system configurations of the user device comprise input device configurations.

In some examples, the one or more system configurations of the user device comprise network configurations.

In some examples, the one or more system configurations of the user device comprise notification configurations.

In some examples, the one or more system configurations of the user device comprise printer configurations.

In some examples, the one or more system configurations of the user device comprise security configurations.

In some examples, the one or more system configurations of the user device comprise backup configurations.

In some examples, the one or more system configurations of the user device comprise application configurations.

In some examples, the one or more system configurations of the user device comprise user interface configurations.

In some examples, the processing unit 2308 is configured to determine (e.g., with the determining unit 2314) one or more actionable intents; and determine (e.g., with the determining unit 2314) one or more parameters associated with the actionable intent.

In some examples, the context information comprises at least one of: user-specific data, device configuration data, and sensor data.

In some examples, the processing unit 2308 is configured to determine (e.g., with the determining unit 2314) whether the user intent is to vary a system configuration.

In some examples, the processing unit 2308 is configured to obtain (e.g., with the obtaining unit 2354) status of one or more system configurations according to the informational request; and provide (e.g., with the providing unit 2318) the spoken response according to the status of one or more system configurations.

In some examples, in accordance with a determination that the user intent indicates an informational request, the processing unit 2308 is configured to, in addition to providing the spoken response to the informational request, display (e.g., with the displaying unit 2322) a first user interface providing information according to the status of the one or more system configurations.

In some examples, in accordance with a determination that the user intent indicates an informational request, the processing unit 2308 is configured to, in addition to providing the spoken response to the informational request, provide (e.g., with the providing unit 2318) a link associated with the informational request.

In some examples, in accordance with a determination that the user intent indicates a request for performing a task, the processing unit 2308 is configured to perform (e.g., with the performing unit 2316) the task using the process.

In some examples, the processing unit 2308 is configured to provide (e.g., with the providing unit 2318) a first spoken output according to a result of performing the task.

In some examples, the processing unit 2308 is configured to provide (e.g., with the providing unit 2318) a second user interface enabling the user to manipulate a result of performing the task.

In some examples, the second user interface comprises a link associated with the result of performing the task.

In some examples, in accordance with a determination that the user intent indicates a request for performing a task, the processing unit 2308 is configured to provide (e.g., with the providing unit 2318) a third user interface enabling the user to perform the task.

In some examples, the third user interface includes a link enabling the user to perform the task.

In some examples, the processing unit 2308 is configured to provide (e.g., with the providing unit 2318) a second spoken output associated with the third user interface.

The operation described above with respect to FIG. 23 is, optionally, implemented by components depicted in FIG. 1, 2A, 4, 6A-B, or 7A-7B. For example, receiving operation 2310, identifying operation 2312, determining operation 2314, performing operation 2316, and providing operation 2318 are optionally implemented by processor(s) 220. It would be clear to a person of ordinary skill in the art how other processes can be implemented based on the components depicted in FIG. 1, 2A, 4, 6A-B, or 7A-7B.

It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein. For example, processing unit 2308 can have an associated "controller" unit that is operatively coupled with processing unit 2308 to enable operation. This controller unit is not separately illustrated in FIG. 23 but is understood to be within the grasp of one of ordinary skill in the art who is designing a device having a processing unit 2308, such as device 2300. As another example, one or more units, such as the receiving unit 2310, may be hardware units outside of processing unit 2308 in some embodiments. The description herein thus optionally supports combination, separation, and/or further definition of the functional blocks described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for providing a digital assistant service, the method comprising:
 at a first electronic device with one or more processors and memory:
  while performing a task, receiving a speech input that requests to perform a continuation of the task at a second electronic device different from the first electronic device, wherein the second electronic device is capable of performing the continuation of the task, and wherein the second electronic device is communicatively connected to the first electronic device;
  determining a user intent based on the speech input; and
  in accordance with a determination that the user intent is to perform the continuation of the task at the second electronic device and that content for performing the task is located remotely to the second electronic device:
   providing, to the second electronic device, the content for performing the continuation of the task, wherein, based on the provided content, the second electronic device performs the continuation of the task based on where the task was previously stopped at the first electronic device.

2. The method of claim 1, wherein determining the user intent based on the speech input further comprises:
 determining one or more actionable intents; and
 determining one or more parameters associated with the one or more actionable intents.

3. The method of claim 1, wherein determining the user intent further comprises:
 identifying context information associated with the second electronic device; and
 determining the user intent based on the speech input and the context information associated with the second electronic device.

4. The method of claim 3, wherein the context information comprises at least one of:
 user-specific data;
 sensor data; and
 second electronic device configuration data.

5. The method of claim 1, wherein determining that the user intent is to perform the continuation of the task at the second electronic device further comprises:

determining that performing the continuation of the task at the second electronic device satisfies one or more performance criteria.

6. The method of claim 5, further comprising:
in accordance with a determination that performing the continuation of the task at the second electronic device does not satisfy the one or more performance criteria, determining whether performing the continuation of the task at the first electronic device satisfies the one or more performance criteria.

7. The method of claim 6, further comprising:
in accordance with a determination that performing the continuation of the task at the first electronic device satisfies the one or more performance criteria, determining that the continuation of the task is to be performed at the first electronic device; and
in accordance with a determination that the performing the continuation of the task at the first electronic device does not satisfy the one or more performance criteria, determining whether performing the continuation of the task at a third electronic device different from the first electronic device and the second electronic device satisfies the one or more performance criteria.

8. The method of claim 5, wherein the one or more performance criteria are determined based on one or more user preferences.

9. The method of claim 5, wherein the one or more performance criteria are determined based on second electronic device configuration data.

10. The method of claim 5, wherein the one or more performance criteria are dynamically updated.

11. The method of claim 1, wherein providing, to the second electronic device, the content for performing the continuation of the task further comprises:
receiving the content from a fourth electronic device; and
providing, to the second electronic device, the content for performing the continuation of the task.

12. The method of claim 1, wherein providing, to the second electronic device, the content for performing the continuation of the task, wherein, based on the provided content, the second electronic device performs the continuation of the task based on where the task was previously stopped at the first electronic device further comprises:
providing a first response at the first electronic device.

13. The method of claim 12, wherein providing the first response at the first electronic device further comprises:
displaying a first user interface associated with the continuation of the task to be performed at the second electronic device.

14. The method of claim 1, wherein providing, to the second electronic device, the content for performing the continuation of the task, wherein, based on the provided content, the second electronic device performs the continuation of the task based on where the task was previously stopped at the first electronic device further comprises:
the second electronic device providing a second response.

15. The method of claim 14, wherein the second electronic device providing the second response further comprises:
the second electronic device displaying a second user interface associated with the continuation of the task.

16. The method of claim 14, wherein the second electronic device providing the second response further comprises:
the second electronic device providing a link associated with the continuation of the task.

17. The method of claim 1, wherein providing, to the second electronic device, the content for performing the continuation of the task, wherein, based on the provided content, the second electronic device performs the continuation of the task based on where the task was previously stopped at the first electronic device further comprises:
the second electronic device performing a portion of the task that has not been performed at the first electronic device using the content provided from the first electronic device.

18. A first electronic device, comprising:
one or more processors;
memory; and
one or more programs stored in memory, the one or more programs including instructions for:
while performing a task, receiving a speech input that requests to perform a continuation of the task at a second electronic device different from the first electronic device, wherein the second electronic device is capable of performing the continuation of the task, and wherein the second electronic device is communicatively connected to the first electronic device;
determining a user intent based on the speech input; and
in accordance with a determination that the user intent is to perform the continuation of the task at the second electronic device and that content for performing the task is located remotely to the second electronic device:
providing, to the second electronic device, the content for performing the continuation of the task, wherein, based on the provided content, the second electronic device performs the continuation of the task based on where the task was previously stopped at the first electronic device.

19. The first electronic device of claim 18, wherein determining the user intent based on the speech input further comprises:
determining one or more actionable intents; and
determining one or more parameters associated with the one or more actionable intents.

20. The first electronic device of claim 18, wherein determining the user intent further comprises:
identifying context information associated with the second electronic device; and
determining the user intent based on the speech input and the context information associated with the second electronic device.

21. The first electronic device of claim 20, wherein the context information comprises at least one of:
user-specific data;
sensor data; and
second electronic device configuration data.

22. The first electronic device of claim 18, wherein determining that the user intent is to perform the continuation of the task at the second electronic device further comprises:
determining that performing the continuation of the task at the second electronic device satisfies one or more performance criteria.

23. The first electronic device of claim 22, the one or more programs further including instructions for:
in accordance with a determination that performing the continuation of the task at the second electronic device does not satisfy the one or more performance criteria, determining whether performing the continuation of the task at the first electronic device satisfies the one or more performance criteria.

24. The first electronic device of claim 23, the one or more programs further including instructions for:
in accordance with a determination that performing the continuation of the task at the first electronic device satisfies the one or more performance criteria, determining that the continuation of the task is to be performed at the first electronic device; and
in accordance with a determination that the performing the continuation of the task at the first electronic device does not satisfy the one or more performance criteria, determining whether performing the continuation of the task at a third electronic device different from the first electronic device and the second electronic device satisfies the one or more performance criteria.

25. The first electronic device of claim 22, wherein the one or more performance criteria are determined based on one or more user preferences.

26. The first electronic device of claim 22, wherein the one or more performance criteria are determined based on second electronic device configuration data.

27. The first electronic device of claim 22, wherein the one or more performance criteria are dynamically updated.

28. The first electronic device of claim 18, wherein providing, to the second electronic device, the content for performing the continuation of the task further comprises:
receiving the content from a fourth electronic device; and
providing, to the second electronic device, the content for performing the continuation of the task.

29. The first electronic device of claim 18, wherein providing, to the second electronic device, the content for performing the continuation of the task, wherein, based on the provided content, the second electronic device performs the continuation of the task based on where the task was previously stopped at the first electronic device further comprises:
providing a first response at the first electronic device.

30. The first electronic device of claim 29, wherein providing the first response at the first electronic device further comprises:
displaying a first user interface associated with the continuation of the task to be performed at the second electronic device.

31. The first electronic device of claim 18, wherein providing, to the second electronic device, the content for performing the continuation of the task, wherein, based on the provided content, the second electronic device performs the continuation of the task based on where the task was previously stopped at the first electronic device further comprises:
the second electronic device providing a second response.

32. The first electronic device of claim 31, wherein the second electronic device providing the second response further comprises:
the second electronic device displaying a second user interface associated with the continuation of the task.

33. The first electronic device of claim 31, wherein the second electronic device providing the second response further comprises:
the second electronic device providing a link associated with the continuation of the task.

34. The first electronic device of claim 18, wherein providing, to the second electronic device, the content for performing the continuation of the task, wherein, based on the provided content, the second electronic device performs the continuation of the task based on where the task was previously stopped at the first electronic device further comprises:
the second electronic device performing a portion of the task that has not been performed at the first electronic device using the content provided from the first electronic device.

35. A non-transitory computer-readable storage medium comprising one or more programs for execution by one or more processors of a first electronic device, the one or more programs including instructions which, when executed by the one or more processors, cause the first electronic device to:
while performing a task, receive a speech input that requests to perform a continuation of the task at a second electronic device different from the first electronic device, wherein the second electronic device is capable of performing the continuation of the task, and wherein the second electronic device is communicatively connected to the first electronic device;
determine a user intent based on the speech input; and
in accordance with a determination that the user intent is to perform the continuation of the task at the second electronic device and that content for performing the task is located remotely to the second electronic device:
provide, to the second electronic device, the content for performing the continuation of the task, wherein, based on the provided content, the second electronic device performs the continuation of the task based on where the task was previously stopped at the first electronic device.

36. The non-transitory computer-readable storage medium of claim 35, wherein determining the user intent based on the speech input further comprises:
determining one or more actionable intents; and
determining one or more parameters associated with the one or more actionable intents.

37. The non-transitory computer-readable storage medium of claim 35, wherein determining the user intent further comprises:
identifying context information associated with the second electronic device; and
determining the user intent based on the speech input and the context information associated with the second electronic device.

38. The non-transitory computer-readable storage medium of claim 37, wherein the context information comprises at least one of:
user-specific data;
sensor data; and
second electronic device configuration data.

39. The non-transitory computer-readable storage medium of claim 35, wherein determining that the user intent is to perform the continuation of the task at the second electronic device further comprises:
determining that performing the continuation of the task at the second electronic device satisfies one or more performance criteria.

40. The non-transitory computer-readable storage medium of claim 39, wherein the one or more programs further comprise instructions, which when executed by the one or more processors, cause the first electronic device to:
in accordance with a determination that performing the continuation of the task at the second electronic device does not satisfy the one or more performance criteria, determine whether performing the continuation of the task at the first electronic device satisfies the one or more performance criteria.

41. The non-transitory computer-readable storage medium of claim 40, wherein the one or more programs further comprise instructions, which when executed by the one or more processors, cause the first electronic device to:
in accordance with a determination that performing the continuation of the task at the first electronic device satisfies the one or more performance criteria, determine that the continuation of the task is to be performed at the first electronic device; and
in accordance with a determination that the performing the continuation of the task at the first electronic device does not satisfy the one or more performance criteria, determine whether performing the continuation of the task at a third electronic device different from the first electronic device and the second electronic device satisfies the one or more performance criteria.

42. The non-transitory computer-readable storage medium of claim 39, wherein the one or more performance criteria are determined based on one or more user preferences.

43. The non-transitory computer-readable storage medium of claim 39, wherein the one or more performance criteria are determined based on second electronic device configuration data.

44. The non-transitory computer-readable storage medium of claim 39, wherein the one or more performance criteria are dynamically updated.

45. The non-transitory computer-readable storage medium of claim 35, wherein providing, to the second electronic device, the content for performing the continuation of the task further comprises:
receiving the content from a fourth electronic device; and
providing, to the second electronic device, the content for performing the continuation of the task.

46. The non-transitory computer-readable storage medium of claim 35, wherein providing, to the second electronic device, the content for performing the continuation of the task, wherein, based on the provided content, the second electronic device performs the continuation of the task based on where the task was previously stopped at the first electronic device further comprises:
providing a first response at the first electronic device.

47. The non-transitory computer-readable storage medium of claim 46, wherein providing the first response at the first electronic device further comprises:
displaying a first user interface associated with the continuation of the task to be performed at the second electronic device.

48. The non-transitory computer-readable storage medium of claim 35, wherein providing, to the second electronic device, the content for performing the continuation of the task, wherein, based on the provided content, the second electronic device performs the continuation of the task based on where the task was previously stopped at the first electronic device further comprises:
the second electronic device providing a second response.

49. The non-transitory computer-readable storage medium of claim 48, wherein the second electronic device providing the second response further comprises:
the second electronic device displaying a second user interface associated with the continuation of the task.

50. The non-transitory computer-readable storage medium of claim 48, wherein the second electronic device providing the second response further comprises:
the second electronic device providing a link associated with the continuation of the task.

51. The non-transitory computer-readable storage medium of claim 35, wherein providing, to the second electronic device, the content for performing the continuation of the task, wherein, based on the provided content, the second electronic device performs the continuation of the task based on where the task was previously stopped at the first electronic device further comprises:
the second electronic device performing a portion of the task that has not been performed at the first electronic device using the content provided from the first electronic device.

* * * * *